(12) United States Patent
Schmidt et al.

(10) Patent No.: US 11,875,629 B2
(45) Date of Patent: *Jan. 16, 2024

(54) WIRELESS-NETWORKED STROLLER ACCESS CONTROL SYSTEM

(71) Applicant: Scooterbug, Inc., Orlando, FL (US)

(72) Inventors: Mark Christopher Schmidt, Windermere, FL (US); Wesley Edward Swogger, Fairfax Station, VA (US); Thomas Dwayne Taylor, Kissimmee, FL (US); Michael Buchoff Buchoff, Winter Springs, FL (US); Sowmya Balda, Orlando, FL (US); Stephanie Cornelia Lutz, Belle Island, FL (US); Marc Maxwell Barber, Deltona, FL (US); Kevin George Miranda, Ocoee, FL (US)

(73) Assignee: SCOOTERBUG, INC., Orlando, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/242,933

(22) Filed: Apr. 28, 2021

(65) Prior Publication Data

US 2022/0051511 A1 Feb. 17, 2022

Related U.S. Application Data

(63) Continuation of application No. 16/990,381, filed on Aug. 11, 2020, now Pat. No. 11,631,295.

(51) Int. Cl.
*G07F 17/12* (2006.01)
*G07C 9/00* (2020.01)
(Continued)

(52) U.S. Cl.
CPC .......... *G07F 17/12* (2013.01); *G06K 7/1417* (2013.01); *G06Q 30/0645* (2013.01);
(Continued)

(58) Field of Classification Search
CPC ............ G07C 9/00912; G07C 9/00571; G07C 9/00896; G07C 9/00309;
(Continued)

(56) References Cited

U.S. PATENT DOCUMENTS 689,243 A 12/1901 Sutton
1,409,312 A 3/1922 Pippin
(Continued)

FOREIGN PATENT DOCUMENTS

BE 1024241 B1 1/2018
CN 2558420 Y 7/2003
(Continued)

OTHER PUBLICATIONS

International Search Report dated Feb. 7, 2022 issued in PCT International Application No. PCT/US2021/045463 (pp. 15).
(Continued)

*Primary Examiner* — Yong Hang Jiang
(74) *Attorney, Agent, or Firm* — THOMAS J. PERKOWSKI, ESQ., PC

(57) ABSTRACT

A wireless-networked stroller access control system includes a plurality of wireless-networked strollers, each having stroller framework for carrying a passenger, and having a set of wheels mounted on an axle. A device-level machine-readable code is displayed on a surface associated with the stroller system. A wheel brake assembly is arranged with the set of wheels and has a locked position, and an unlocked position. A manually-actuated control bar assembly is mounted on the stroller framework, arranged with respect to the wheel brake assembly, and has a locked state (Continued)

of operation and an unlocked state of operation. A wireless wheel-axle locking control module is arranged in wireless communication with a wireless communication infrastructure, and configured with the manually-actuated control bar assembly to control the state of operation of the manually-actuated control bar assembly and also the wheel brake assembly. When a web-enabled mobile phone is used to (i) scan the device-level machine-readable code displayed on the wireless-networked stroller, (ii) complete a stroller rental transaction over the wireless access control network, and (iii) obtain access control over the rented stroller system, then the wireless wheel-axle locking control module unlocks the wheel brake assembly, so that the set of wheels are allowed to rotate and the stroller framework is allowed to moved relative to the ground surface.

16 Claims, 129 Drawing Sheets

(51) Int. Cl.
*G06K 7/14* (2006.01)
*G06Q 30/06* (2023.01)
*G06Q 30/0645* (2023.01)

(52) U.S. Cl.
CPC ..... *G07C 9/00309* (2013.01); *G07C 9/00571* (2013.01); *G07C 9/00912* (2013.01); *G07C 2009/00523* (2013.01)

(58) Field of Classification Search
CPC .......... G07C 2009/00523; G07F 17/12; G06K 7/1417; G06K 17/00; G06Q 30/0645
USPC ....................................................... 340/5.73
See application file for complete search history.

(56) References Cited

U.S. PATENT DOCUMENTS

| | | | |
|---|---|---|---|
| 1,411,496 A | 4/1922 | Herrmann | |
| 1,681,093 A | 8/1928 | Capek | |
| 1,732,030 A | 10/1929 | Runyan | |
| 3,447,735 A | 6/1969 | Whitney | |
| 3,978,959 A | 9/1976 | Muellner | |
| 4,177,589 A | 12/1979 | Villa | |
| 4,494,805 A | 1/1985 | Washburn | |
| 4,496,896 A | 1/1985 | Melocik | |
| 4,654,482 A | 3/1987 | Deangelis | |
| 4,698,630 A | 10/1987 | Ellsberg | |
| 4,841,132 A | 6/1989 | Kajitani | |
| D304,110 S | 10/1989 | Yang | |
| 5,157,687 A | 10/1992 | Tymes | |
| 5,169,222 A | 12/1992 | Bollore | |
| 5,202,817 A * | 4/1993 | Koenck | G06F 1/1626 |
| | | | 345/169 |
| 5,231,272 A | 7/1993 | Mardon | |
| 5,280,498 A | 1/1994 | Tymes | |
| 5,288,976 A | 2/1994 | Citron | |
| D349,796 S | 8/1994 | Wimberley | |
| 5,345,379 A | 9/1994 | Brous | |
| 5,370,408 A | 12/1994 | Eagan | |
| 5,429,290 A | 7/1995 | Greene, Jr. | |
| 5,448,046 A | 9/1995 | Swartz | |
| 5,483,052 A | 1/1996 | Smith, III | |
| 5,490,217 A | 2/1996 | Wang | |
| 5,506,697 A | 4/1996 | Li | |
| 5,523,666 A | 6/1996 | Hoelzl | |
| 5,547,684 A | 8/1996 | Vainberg | |
| 5,635,694 A | 6/1997 | Tuhro | |
| 5,804,803 A | 9/1998 | Cragun | |
| 5,815,657 A | 9/1998 | Williams | |
| 5,825,002 A | 10/1998 | Roslak | |
| 5,842,713 A * | 12/1998 | Barnes | B62B 7/06 |
| | | | 280/47.38 |
| 5,869,819 A | 2/1999 | Knowles | |
| 5,894,277 A | 4/1999 | Keskin | |
| 5,902,353 A | 5/1999 | Reber | |
| 5,903,729 A | 5/1999 | Reber | |
| 5,905,251 A | 5/1999 | Knowles | |
| 5,918,213 A | 6/1999 | Bernard | |
| 5,923,884 A | 7/1999 | Peyret | |
| 5,929,276 A | 7/1999 | Kirkovits | |
| 5,930,767 A | 7/1999 | Reber | |
| 5,933,829 A | 8/1999 | Durst | |
| 5,938,726 A | 8/1999 | Reber | |
| 5,940,000 A | 8/1999 | Dykema | |
| 5,940,595 A | 8/1999 | Reber | |
| 5,946,660 A | 8/1999 | McCarty | |
| D415,073 S | 10/1999 | Meehan | |
| 5,971,277 A | 10/1999 | Cragun | |
| 5,978,773 A | 11/1999 | Hudetz | |
| 5,979,757 A | 11/1999 | Tracy | |
| 5,992,752 A | 11/1999 | Wilz, Sr. | |
| 6,012,102 A | 1/2000 | Shachar | |
| 6,027,024 A | 2/2000 | Knowles | |
| 6,064,979 A | 5/2000 | Perkowski | |
| 6,070,793 A | 6/2000 | Reichl | |
| 6,073,958 A | 6/2000 | Gagnon | |
| 6,108,656 A | 8/2000 | Durst | |
| 6,139,061 A | 10/2000 | Lewis | |
| 6,165,773 A | 12/2000 | New | |
| 6,185,773 B1 | 2/2001 | Goedde | |
| 6,199,048 B1 | 3/2001 | Hudetz | |
| D446,478 S | 8/2001 | Wu | |
| 6,311,214 B1 | 10/2001 | Rhoads | |
| 6,321,991 B1 | 11/2001 | Knowles | |
| 6,321,992 B1 | 11/2001 | Knowles | |
| 6,345,764 B1 | 2/2002 | Knowles | |
| 6,375,078 B1 | 4/2002 | Russell | |
| 6,384,717 B1 | 5/2002 | Devolpi | |
| 6,386,453 B1 | 5/2002 | Russell | |
| 6,400,272 B1 | 6/2002 | Holtzman | |
| 6,412,699 B1 | 7/2002 | Russell | |
| 6,464,139 B1 | 10/2002 | Wilz, Sr. | |
| 6,491,122 B2 | 12/2002 | Leitner | |
| 6,505,776 B1 | 1/2003 | Wilz, Sr. | |
| 6,510,997 B1 | 1/2003 | Wilz, Sr. | |
| 6,525,510 B1 | 2/2003 | Ayano | |
| 6,542,927 B2 | 4/2003 | Rhoads | |
| 6,568,595 B1 | 5/2003 | Russell | |
| 6,622,917 B1 | 9/2003 | Knowles | |
| 6,622,919 B1 | 9/2003 | Wilz | |
| 6,625,581 B1 | 9/2003 | Perkowski | |
| 6,655,180 B2 | 12/2003 | Gokcebay | |
| 6,694,043 B2 | 2/2004 | Seder | |
| 6,694,217 B2 | 2/2004 | Bloom | |
| 6,791,450 B2 | 9/2004 | Gokcebay | |
| 6,802,000 B1 | 10/2004 | Greene | |
| 6,806,807 B2 | 10/2004 | Cayne | |
| 6,827,273 B2 | 12/2004 | Wilz, Sr. | |
| 6,850,153 B1 | 2/2005 | Murakami | |
| 6,868,433 B1 | 3/2005 | Philyaw | |
| 6,879,243 B1 | 4/2005 | Booth | |
| 6,882,269 B2 | 4/2005 | Moreno | |
| 6,942,150 B2 | 9/2005 | Knowles | |
| 6,961,712 B1 | 11/2005 | Perkowski | |
| 6,961,713 B2 | 11/2005 | Perkowski | |
| 6,980,797 B1 | 12/2005 | Tuulos | |
| 6,988,662 B2 | 1/2006 | Russell | |
| 6,999,825 B2 | 2/2006 | Inomata | |
| 7,012,053 B1 | 3/2006 | Barnabas | |
| 7,012,503 B2 | 3/2006 | Nielsen | |
| 7,023,177 B1 | 4/2006 | Bussinger | |
| 7,068,149 B2 | 6/2006 | Lee | |
| 7,089,199 B2 | 8/2006 | Perkowski | |
| 7,108,171 B1 | 9/2006 | Ergo | |
| 7,143,055 B1 | 11/2006 | Perkowski | |
| 7,176,782 B2 | 2/2007 | Shitan | |
| 7,183,925 B2 | 2/2007 | Marshall | |
| 7,323,967 B2 | 1/2008 | Booth | |
| 7,337,968 B2 | 3/2008 | Wilz, Sr. | |

(56) References Cited

U.S. PATENT DOCUMENTS

| | | |
|---|---|---|
| 7,341,191 B2 | 3/2008 | Russell |
| 7,430,528 B2 | 9/2008 | Perkowski |
| 7,434,674 B1 | 10/2008 | Bain |
| 7,438,148 B1 | 10/2008 | Crea |
| 7,441,710 B2 | 10/2008 | Perkowski |
| 7,445,300 B2 | 11/2008 | Collins |
| 7,458,514 B1 | 12/2008 | Kitada |
| 7,477,132 B2 | 1/2009 | Mayer |
| 7,493,908 B2 | 2/2009 | Carter |
| 7,516,094 B2 | 4/2009 | Perkowski |
| 7,526,122 B2 | 4/2009 | Usuda |
| 7,533,040 B2 | 5/2009 | Perkowski |
| 7,548,988 B2 | 6/2009 | Philyaw |
| 7,591,335 B2 | 9/2009 | Howell |
| 7,659,891 B2 | 2/2010 | MacKenzie |
| 7,705,731 B2 | 4/2010 | Trammell, III |
| 7,711,598 B2 | 5/2010 | Perkowski |
| 7,739,353 B2 | 6/2010 | Philyaw |
| 7,748,511 B1 | 7/2010 | Maher |
| 7,764,176 B2 | 7/2010 | Zhang |
| 7,785,167 B2 | 8/2010 | Friend-Douglass |
| 7,819,316 B2 | 10/2010 | Philyaw |
| 7,819,719 B2 | 10/2010 | Tye |
| 7,822,829 B2 | 10/2010 | Philyaw |
| 7,828,399 B1 | 11/2010 | Bass |
| 7,844,492 B2 | 11/2010 | Perkowski |
| 7,848,948 B2 | 12/2010 | Perkowski |
| 7,865,275 B2 | 1/2011 | Palmer |
| 7,866,422 B2 | 1/2011 | Peters |
| 7,880,585 B1 | 2/2011 | Aronson |
| 7,900,952 B2 | 3/2011 | Cone, II |
| 7,904,333 B1 | 3/2011 | Perkowski |
| 8,172,033 B2 | 5/2012 | Corbett |
| 8,239,251 B2 | 8/2012 | Wellman |
| 8,253,533 B2 | 8/2012 | Jones |
| RE43,680 E | 9/2012 | Kitada |
| 8,366,135 B2 | 2/2013 | Asbach |
| 8,368,700 B1 | 2/2013 | Difrancesco |
| 8,390,629 B2 | 3/2013 | Anderson |
| 8,410,901 B2 | 4/2013 | Mullin |
| 8,463,765 B2 | 6/2013 | Lesavich |
| 8,500,012 B2 | 8/2013 | Amdahl |
| 8,639,578 B2 | 1/2014 | Barber |
| 8,714,452 B2 | 5/2014 | Amdahl |
| 8,854,184 B2 | 10/2014 | Mullin |
| 8,854,185 B2 | 10/2014 | Mullin |
| 8,892,463 B2 | 11/2014 | Mullin |
| 8,990,110 B2 | 3/2015 | Mullin |
| 9,010,769 B1 | 4/2015 | Munive |
| 9,050,879 B2 | 6/2015 | Guzzetta |
| 9,138,638 B2 | 9/2015 | Bastawros |
| 9,145,067 B1 | 9/2015 | Dahlen |
| 9,158,946 B2 | 10/2015 | Amdahl |
| 9,284,054 B2 | 3/2016 | Saint-Jalmes |
| 9,339,671 B1 | 5/2016 | Raj |
| 9,418,345 B1 | 8/2016 | Meehan |
| 9,430,892 B2 | 8/2016 | Amdahl |
| 9,558,608 B2 | 1/2017 | Amdahl |
| 9,610,510 B2 | 4/2017 | Comploi |
| 9,656,682 B2 | 5/2017 | Ahlemeier |
| 9,706,835 B2 | 7/2017 | Zaniker |
| 9,795,214 B2 | 10/2017 | Zaniker |
| 9,818,217 B2 | 11/2017 | Tena |
| 9,826,049 B2 | 11/2017 | Lim |
| 9,889,979 B2 | 2/2018 | Nelson |
| 9,936,804 B2 | 4/2018 | Zaniker |
| 9,937,932 B2 | 4/2018 | Nemeth |
| 9,943,769 B2 | 4/2018 | Comploi |
| 9,948,603 B1 | 4/2018 | Lee |
| 9,975,031 B2 | 5/2018 | Bastawros |
| 9,984,356 B2 | 5/2018 | Janis |
| 10,040,611 B2 | 8/2018 | Nelson |
| 10,052,246 B2 | 8/2018 | Lozano |
| 10,064,123 B2 | 8/2018 | Bari |
| 10,096,183 B2 | 10/2018 | Nitu |
| 10,140,191 B2 | 11/2018 | Kaulgud |
| 10,182,952 B1 | 1/2019 | Nelson-Herron |
| 10,210,474 B2 | 2/2019 | Robinson |
| 10,234,087 B2 | 3/2019 | Spriggins |
| 10,249,128 B1 | 4/2019 | Yang |
| 10,322,675 B2 | 6/2019 | Naboulsi |
| 10,346,614 B1 | 7/2019 | Ko |
| 10,435,093 B2 | 10/2019 | White |
| 10,460,539 B2 | 10/2019 | Zielkowski |
| 10,474,797 B2 | 11/2019 | Lowenthal |
| 10,504,313 B2 | 12/2019 | Dautz |
| 10,536,211 B2 | 1/2020 | Leroux |
| 10,594,929 B2 | 3/2020 | Tyson |
| 10,596,930 B2 | 3/2020 | Chiesa |
| 10,621,811 B2 | 4/2020 | Tovey |
| 10,660,806 B1 | 5/2020 | Nelson-Herron |
| 10,672,211 B2 | 6/2020 | Flynn |
| 10,679,239 B2 | 6/2020 | Khoyilar |
| 10,693,714 B2 | 6/2020 | Teo |
| 10,701,074 B2 | 6/2020 | Tsao |
| 10,755,508 B2 | 8/2020 | Ghorpade |
| 10,779,642 B2 | 9/2020 | Zaniker |
| 10,814,926 B2 | 10/2020 | White |
| 10,817,484 B2 | 10/2020 | Rana |
| 10,820,265 B2 | 10/2020 | Schneider |
| 10,827,358 B2 | 11/2020 | Cui |
| 10,839,629 B2 | 11/2020 | Jones |
| 10,846,970 B2 | 11/2020 | Ruggiero |
| 10,861,267 B2 | 12/2020 | Aman |
| 10,915,856 B2 | 2/2021 | Fee |
| 10,965,684 B2 | 3/2021 | Achtermann |
| 10,992,711 B2 | 4/2021 | Hu |
| 11,038,838 B2 | 6/2021 | Lau |
| 11,082,839 B2 | 8/2021 | Jacobson |
| 2002/0035515 A1 | 3/2002 | Moreno |
| 2002/0180582 A1 | 12/2002 | Nielsen |
| 2003/0022138 A1 | 1/2003 | Korala |
| 2003/0023453 A1 | 1/2003 | Hafen |
| 2003/0141840 A1 | 7/2003 | Sanders |
| 2003/0227550 A1 | 12/2003 | Manico |
| 2003/0236601 A1 | 12/2003 | McLeod |
| 2004/0046014 A1 | 3/2004 | Russell |
| 2005/0040093 A1 | 2/2005 | Yanagisawa |
| 2005/0040931 A1 | 2/2005 | Shitan |
| 2005/0044906 A1 | 3/2005 | Spielman |
| 2005/0068178 A1 | 3/2005 | Lee |
| 2005/0090981 A1 | 4/2005 | Gaegauf |
| 2005/0171663 A1 | 8/2005 | Mittelsteadt |
| 2005/0179349 A1 | 8/2005 | Booth |
| 2005/0190037 A1 | 9/2005 | Shitan |
| 2005/0254185 A1* | 11/2005 | Cunningham ........ A47L 9/2842 361/23 |
| 2005/0283043 A1 | 12/2005 | Sisk |
| 2007/0001804 A1 | 1/2007 | Lanier |
| 2007/0021032 A1 | 1/2007 | Tye |
| 2007/0208483 A1 | 9/2007 | Rabin |
| 2008/0010105 A1 | 1/2008 | Rose |
| 2008/0054704 A1 | 3/2008 | Friend-Douglass |
| 2008/0103696 A1 | 5/2008 | Cheok |
| 2008/0170355 A1 | 7/2008 | Kyriakides |
| 2009/0033445 A1 | 2/2009 | Menard |
| 2009/0033456 A1 | 2/2009 | Castillo |
| 2009/0079153 A1* | 3/2009 | Chaudeurge ............ B62B 9/005 280/47.38 |
| 2009/0121832 A1 | 5/2009 | Mullin |
| 2009/0153566 A1 | 6/2009 | Anderson |
| 2009/0174363 A1 | 7/2009 | Maher |
| 2009/0200838 A1 | 8/2009 | Cone, II |
| 2009/0257564 A1 | 10/2009 | Kito |
| 2009/0267564 A1 | 10/2009 | Gerber |
| 2010/0030590 A1 | 2/2010 | Sodaro |
| 2010/0089846 A1 | 4/2010 | Navarro Ruiz |
| 2010/0102780 A1 | 4/2010 | Koh |
| 2010/0228405 A1 | 9/2010 | Morgal |
| 2010/0287057 A1 | 11/2010 | Aihara |
| 2011/0074350 A1 | 3/2011 | Kocher |
| 2011/0074541 A1 | 3/2011 | Jones |
| 2011/0140656 A1 | 6/2011 | Starr |
| 2011/0163520 A1 | 7/2011 | Fair |

(56) References Cited

U.S. PATENT DOCUMENTS

| | | |
|---|---|---|
| 2011/0208710 A1 | 8/2011 | Lesavich |
| 2011/0301748 A1 | 12/2011 | Lecarpentier |
| 2011/0303371 A1 | 12/2011 | Harrison |
| 2012/0007848 A1 | 1/2012 | Han |
| 2012/0078413 A1 | 3/2012 | Baker, Jr. |
| 2012/0098493 A1 | 4/2012 | Budike |
| 2012/0138548 A1 | 6/2012 | Young |
| 2012/0203672 A1 | 8/2012 | Morgan |
| 2012/0203673 A1 | 8/2012 | Morgan |
| 2012/0203695 A1 | 8/2012 | Morgan |
| 2012/0312562 A1 | 12/2012 | Woehrle |
| 2012/0324966 A1* | 12/2012 | Dallaire ............. B62H 3/02 70/57 |
| 2013/0036456 A1 | 2/2013 | Boysen |
| 2013/0073377 A1 | 3/2013 | Heath |
| 2013/0117078 A1 | 5/2013 | Weik, III |
| 2013/0173242 A1 | 7/2013 | Anderson |
| 2013/0197992 A1 | 8/2013 | Bao |
| 2013/0254122 A1 | 9/2013 | Mullin |
| 2013/0292468 A1 | 11/2013 | Amdahl |
| 2014/0035721 A1 | 2/2014 | Heppe |
| 2014/0058870 A1 | 2/2014 | Zhao |
| 2014/0203076 A1 | 7/2014 | Amdahl |
| 2014/0309842 A1 | 10/2014 | Jefferies |
| 2014/0316918 A1 | 10/2014 | Zaniker |
| 2014/0330407 A1 | 11/2014 | Corder |
| 2014/0346746 A1* | 11/2014 | Li ..................... B62B 9/20 280/47.38 |
| 2014/0354403 A1 | 12/2014 | Zaniker |
| 2015/0004873 A1 | 1/2015 | Schecter |
| 2015/0102630 A1 | 4/2015 | Guzzetta |
| 2015/0102711 A1 | 4/2015 | Zaniker |
| 2015/0112887 A1 | 4/2015 | Camp |
| 2015/0120602 A1 | 4/2015 | Huffman |
| 2015/0170164 A1 | 6/2015 | Marsico |
| 2015/0179006 A1 | 6/2015 | Von Zurmuehlen |
| 2015/0199610 A1 | 7/2015 | Hershberg |
| 2015/0254760 A1 | 9/2015 | Pepper |
| 2015/0255226 A1 | 9/2015 | Rouvala |
| 2015/0356801 A1* | 12/2015 | Nitu ................. H04W 4/80 340/5.61 |
| 2016/0035166 A1 | 2/2016 | Amdahl |
| 2016/0066733 A1 | 3/2016 | Gozar |
| 2016/0098678 A1 | 4/2016 | Levy |
| 2016/0133074 A1 | 5/2016 | Amdahl |
| 2016/0133075 A1 | 5/2016 | Amdahl |
| 2016/0180623 A1 | 6/2016 | Rashkovan |
| 2016/0189147 A1 | 6/2016 | Vanczak |
| 2016/0200261 A1 | 7/2016 | White |
| 2017/0016249 A1 | 1/2017 | Johnson |
| 2017/0032597 A1 | 2/2017 | Johnson |
| 2017/0059534 A1 | 3/2017 | McAdams |
| 2017/0098273 A1 | 4/2017 | Meehan |
| 2017/0116449 A1 | 4/2017 | Kotlarsky |
| 2017/0157521 A1 | 6/2017 | Comploi |
| 2017/0244262 A1 | 8/2017 | Schadow |
| 2017/0250834 A1 | 8/2017 | Hsiao |
| 2017/0266069 A1 | 9/2017 | Lozano |
| 2017/0311715 A1 | 11/2017 | Zaniker |
| 2017/0341672 A1* | 11/2017 | Fleming ............. B60T 11/046 |
| 2017/0347885 A1 | 12/2017 | Tan |
| 2017/0367909 A1 | 12/2017 | Barnes |
| 2018/0040181 A1 | 2/2018 | Groeger |
| 2018/0041493 A1 | 2/2018 | Wilkinson |
| 2018/0061157 A1 | 3/2018 | Zielkowski |
| 2018/0091503 A1 | 3/2018 | Tang |
| 2018/0101833 A1 | 4/2018 | Parekh |
| 2018/0109308 A1 | 4/2018 | Leroux |
| 2018/0135987 A1 | 5/2018 | Evans |
| 2018/0139290 A1 | 5/2018 | Lim |
| 2018/0162613 A1 | 6/2018 | Nelson |
| 2018/0165638 A1 | 6/2018 | Wilkinson |
| 2018/0165640 A1 | 6/2018 | Wilkinson |
| 2018/0182194 A1* | 6/2018 | Schmidt-Lackner ................... G07C 9/00896 |
| 2018/0191719 A1 | 7/2018 | Tsao |
| 2018/0225749 A1 | 8/2018 | Shoen |
| 2018/0315012 A1 | 11/2018 | Janis |
| 2018/0331386 A1 | 11/2018 | Koh |
| 2018/0337820 A1 | 11/2018 | Chen |
| 2018/0350144 A1 | 12/2018 | Rathod |
| 2018/0350177 A1 | 12/2018 | Dautz |
| 2018/0365641 A1 | 12/2018 | Zhu |
| 2019/0021921 A1 | 1/2019 | Nelson-Herron |
| 2019/0035186 A1 | 1/2019 | Nitu |
| 2019/0042175 A1 | 2/2019 | Shah |
| 2019/0054972 A1 | 2/2019 | Meehan |
| 2019/0056745 A1 | 2/2019 | Meehan |
| 2019/0080574 A1 | 3/2019 | Cai |
| 2019/0108430 A1 | 4/2019 | Coppedge |
| 2019/0132329 A1 | 5/2019 | Verberkt |
| 2019/0172011 A1 | 6/2019 | Robinson |
| 2019/0195443 A1 | 6/2019 | Spriggins |
| 2019/0236873 A1 | 8/2019 | Estill |
| 2019/0246262 A1 | 8/2019 | Salkintzis |
| 2019/0248439 A1 | 8/2019 | Wang |
| 2019/0259232 A1 | 8/2019 | Nandakumar |
| 2019/0281030 A1 | 9/2019 | Isaacson |
| 2019/0304216 A1 | 10/2019 | Mendelson |
| 2019/0325691 A1 | 10/2019 | Tovey |
| 2019/0329125 A1 | 10/2019 | Peretz |
| 2019/0333304 A1 | 10/2019 | Flynn |
| 2019/0347532 A1 | 11/2019 | Amisar |
| 2019/0379739 A1 | 12/2019 | Schulz |
| 2019/0386954 A1 | 12/2019 | Lau |
| 2020/0045546 A1 | 2/2020 | Zhou |
| 2020/0059363 A1 | 2/2020 | Lobo |
| 2020/0068029 A1 | 2/2020 | Lim |
| 2020/0112614 A1 | 4/2020 | Lim |
| 2020/0184758 A1 | 6/2020 | Groeger |
| 2020/0193375 A1 | 6/2020 | Santangeli |
| 2020/0220788 A1 | 7/2020 | Ramanathan |
| 2020/0226706 A1 | 7/2020 | Ramarao |
| 2020/0229596 A1 | 7/2020 | Finney |
| 2020/0268577 A1 | 8/2020 | Lau |
| 2020/0286354 A1 | 9/2020 | Bloom |
| 2020/0301748 A1 | 9/2020 | Gupta |
| 2020/0309551 A1 | 10/2020 | Yang |
| 2020/0357211 A1 | 11/2020 | Mendelson |
| 2020/0385046 A1 | 12/2020 | Vollmar |
| 2020/0394436 A1 | 12/2020 | Rakshit |
| 2021/0049846 A1 | 2/2021 | Kashi |
| 2021/0126810 A1 | 4/2021 | Dinh |
| 2021/0142277 A1 | 5/2021 | Fee |
| 2022/0051509 A1 | 2/2022 | Schmidt |
| 2022/0051510 A1 | 2/2022 | Schmidt |
| 2022/0051511 A1 | 2/2022 | Schmidt |
| 2022/0051512 A1 | 2/2022 | Schmidt |
| 2022/0051513 A1 | 2/2022 | Schmidt |
| 2022/0051514 A1 | 2/2022 | Schmidt |
| 2022/0051515 A1 | 2/2022 | Schmidt |

FOREIGN PATENT DOCUMENTS

| | | | |
|---|---|---|---|
| CN | 1565673 A | | 1/2005 |
| CN | 201940046 U | | 8/2011 |
| CN | 202208341 U | | 5/2012 |
| CN | 207473750 U | | 6/2018 |
| CN | 207565656 U | | 7/2018 |
| CN | 109102359 A | | 12/2018 |
| CN | 109102359 A | * | 12/2018 |
| CN | 208233253 | | 12/2018 |
| EP | 0645728 A2 | | 3/1995 |
| EP | 2887240 | | 6/2015 |
| EP | 2887240 A1 | | 6/2015 |
| EP | 3668467 A1 | | 2/2019 |
| KR | 101272562 B1 | | 6/2013 |
| WO | 2005076233 | | 8/2005 |
| WO | 2006036913 A2 | | 4/2006 |
| WO | 2007098571 A1 | | 9/2007 |
| WO | 2009079514 A1 | | 6/2009 |
| WO | 2010036952 A2 | | 4/2010 |
| WO | WO-2010036952 A2 | * | 4/2010 ......... B60B 33/0007 |
| WO | 2010067006 | | 6/2010 |

(56) References Cited

FOREIGN PATENT DOCUMENTS

| WO | 2012050891 | | 4/2012 |
|---|---|---|---|
| WO | 2013049259 | A2 | 4/2013 |
| WO | 2013115815 | | 8/2013 |
| WO | 2013115815 | A1 | 8/2013 |
| WO | 2014014362 | A1 | 1/2014 |
| WO | 2017059534 | A1 | 4/2017 |
| WO | 2019035888 | | 2/2019 |
| WO | 2019035888 | A1 | 2/2019 |

OTHER PUBLICATIONS

Written Opinion dated Feb. 7, 2022 issued in PCT International Application No. PCT/US2021/045463 (pp. 22).
International Search Report dated Feb. 1, 2022 issued in PCT International Application No. PCT/US2021/045456 (pp. 13).
Written Opinion dated Feb. 1, 2022 issued in PCT International Application No. PCT/US2021/045456 (pp. 42).
International Search Report dated Jan. 26, 2022 issued in PCT International Application No. PCT/US2021/045459 (pp. 8).
Written Opinion dated Jan. 26, 2022 issued in PCT International Application No. PCT/US2021/045459 (pp. 36).
International Search Report dated Dec. 15, 2021 issued in PCT International Application No. PCT/US2021/045461 (pp. 9).
Written Opinion dated Dec. 15, 2021 issued in PCT International Application No. PCT/US2021/045461 (pp. 11).
Rydables Inc. "Rydables" May 2021 (pp. 25).
Office Action (Non-Final Rejection) dated Apr. 25, 2022 for U.S. Appl. No. 16/990,381 (pp. 1-12).
US Trademark Registration No. 5547684 for the mark "Rydables" granted to Ridabl, LLC on Aug. 21, 2018 (pp. 1-29).
Office Action dated Jun. 9, 2020 for U.S. Appl. No. 16/152,144 (pp. 1-195).
Office Action (Non-Final Rejection) dated May 12, 2022 for U.S. Appl. No. 17/242,922 (pp. 1-12).
Office Action (Non-Final Rejection) dated Nov. 23, 2022 for U.S. Appl. No. 17/242,990 (pp. 1-11).
Office Action (Notice of Allowance and Fees Due (PTOL-85)) dated Feb. 8, 2023 for U.S. Appl. No. 16/990,381 (pp. 1-7).
Office Action (Final Rejection) dated Feb. 9, 2023 for U.S. Appl. No. 17/242,922 (pp. 1-8).
Office Action (Final Rejection) dated Mar. 1, 2023 for U.S. Appl. No. 17/242,945 (pp. 1-12).
Reply to Written Opinion issued in PCT Application No. PCT/US2021/45459 dated Oct. 4, 2022.
International Preliminary Report on Patentability (IPRP) issued in PCT Application No. PCT/US2021/045459.
International Preliminary Report on Patentability (IPRP) issued in PCT Application No. PCT/US2021/045456.

\* cited by examiner

Locker Status Light Guide
from GoPod® Operations Manual

| | |
|---|---|
|  | Solid Green, Indicates the locker is communicating & Available for Rent |
|  | Solid Red, Indicates the locker is communicating & is Rented |
|  | Slow Flashing Red, Indicates the locker is Out of Service |
|  | Blinking Red & Green, Indicates the Rental is Expired |
|  | Rapidly Blinking Green, Indicates the locker was rented but not accessed |
|  | Slow Flashing Green, Indicates the door is open on Available Locker |
|  | Steady Yellow, Indicates Keypad lost Communication with Server |
|  | Solid Read & Flashing Green, Indicates the door is open on Rented Locker |
|  | Blinking Yellow, Indicates there is a communication failure with Keypad |
|  | Rapid Flashing Yellow, Indicates the Keypad is ready to be addressed |
| 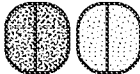 | Flashing Read & Green, Indicates the entered PIN is incorrect or incomplete |
|  | Solid Red-Flashing Yellow, Indicates a key is pressed on Keypad -Rented Locker |
|  | Solid Green-Flashing Yellow, Indicates a key is pressed on Keypad on Available Locker |

(PRIOR ART)

FIG. 2

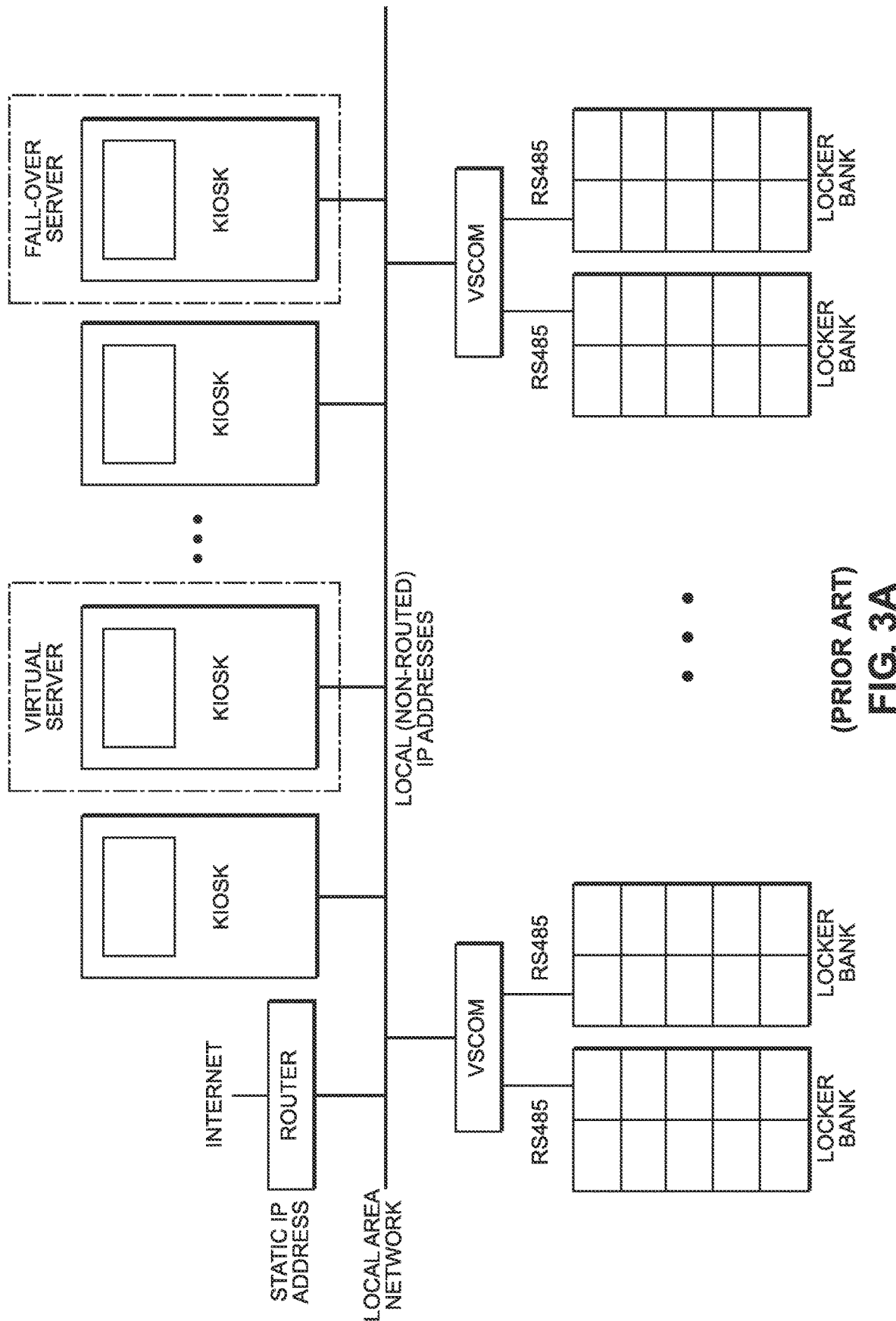

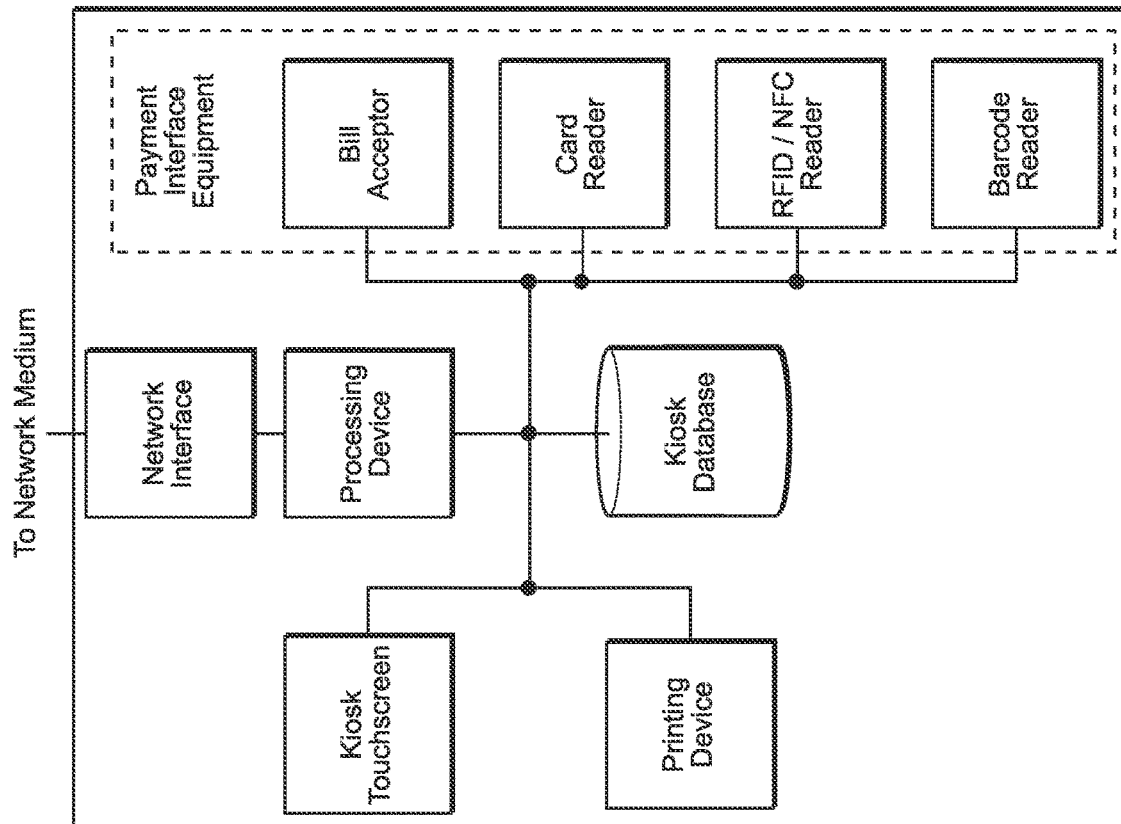
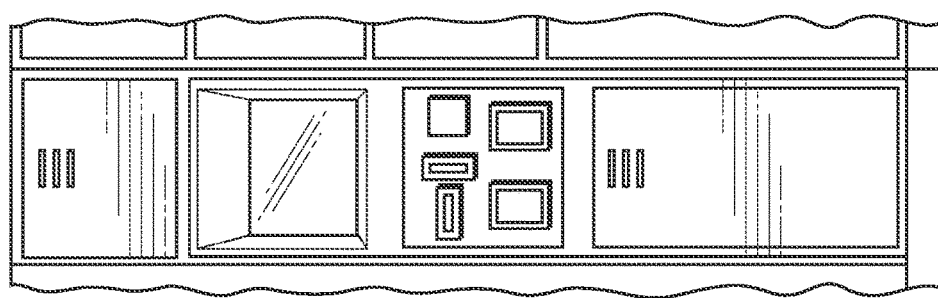
(PRIOR ART)
FIG. 6C

RULE-BASED TRIGGERS FOR AUTOMATED RE-DIRECTION OF TRANSACTIONAL WORKFLOW UPON AUTOMATED DETECTION THEREOF DURING QR DRIVEN ACCESS CONTROL PROCESSES EXECUTING ON SYSTEM SERVERS

TRIGGER RULE #1 :

If all or specific size Lockers are sold out at specific Site-Level,
Then Re-Direct to Facility-Level In the Transactional Workflow

TRIGGER RULE #2

If a different (new) mobile phone scans a Door-Level QR code on a locker that is currently rented, then the system will displays a message in the web browser of the mobile phone: "this locker is already rented by a different user, if you would like to rent a locker, look for a GREEN LED".

TRIGGER RULE #3

If a guest re-scans a Door-Level code upon returning to her locker, and the mobile phone performing the scanning is recognized by its stored Transaction Identifier, then the system will pre-populate the PIN of the guest into the PIN field of the web browser application.

TRIGGER RULE #4

If a guest's mobile smartphone scans a Door-Level QR code and Internet operation is detected as unavailable, then mobile phone should load its local Bluetooth (BT) communication GUI to establish a wireless BT communication connection between the Locker Unit and mobile smartphone and invite the user to enter his or her PIN code into the locker unit so it can be opened and belongings retrieved

TRIGGER RULE #5

If a guest's mobile smartphone scans a Facility-Level or Site-Level QR Code, and the mobile phone does not receive an Internet Server Connection Status from System Network Servers, then load and display a GUI on mobile smartphone with message requesting the guest user to attempt to scan a Door-Level QR code on a Locker Unit at Local Kiosk Server System 170 (using WIFI) to rent a new locker unit or open a currently rented locker unit, as the case may be.

FIG. 8C

EXEMPLARY MULTI-LEVEL MACHINE-READABLE CODE HIERARCHY EMPLOYED IN THE WIRELESS ACCESS CONTROL SYSTEM NETWORK

| QR code type | URL (for example only) | Additional info associated to the Unique ID pulled from the Database |
|---|---|---|
| Door level | //GoPod.mobi/door | Facility, site, door, type (timed/daily), Size, pricing |
| Site level | //GoPod.mobi/site | Facility, site, door, type (timed/daily), Size OPTIONS pricing for each size and option- Inventory status of each type |
| Facility level | //GoPod.mobi/facility | Facility, site(s)- to be rendered as choices types, size options, pricing for each size and type option |

FIG. 9

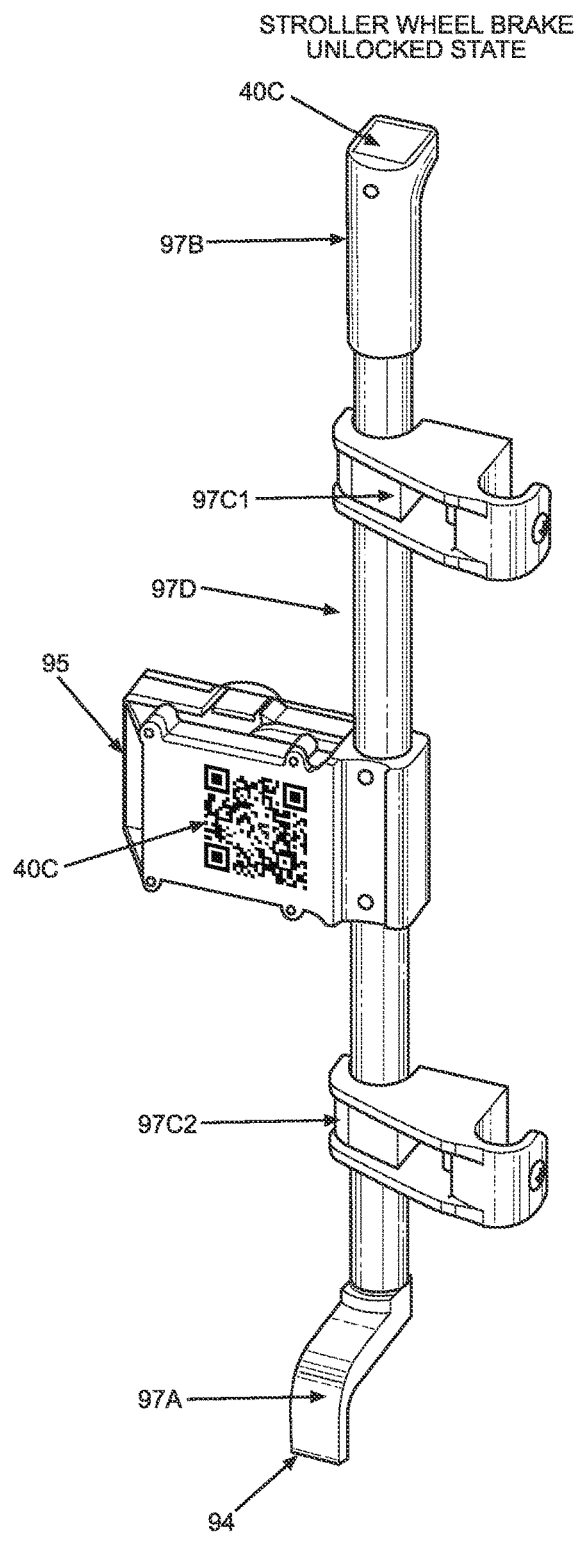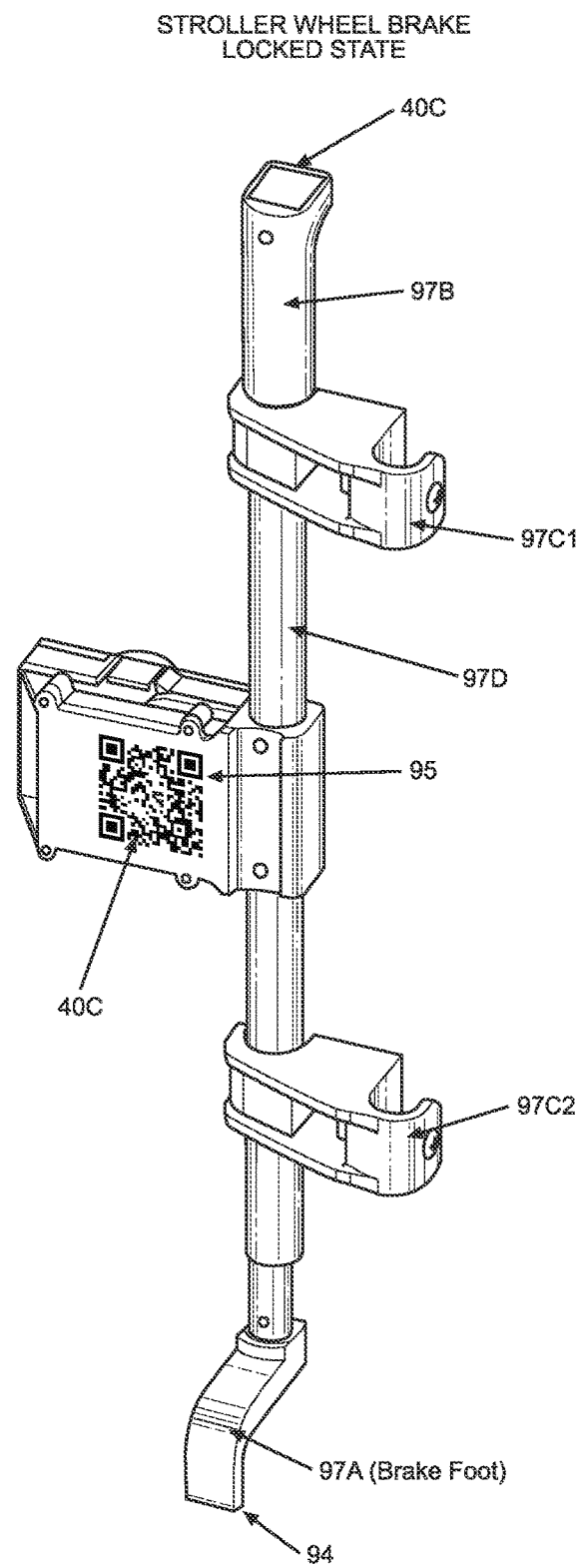
FIG. 17B1  FIG. 17B2

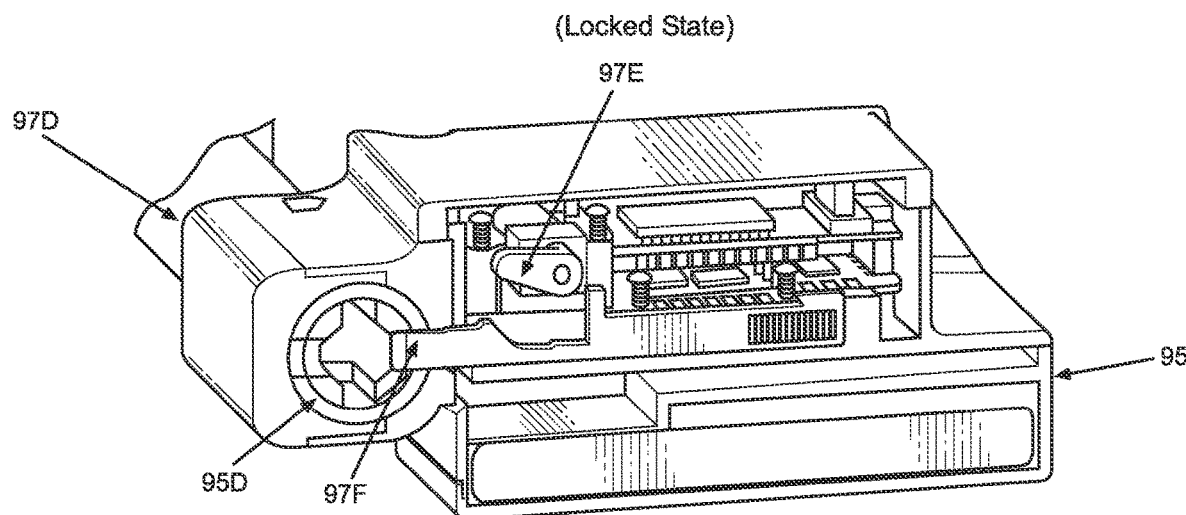
FIG. 17C2
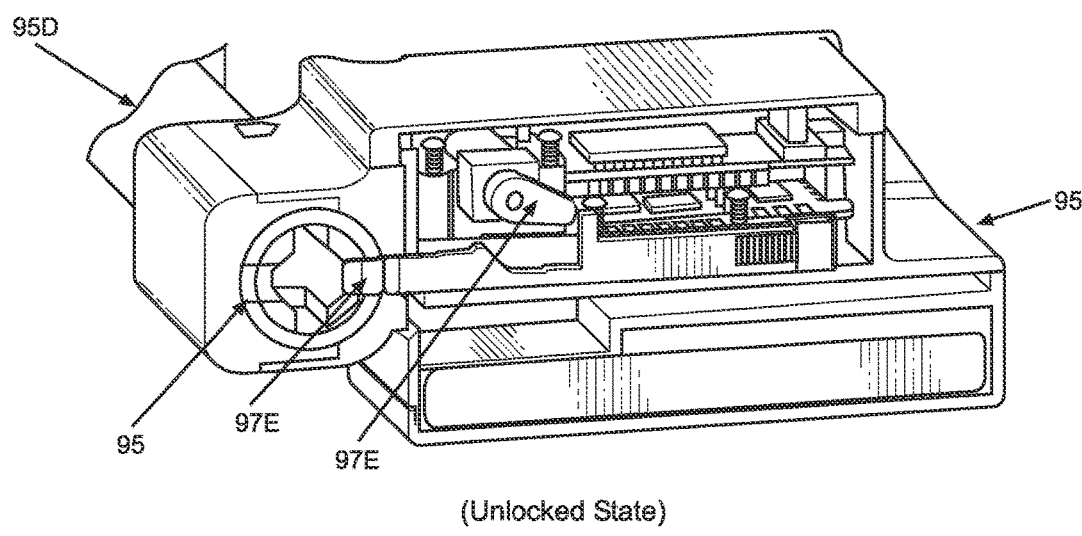
FIG. 17C1

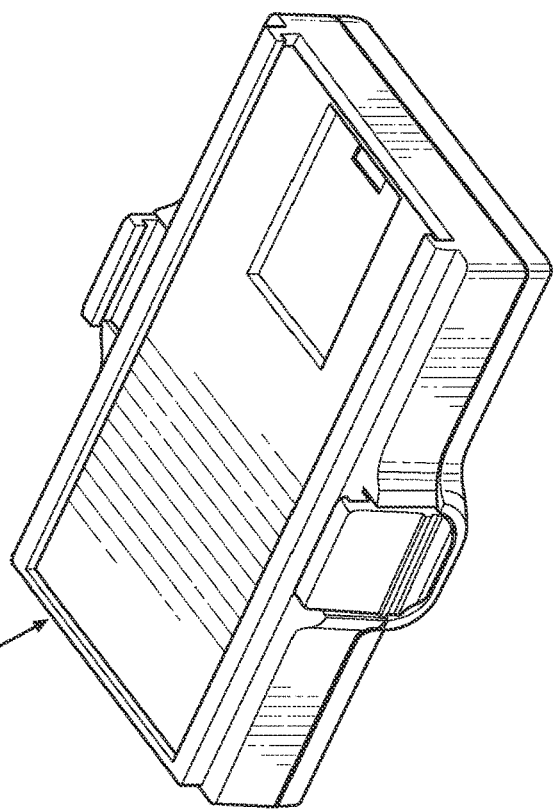
FIG. 17G2
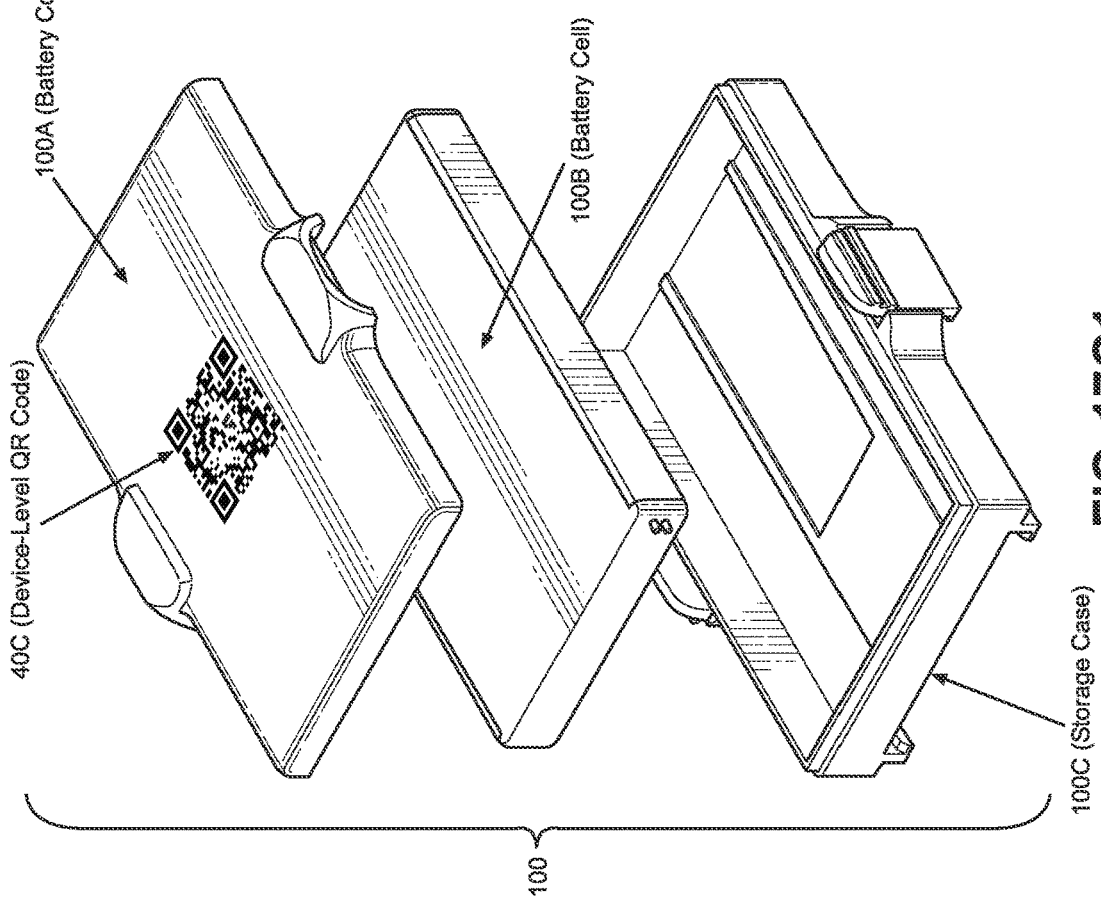
FIG. 17G1

METHOD OF USING SETTING PERSONALIZED LOCKER DISPLAY USING MOBILE SPEAKER

METHOD OF MANAGING ACCESS CONTROL TO A NETWORKED LOCKER SYSTEM BY SCANNING FACILITY-LEVEL QR CODES POSTED AT THE ENTRANCE GATE OR OUTSIDE OF AN AMUSEMENT PARK FACILITY, USING A MOBILE SMARTPHONE WIRELESS CONNECTED TO THE WIRELESS ACCESS CONTROL SYSTEM NETWORK OF THE PRESENT INVENTION

FACILITY LEVEL SCANNING

METHOD OF MANAGING ACCESS CONTROL TO A NETWORKED LOCKER SYSTEM BY SCANNING SITE-LEVEL QR CODES POSTED AT A PARTICULAR SITE IN AN AMUSEMENT PARK FACILITY, USING A MOBILE SMARTPHONE WIRELESS CONNECTED TO THE WIRELESS ACCESS CONTROL SYSTEM NETWORK OF THE PRESENT INVENTION

STEP A: Using a mobile smartphone deployed on the wireless access control system network to practice a site-level access control method by (i) the scanning of a Site-Level QR Code, and (ii) automatically directing the smartphone web-browser application to parse and analyze the scanned QR code and serve, load and display the webpage specified by the URL encoded in the Site-Level QR Code, and whereupon, the application server stores a "Rental Transaction Identifier - Site-Entry" (RTI-SE) within the cache on the mobile smartphone

STEP B: Using the mobile smartphone deployed on the wireless access control system network to practice a site-level access control method by selecting the time/date of the locker rental at the Site within the Facility when would the guest user would like to rent and access to store personal belongings

STEP C: Using the mobile smartphone deployed on the wireless access control system network to practice a site-level access control method by selecting the locker size (e.g. small, large, jumbo) at the selected Site within the Facility which the guest user would like to rent and access to store personal belongings

STEP D: Using the mobile smartphone deployed on the wireless access control system network to practice a site-level access control method by the guest user requesting to "Rent This Locker" previously specified by the Site, time/date, and locker size selected by the guest at the Site, while displaying the price of the locker rental and availability at the time of the rental offer (prior to acceptance and order placement)

FIG. 33A

GPS-TRACKED WIRELESS NETWORKED LOCKER AND
MOBILITY SOLUTION ACCESS CONTROL SYSTEM NETWORK
INVOLVING SITE LEVEL SCANNING

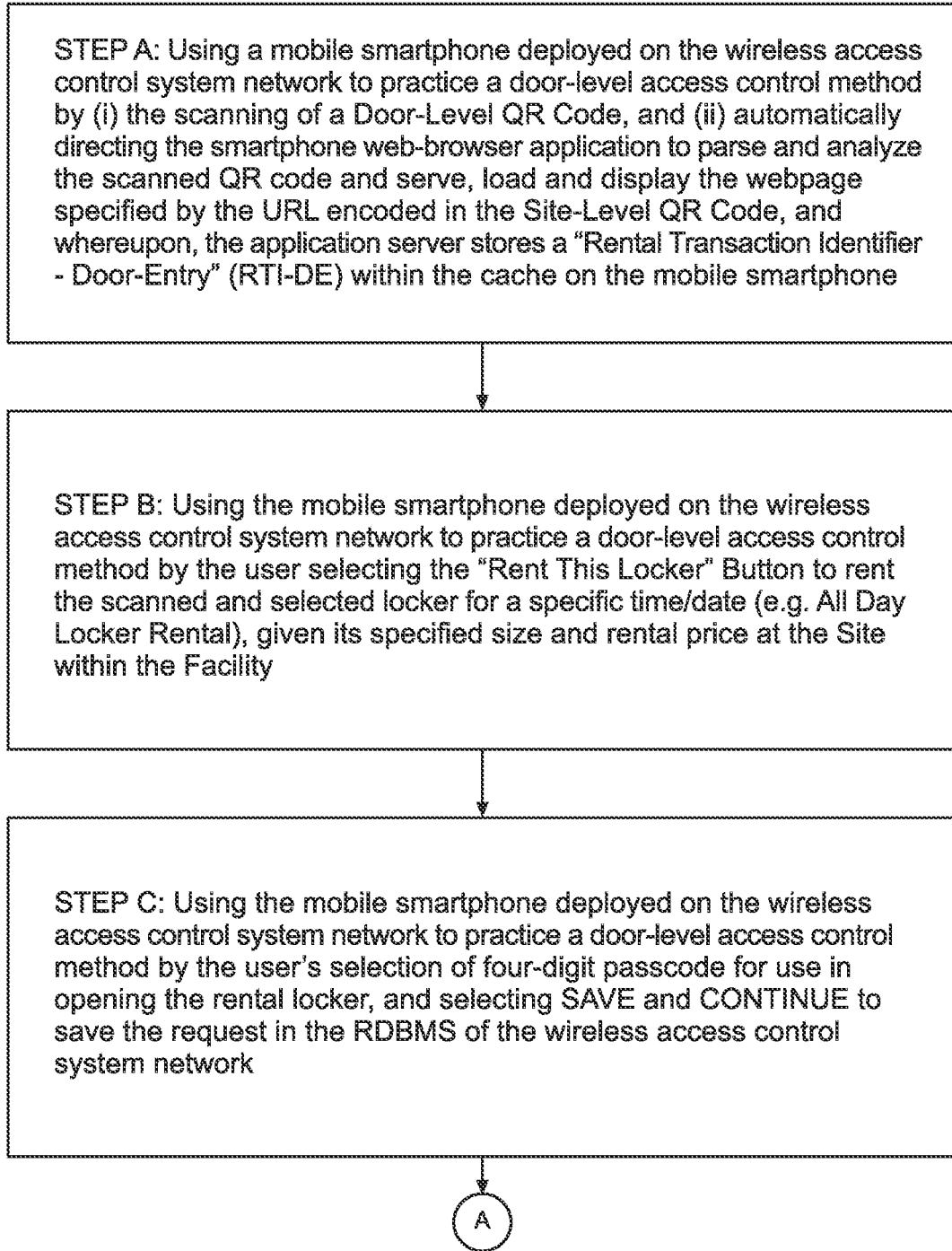

METHOD OF MANAGING ACCESS CONTROL TO A GPS-TRACKED WIRELESS NETWORKED STROLLER BY SCANNING DEVICE-LEVEL QR CODS POSTED OR DISPLAYED ON THE STROLLER AVAILABLE FOR RENTAL, CONTROLLED ACCESS AND USE WITHIN THE AMUSEMENT PARK FACILITY, USING A MOBILE SMARTPHONE WIRELESS CONNECTED TO THE WIRELESS ACCESS CONTROL SYSTEM NETWORK OF THE PRESENT INVENTION

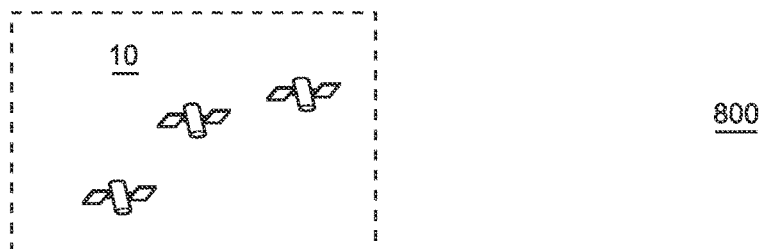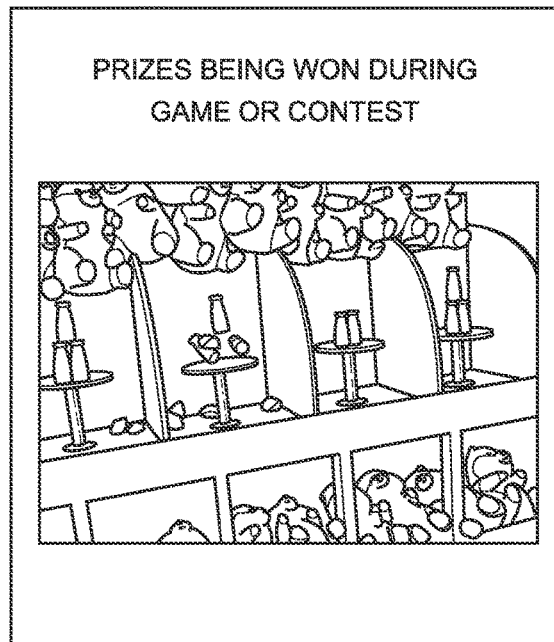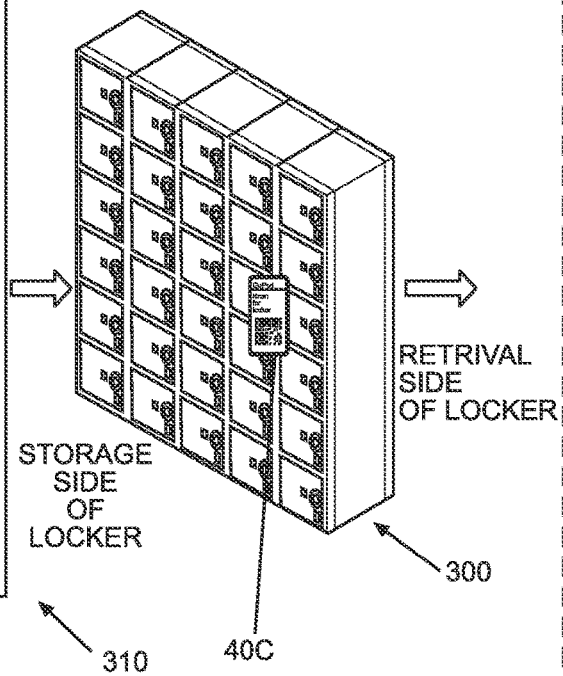
FIG. 46

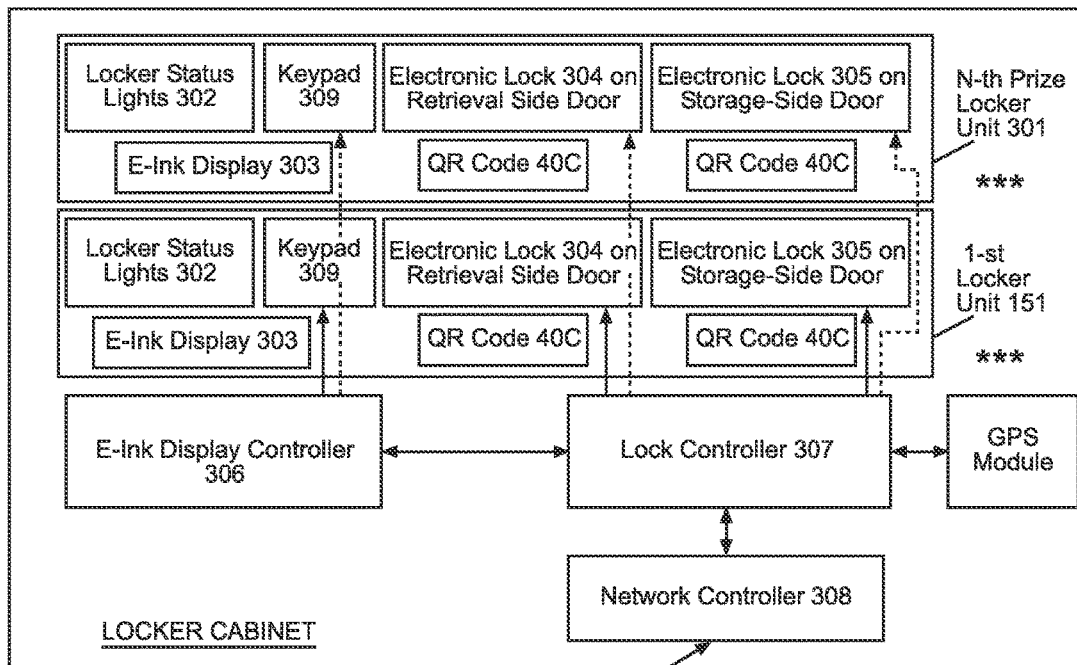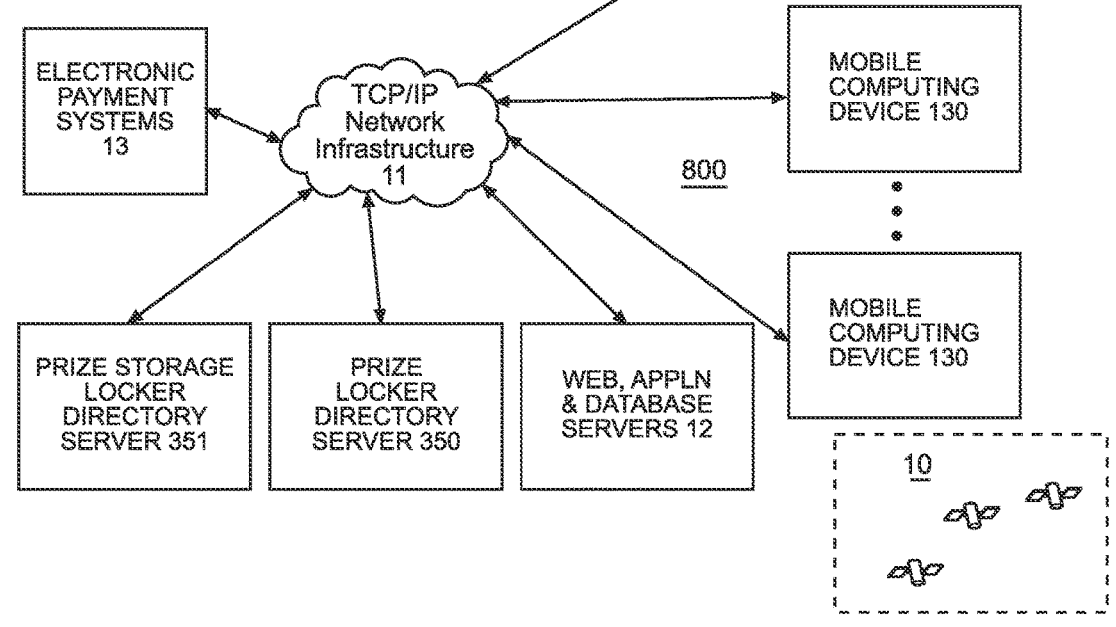
FIG. 48

METHOD OF PLAYING A GAME AT A GAME SITE, WINNING A PRIZE AND STORING THE PRIZE WITHIN A DOUBLE-SIDED WIRELESS NETWORKED PRIZE LOCKER SYSTEM INSTALLED AT THE GAME SITE

STEP A: Guest visits a Game Site managed by a Game Attendant, offering a prize every game winner and the option to store a won prize in a locker of a wireless networked double-sided pass-through locker cabinet system installed at the Game Site, wherein the storage side of the double-sided locker is disposed on the same side of the Game Site where the guest won the prize and can store the won prize in a rented locker using a mobile smartphone reading a Door-Level QR Code posted on the storage side of a locker available for rental, whereas the retrieval side of the double-sided pass-through locker system is disposed on the outside of the Game Site, where the winning guest can retrieve the stored prize from a rented locker using their mobile smartphone reading the Door-level QR code posted on retrieval side the rented locker STEP B: The Guest scans a Game-Level QR Code (Player Code) at the Game Site using the mobile smartphone, provides its SMS/Text phone number to the system servers, pays the Game Site for the right to play a Game according to published Game Rules, and then starts playing the Game while the Game Management Servers at the data center (i) store a Game Transaction Identifier in local memory of the guest's mobile smartphone, and (ii) transmit a Game Transaction Receipt (e.g. via email, SMS/Text and/or native Application) to the Mobile Phone of the Game Attendant's operating the Game Site.

FIG. 50A

METHOD OF PURCHASING PRODUCTS AT A RETAIL STORE AND RETRIEVING THE PURCHASED PRODUCTS STORED IN A CONTACTLESS MANNER FROM WITHIN A DOUBLE-SIDED WIRELESS NETWORKED LOCKER SYSTEM INSTALLED AT THE RETAIL STORE

STEP A: Consumer visits a Retailer's Online and purchases Products from the Retailer using an online payment method, and the Retailer then stores the purchased Products within one or more double-sided storage lockers within a wireless networked double-sided locker cabinet system installed at the retailer's store or fulfillment center, wherein the storage side of each locker is accessible by the Retailer and its Retail Fulfilment Clerks, and the retrieval side of each locker is closed by an electronic lock employed on the locker door that can be controlled and accessed using their mobile smartphone reading the Door-level QR code posted on retrieval side the storage locker

STEP B: After completing the e-commerce product purchase transaction and its method of payment, the Consumer receives a Message Notification from the Retailer informing the Consumer in which storage lockers the Consumer's Purchased Products are being stored and ready for pickup at a specified Retailer Fulfillment Center site

STEP C: The Consumer visits the specified Retailer Fulfillment Center, and opens each storage locker specified in Retailer's Message Notification by (i) using the Consumer's mobile smartphone to scan and read the Door-Level QR Code posted on the locker door of the storage locker, (ii) unlocking and accessing control over the locker, (iii) opening the locker and retrieving the purchased goods stored in the opened locker, and (iv) then closing the emptied locker, whereupon the wireless network system automatically sends a Pickup Receipt Message Notification to the consumer's mobile phone indicating that specific storage locker(s) were opened on a specified date and time at the Retailer's Fulfillment Center, and the purchased goods retrieved therefrom.

FIG. 53

METHOD OF DEPOSITING CASH AND/OR CHECKS IN OR WITHDRAWING CASH FROM AN GPS-TRACKED QR CODE DRIVEN ATM SYSTEM IN A CONTACTLESS MANNER USING A MOBILE SMART PHONE DEPLOYED ON THE WIRELESS ACCESS CONTROL SYSTEM NETWORK OF THE PRESENT INVENTION

STEP A: A Consumer visits a secure QR Code Driven ATM System and Uses a mobile smartphone to scan/read either (i) an ATM-Level QR code posted or displayed on the ATM System to Deposit Cash into ATM's Cash Depositor, (ii) an ATM-Level Code To Withdraw Cash From ATM's Cash Dispenser, or (iii) an ATM-Level QR Code to Deposit Check into ATM Check Depositor, And Then Automatically Initiates a Secure Web-based Financial Transaction Between the ATM, the Mobile Phone and Bank's Financial Server on the Internet, To Enable Depositing of Cash Into ATM, Withdrawal of Cash from ATM, or Depositing Check into ATM, without Contacting the ATM System

STEP B: The Consumer's Phone Phone displays GUI screens to support the required Financial transaction with the ATM, specified by the scanned ATM-Level QR Code, Using the Bank's Financial Transaction Servers and Bank ATM System Communicating With the Bank's ATM System During A Secure Encrypted HTTP Transaction.

STEP C: After completing the financial transaction and either depositing cash or check or withdrawing cash from the ATM System, as specified by the scanned ATM-Level QR Code, the Bank's Financial Transaction Server sends the Consumer's mobile phone a receipt of the completed financial transaction involving the GPS-tracked and access controlled ATM system during the transaction on a specified date, time and GPS-coordinates, matched with the GPS coordinates collected from mobile phone by the Bank's Financial Transaction Servers.

FIG. 58

WIRELESS-NETWORKED STROLLER ACCESS CONTROL SYSTEM

RELATED CASES

The present Patent Application is a Continuation of co-pending: U.S. patent application Ser. No. 16/990,381 filed Aug. 11, 2020, which is commonly owned by ScooterBug, Inc. and incorporated herein by reference as if fully set forth herein.

BACKGROUND OF THE INVENTION

Field of Invention

The present invention relates to the field of amusement park, theme park and recreational environments, and more particularly, to new and improved methods of and apparatus for guest visitors to rent, access, and control storage lockers and mobility devices such as electric convenience vehicles (ECVs), wheelchairs and strollers, and related services, without compromising the park or venue experience.

Brief Description of the State of the Art of Knowledge

Since 2008, Safemark Systems L.P. has offered its GoPod® electronic locker system to amusement and theme parks around the world. As illustrated in FIGS. 1 and 2, the GoPod® electronic locker system has its own locally-controlled inventory system, and supported by its own PO S/payment transaction system. The GoPod® locker system is networked with flexibly placed guest kiosks so that payment queue lines do not interfere with guests accessing their lockers. Each GoPod® electronic locker unit is provided with a dedicated keypad on its locker door to bypass the kiosk during future access. To rent a locker rental using the prior art GOPOD® electronic locker system, a guest simply visits any networked GoPod® kiosk. Using cash or credit card, a guest user enters their desired PIN at the GoPod® Kiosk, and then goes directly to their locker to use it. FIG. 2 shows the green, red and yellow indicator lights supported on each prior art GoPod® electronic locker, visibly signaling to the user the status of the assigned locker. The locker keypad eliminates operational nightmares associated with costly wristbands or RFID keys, unreliable biometric sensors and misplaced keys. It also provides direct access to their stored personal belongings even when there is a local power and/or Internet disruption at the locker system.

FIGS. 3A and 3B show a prior art system from U.S. Pat. No. 8,990,110 (assigned to Best Lockers LLC) which is used to assigned controlled access to a securable device (e.g. locker) using a kiosk configured to receive a PIN number from the user, which is then stored in rented locker for local access to the locker even when the locker is disconnected from the network. This invention, disclosed in U.S. Pat. No. 8,990,110, is currently used in Safemark's Best Locker GOPOD® electronic locker system described above.

Recently, prior art efforts have been made to use mobile smartphones to control access to networked locker systems around the world.

For example, as shown in FIG. 4, US Patent Application No. US2019/0035186 discloses the use of a guest's mobile phone to send kiosk/locker data to the management server via a cell tower network, while directly controlling access to the locker, via a local locker computer device controlling the electronic lock installed in the accessed locker.

Also, FIGS. 5A through 5C show a prior art locker system disclosed in U.S. Pat. No. 9,558,608 (assigned to Smarte Carte, Inc.) that includes electronic lockers that are centrally managed by a locker manager that handles admissions and sales for a venue. As disclosed, guests scan their ID codes at the locker terminal (kiosk terminal) and provide the scanned codes to ID code to the locker manager, and when approved, generates a rental plan and provided the guest access to the assigned locker.

FIGS. 6A through 6D show a prior art storage locker system in U.S. Pat. No. 10,474,797 (assigned to Tiburon Lockers Inc.) that includes (i) a kiosk to assign locker units to users and provide users with access credentials (e.g. via text or SMS messages or applications on a computer) to access assigned lockers, and (ii) a user portal for each locker unit to access the locker using assigned access credentials.

Also, it is well known to use mobile code symbol scanning terminals to initiate e-commerce and other kinds of web-based transactions by reading code symbols, as recognized by U.S. Pat. No. 7,341,191 to Russell et al, titled "Internet-Based System for Enabling Information-Related Transactions over the Internet" granted on Mar. 11, 2008. As disclosed, this US Patent disclosed a transaction-enabling method and system, wherein a transaction-enabling Java-Applet was embedded within an HTML-encoded document stored in an HTTP server at predetermined URL. When a code symbol (e.g., magstripe or bar code) encoded with the URL is read using a code symbol reader interfaced with a Java-enabled Internet terminal, the corresponding HTTP document is automatically accessed and displayed at the terminal, and the transaction-enabling Java-Applet initiated for execution, so that the customer, consumer or client desiring the transaction can simply and conveniently conduct the information-related transaction over the Internet. While the promise of such general techniques has been great, success at using mobile scanning techniques has been generally limited to a few industries focused on document production and delivery, and not access and control of physical, electronic and photonic systems.

Thus despite some advances made in the locker access and control field over the past decade, there is a still a great need in the art for new and improved mobile methods and technologies for enabling guest users to remotely access and control useful things, using web-enabled mobile smartphones in ways that deliver greater levels of convenience and value to consumers beyond that enabled by the current state of the art.

OBJECTS AND SUMMARY OF PRESENT INVENTION

Accordingly, a primary object of the present invention is to provide a new and improved cloud-based (i.e. Internet-based) wireless access control wireless system network employing mobile smartphones in diverse application environments, including amusement and theme parks, entertainment centers, recreational facilities and the like, supporting the rental, access and control of storage lockers, mobility solutions and other guest services, to overcome the shortcomings and drawbacks of prior art systems and methodologies.

Another object of the present invention is to provide a new and improved wireless access control wireless system network, wherein multi-level machine-readable codes (e.g. multi-level facility-level QR codes, site-level QR codes and device-level QR codes) are deployed across the entire enterprise of the facility to support the contact-less procurement and provision of diverse kinds of valuable products and services to guests and visitors, anywhere within the environment, on a prepayment basis, when simply using their mobile smartphones.

Another object of the present invention is to provide such a new and improved wireless system network, mobile systems and methods for controlling access to storage lockers, electric convenience vehicles, strollers, wheelchairs, and other things operating within the Internet infrastructure.

Another object of the present invention is to provide such a new and improved wireless system network, wherein multi-level QR codes are embedded at the facility, site, and device (i.e. thing) level of the park environment to enable park guests, visitors and other system users to procure, access and receive storage, mobility and other valuable products and services while visiting an amusement park environment.

Another object of the present invention is to provide a new and improved method of mapping multi-level QR codes to particular entry points in transaction workflows supported on the wireless system network, and designed to support procurement and delivery of services to an amusement park, tourist, or adventure seeking environment, wherein (i) Facility-Level QR codes are mapped to facility-level entry points in the transactional workflow and posted/displayed at physical and virtual locations outside of amusement park facility, (ii) Site-Level QR codes are mapped to site-level entry points in the transactional workflow and posted/displayed at physical point of rental or point-of-sale (POS) Site locations within the amusement park facility or within a facility but not located near the item to be rented, and (iii) Device/Thing-Level QR codes are mapped to device-level (e.g. locker door level, stroller handle level, and electric vehicle dashboard level) entry points in the transactional workflow and posted/displayed on actual physical surfaces and/or touchpoints located at diverse Sites within the amusement park facility;

Another object of the present invention is to provide a new and improved System of Multi-Level QR Codes having a hierarchy comprising (i) Door-Level QR Codes intelligently encoded with data attributes including facility (park), site, door, type (e.g. timed/daily), size, and pricing and URL directed to a first server component supported on the wireless system network of the present invention, (ii) Site-Level QR Codes intelligently encoded with data attributes including facility (park), site, type (e.g. timed/daily), size options, the pricing for each size and type options, and inventory status of each type and option, and URL directed to a second server component supported on the wireless system network of the present invention, and (iii) Facility-Level QR Codes intelligently encoded with data attributes including facility (park), sites rendered as choices, types (e.g. timed/daily), size options, and the pricing for each size and type options, and URL directed to a third server component supported on the wireless system network of the present invention.

Another object of the present invention is to provide a cloud-based GPS-tracking QR code driven wireless system network configured for procurement and access control of storage lockers, mobility solutions and other services offered within an enterprise-level amusement park facility, shown comprising: a system of GNSS satellites orbiting around the Earth, GPS-tracked wireless networked lockers, GPS-tracked wireless networked vehicles (e.g. ECVs, wheelchairs, and strollers alike), GPS-tracked service providers, GPS-tracked vendors, and other diverse types of GPS-tracked wireless networked securable devices, each being interfaced with a TCP/IP infrastructure directly, and/or via a facility-based Internet Gateway; a network of cellular towers for supporting wireless data communication services between wireless mobile computing devices and network communication adapters; a plurality of wireless mobile computing systems (e.g. smartphones, tablet computers, etc.); one or more industrial strength data centers, each supporting a cluster of communication servers (e.g. web servers), a cluster of application servers, and a cluster of database servers, and SMS/text and email servers supported by at least one wide area network (WAN), and local weather servers, and network service platforms including electronic payment systems and services, credit card processing, and the universe of webservers supported on the WWW;

Another object of the present invention is to provide a new and improved GPS-tracking wireless system network supporting remote access control to (i) GPS-tracked wireless networked locker systems displaying Device-Level QR Codes for procurement and access control by guests scanning these QR codes using mobile smartphones, (ii) GPS-tracked wireless networked strollers displaying Device-Level QR Codes for procurement and access control by guests scanning these QR codes using mobile smartphones, (iii) GPS-tracked wireless networked electric convenience vehicles (ECVs) displaying Device-Level QR Codes for procurement and access control guests by scanning these QR codes using mobile smartphones, (iv) GPS-tracked wireless networked amusement park rides (e.g. Sites) posting/displaying Site-Level QR Codes for access to the park's storage and mobility service transactional workflow by guests scanning these QR codes using mobile smartphones, (v) GPS-tracked wireless networked Service Providers and Vendors (e.g. Sites) posting/displaying Site-Level QR Codes for access to the park's service transactional workflow by guests scanning these QR codes using mobile smartphones, and (vi) GPS-tracked wireless networked Amusement Park Facility (e.g. Facility) posting/displaying Facility-Level QR Codes for access to the park's storage and mobility service transactional workflow by guests scanning these QR codes using mobile smartphones.

Another object of the present invention is to provide a new and improved GPS-tracking wireless locker access control system network comprising a plurality of GPS-tracked wireless networked locker systems, and system network components interfaced with an TCP/IP Internet infrastructure, namely: electronic payment systems, locker inventory systems, stroller inventory systems, electric convenience vehicle (ECV) inventory system, mobile computing systems, GPS-tracking wireless networked ECVs bearing device-level QR codes, GPS-tracked wireless networked strollers bearing device-level QR codes, GPS-tracked wireless networked venues of service providers and/or vendors operating in the park facility, bearing site-level QR codes, wireless networked geo-fencing systems installed in the amusement park to support the vendors and service providers operating in the amusement park facility using wireless networked services, and web, application and database servers associated with the data centers deployed to support the services required by the system network.

Another object of the present invention is to provide a new and improved GPS-tracked wireless networked mobile/stationary locker system having a plurality of wireless networked locker units, each locker unit being accessible by scanning the multi-level QR code posted or displayed on the locker unit, using a web-enabled mobile smartphone deployed in the system network, and carrying out the transaction supported on the display screen of the mobile smartphone.

Another object of the present invention is to provide a new and improved GPS-tracked wireless networked transportable locker system with QR code driven access control, comprising a group of electronically-controlled locker units that are internetworked together in a transportable GPS-tracked cabinet, that can be locally managed by a networked kiosk server system, and/or remotely managed by network servers maintained in a cloud-based data center, under any of a large variety of case providing unprecedented flexibility, convenience and migration options for system users.

Another object of the present invention is to provide a new and improved GPS-tracked wireless networked transportable locker, comprising a group or bank of networked locker units are networked together and managed/manageable by the kiosk server system using Ethernet or other communication networking protocols, while the manual keypads and PIN storage memory on each locker unit are in communication with kiosk server system using a serial-to-UDP/IP communication network.

Another object of the present invention is to provide a new and improved wireless system network where mobile phones and other network components configured and operating according to a first system networking configuration, where a local kiosk server system is used to manage groups of locker units at a specific site location in a facility and locker inventory and rental transaction records are maintained in databases in the local kiosk server system.

Another object of the present invention is to provide a new and improved wireless system network where mobile phones and other network components configured and operating according to a second system networking configuration, where local kiosk server systems are networked together and used to manage groups of locker units at specific site locations in specific facilities, and locker inventory and rental transaction records are maintained in databases synchronized in local kiosk server systems and cloud-based network servers.

Another object of the present invention is to provide a new and improved wireless system network where mobile phones and other network components configured and operating according to a third system networking configuration, where a local kiosk server system is used to manage a groups of locker units at a specific site location in a specific facility, and locker inventory and rental transaction records are maintained in databases in local kiosk server systems and cloud-based network servers that are automatically data synchronized.

Another object of the present invention is to provide a new and improved wireless system network where mobile phones and other network components configured and operating according to a fourth system networking configuration, where a local kiosk server system is not employed to manage groups of local locker units at a site location in a specific facility, and all locker inventory and rental transaction records are maintained in databases in cloud-based network servers.

Another object of the present invention is to provide a new and improved wireless system network where mobile phones and other network components configured and operating according to a fifth system networking configuration, where locker inventory and rental transaction records are maintained in local kiosk database servers, local internet and/or electrical power is interrupted at a site and the guest's mobile phone uses Bluetooth RF communication with a specific locker unit to communicate the PIN code to locker and open the door of a rented locker and retrieve personal belongings.

Another object of the present invention is to provide a new and improved wireless system network where mobile phones and other network components configured and operating according to a sixth system networking configuration, where locker inventory and rental transaction records are maintained in local kiosk database servers, local internet and/or electrical power is interrupted at a site and the guest's mobile phone uses local WIFI supported at the local kiosk server system to establish a WIFI communication link between the mobile smartphone and the local kiosk server system to rent a new locker unit and store the user's PIN code in the locker unit, then open the door of a rented locker and store personal belongings.

Another object of the present invention is to provide a new and improved wireless system network where mobile phones and other network components configured and operating according to a seventh system networking configuration, where locker inventory and rental transaction records are maintained in cloud database servers, local internet and/or electrical power is interrupted at a site, and a guest's mobile phone uses Bluetooth RF to communicate with the rented networked locker unit and enter the PIN code to open the locker door and retrieve personal belongings.

Another object of the present invention is to provide a new and improved GPS-tracked wireless networked locker system comprising a system of wireless networked locker units internetworked together at the cabinet/bank-level by a low-power wireless personal area network (WPAN) (e.g. the IEEE 802.15.4 Standard), and each wireless networked locker system comprises the following components integrated about a system bus, namely, a programmed microprocessor interfaced to the system bus and supported by a memory architecture (e.g. RAM, ROM, and SSD persistent storage), a network controller for interfacing with the TCP/IP infrastructure, a solenoid driver circuit connected to a lock solenoid and bolt assembly and locker door, a keypad and E-ink display panel and Bluetooth/WIFI interfaced with the system bus via an I/O module interface, a digital video camera with a field of view (FOV) and interfaced with the system bus, a GPS module interfaced with the system bus, and a door-level QR code displayed in the outer door surface or electronically displayed on the E-ink panel.

Another object of the present invention is to provide a new and improved GPS-tracked wireless networked electric convenience vehicle (ECVs) with QR code driven access control using the GPS-tracking wireless system network.

Another object of the present invention is to provide a new and improved GPS-tracked wireless networked electric convenience vehicle (ECV) with QR code driven access control using the GPS-tracking wireless system network.

Another object is to provide a new and improved GPS-tracked wireless networked stroller with Q code driven access control using the GPS-tracking wireless system network.

Another object of the present invention is to provide a new and improved GPS-tracked wireless networked stroller with QR code driven access control using the GPS-tracking wireless system network to support Contactless Transactions for a quick and safe guest rental experience, Web-based Application initiated by QR code provides easy to use platform without need for app installation, SMS Receipt Message for guest convenience and personalized rental confirmation, Mobile Payment to reduce cash handling and labor costs, GPS-enabled fleet review and management, rider instructions for use of vehicle, and fleet reporting.

Another object of the present invention is to provide a new and improved a GPS-tracked wireless networked wheel chair with QR code driven access control using the GPS-tracking wireless system network.

Another object of the present invention is to provide a new and improved a GPS-tracked wireless networked wheel chair with QR code driven access control using the GPS-tracking wireless system network.

Another object of the present invention is to provide a new and improved GPS-tracked wireless networked locker system with QR code-driven access controlled locker units, each having an electronic-ink (E-ink) display panel for displaying QR codes and user instructions.

Another object of the present invention is to provide a new and improved method of managing access control to a networked locker system by scanning facility-level QR codes posted at the entrance gate or outside of an amusement park facility, using a mobile smartphone wireless connected to the wireless access control system network.

Another object of the present invention is to provide a new and improved amusement park facility, with a sign posted at the entrance date of the park, displaying a Facility-Level QR code which upon scanning with a web-enabled mobile smartphone is engineered to direct the guest user to a web-based e-commerce-enabled locker rental and access control transaction having the largest scope of services, encapsulating the entire facility, and allowing guest users to select a Site location of choice within the amusement park for their locker rental within the amusement park, and then allow the wireless system network to automatically assign an available locker to the guest at the selected Site.

Another object of the present invention is to provide a new and improved method of managing access control to a networked locker system involving the user's web-enabled mobile phone for scanning facility-level QR codes posted at the entrance gate or outside of an amusement park facility, using a mobile smartphone wireless connected to the wireless access control system network.

Another object of the present invention is to provide a new and improved wireless access control system network supporting a facility-level access control method involving the user's web-enabled mobile phone for (i) scanning a Facility-Level QR Code, and (ii) automatically directing the smartphone web-browser application (e.g. Apple Safari) to parse and analyze the scanned QR code and serve, load and display the webpage specified by the URL encoded in the Facility-Level QR Code, and whereupon, the application server stores a "Rental Transaction Identifier-Facility Entry" (RTI-FE) within the cache on the mobile smartphone.

Another object of the present invention is to provide a new and improved wireless access control system network supporting a facility-level access control method involving the selection of which Site within the Facility (e.g. amusement park) (e.g. Main Gate, South Entrance, or Picnic Area) where the guest user would like to rent and access a storage locker to store personal belongings.

Another object of the present invention is to provide a new and improved wireless access control system network supporting a facility-level access control method involving the selection of time/date of the locker rental at the Site within the Facility when would the guest user would like to rent and access to store personal belongings.

Another object of the present invention is to provide a new and improved wireless access control system network supporting a facility-level access control method involving the selection of locker size (e.g. small, large, jumbo) at the selected Site within the Facility which the guest user would like to rent and access to store personal belongings.

Another object of the present invention is to provide a new and improved wireless access control system network supporting a facility-level access control method involving the guest user requesting to rent the locker previously specified by the site, time/date, and locker size selected by the guest within the Facility, while displaying the price of the locker rental and availability at the time of the rental offer (prior to acceptance and order placement).

Another object of the present invention is to provide a new and improved wireless access control system network supporting a facility-level access control method involving the user's selection of four-digit passcode for use in opening the rental locker, and selecting SAVE and CONTINUE to save the request in the RDBMS of the wireless access control system network.

Another object of the present invention is to provide a new and improved wireless access control system network supporting a facility-level access control method involving the user's web-enabled mobile phone to display the selected locker size and user passcode, and involving entering the guest's phone number to which the system network will transmit locker information and rental receipt via SMS/text once the user enters the phone number information and selects SAVE and CONTINUE, to initiate the web-based transaction between the web-enabled mobile phone and the system's web-enabled e-commerce-supported locker access control servers maintained at the data center.

Another object of the present invention is to provide a new and improved wireless access control system network supporting a door-level access control method after scanning a facility-level QR code involving (i) the scanning of the Door-Level QR code on the rented locker using the user's web-enabled mobile smartphone, (ii) automatically directing the smartphone web-browser application to parse and analyze the scanned QR code and serve, load and display the webpage specified by the URL encoded in the Door-Level QR Code, and (iii) executing the access control transaction script for the locker rental transaction identified by the "Rental Transaction Identifier-Facility Entry" stored on the phone by the application servers, so as to determine the state of the transaction for the Door-Level Access Control Method.

Another object of the present invention is to provide a new and improved wireless access control system network supporting a door-level access control method involving the user's web-enabled mobile phone to display a message that the "Locker Is in Use", and requesting the user to enter his or her unique 4 digital passcode, and the select the button "OPEN MY LOCKER".

Another object of the present invention is to provide a new and improved wireless access control system network supporting a door-level access control method involving the user's web-enabled mobile phone displaying, after scanning the door-level QR code or entering the unique passcode into the locker's keypad, a message that the locker is OPEN, and upon return, unlock the locker by entering the passcode on the keypad or rescanning the Door-Level QR Code, allowing the user to either store personal belongings in the storage locker or access stored personal belongings from the accessed locker.

Another object of the present invention is to provide a new and improved method of managing access control to a networked locker system involving the user's web-enabled mobile phone to scan site-level QR codes posted at a particular Site in an amusement park facility, using a mobile smartphone wireless connected to the wireless access control system network.

Another object of the present invention is to provide a new and improved amusement park facility, with a sign posted at a Site in the park, displaying a Site-Level QR code, which upon scanning with a web-enabled mobile smartphone is engineered to direct the guest user to a web-based e-commerce-enabled locker rental and access control transaction having a narrowed scope of services within the facility, and allowing guest users to select a storage locker, mobility solution or other service at the Site within the amusement park, and then allow the wireless system network to automatically assign an available locker, mobility solution or service to the guest at the selected Site.

Another object of the present invention is to provide a new and improved wireless access control system network supporting a site-level access control method involving (i) the scanning of a Site-Level QR Code, and (ii) automatically directing the smartphone web-browser application to parse and analyze the scanned QR code and serve, load and display the webpage specified by the URL encoded in the Site-Level QR Code, and whereupon, the application server stores a "Rental Transaction Identifier-Site-Entry" (RTI-SE) within the cache on the mobile smartphone.

Another object of the present invention is to provide a new and improved wireless access control system network supporting a site-level access control method involving the user's web-enabled mobile phone and the selection of time/date of the locker rental at the Site within the Facility when would the guest user would like to rent and access to store personal belongings.

Another object of the present invention is to provide a new and improved wireless access control system network supporting a site-level access control method involving the user's web-enabled mobile phone and the selection of locker size (e.g. small, large, jumbo) at the selected Site within the Facility which the guest user would like to rent and access to store personal belongings.

Another object of the present invention is to provide a new and improved wireless access control system network supporting a site-level access control method involving the user's web-enabled mobile phone and the user's selection of four-digit passcode for use in opening the rental locker, and selecting SAVE and CONTINUE to save the request in a database of the wireless access control system network.

Another object of the present invention is to provide a new and improved wireless access control system network supporting a site-level access control method involving the user's web-enabled mobile phone displaying the selected locker size and user passcode, and involving entering the guest's phone number to which the system network will transmit locker information and rental receipt via SMS/text once the user enters the phone number information and selects SAVE and CONTINUE, to initiate the web-based transaction between the web-enabled mobile phone and the system's web-enabled e-commerce-supported locker access control servers, maintained at the data center.

Another object of the present invention is to provide a new and improved wireless access control system network supporting a site-level access control method involving the user's web-enabled mobile phone displaying the selected locker size, entered passcode, text receipt phone number, and total price of the locker rental (tax included), and providing several options for the user to make payment.

Another object of the present invention is to provide a new and improved wireless access control system network supporting a site-level access control method involving the user's web-enabled mobile phone displaying, after the prior payment transaction has been successfully completed, a message indicating that the locker is ready for use, along with the selected locker # and user's passcode, and a button enabled to open the locker at its location, by the user simply either scanning the door-level QR code on the locker door, or entering the unique passcode into the locker's keypad (where and as provided).

Another object of the present invention is to provide a new and improved wireless access control system network supporting a door-level access control method after scanning a site-level QR code, by scanning the door-level QR code or entering the unique passcode into the locker's keypad, and displaying a message that the locker is OPEN (and "upon return, unlock the locker by entering the passcode on the keypad or rescanning the Door-Level QR Code"), and an END RENTAL Button for selection by the user to the end the locker rental.

Another object of the present invention is to provide a new and improved wireless access control system network supporting a door-level access control method, after scanning a site-level QR code, involving (i) the scanning of the Door-Level QR code on the rented locker using the user's web-enabled mobile smartphone, (ii) automatically directing the smartphone web-browser application to parse and analyze the scanned QR code and serve, load and display the webpage specified by the URL encoded in the Door-Level QR Code, and (iii) executing the access control transaction script for the locker rental transaction identified by the "Rental Transaction Identifier-Site Entry" stored on the phone by the application servers, so as to determine the state of the transaction for the Door-Level Access Control Method.

Another object of the present invention is to provide a new and improved wireless access control system network supporting a door-level access control method involving the user's web-enabled mobile phone displaying a message that the "Locker Is in Use", and requesting the user to enter his or her unique multi-digit digital passcode, and the select the button "OPEN MY LOCKER".

Another object of the present invention is to provide a new and improved wireless access control system network supporting a door-level access control method displaying a message asking the user (i) whether or not the user is "Done for the Day ?", in which case the user will no longer have access to the locker rental and all belongings should be removed from the locker before ending the locker rental, or (ii) whether or not the user wishes to continue using the locker for storage of personal belongings.

Another object of the present invention is to provide a new and improved wireless access control system network supporting a door-level access control method involving the user's web-enabled mobile phone displaying, after scanning the door-level QR code or entering the unique passcode into the locker's keypad, a message stating that the locker is OPEN, and upon return, unlock the locker by entering the passcode on the keypad or rescanning the Door-Level QR Code", allowing the user to either store personal belongings in the storage locker or access stored personal belongings from the accessed locker, and the message further providing an END RENTAL Button for selection by the user to the end the locker rental.

Another object of the present invention is to provide a new and improved method of managing access control to a networked locker system by scanning Door-Level QR Codes posted or displayed on the front door of each storage locker deployed within an amusement park or other recreational facility, using a mobile smartphone wireless connected to the wireless access control system network.

Another object of the present invention is to provide a new and improved amusement park or recreational facility, with a locker cabinet located at sign posted at a Site in the park, and each locker unit in the cabinet displaying a Door-Level QR code which, upon scanning with a web-enabled mobile smartphone, is engineered to direct the guest user to a web-based e-commerce-enabled locker rental, access and control transaction having a narrowed scope of services within the facility, and allowing guest users to rent the storage locker at the Site within the park, and then allow the wireless system network to automatically control access to the locker at the Site.

Another object of the present invention is to provide a new and improved wireless access control system network supporting a door-level access control method involving the user's web-enabled mobile phone and (i) the scanning of a Door-Level QR Code, and (ii) automatically directing the smartphone web-browser application to parse and analyze the scanned QR code and serve, load and display the webpage specified by the URL encoded in the Site-Level QR Code, and whereupon, the application server stores a "Rental Transaction Identifier-Door-Entry" (RTI-DE) within the cache on the mobile smartphone.

Another object of the present invention is to provide a new and improved wireless access control system network supporting a door-level access control method involving the user's web-enabled mobile phone, and selection of the "Rent This Locker" Button to rent the scanned and selected locker for a specific time/date (e.g. All Day Locker Rental), given its specified size and rental price at the Site within the Facility.

Another object of the present invention is to provide a new and improved wireless access control system network supporting a door-level access control method involving the user's web-enabled mobile phone, and selection of four-digit passcode for use in opening the rental locker, and selecting SAVE and CONTINUE to save the request in the RDBMS of the wireless access control system network.

Another object of the present invention is to provide a new and improved wireless access control system network supporting a door-level access control method initiated by scanning a door-level QR code posted on the locker door, automating serving to the user's web-enabled mobile phone a GUI screen displaying the selected locker size and user passcode, and requesting the entry of the guest's phone number to which the system network will transmit locker information and rental receipt via SMS/text once the user enters the phone number information and selects SAVE and CONTINUE, thereby initiating a web-based transaction between the web-enabled mobile phone and the system's web-enabled e-commerce-supported locker access control servers maintained at a data center connected to the infrastructure of the Internet.

Another object of the present invention is to provide a new and improved wireless access control system network supporting a door-level access control method displaying a message on the user's web-enabled mobile phone, the selected locker size, entered passcode, text receipt phone number, and total price of the locker rental (tax included), and providing several options for the user to make payment.

Another object of the present invention is to provide a new and improved wireless access control system network supporting a door-level access control method displaying, after the prior payment transaction has been successfully completed, a message on the user's web-enabled mobile phone that the locker is ready, along with the selected locker # and user's passcode, and a Button enabled to "Open My Locker" at its location by the user simply either scanning the door-level QR code on the locker door, or entering the unique passcode into the locker's keypad.

Another object of the present invention is to provide a new and improved wireless access control system network supporting a door-level access control method displaying, after scanning the door-level QR code or entering the unique passcode into the locker's keypad, a message that the locker is OPEN, and upon return, unlock the locker by entering the passcode on the keypad or rescanning the Door-Level QR Code, and an END RENTAL Button for selection by the user to the end the locker rental.

Another object of the present invention is to provide a new and improved wireless access control system network supporting a door-level access control method involving the user's web-enabled mobile phone, after scanning a door-level QR code on a rented locker, (i) the rescanning of the Door-Level QR code, (ii) automatically directing the smartphone web-browser application to parse and analyze the scanned QR code and serve, load and display the webpage specified by the URL encoded in the Door-Level QR Code, and (iii) executing the access control transaction script for the locker rental transaction identified by the "Rental Transaction Identifier-Door Entry" stored on the phone by the application servers, so as to determine the state of the transaction for the Door-Level Access Control Method.

Another object of the present invention is to provide a new and improved wireless access control system network supporting a door-level access control method involving the user's web-enabled mobile phone to display a message that (i) the "Locker Is in Use", and requesting the user to enter his or her unique 4 digital passcode and then select the button "OPEN MY LOCKER", and (ii) if the scanned locker is not the guest's rented locker, then the user should look for a locker with a GREEN light indicating it is available for rental.

Another object of the present invention is to provide a new and improved wireless access control system network supporting a door-level access control method involving the user's web-enabled mobile phone displaying, after scanning the door-level QR code or entering the unique passcode into the locker's keypad, a message indicating (i) that the "Locker is Open", and upon return, unlock the locker by entering the passcode on the keypad or rescanning the Door-Level QR Code" allowing the user to either store personal belongings in the storage locker or access stored personal belongings from the accessed locker, as the case may be, and (ii) that an END RENTAL Button is displayed and active for selection by the user to the end the locker rental transaction at the Site of the Facility.

Another object of the present invention is to provide a new and improved wireless access control system network supporting a door-level access control method involving the user's web-enabled mobile phone displaying a message asking the user (i) whether or not the user is "Done for the Day ?", in which case the user will no longer have access to the locker rental and all belongings should be removed from the locker before ending the locker rental, or (ii) whether or not the user wishes to continue using the locker for storage of personal belongings.

Another object of the present invention is to provide a new and improved wireless access control system network supporting a door-level access control method involving the user's web-enabled mobile phone displaying a message indicating and confirming the user ended the locker rental, and the user should remove all belongings from the locker before closing the locker.

Another object of the present invention is to provide a new and improved wireless access control system network, wherein an internal automated locker camera is provided within a rented locker, and when the locker camera automatically detects one or more objects are present in the locker, then the access control system network will prevent the user from terminating the locker rental until all objects have been removed from the locker as confirmed by camera images captured by the internal locker camera.

Another object of the present invention is to provide a machine-readable code-driven access control method and system, wherein, during emergencies, when electrical power and/or Internet connectivity are disrupted, the system and method of the present invention allows the guest user to directly enter his or her digital password (e.g. PIN) into the keypad provided on the rented locker unit, and locally operate its lock controller (provided with local battery power backup) and where the digital password is stored in local memory of the locker unit, by the system network servers within the data center during the web-based rental, access and control method, thereby allowing the guest to unlock the electronically-controlled lock unit in locker unit, and open the locker door and access one's personal belongings while the locker system is disconnected from the Internet infrastructure and/or during local power disruptions.

Another object of the present invention is to provide a machine-readable code-driven access control method and system, wherein, during emergencies, when electrical power and/or Internet connectivity are disrupted, the system and method of the present invention also allows the guest user to locally communicate with the locker controller, through its network adapter and antennas (e.g. using Bluetooth and/or WIFI protocols), to establish a communication session between the mobile smartphone and the rented locker unit, and then enter the guest's digital locker password (i.e. PIN) via the virtual keypad (GUI screen) on the mobile smartphone, to locally operate its lock controller (provided with local battery power backup), and where the digital password is stored in local memory of the locker unit, by the system network servers within the data center during the web-based rental, access and control method, thereby allowing the guest to unlock the electronically-controlled lock unit of a rented locker unit, and open the locker door and access one's personal belongings while the locker system is disconnected from the Internet infrastructure and/or during local power disruptions.

Another object of the present invention is to provide a new and improved method of managing access control to a GPS-tracked wireless networked stroller involving the user's web-enabled mobile phone for scanning Device-Level QR Codes posted or displayed on the stroller available for rental, controlled access and use within the amusement park facility, using a mobile smartphone wireless connected to the wireless access control system network.

Another object of the present invention is to provide a new and improved GPS-tracked wireless networked stroller supporting a Device-Level QR Code, wherein users are allowed to directly scan the stroller Device-Level QR code they wish to rent, and intelligence regarding the stroller Model, Price, Site, and Facility are effectively built into the Device-Level QR Code so that users can enjoy an expedited rental experience.

Another object of the present invention is to provide a new and improved wireless access control system network supporting a device-level access control method involving the user's web-enabled mobile phone for (i) scanning a Device-Level QR Code on an available GPS-tracked wireless networked stroller, and (ii) automatically directing the smartphone web-browser application to parse and analyze the scanned QR code and serve, load and display the webpage specified by the URL encoded in the Device-Level QR Code, and whereupon, the application server stores a "Rental Transaction Identifier-Device-Entry" (RTI-DE) within the cache on the mobile smartphone.

Another object of the present invention is to provide a new and improved wireless access control system network supporting a device-level access control method involving the user's web-enabled mobile phone in selecting the "Rent This Stroller" Button to rent the scanned and selected stroller for a specific time/date (e.g. All Day Rental), given its specified stroller size, and rental price, at the Site within the Facility.

Another object of the present invention is to provide a new and improved wireless access control system network supporting a device-level access control method involving the user's web-enabled mobile phone during data entry of the user's full name and phone number for use in opening the rental locker, and selecting SAVE and CONTINUE to save the request in the RDBMS of the wireless access control system network;

Another object of the present invention is to provide a new and improved wireless access control system network supporting a device-level access control method involving the user's web-enabled mobile phone when displaying the rental terms for the stroller (e.g. one day rider only, to remain seated, always keep hands and feet inside stroller, slow speed for turns, do not exceed stroller weight limits, and do not leave valuable in an unintended stroller) to be checked by the user/renter, and then selecting CONFIRM and CONTINUE, to initiate the web-based transaction between the web-enabled mobile phone and the system's web-enabled e-commerce-supported stroller access control servers, maintained at the data center.

Another object of the present invention is to provide a new and improved wireless access control system network supporting a device-level access control method involving the user's web-enabled mobile phone for displaying the selected stroller size, renter information, rental terms, and total price of the stroller rental (tax included), and providing several options for the user to make payment.

Another object of the present invention is to provide a new and improved wireless access control system network supporting a device-level access control method involving the user's web-enabled mobile phone for displaying, after a prior payment transaction has been successfully completed, a message that the stroller is ready, along with a Button enabled to "Unlock My Stroller" by the user simply clicking on the UNLOCK STROLLER Button, and a message indicating to lock the stroller, press the foot brake down and press down on the red handle.

Another object of the present invention is to provide a new and improved wireless access control system network supporting a device-level access control method involving on the user's web-enabled mobile phone for displaying a message that the stroller is UNLOCKED, and to roll the stroller, the user must lift the brake bar with his or her foot before starting to push the stroller.

Another object of the present invention is to provide a new and improved GPS-tracked wireless networked amusement park game/contest system, awarding prizes to game winners, and supporting a local GPS-tracked wireless networked two-sided locker system that is access controlled by any guest winner using door-level QR code scanning to rent and access a prize locker for the purpose of storing a prize won at the game/contest while visiting the amusement park, and subsequently retrieving the prize from the prize locker on its retrieval side without interrupting game/contest play on the storage side of the prize locker.

Another object of the present invention is to provide a new and improved GPS-tracked two-sided locker system deployed at a wireless networked amusement park game/contest system, wherein each GPS-tracked wireless networked locker unit is access controlled and managed using Door-Level QR code.

Another object of the present invention is to provide a new and improved GPS-tracked wireless network access controlled locker system comprising a system of wireless networked two-sided prize locker units internetworked together at the cabinet/bank-level by a low-rate wireless personal area network (WPAN), and each wireless networked two-sided prize locker system comprises the following components integrated about a system bus, namely, a programmed microprocessor interfaced to the system bus and supported by a memory architecture (e.g. RAM, ROM, and SSD persistent storage), a network controller for interfacing with the TCP/IP infrastructure, a solenoid driver circuit connected to a lock solenoid and bolt assembly and locker door, a keypad and E-ink display panel and Bluetooth/WIFI interfaced with the system bus via an I/O module interface, a digital video camera with a field of view (FOV) and interfaced with the system bus, a GPS module interfaced with the system bus, a first door-level QR code physically posted or electronically displayed on the storage-side door surface using its E-ink panel, and a second door-level QR code physically posted or electronically displayed on the storage-side door surface using its E-ink panel.

Another object of the present invention is to provide a new and improved method of storing a prize won by a guest during a game or contest, within a double-sided wireless networked prize locker system.

Another object of the present invention is to provide a new and improved GPS-tracking wireless networked access control system network supporting the automated display of notifications, directions and digital mobile facility maps on the display screens of mobile smart phones of guests visiting an amusement park.

Another object of the present invention is to provide a new and improved method of delivering notifications, offers and digital maps to mobile smartphones of guest visitors within an amusement park environment using a GPS-tracked wireless system network.

Another object of the present invention is to provide a new and improved wireless network, systems and methods for controlling access to things provided with machine-readable codes linked to electronic commerce transactions.

Another object of the present invention is to provide a new and improved GPS-tracking wireless control access platform for providing a complete, decentralized point of sale (POS) and product delivery system network, wherein: some things (i.e. products) are "IoT" connected and are self-servable; some things are physical items that can rented or purchased and for which the guest can walk away; some things are physical items that are tied to secure storage locations and connected to, virtually, the purchaser/renter's mobile phone for later retrieval; and some things have an intermediary "game" between the person (player) and the item (prize) that can be offered to the winner in a touchless two-sided prize storage locker.

Another object of the present invention is to provide a new and improved method of storing a prize won by a guest during a game or contest, within the double-sided wireless networked prize locker system.

Another object of the present invention is to provide a new and improved double-sided wireless networked retail storage locker system enabling customers to retrieve purchased items from the lockers in a contactless manner using mobile phones and the wireless access control system network, wherein a backstage loading area of the retail locker system enables loading of purchased items on specified lockers, and a guest area is provided on the opposite side, where consumers can retrieve purchased items from lockers containing their purchased goods by reading door-level QR codes using their web-enabled mobile phones in a touchless manner.

Another object of the present invention is to provide a new and improved double-sided wireless networked retail storage locker system for contactless purchased item retrieval, integrated within the cloud-based GPS-tracking wireless access control system network.

Another object of the present invention is to provide a new and improved method of purchasing products at an online e-commerce and/or brick and mortar retail store and thereafter retrieving in a contactless manner the purchased product items stored within a double-sided wireless networked retail locker system installed at the retail store or its order fulfillment center.

Another object of the present invention is to provide a new and improved GPS-tracking wireless access control system network supporting the offering and delivering of goods and services to consumer's using rented/access-controlled things GPS-tracked within a GPS-tracking wireless access control system network.

Another object of the present invention is to provide a new and improved method of delivering products and services to a guest visitor who has rented a GPS-tracked thing for use within an amusement park or recreational environment using a mobile smartphone to scan device-level QR code on the GPS-tracked thing being tracked within a GPS-tracked wireless access control system network.

Another object of the present invention is to provide a new and improved GPS-tracked ATM banking system of the present invention installed within an environment that is accessible and controllable by banking customers using a web-enabled mobile smartphone deployed on the GPS-tracked wireless system network of the present invention, for the purpose of scanning certain of the ATM-Level QR codes displayed or posted on the ATM system, so to initiate and conduct desired or required financial transactions with the ATM system in a safe, secure and contactless manner.

Another object of the present invention is to provide a new and improved GPS-tracked ATM banking system of the present invention displaying ATM-Level QR codes to enable the consumer user to access and control the GPS-specified ATM system to perform a number of banking functions in a safe, secure and contactless manner.

Another object of the present invention is to provide a new and improved method of depositing cash and/or checks in, or withdrawing cash from, an GPS-tracked QR code driven ATM banking system in a contactless manner using a mobile smart phone deployed on the GPS-tracking wireless access control network of the present invention.

These and other objects will become more apparent hereinafter in view of the Detailed Description and pending Claims to Invention.

BRIEF DESCRIPTION OF THE DRAWINGS

In order to more fully understand the Objects, the following Detailed Description of the illustrative embodiments should be read in conjunction with the accompanying Drawings, wherein:

FIG. 2 is a table showing the green, red and yellow indicator lights supported on each prior art GOPOD® electronic locker, visibly signaling to the user the status of the assigned locker, what operations to conduct and when;

FIGS. 3A and 3B show a prior art system in U.S. Pat. No. 8,990,110 (assigned to Best Lockers LLC) for assigning controlled access to a securable device (e.g. locker) using a kiosk configured to receive a PIN number from the user which is then stored in rented locker for local access to the locker even when the locker is disconnected from the network;

FIGS. 6A, 6B, 6C and 6D show a prior art storage locker system disclosed in U.S. Pat. No. 10,474,797 (assigned to Tiburon Lockers Inc.) that includes (i) a kiosk to assign locker units to users and provide users with access credentials (e.g. via text or SMS messages or applications on a computer) to access assigned lockers, and (ii) a user portal for each locker unit to access the locker using assigned access credentials;

FIG. 8C is a table setting forth rule-based triggers that are employed for automated re-direction of transactional workflow upon automated detection thereof during the QR driven access control processes executing on system servers of the present invention;

FIG. 9 is a table showing the Multi-Level QR Code Hierarchy comprising (i) Door-Level QR Codes intelligently encoded with data attributes including facility (park), site, door, type (e.g. timed/daily), size, and pricing and URL directed to a first server component supported on the wireless system network of the present invention, (ii) Site-Level QR Codes intelligently encoded with data attributes including facility (park), site, type (e.g. timed/daily), size options, the pricing for each size and type options, and inventory status of each type and option, and URL directed to a second server component supported on the wireless system network of the present invention, and (iii) Facility-Level QR Codes intelligently encoded with data attributes including facility (park), sites rendered as choices, types (e.g. timed/daily), size options, and the pricing for each size and type options, and URL directed to a third server component supported on the wireless system network of the present invention;

FIG. 17B1 is a perspective view of the hand-actuated control bar assembly mounted on the GPS-tracked wireless networked stroller shown in FIG. 17, shown configured in its unlocked state so the stroller wheel brake is unlocked by the device;

FIG. 17B2 is a close-up rear perspective view of the hand-actuated control bar assembly mounted on the GPS-tracked wireless networked stroller shown in FIG. 17 shown configured in its locked state so the stroller wheel brake is locked by the device, and the wheels unable to rotate;

FIG. 17C1 is a perspective cutaway view of the wireless remote locking module mounted to the hand-actuated control bar assembly shown in FIGS. 17A and 17B, while shown in the unlocked state of configuration;

FIG. 17C2 is a perspective cutaway view of the wireless remote locking module mounted to the hand-actuated control bar assembly shown in FIGS. 17A and 17B, while shown in the locked state of configuration;

FIG. 17G1 is an exploded view of the battery power module employed with the GPS-tracking electronic control module of FIG. 17D;

FIG. 17G2 is a perspective view of the assembled battery power module employed with the GPS-tracking electronic control module of FIG. 17D;

FIGS. 33A, 33B, 33C and 33D, taken together, set forth a flow chart describing the primary steps involved when carrying out the method of managing access control to a networked locker system by scanning site-level QR codes posted at a particular Site in an amusement park facility, using a mobile smartphone wireless connected to the wireless access control system network of the present invention;

FIGS. 38A, 38B, 38C and 38D, taken together, provide a flow chart describing the primary steps involved when carrying out the method of managing access control to a networked locker system by scanning Door-Level QR Codes posted or displayed on the front door of each storage locker deployed within the amusement park facility, using a mobile smartphone wireless connected to the wireless access control system network of the present invention;

Figure 17:
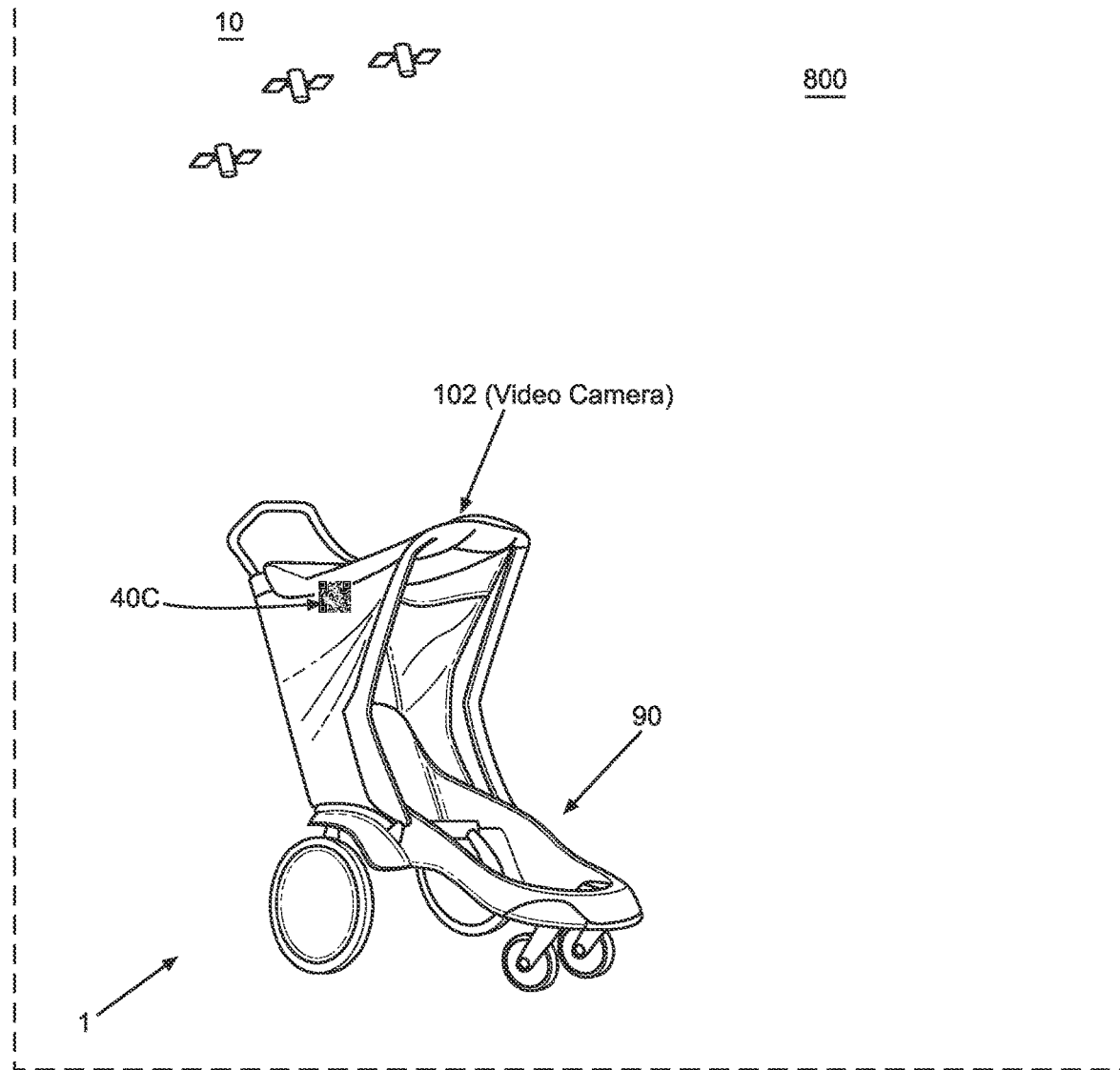
FIG. 17 is a perspective view of a GPS-tracked wireless networked stroller with Q code driven access control using the GPS-tracking wireless system network of the present invention.
Figure 18:
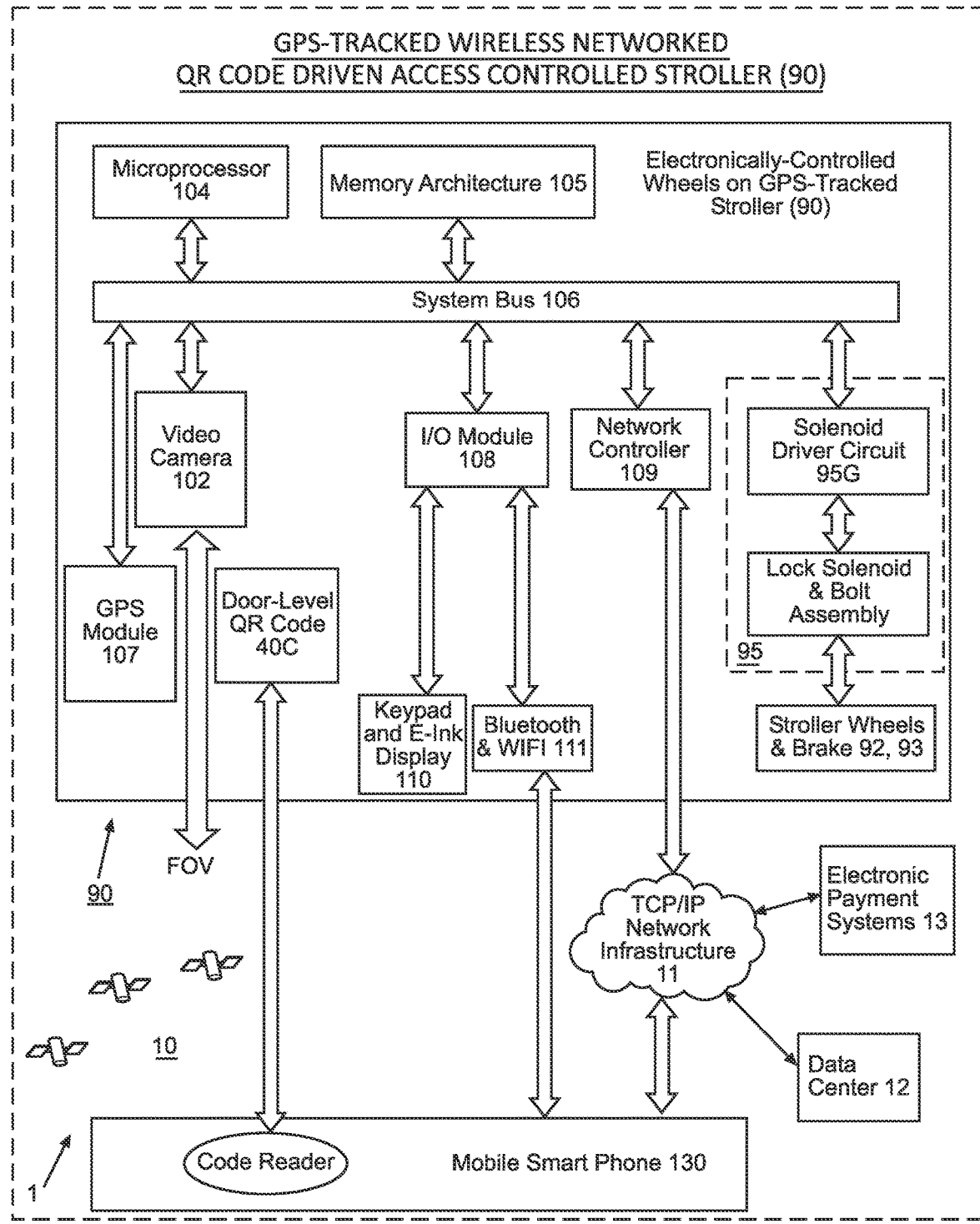
FIG. 18 is a GPS-tracked wireless networked stroller of the present invention with QR code driven access control using the GPS-tracking wireless system network of the present invention, to support Contactless Transactions for a quick and safe guest rental experience, Web-based Application initiated by QR code provides easy to use platform without need for app installation, SMS Receipt Message for guest convenience and personalized rental confirmation, Mobile Payment to reduce cash handling and labor costs, GPS-enabled fleet review and management, rider instructions for use of vehicle, and fleet reporting.
Figure 21:
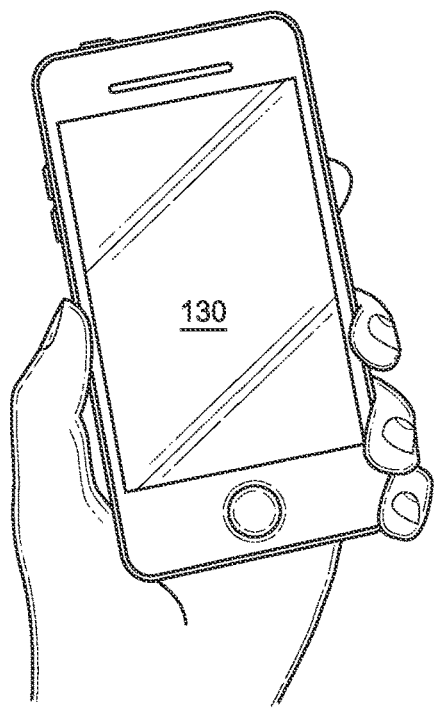
FIG. 21 is a perspective view of a mobile smartphone system (e.g. Apple iPhone device)
Figure 42A:
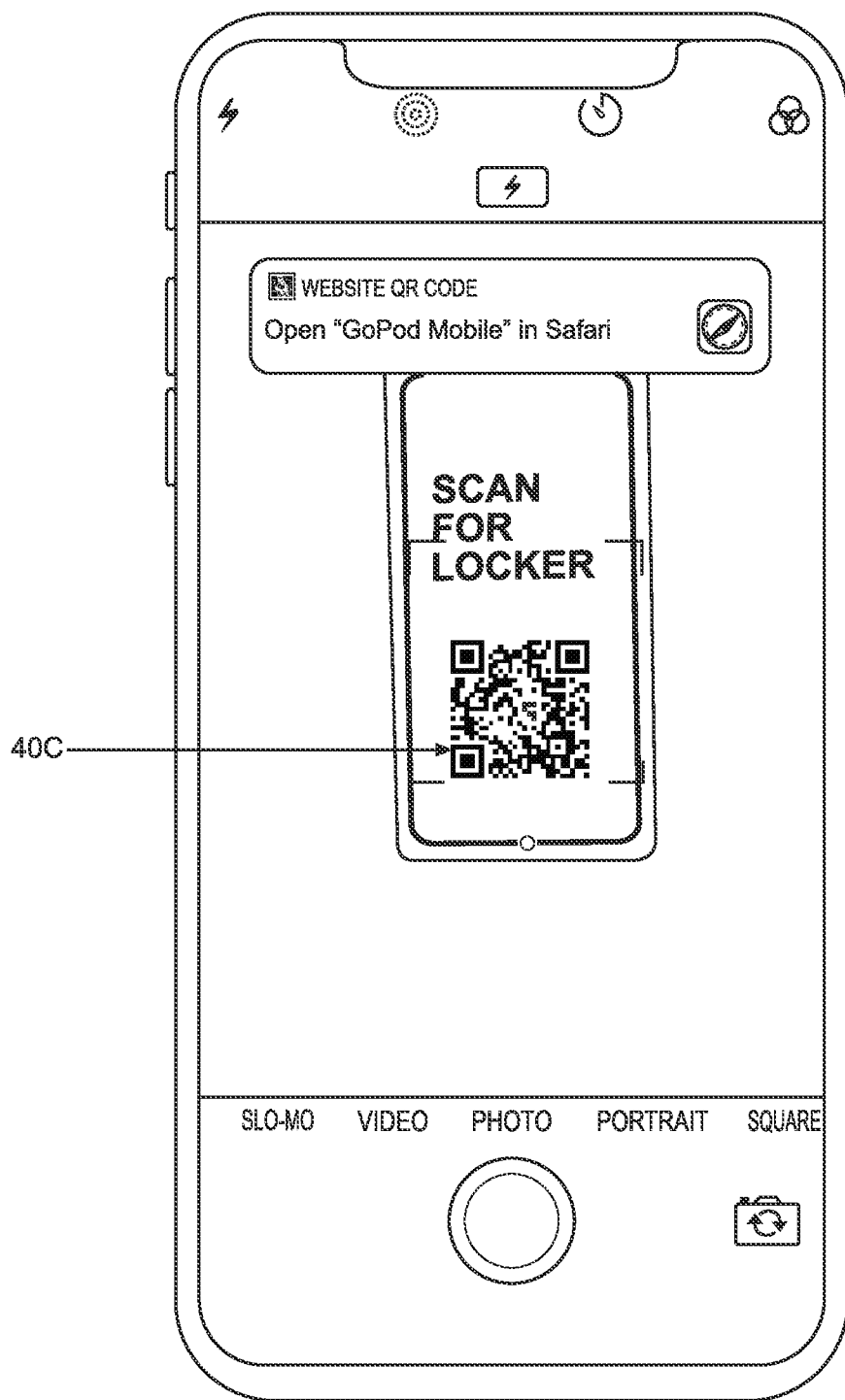
FIG. 42A is a graphical user interface (GUI) screen of the mobile smartphone shown in FIG. 21, deployed on the wireless access control system network of the present invention, and showing the first step in the door-level access control method when entered after completing the door-level access control method described in FIGS. 40A through 40G, involving (i) the scanning of the Door-Level QR code on the rented locker using the user's web-enabled mobile smartphone, as shown in FIGS. 29A and 29B, (ii) automatically directing the smartphone web-browser application (e.g. Apple Safari) to parse and analyze the scanned QR code and serve, load and display the webpage specified by the URL encoded in the Door-Level QR Code as illustrated in table of FIG. 9, and (iii) executing the access control transaction script for the locker rental transaction identified by the "Rental Transaction Identifier-Door Entry" stored on the phone by the application servers, so as to determine the state of the transaction for the Door-Level Access Control Method.
Figure 42B:
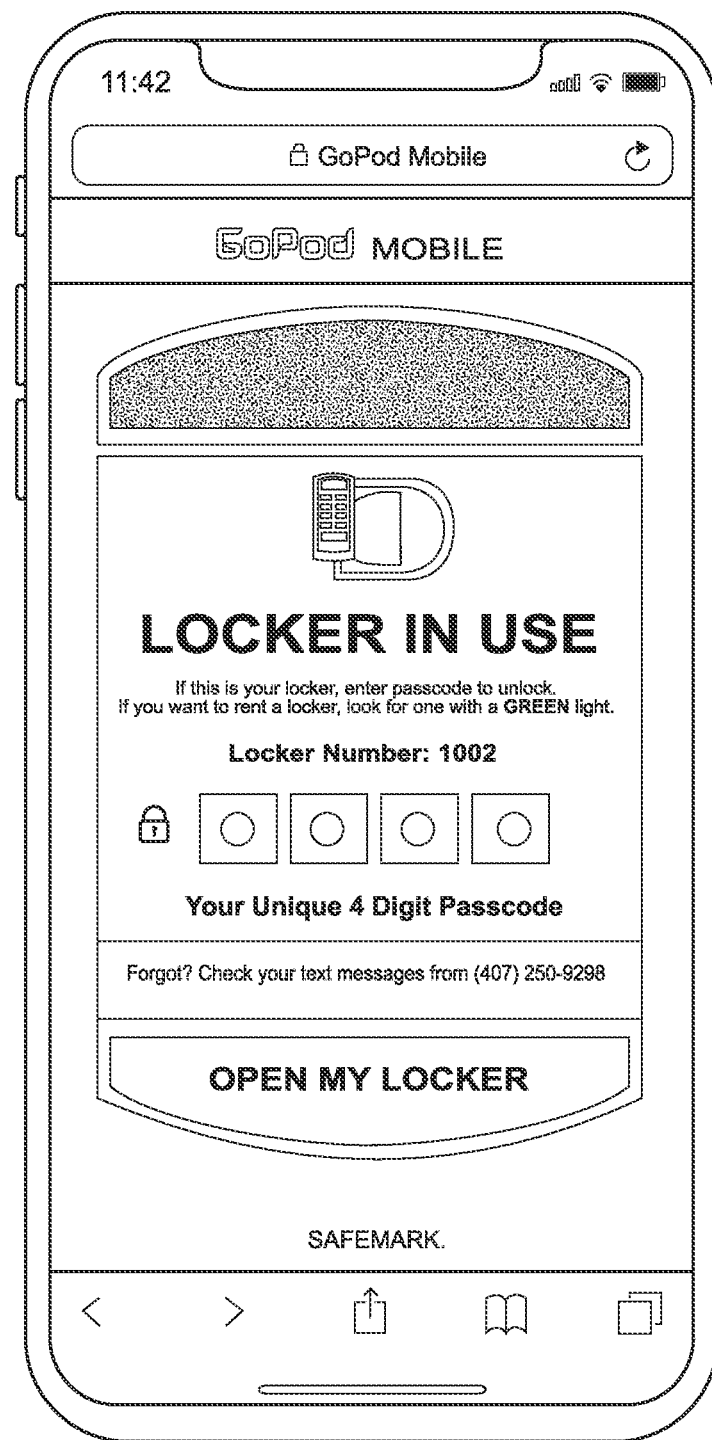
FIG. 42B is a graphical user interface (GUI) screen of the mobile smartphone shown in FIG. 21, deployed on the wireless access control system network of the present invention, and showing the second step in the door-level access control method of the present invention displaying a message that (i) the "Locker Is in Use" (e.g. Locker Number 154), and requesting the user to enter his or her unique 4 digital passcode, and the select the button "OPEN MY LOCKER", and (ii) if the scanned locker is not the guest's rented locker, then the user should look for a locker with a GREEN light indicating it is available for rental.
Figure 42C:
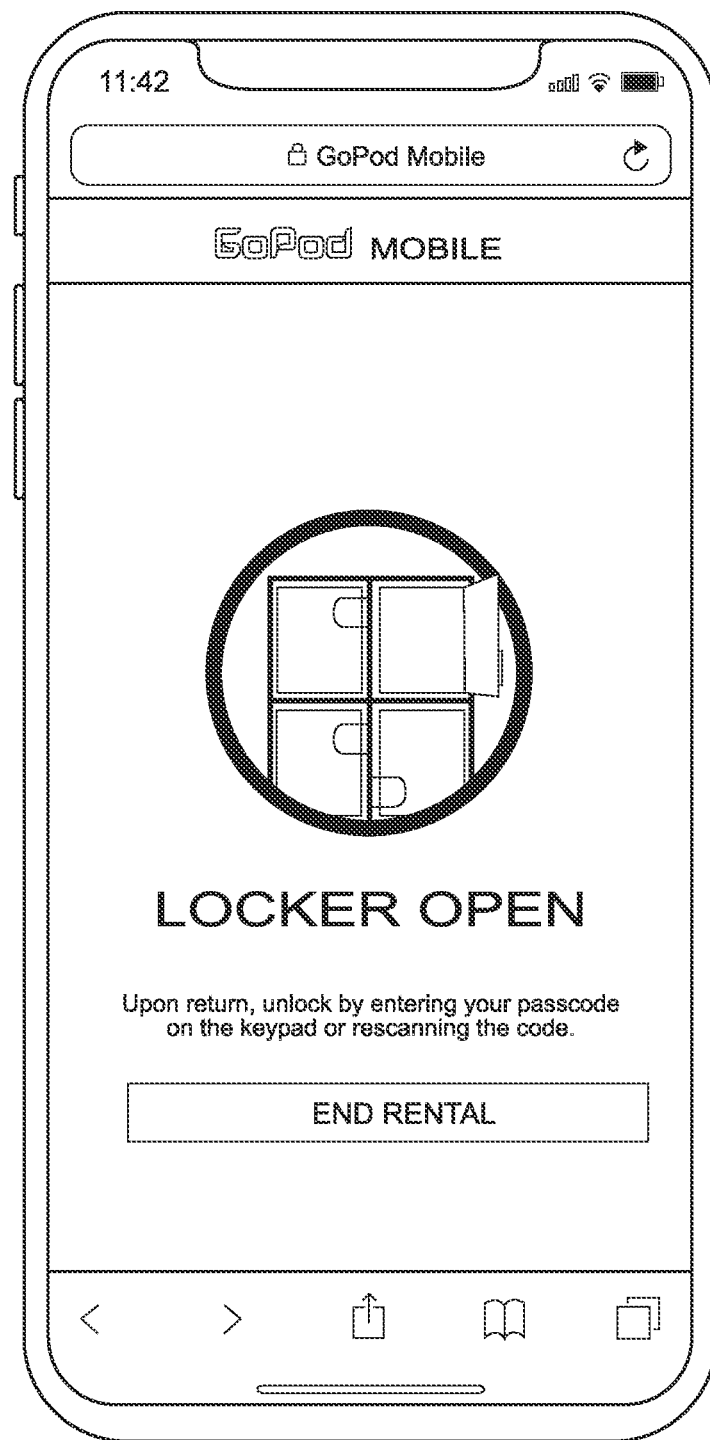
FIG. 42C is a graphical user interface (GUI) screen of the mobile smartphone shown in FIG. 21, deployed on the wireless access control system network of the present invention, and showing the third step in the door-level access control method displaying, after scanning the door-level QR code or entering the unique passcode into the locker's keypad, a message indicating (i) that the "Locker is Open" (and "upon return, unlock the locker by entering the passcode on the keypad or rescanning the Door-Level QR Code") allowing the user to either store personal belongings in the storage locker or access stored personal belongings from the accessed locker, as the case may be, and (ii) that an END RENTAL Button is displayed and active for selection by the user to the end the locker rental transaction at the Site of the Facility.
Figure 42D:
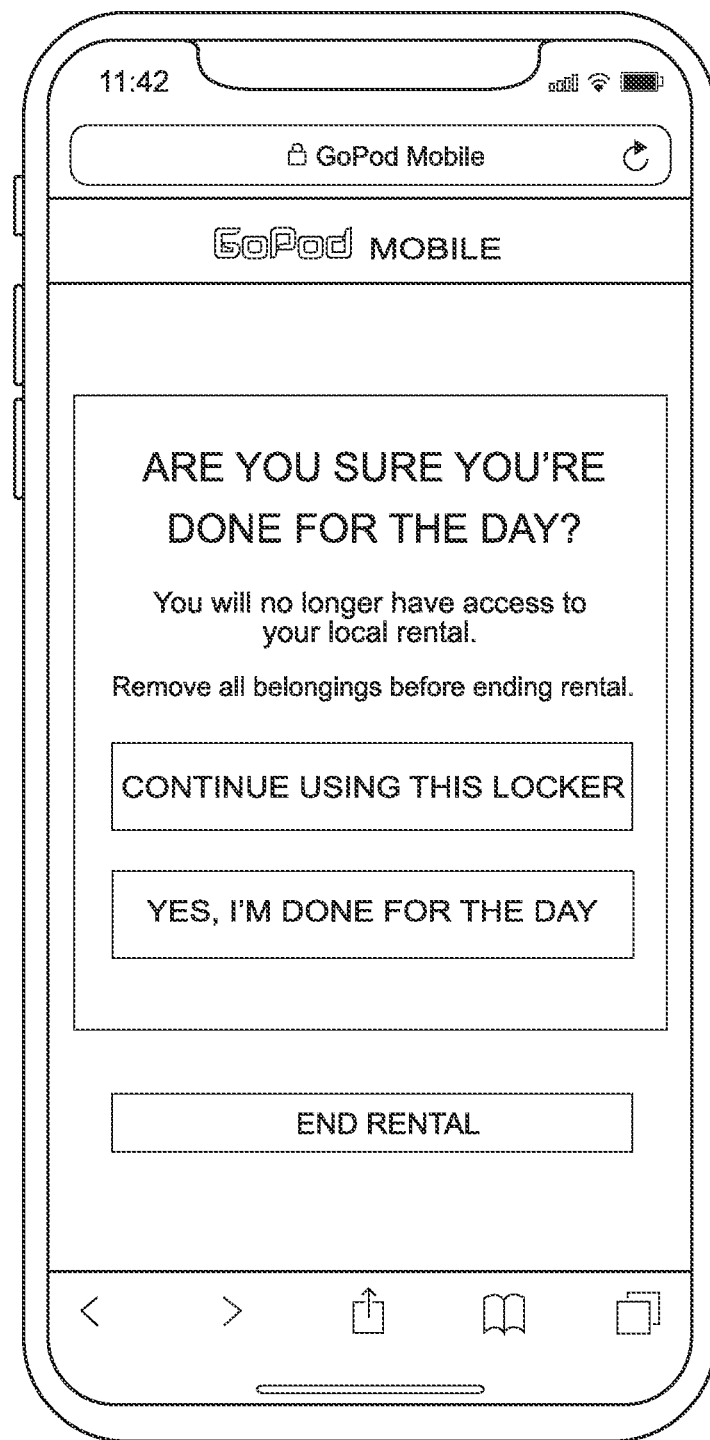
FIG. 42D is a graphical user interface (GUI) screen of the mobile smartphone shown in FIG. 21, deployed on the wireless access control system network of the present invention, and showing the fourth step in the door-level access control method of the present invention displaying a message asking the user (i) whether or not the user is "Done for the Day ?", in which case the user will no longer have access to the locker rental and all belongings should be removed from the locker before ending the locker rental, or (ii)
Figure 42E:
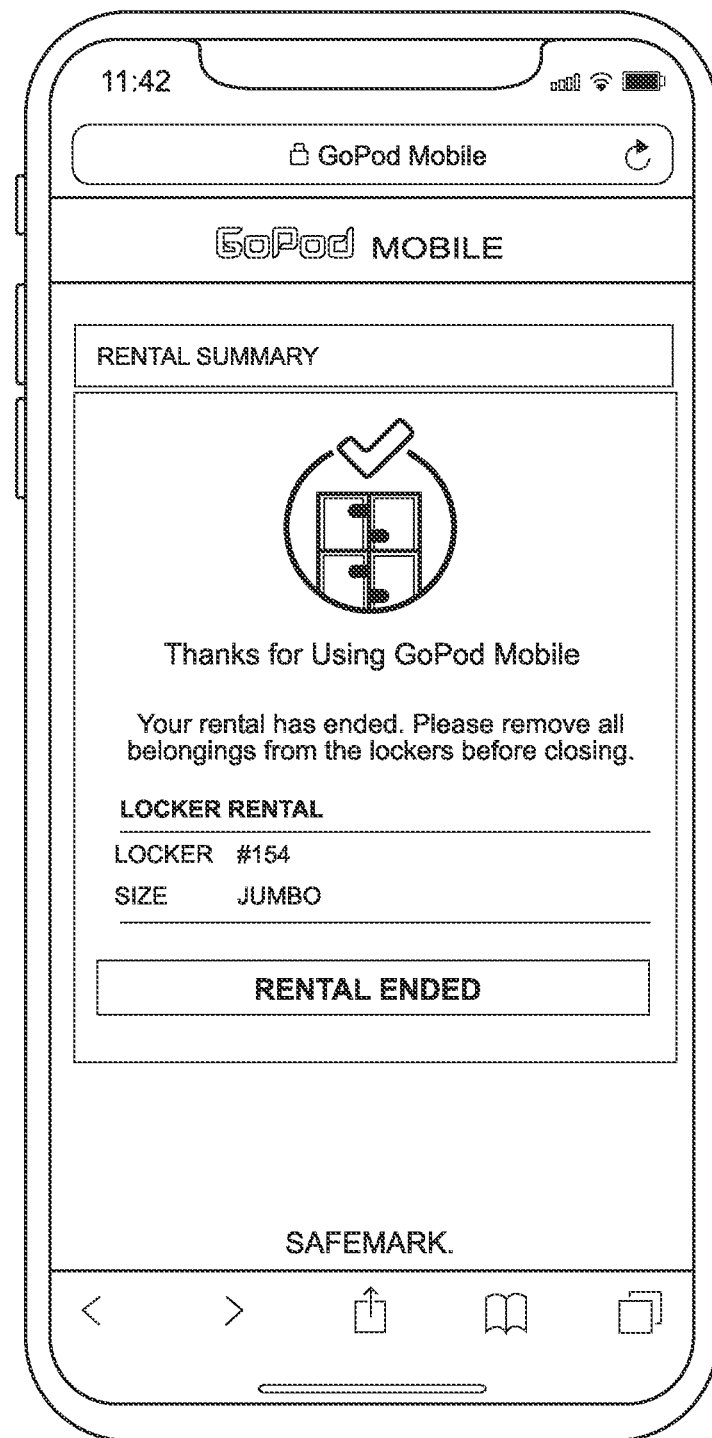
Figure 43A:
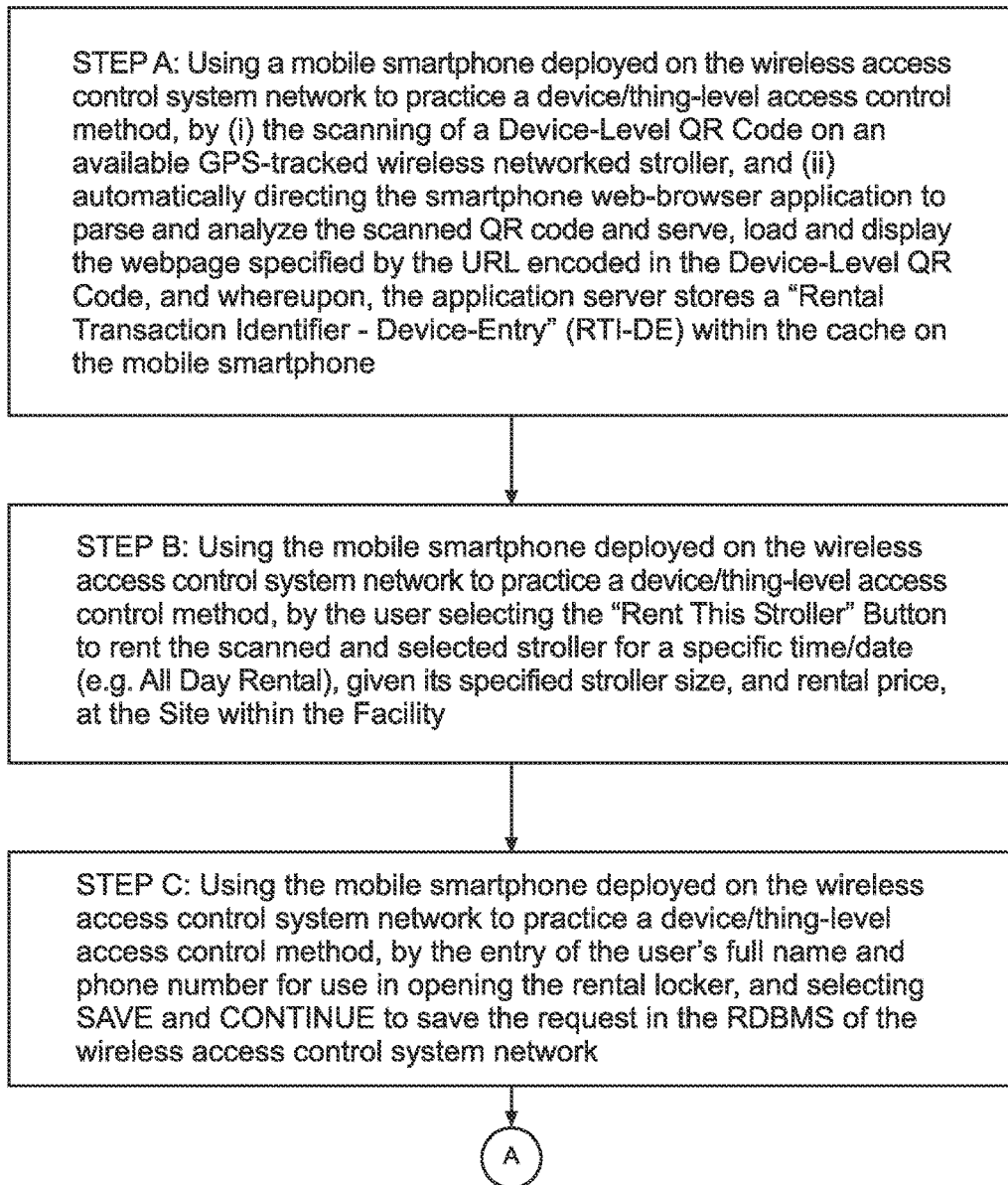
Figure 43B:
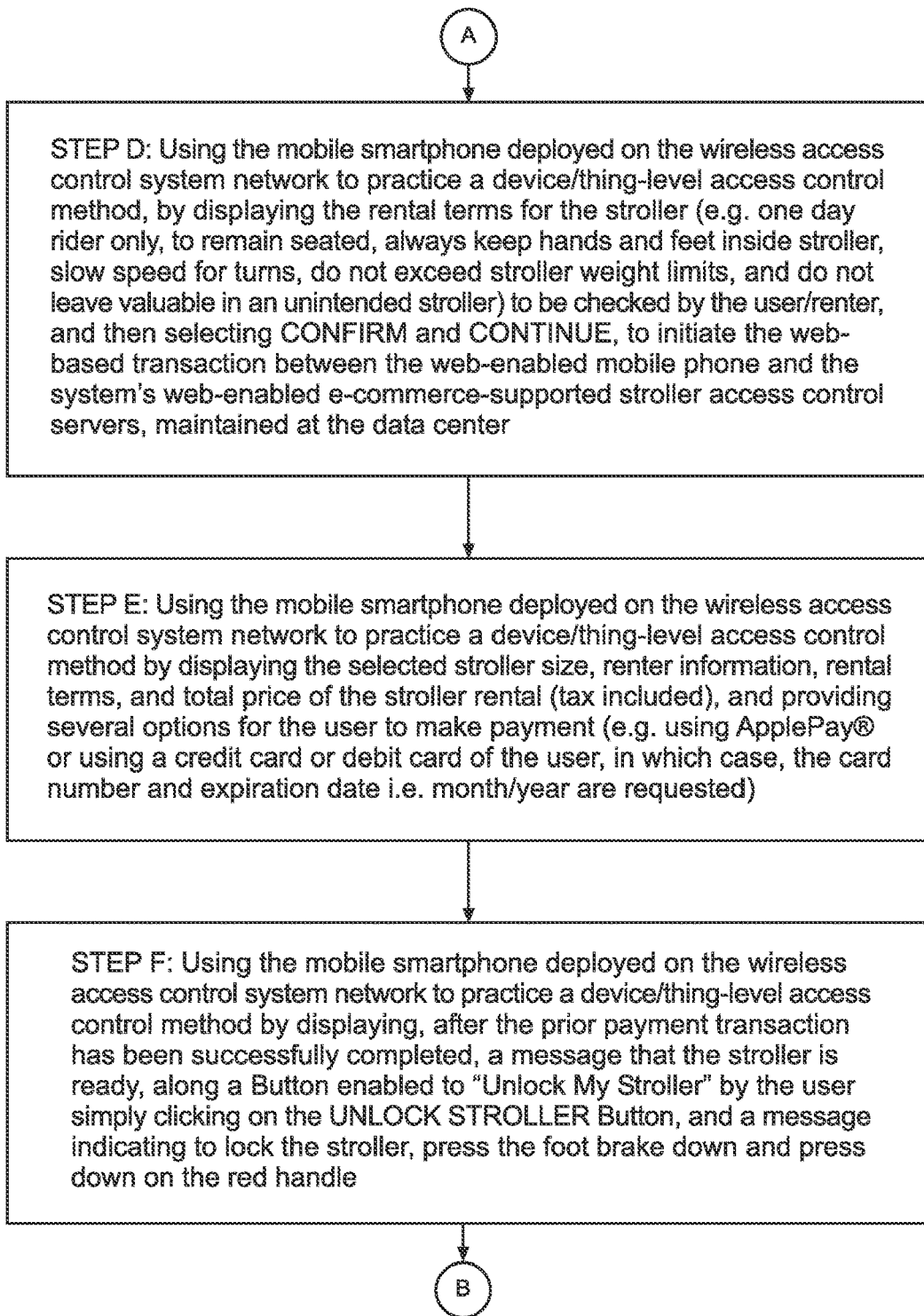
Figure 43C:
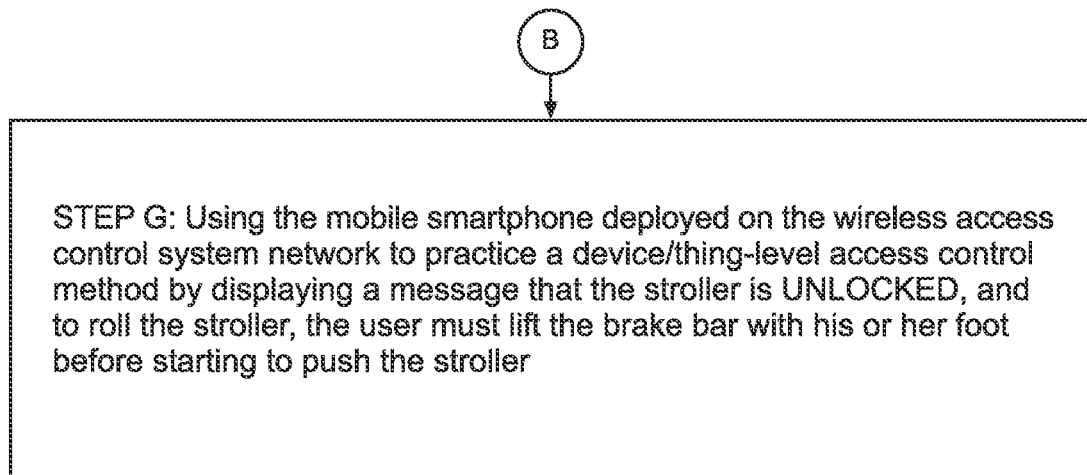
Figure 44:
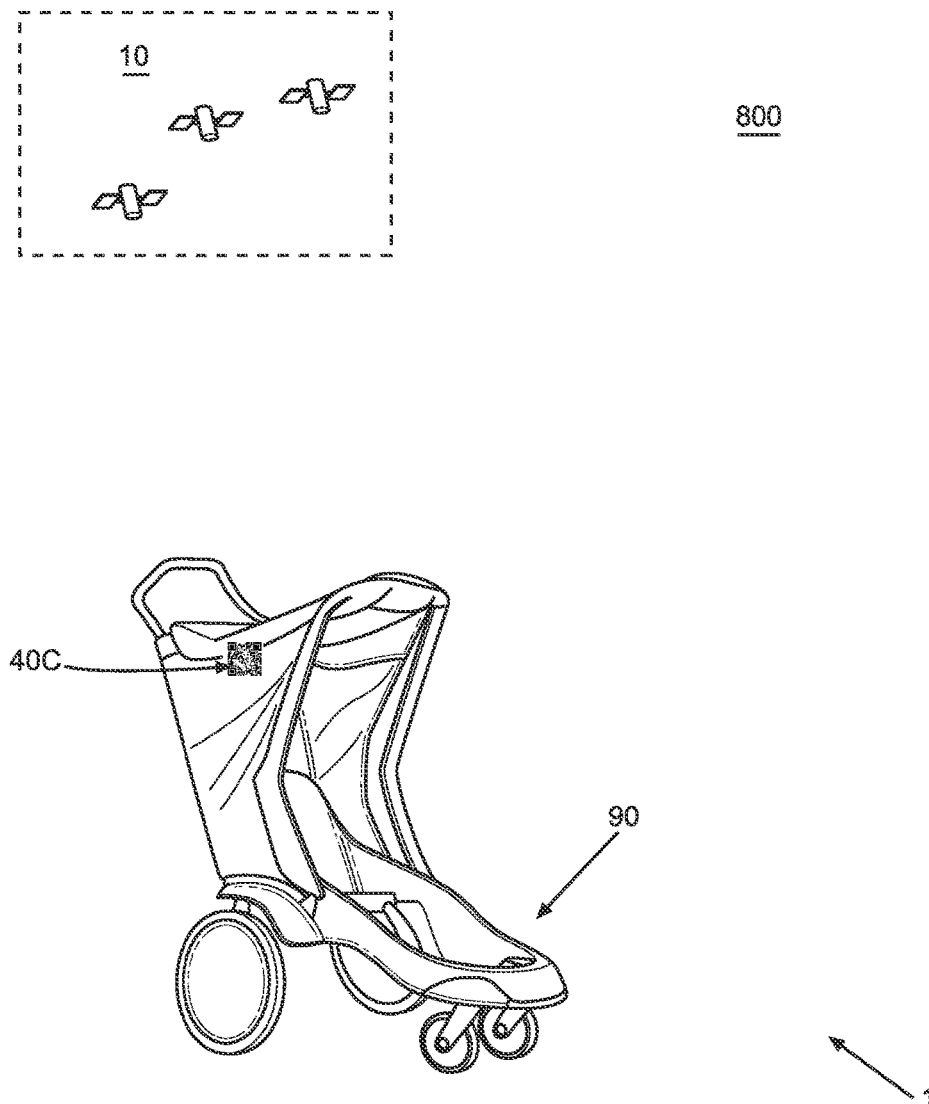
Figure 45A:
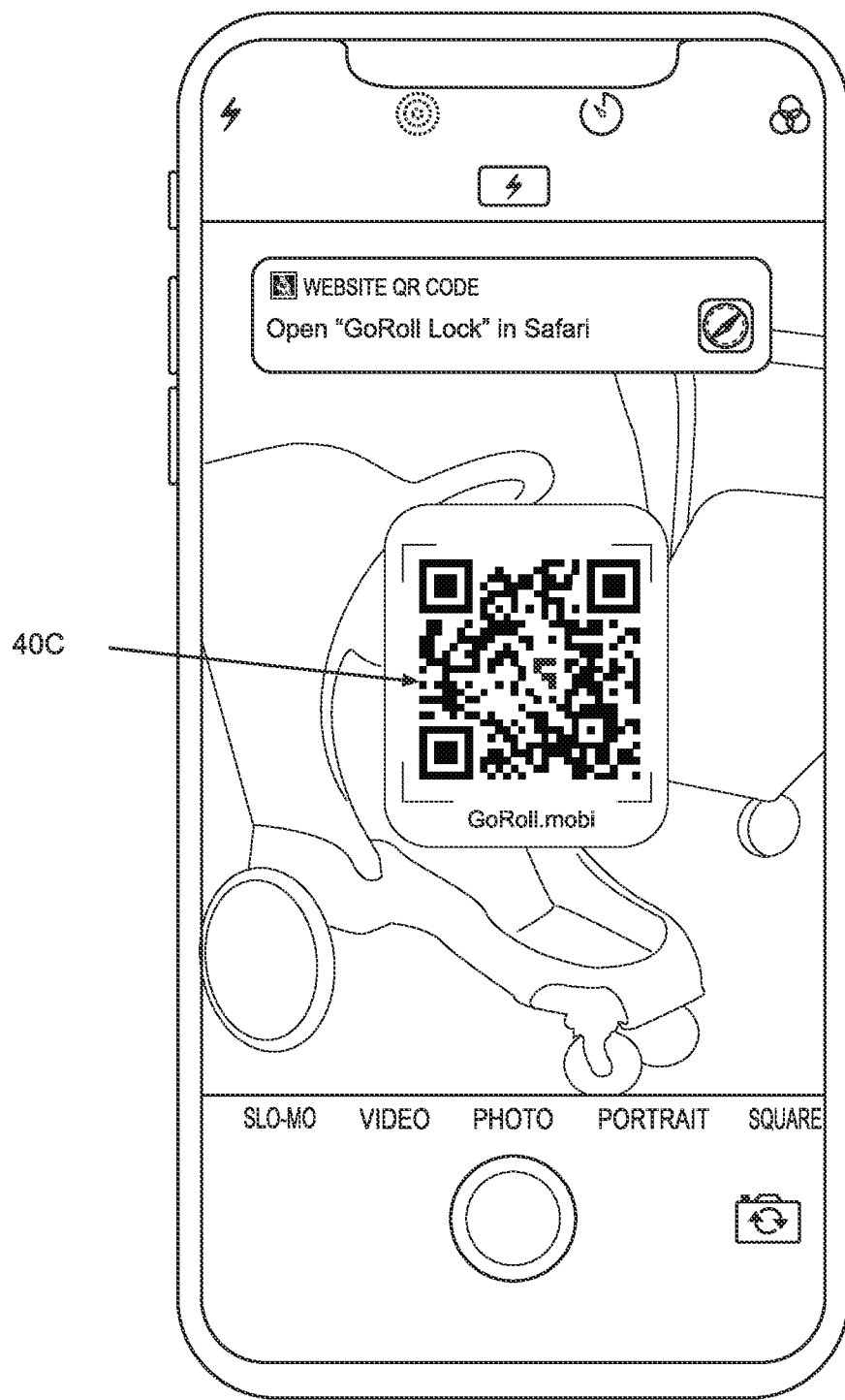
Figure 45B:
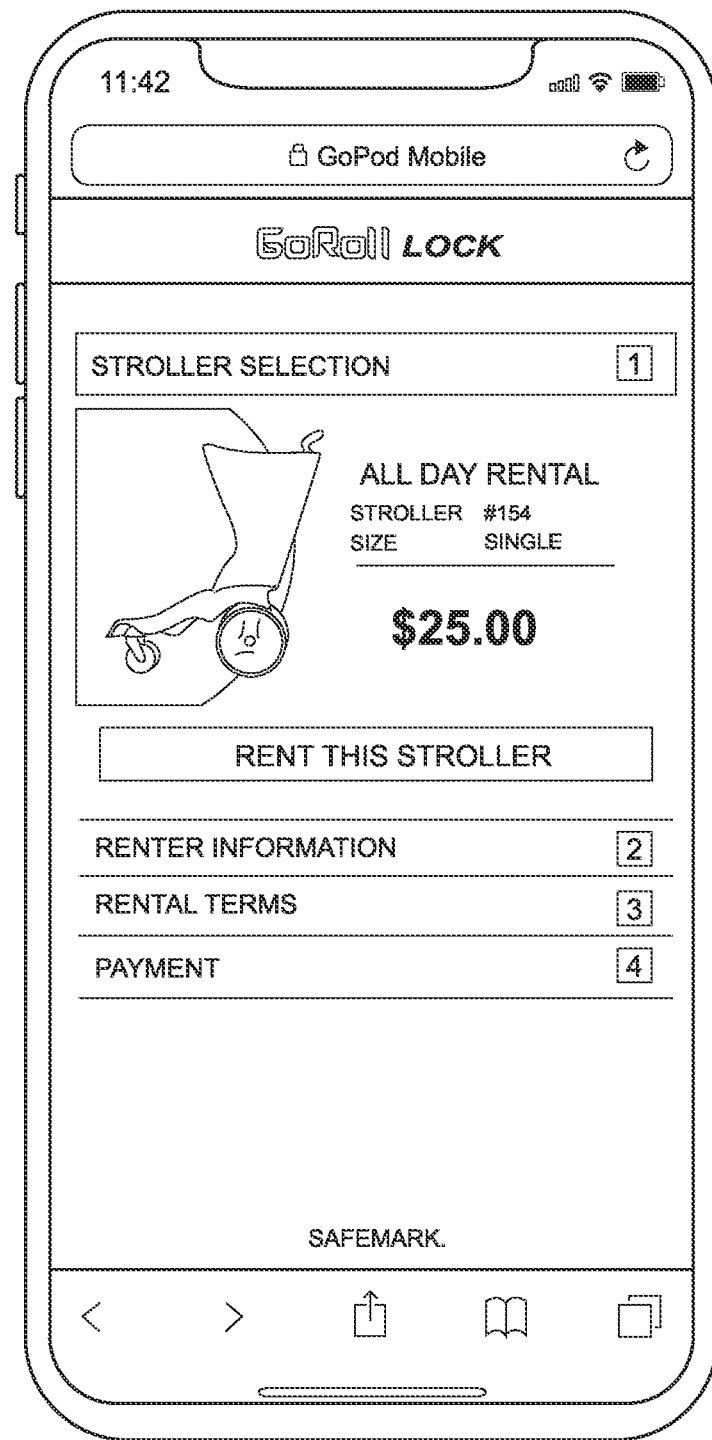
Figure 45C:
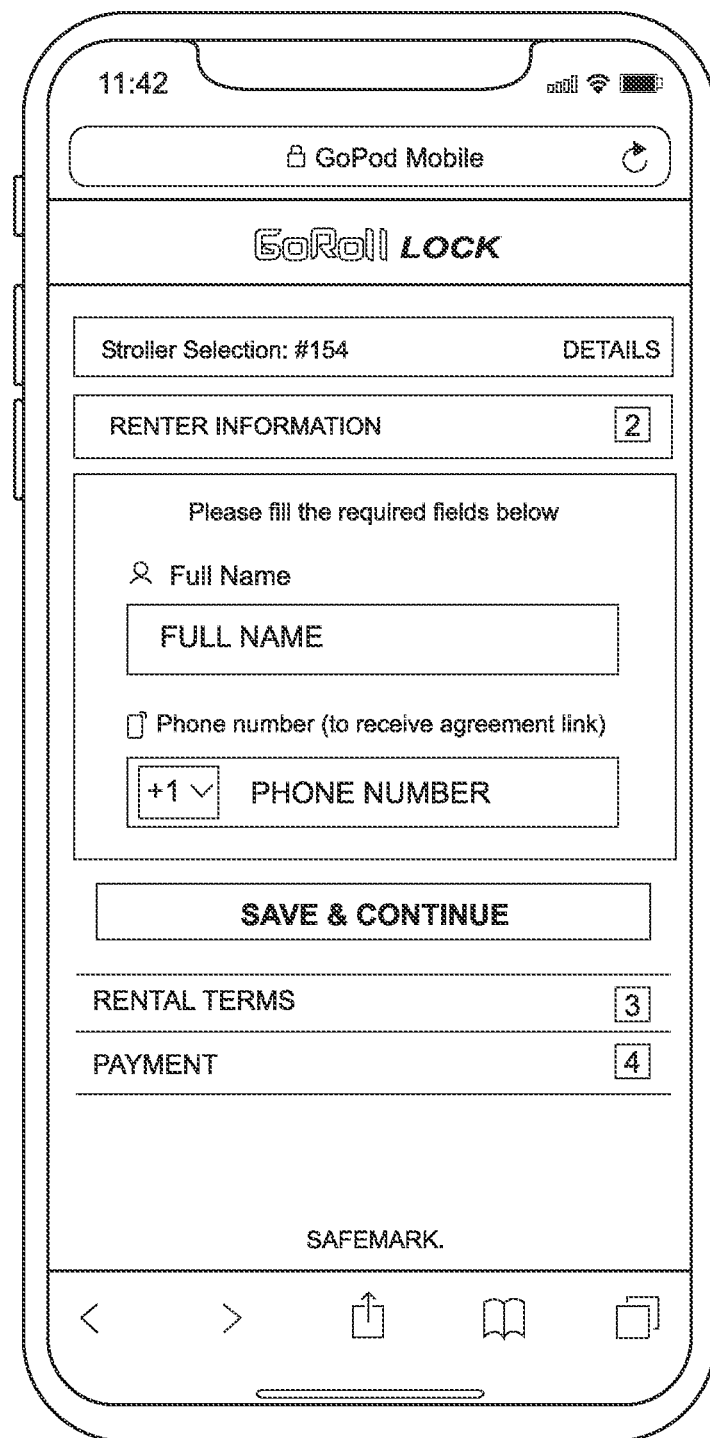
Figure 45D:
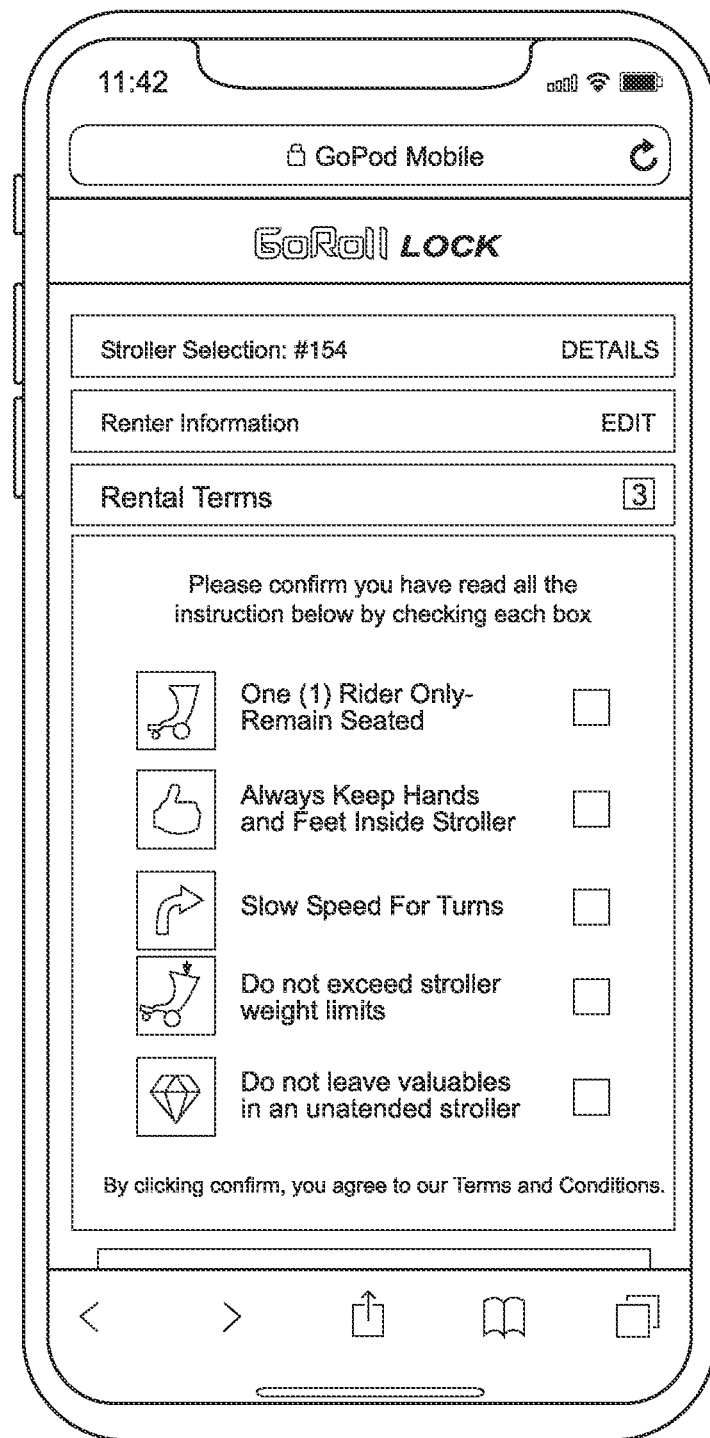
Figure 45E:
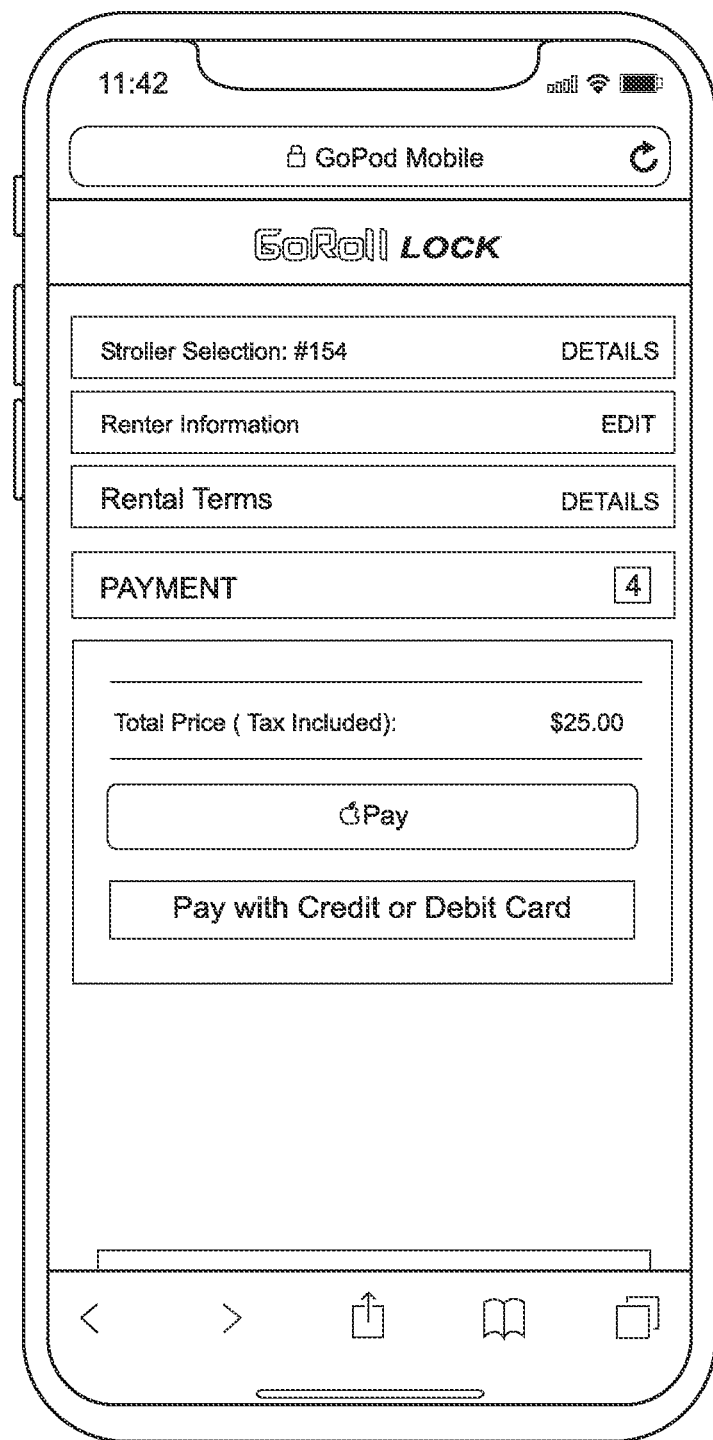
Figure 45F:
Figure 45G:
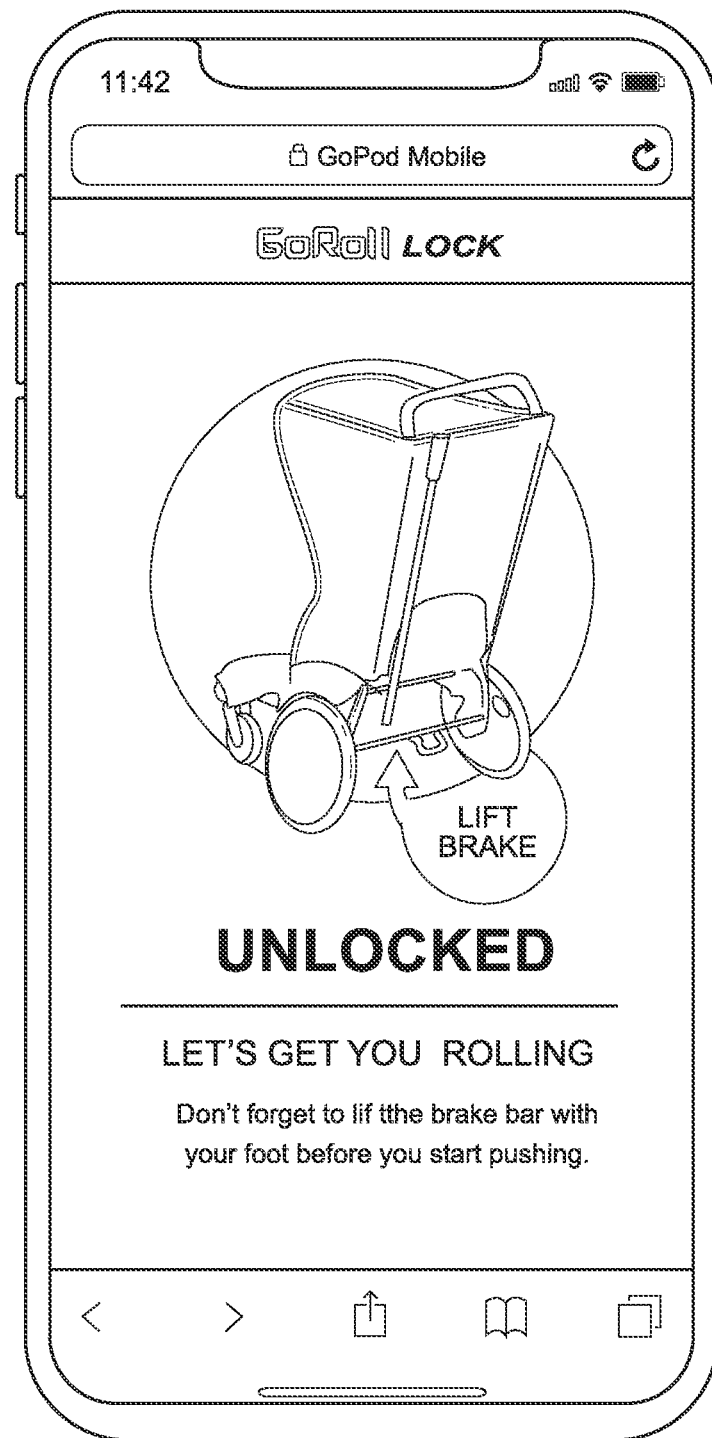
Figure 47A:
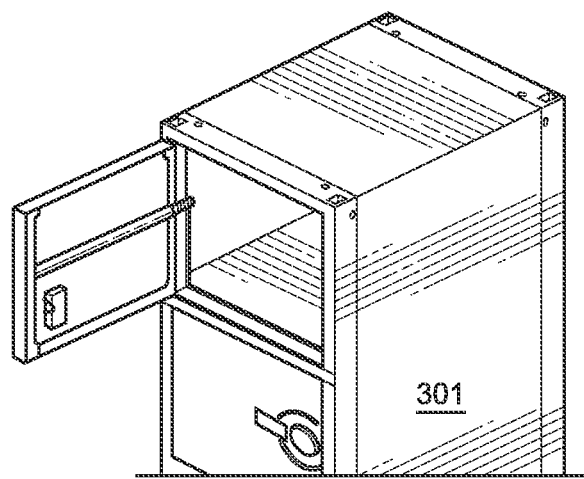
Figure 47B:
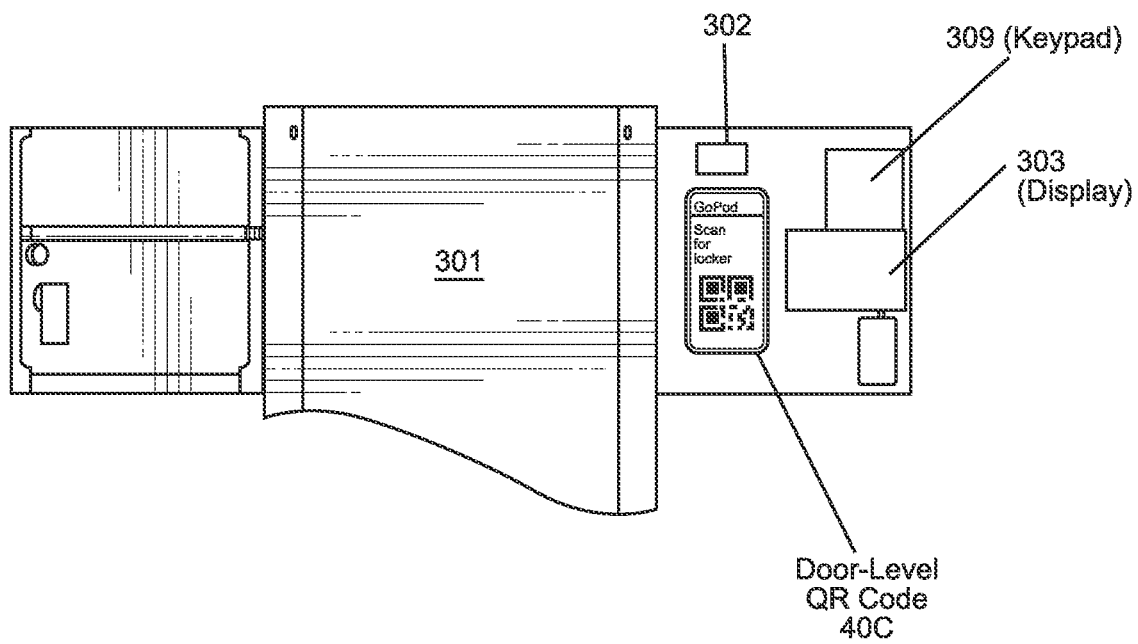
Figure 49:
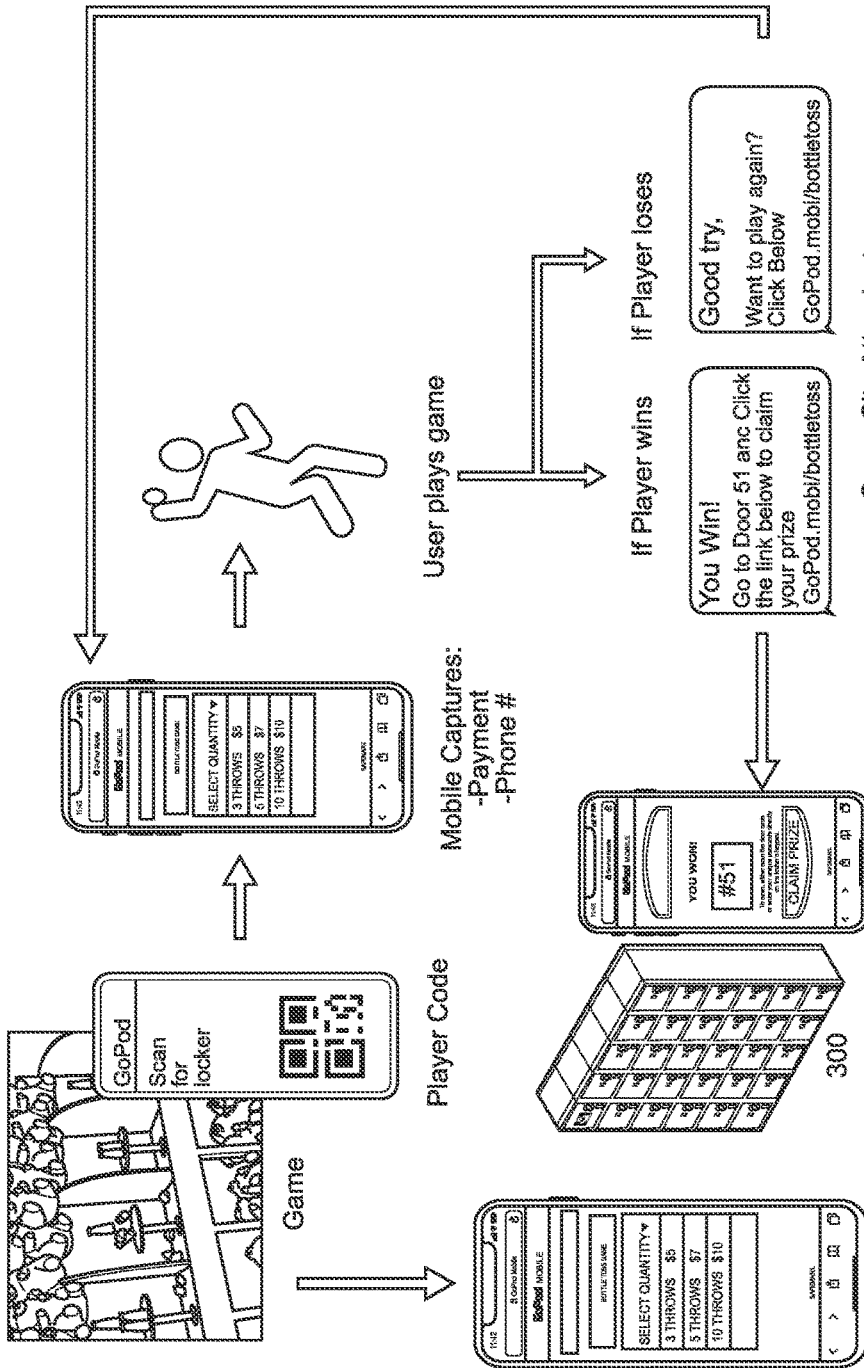
Figure 50B:
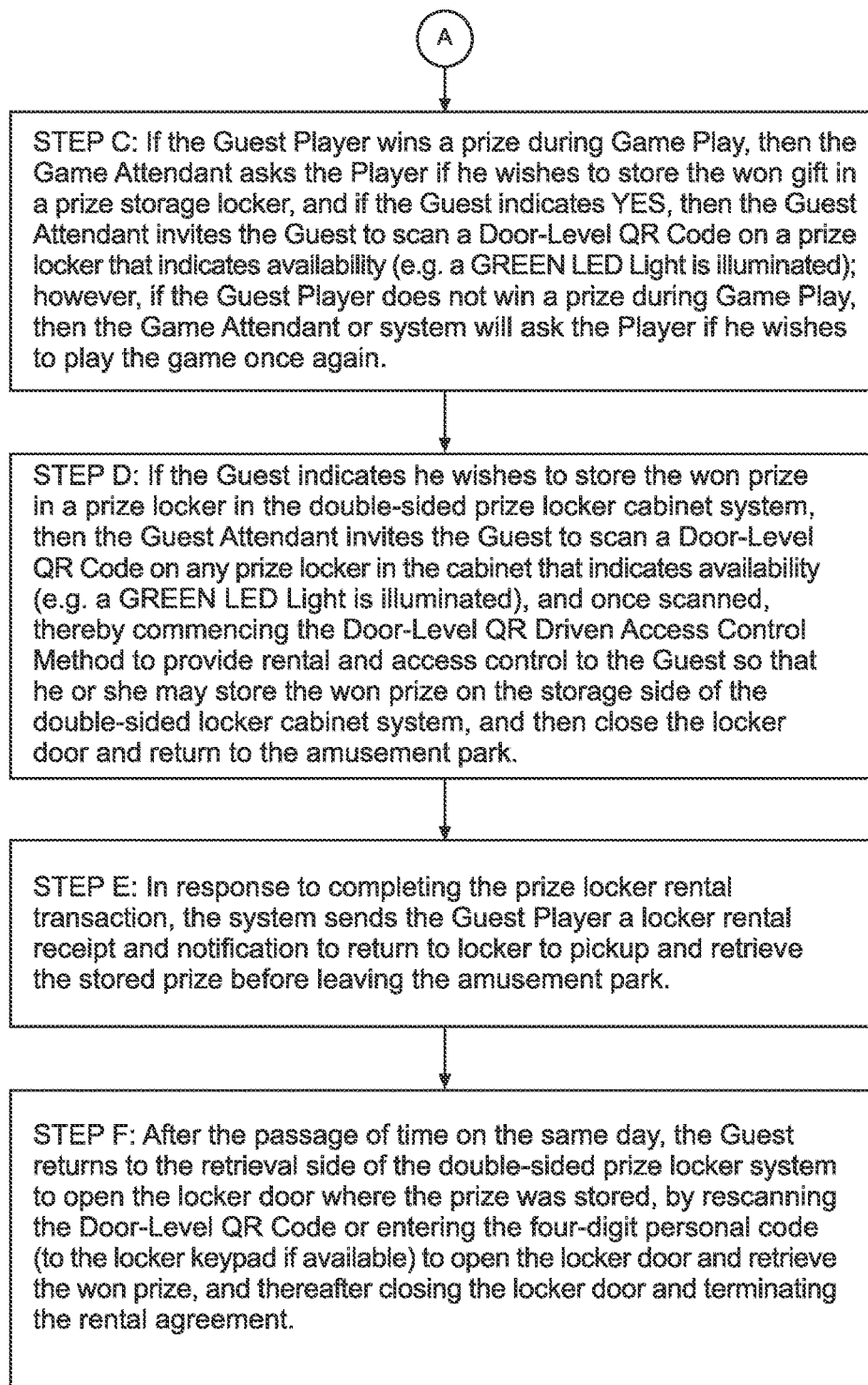
Figure 51A:
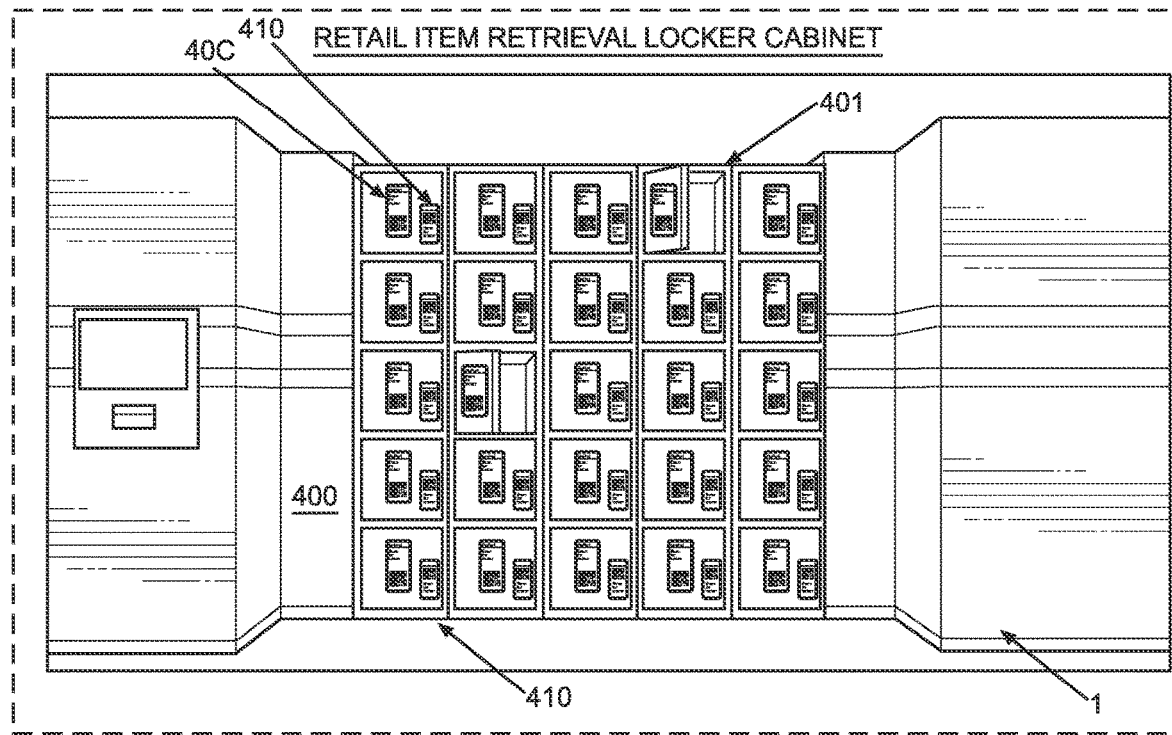
Figure 51B:
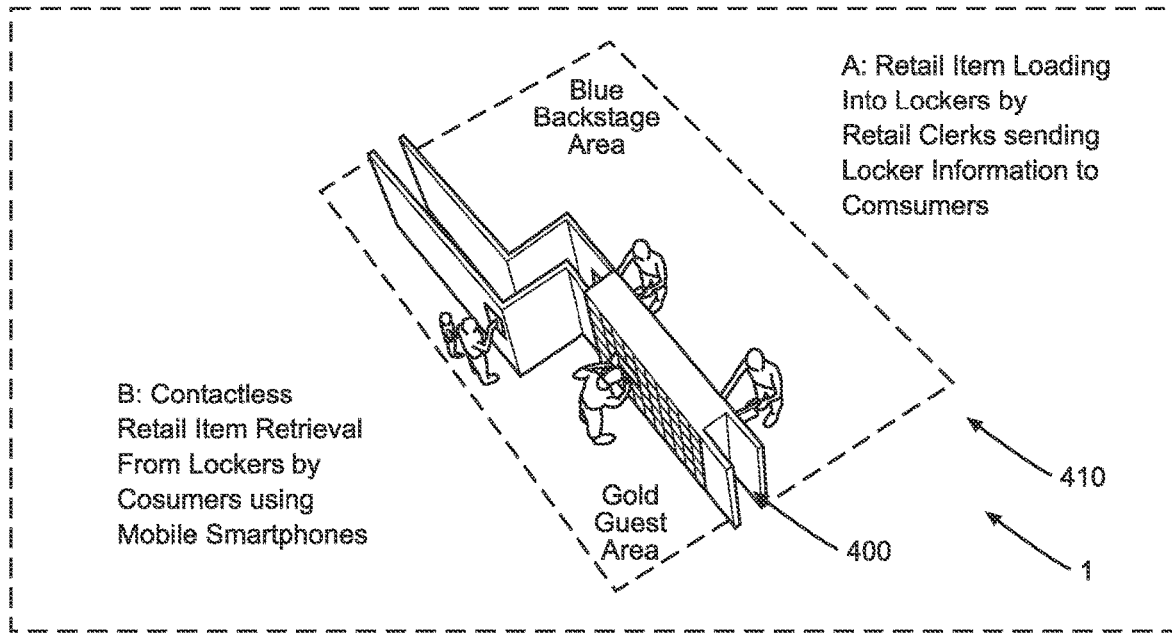
Figure 52:
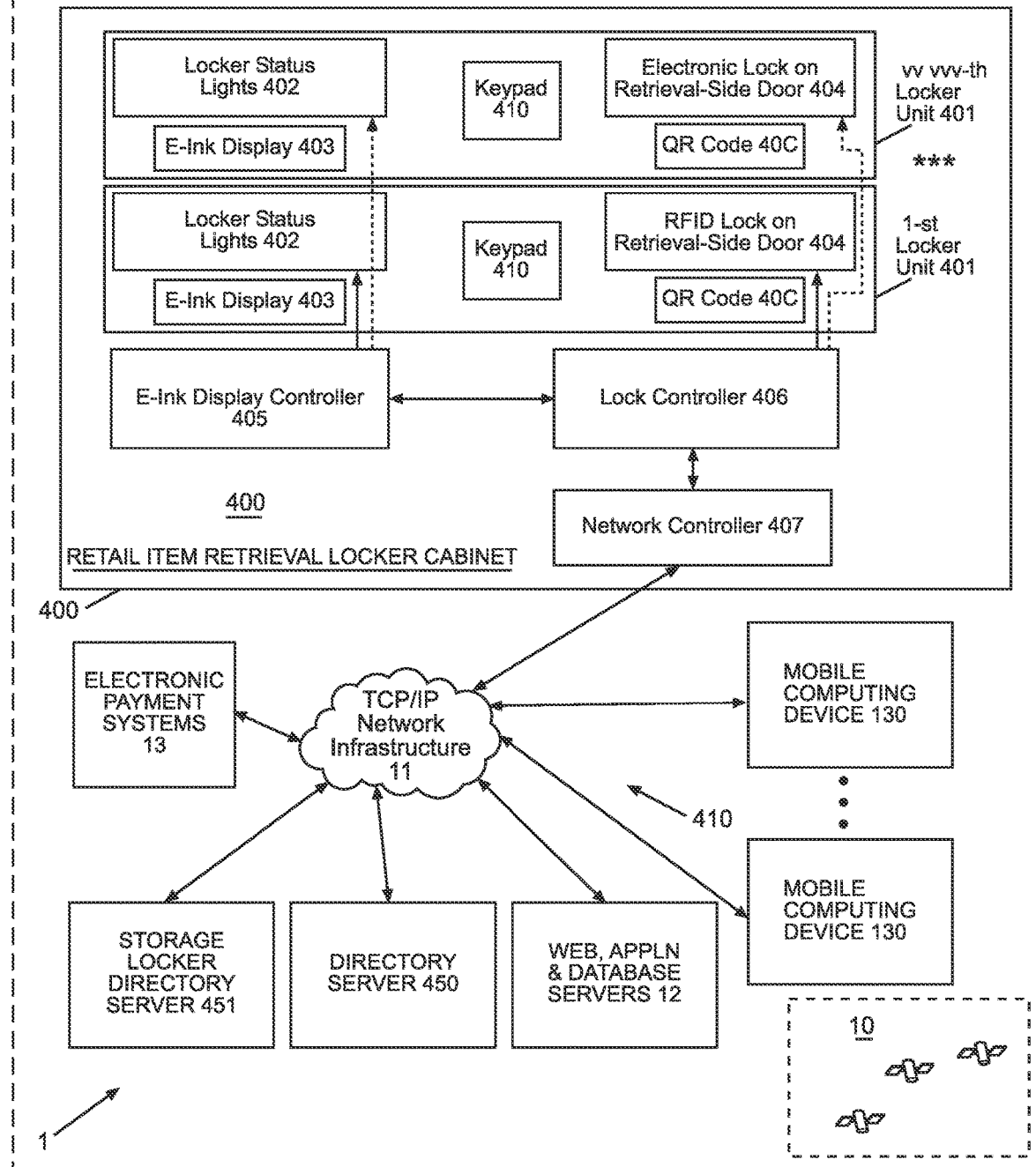
Figure 54:
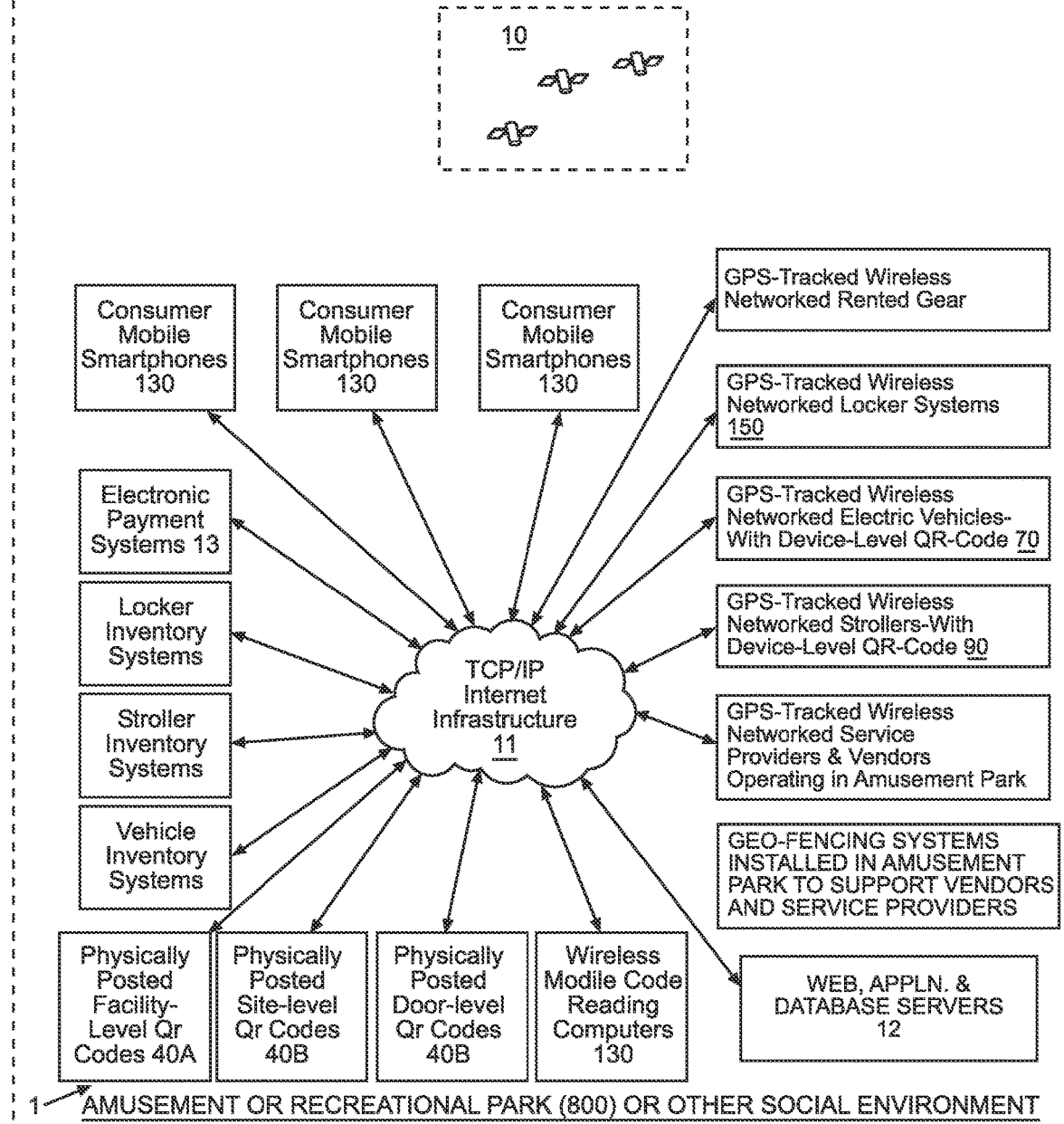
Figure 55A:
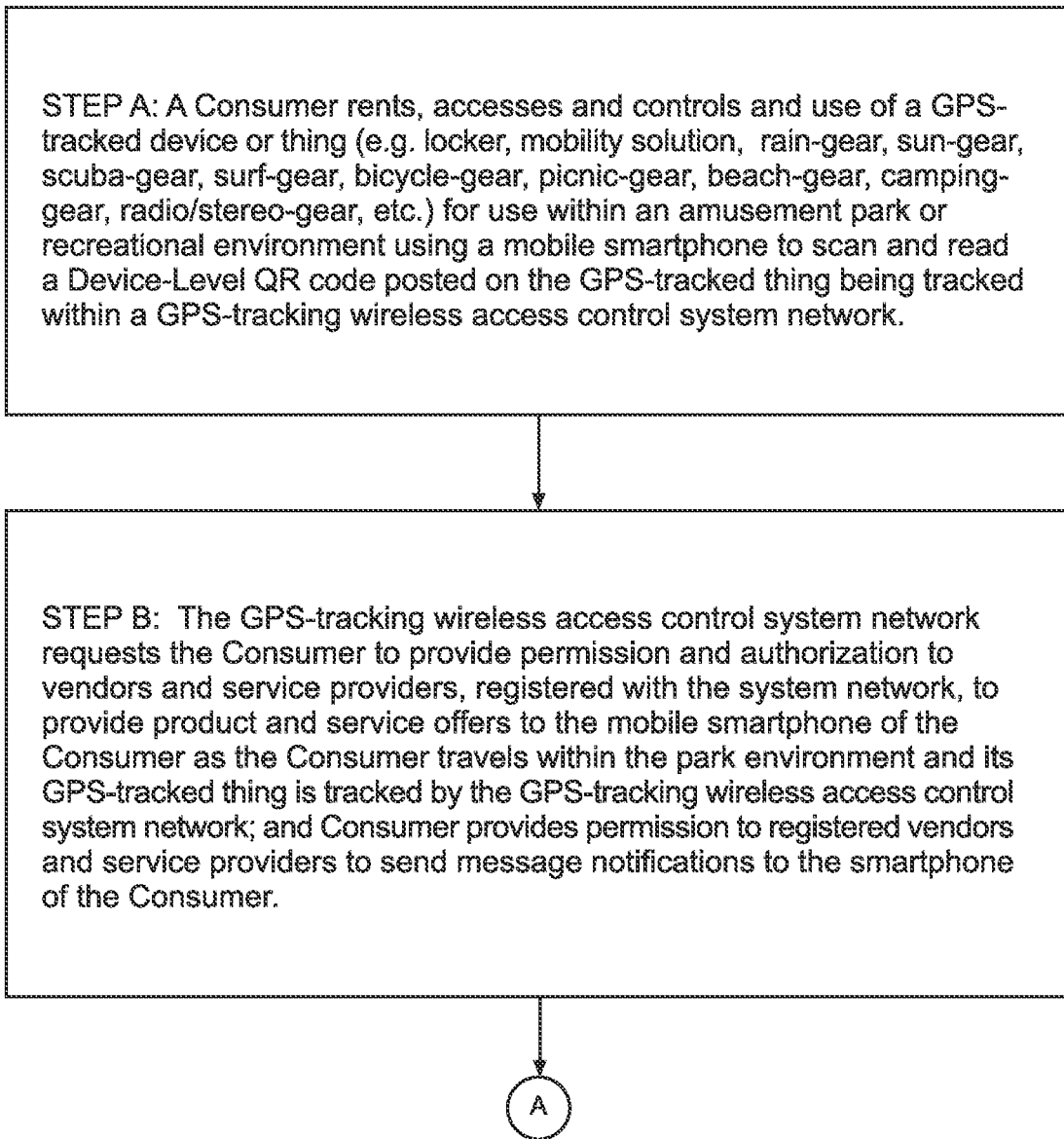
Figure 55B:
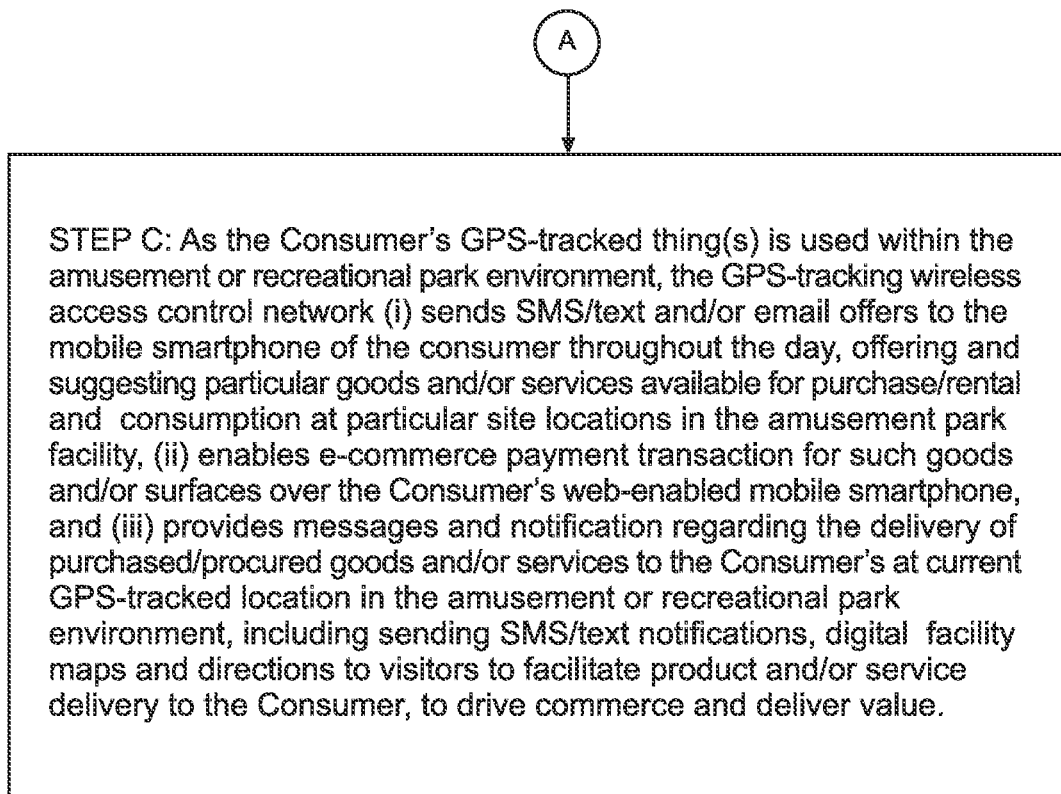
Figure 56:
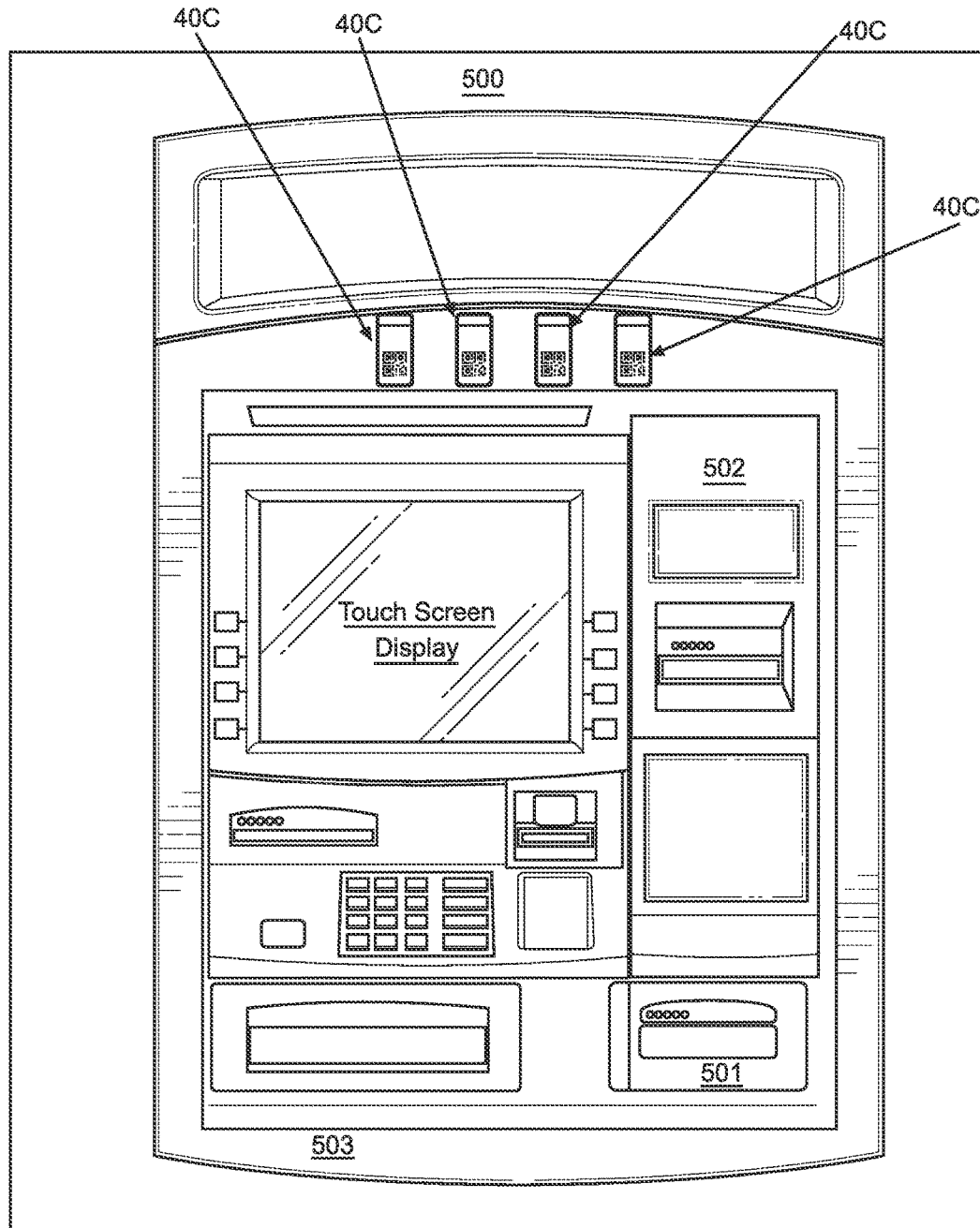
Figure 57:
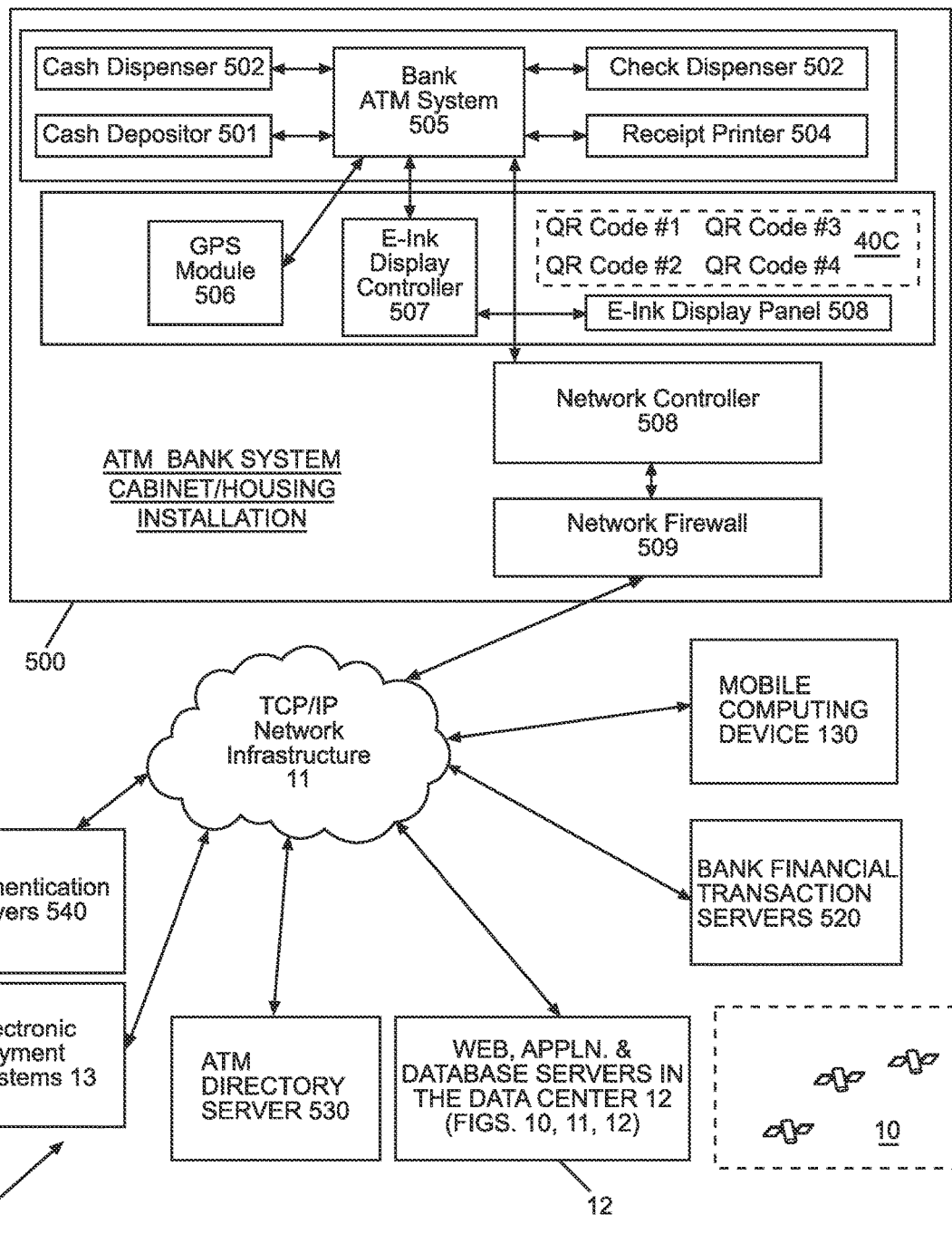

whether or not the user wishes to continue using the locker for storage of personal belongings;

FIG. 42E is a graphical user interface (GUI) screen of the mobile smartphone shown in FIG. 21, deployed on the wireless access control system network of the present invention, and showing the fifth step in the door-level access control method of the present invention displaying a message indicating and confirming the user ended the locker rental, and the user should remove all belongings from the locker before closing the locker, and optionally, if the internal automated locker camera is active within the rented locker, and the camera detects one or more objects in the locker, then the access control system network will automatically make such determinations and prevent the user from terminating the locker rental until all objects have been removed from the locker as confirmed by video camera images captured by the internal locker camera;

FIGS. 43A, 43B and 43C, taken together, provide a flow chart describing the primary steps involved when carrying out the method of managing access control to a GPS-tracked wireless networked stroller by scanning the Device-Level QR Code posted or displayed on the stroller available for rental, controlled access and use within the amusement park facility, using a mobile smartphone wireless connected to the wireless access control system network of the present invention;

FIG. 44 is a plan view of perspective view of GPS-tracked wireless networked stroller illustrated in FIGS. 17, 17A through 17E and 18, wherein users are allowed to directly scan the Device-Level QR code on the stroller system they wish to rent, and the intelligence regarding the stroller's Model, Price, Site, and Facility is effectively built into the Device-Level QR Code so that users can enjoy an expedited rental experience, with involvement in minimal data entry operations;

FIG. 45A is a graphical user interface (GUI) screen of the mobile smartphone shown in FIG. 21, deployed on the wireless access control system network of the present invention, and showing the first step in the device-level access control method of the present invention involving (i) the scanning of a Device-Level QR Code on an available GPS-tracked wireless networked stroller as shown in FIGS. 17 and 18, and (ii) automatically directing the smartphone web-browser application (e.g. Apple Safari) to parse and analyze the scanned QR code and serve, load and display the webpage specified by the URL encoded in the Device-Level QR Code as illustrated in table of FIG. 9, and whereupon, the application server stores a "Rental Transaction Identifier-Device-Entry" (RTI-DE) within the cache on the mobile smartphone;

FIG. 45B is a graphical user interface (GUI) screen of the mobile smartphone shown in FIG. 21, deployed on the wireless access control system network of the present invention, and showing the second step in the device-level access control method of the present invention involving the user selecting the "Rent This Stroller" Button to rent the scanned and selected stroller for a specific time/date (e.g. All Day Rental), given its specified stroller size, and rental price, at the Site within the Facility;

FIG. 45C is a graphical user interface (GUI) screen of the mobile smartphone shown in FIG. 21, deployed on the wireless access control system network of the present invention, and showing the third step in the device-level access control method of the present invention involving the entry of the user's full name and phone number for use in opening the rental locker, and selecting SAVE and CONTINUE to save the request in the RDBMS of the wireless access control system network;

FIG. 45D is graphical user interface (GUI) screens of the mobile smartphone shown in FIG. 21, deployed on the wireless access control system network of the present invention, and showing the fourth step in the device-level access control method of the present invention displaying the rental terms for the stroller (e.g. one day rider only, to remain seated, always keep hands and feet inside stroller, slow speed for turns, do not exceed stroller weight limits, and do not leave valuable in an unintended stroller) to be checked by the user/renter, and then selecting CONFIRM and CONTINUE, to initiate the web-based transaction between the web-enabled mobile phone and the system's web-enabled e-commerce-supported stroller access control servers, maintained at the data center;

FIG. 45E is a graphical user interface (GUI) screen of the mobile smartphone shown in FIG. 21, deployed on the wireless access control system network of the present invention, and showing the fifth step in the device-level access control method of the present invention displaying the selected stroller size, renter information, rental terms, and total price of the stroller rental (tax included), and providing several options for the user to make payment (e.g. using ApplePay® or using a credit card or debit card of the user, in which case, the card number and expiration date i.e. month/year are requested);

FIG. 45F is a graphical user interface (GUI) screen of the mobile smartphone shown in FIG. 21, deployed on the wireless access control system network of the present invention, and showing the sixth step in the device-level access control method of the present invention displaying, after the prior payment transaction has been successfully completed, a message that the stroller is ready, along a Button enabled to "Unlock My Stroller" by the user simply clicking on the UNLOCK STROLLER Button, and a message indicating to lock the stroller, press the foot brake down and press down on the red handle;

FIG. 45G is a graphical user interface (GUI) screen of the mobile smartphone shown in FIG. 21, deployed on the wireless access control system network of the present invention, and showing the seventh step in the device-level access control method of the present invention displaying a message that the stroller is UNLOCKED, and to roll the stroller, the user must lift the brake bar with his or her foot before starting to push the stroller;

FIG. 46 is a schematic illustration of the GPS-tracked wireless networked amusement park game/contest system, located at its own Site within the Facility, and awarding prizes to game winners, and supporting a local GPS-tracked wireless networked two-sided locker system that is access controlled by any guest winner using door-level QR code scanning to rent and access a storage locker for the purpose of storing a prize won at the game/contest while visiting the amusement park, and subsequently retrieving the prize from the locker on its retrieval side without interrupting game/contest play on the storage side of the prize locker;

FIG. 47A is a perspective view of one electronically-controlled storage locker contained in the two-sided locker system deployed at the GPS-tracked wireless networked amusement park game/contest system illustrated in FIG. 46, wherein the system architecture of each electronically-controlled locker is shown and described in FIG. 48, and each GPS-tracked wireless networked locker unit is access controlled and managed using multi-level QR codes in a manner similar to that described herein with regard to the other illustrative embodiments of the present invention;

FIG. 47B is an elevated side view of the electronically-controlled storage locker shown in FIG. 47A, showing its RGY status indicator lights, electronic-ink display panel, and Door-Level QR Code posted on the locker door surface;

FIG. 48 is a schematic system block diagram of a GPS-tracked wireless network QR code driven local access-controlled locker system present invention, shown comprising a system of wireless networked two-sided prize locker units internetworked together at the cabinet/bank-level by a Zigbee® low-rate wireless personal area network (WPAN) (e.g. the IEEE 802.15.4 Standard), and each wireless networked two-sided prize locker system comprises the following components integrated about a system bus, namely, a programmed microprocessor interfaced to the system bus and supported by a memory architecture (e.g. RAM, ROM, and SSD persistent storage), a network controller for interfacing with the TCP/IP infrastructure, a solenoid driver circuit connected to a lock solenoid and bolt assembly and locker door, a keypad and E-ink display panel and Bluetooth/WIFI interfaced with the system bus via an I/O module interface, a digital video camera with a field of view (FOV) and interfaced with the system bus, a GPS module interfaced with the system bus, a first door-level QR code physically posted or electronically displayed on the storage-side door surface using its E-ink panel, and a second door-level QR code physically posted or electronically displayed on the storage-side door surface using its E-ink panel;

FIG. 49 is schematic illustrating describing the method of playing a game at a game site, winning a prize, and then storing the prize within a double-sided wireless networked prize locker system installed at the game site;

FIGS. 50A and 50B, taken together, provide a flow chart describing the primary steps carried out when practicing the method of storing a prize won by a guest during a game or contest, within the double-sided wireless networked prize locker system shown in FIGS. 46, 47A, 47B and 48, in accordance with the principles of the present invention;

FIG. 51A is a perspective view of a double-sided wireless networked retail storage locker system enabling customers to retrieve purchased items from the lockers in a contactless manner using mobile phones and the wireless access control system network of the present invention;

FIG. 51B is a perspective illustration the double-sided wireless networked retail storage locker system shown in FIG. 51A, showing the backstage loading area of the retail locker system shown in FIG. 51A, and the guest area where consumers retrieve purchased items from lockers containing their purchased goods;

FIG. 52 is a schematic block diagram of the double-sided wireless networked retail storage locker system for contactless purchased item retrieval, integrated within the cloud-based GPS-tracking wireless access control system network of the present invention;

FIG. 53 is a flow chart describing the primary steps carried out when practicing the method of purchasing products at an online e-commerce and/or brick and mortar retail store and thereafter retrieving in a contactless manner the purchased product items stored within a double-sided wireless networked retail locker system installed at the retail store or its order fulfillment center;

FIG. 54 is a schematic block diagram describing the GPS-tracking wireless access control system network of the present invention supporting the offering and delivering of goods and services to consumer's using rented/access-controlled things GPS-tracked within a GPS-tracking wireless access control system network;

FIGS. 55A and 55B, taken together, provide a flow chart describing the primary steps carried out when practicing the method of method of delivering products and services to a guest visitor who has rented a GPS-tracked thing for use within an amusement park or recreational environment using a mobile smartphone to scan device-level QR code on the GPS-tracked thing being tracked within a GPS-tracked wireless access control system network;

FIG. 56 is a perspective view of a GPS-tracked ATM banking system of the present invention installed within an environment that is accessible and controllable by banking customers using a web-enabled mobile smartphone deployed on the GPS-tracked wireless system network of the present invention, for the purpose of scanning certain of the ATM-Level QR codes displayed or posted on the ATM system, so to initiate and conduct desired or required financial transactions with the ATM system in a safe, secure and contactless manner;

FIG. 57 is a schematic block system diagram describing the system architecture of the GPS-tracked ATM banking system of the present invention displaying ATM-Level QR codes to enable the consumer user to access and control the GPS-specified ATM system to perform a number of banking functions in a safe, secure and contactless manner; and FIG. 58 is a flow chart describing the primary steps carried out when practicing the method of depositing cash and/or checks in, or withdrawing cash from, an GPS-tracked QR code driven ATM banking system in a contactless manner using a mobile smart phone deployed on the GPS-tracking wireless access control network of the present invention.

DETAILED DESCRIPTION OF THE ILLUSTRATIVE EMBODIMENTS OF THE PRESENT INVENTION

Referring to the figures in the accompanying Drawings, the illustrative embodiments of the system and will be described in great detail, wherein like elements will be indicated using like reference numerals.

Also, U.S. Pat. No. 8,990,110, US Patent Application No. US2019/0035186, U.S. Pat. Nos. 9,558,608, 10,474,797, 7,341,191, and pending U.S. patent application Ser. No. 14/728,887 filed Jun. 2, 2015, are each hereby incorporated herein by reference in their entirety, as if set forth fully herein.

Figure 7:
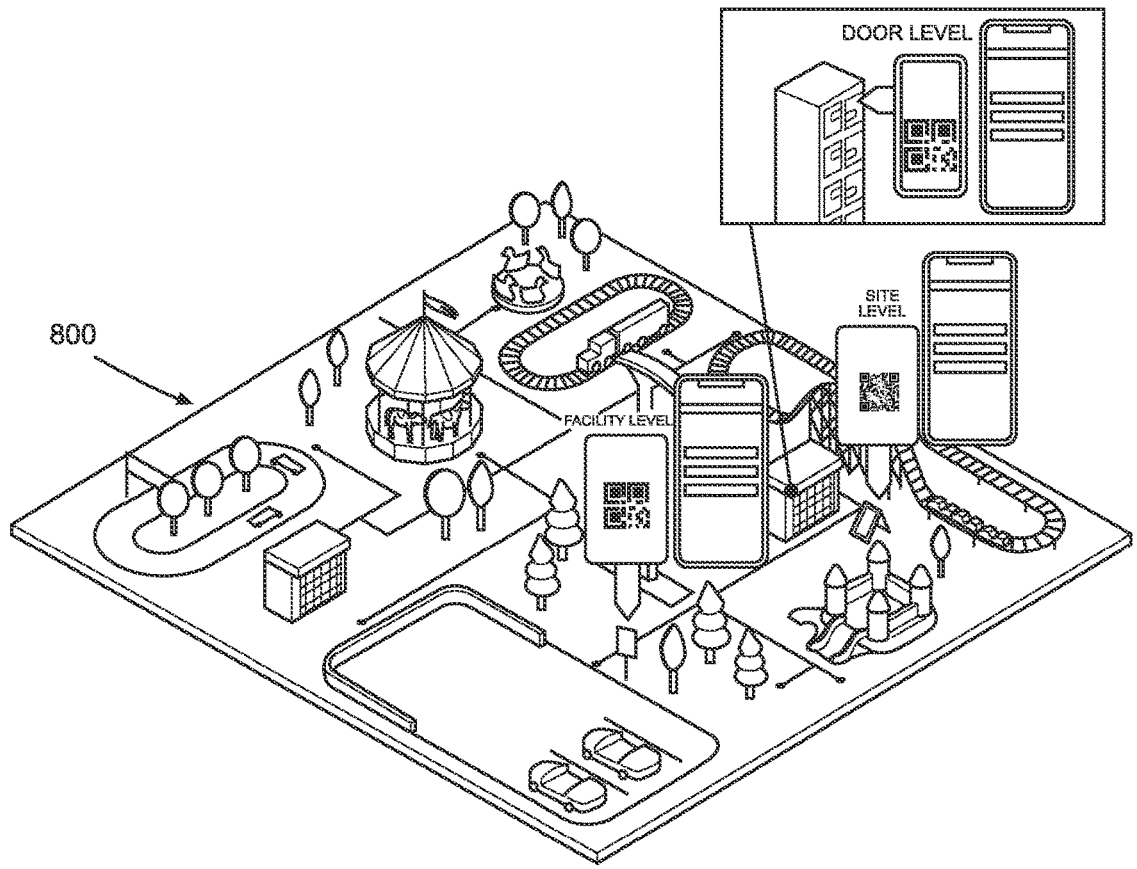
FIG. 7 shows a schematic illustrating providing a global view of an amusement park facility supported by the cloud-based Quick Response (QR) code driven wireless system network supporting storage lockers, mobility solutions and other guest services in accordance with the principles of the present invention, wherein multi-level QR codes (e.g. facility-level QR codes, site-level QR codes and device-level QR codes) are deployed across the entire amusement park facility (i.e. enterprise) to support the contact-less procurement and provision of diverse kinds of valuable services to park guests and visitors, anywhere within the park environment, when simply using their mobile (smart) phones.

Brief Overview of the Wireless Control Access System Network of the Present Invention FIG. 7 illustrates a global view of an amusement park facility supported by a cloud-based Quick Response (QR) code driven wireless control access system network 1 supporting the rental, access and control of storage lockers, mobility solutions and other guest services in accordance with the principles of the present invention.

In the illustrative embodiments disclosed herein, multi-level QR codes (e.g. facility-level QR codes 40A, site-level QR codes 40B and device-level QR codes 40C) are deployed across the entire amusement park facility (i.e. enterprise) 800 to support the contact-less procurement and provision of diverse kinds of valuable products and services to park guests and visitors, anywhere within the park environment, when simply using their mobile smartphones deployed on the wireless system network.

Figure 8A:
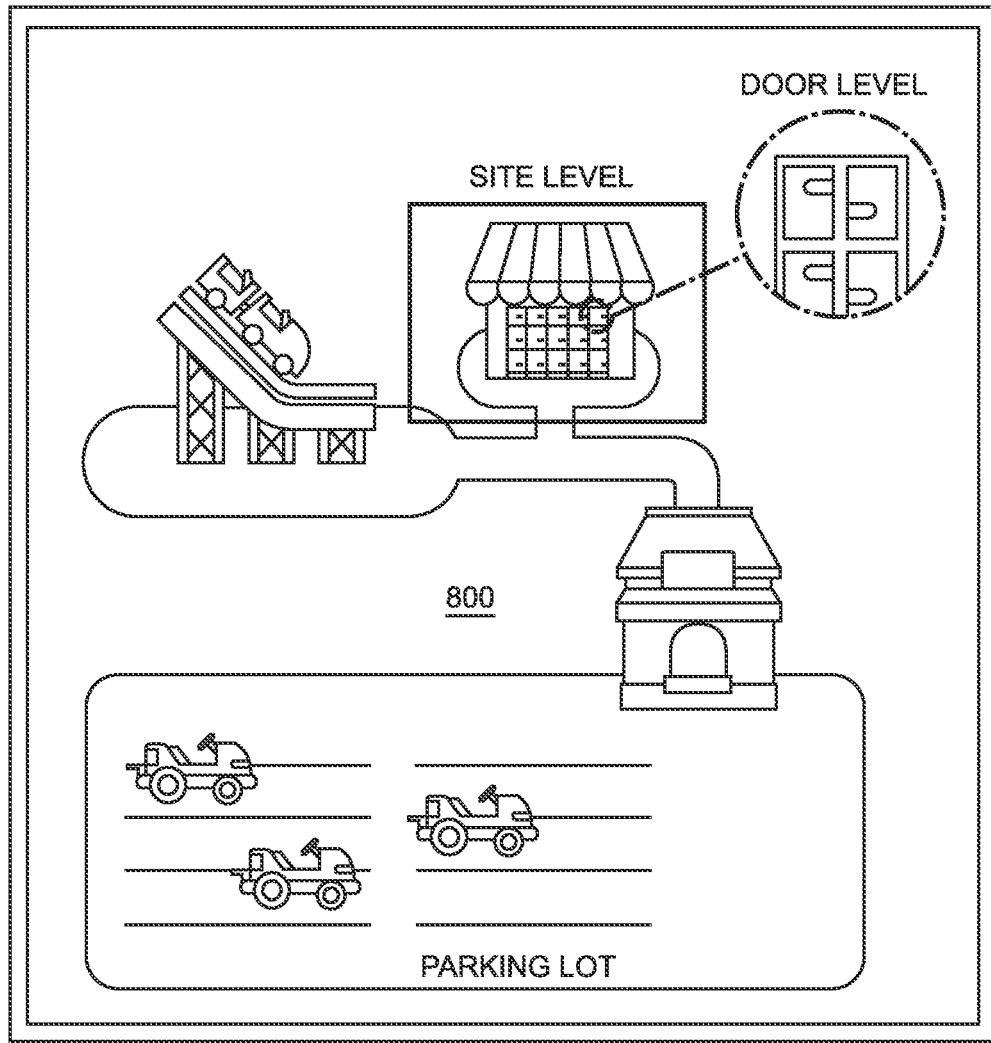
FIG. 8A shows a schematic representation of an amusement park facility, which the system of multi-level QR codes of the present invention are embedded at the facility, site, and device (i.e. thing) level of the park environment to enable park guests, visitors and other system users to procure, access and receive storage, mobility and other valuable products and services while visiting an amusement park environment.

While the use of the term "amusement park" and "amusement park facility" has been used herein in connection with many illustrative embodiments of the present invention, it is understood that this term shall be understood to include, but not be limited to, any "adventure seeking" or "human social" activity on Earth, including, for example:

Casinos
Museums
National Parks
Amusement Parks
Theme Parks
Sporting Arenas and Centers
Virtual Reality and Augmented Reality Adventure Parks
Colosseums and Amphitheatre
Music and Arts Festivals
Water and River Rafting and Outdoor Activities
Western Activities
Horseback Riding
Hiking and Mountain Climbing Activities
Sporting and Recreational Centers
Gymnastic Centers
National Beaches
Rodeos
Animal Shows
Sporting Games and Contests
Film and Performing Arts Theaters
Public Parks
Ice Skating Rinks
Public Swimming Pools
ATR vehicles and trailblazing
Ski Lodges
Snowboarding
Alpine Sports
Hunting and Fishing Lodges While amusement park venue will provide many opportunities to serve people using the wireless system network of the present invention 1, it is understood that any social environment involving human and/or animal life will be suitable venues for the wireless system network 1, where mobile phones can be used to provide machine-code driven access control to things and services of value. For examples, social environments for use of the wireless system network of the present invention 1 will include, but are not limited to:

National Disaster and Relief Centers (FEMA)
International Red Cross Relief Centers
Homeless Shelters and Centers
Personal Relief Shelters
Shared Business Office Space
Community Living Environments
Senior Citizen Centers
Transportation Centers FIG. 8A shows an amusement park facility 800, in which a system of exemplary multi-level QR codes of the present invention are embedded at the facility, site, and device (i.e. thing) level of the park environment to enable park guests, visitors and other system users to procure, access and control storage, mobility and other valuable products and services while visiting an amusement park environment.

Figure 8B:
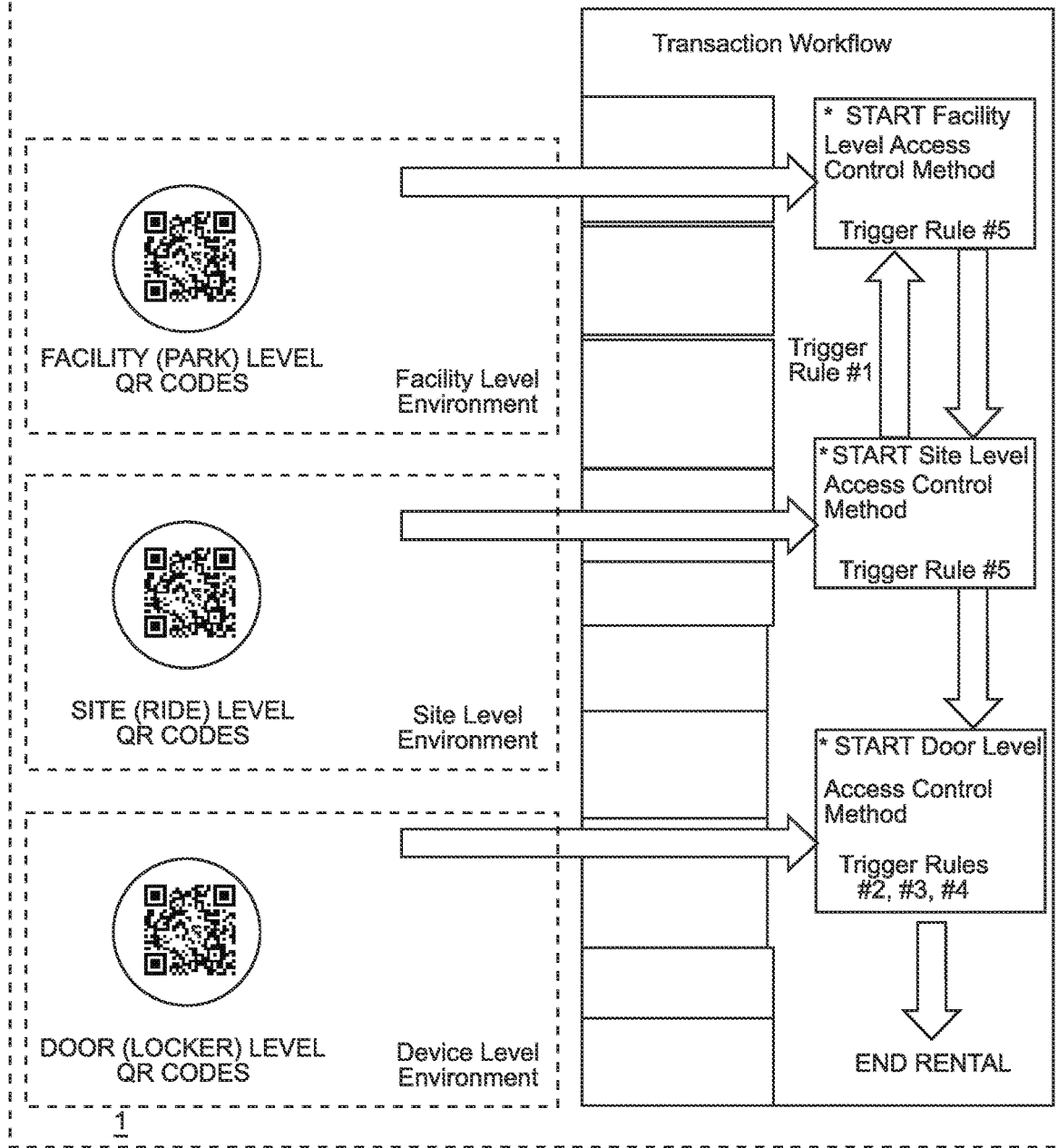
FIG. 8B shows a schematic representation illustrating the mapping of multi-level QR codes to particular entry points in transaction workflows designed to support procurement and delivery of services to an amusement park, tourist, or adventure seeking environment, wherein (i) Facility-Level QR codes are mapped to facility-level entry points in the transactional workflow and posted/displayed at physical and virtual locations outside of amusement park facility, (ii) Site-Level QR codes are mapped to site-level entry points in the transactional workflow and posted/displayed at physical Site locations within the amusement park facility, and (iii) Device-Level QR codes are mapped to device-level (e.g. locker door level) entry points in the transactional workflow and posted/displayed on actual physical locker doors located at Sites within the amusement park facility.

FIG. 8B illustrates the mapping of multi-level QR codes to particular entry points in transaction workflows designed to support procurement and delivery of services to an amusement park, tourist, or adventure seeking environment. As shown, the (i) Facility-Level QR codes 40A are mapped to facility-level entry points in the transactional workflow and posted/displayed at physical and virtual locations outside of amusement park facility, (ii) Site-Level QR codes 40B are mapped to site-level entry points in the transactional workflow and posted/displayed at physical Site locations within the amusement park facility, and (iii) Device/Thing-Level QR codes 40C are mapped to device-level (e.g. locker door level) entry points in the transactional workflow and posted/displayed on actual physical locker doors located at Sites within the amusement park facility.

FIG. 8C list a set of exemplary rule-based triggers that can be employed for automated re-direction of transactional workflow upon automated detection thereof during the QR driven access control processes executing on system servers of the present invention. This list is merely exemplary and will vary from embodiment to embodiment, and application to application.

FIG. 9 shows the Multi-Level QR Code Hierarchy used to practice the illustrative embodiments of the present invention, namely: (i) (Locker) Door-Level QR Codes intelligently encoded with data attributes including facility (park), site, door, type (e.g. timed/daily), size, and pricing and URL directed to a first server component supported on the wireless system network of the present invention, (ii) Site-Level QR Codes intelligently encoded with data attributes including facility (park), site, type (e.g. timed/daily), size options, the pricing for each size and type options, and inventory status of each type and option, and URL directed to a second server component supported on the wireless system network of the present invention, and (iii) Facility-Level QR Codes intelligently encoded with data attributes including facility (park), sites rendered as choices, types (e.g. timed/daily), size options, and the pricing for each size and type options, and URL directed to a third server component supported on the wireless system network of the present invention. This is code hierarchy is merely exemplary, and will vary from embodiment to embodiment of the present invention disclosed herein.

In general, when practicing the principles of the present invention, each Multi-Level QR (Quick Response) Code Structure (e.g. Facility-Level, Site-Level and Device/Door/Thing-Level QR Code Structure) can be realized using (i) any machine-readable optically-readable bar code symbol of any symbology type, and/or (ii) any RFID tag component, realized using an RFID technology including active and passive RFID technologies known, and as may be developed and advanced in the future.

These machine-readable codes, including optically-readable codes and other forms of graphical indicia containing decodable information, can be printed in a physical medium and posted on the signs, doors, and devices described herein requiring wireless remote and local access control, as described herein, by scanning and decoding (i.e. reading) the code with aa user's web-enabled mobile phone deployed on the wireless access control system network of the present invention.

Alternatively, these machine-readable codes can be electronically displayed on electronic-ink (e.g. E-Ink display media) and LCD display screens alike mounted on signs, doors, and devices described herein also requiring wireless remote and local access control by scanning the code with a user's web-enabled mobile phone deployed on the wireless access control system network of the present invention.

Figure 10:
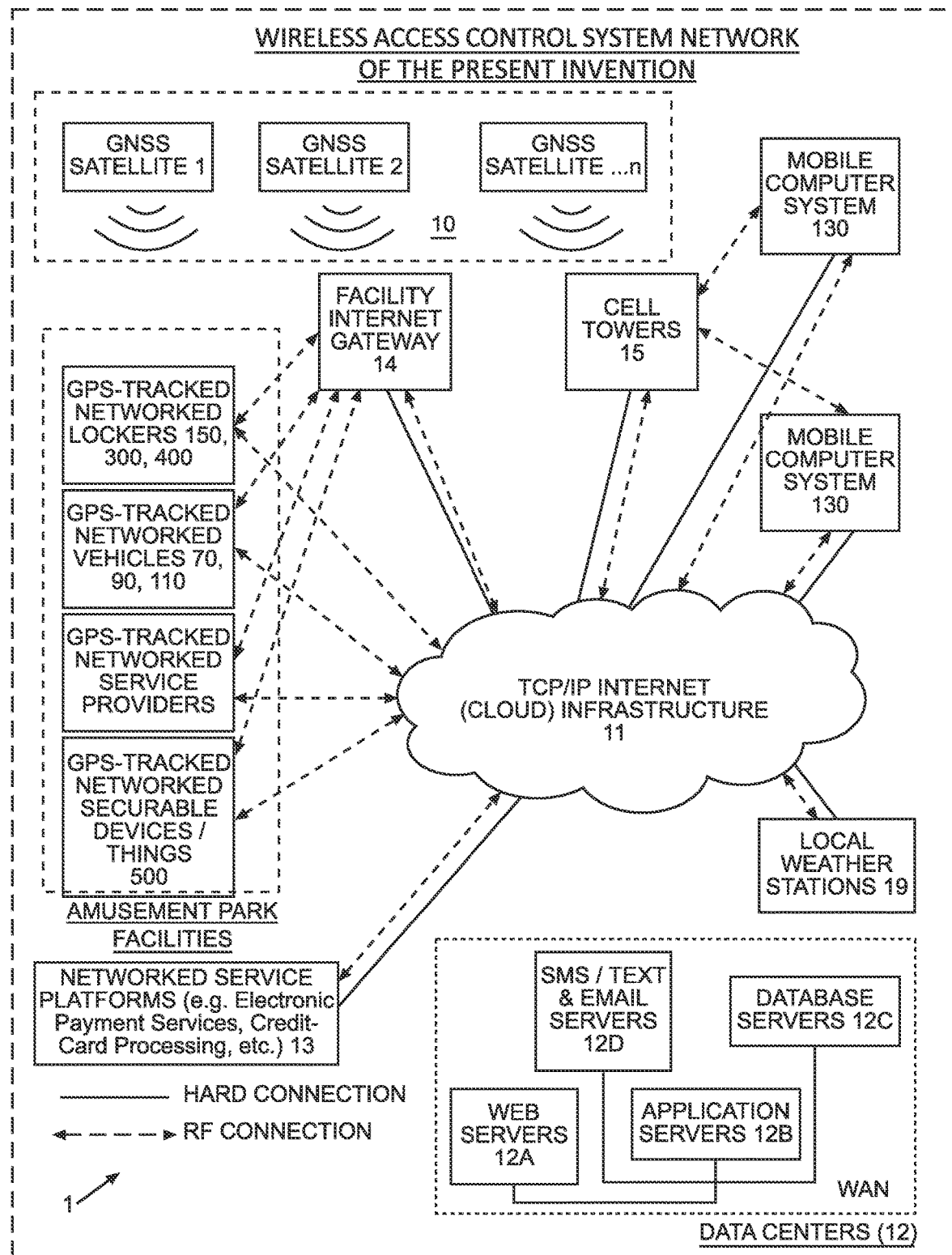
FIG. 10 is a schematic system block diagram of the cloud-based (i.e. Internet-based) GPS-tracking wireless access control system network of the present invention configured for procurement and access control of storage lockers, mobility solutions and other services offered within an enterprise-level amusement park facility, shown comprising: a system of GNSS satellites orbiting around the Earth, GPS-tracked wireless networked lockers, GPS-tracked wireless networked vehicles (e.g. ECVs, wheelchairs, and strollers alike), GPS-tracked service providers, GPS-tracked vendors, and other diverse types of GPS-tracked wireless networked securable devices, each being interfaced with a TCP/IP infrastructure directly, and/or via a facility-based Internet Gateway; a network of cellular towers for supporting wireless data communication services between wireless mobile computing devices and network communication adapters; a plurality of wireless mobile computing systems (e.g. smartphones, tablet computers, etc.); one or more industrial strength data centers, each supporting a cluster of communication servers (e.g. web servers), a cluster of application servers, and a cluster of database servers, and SMS/text and email servers supported by at least one wide area network (WAN), and local weather servers, and network service platforms including electronic payment systems and services, credit card processing, and the universe of webservers supported on the WWW.

FIG. 10 shows the cloud-based (i.e. Internet-based) GPS-tracking wireless access control system network of the present invention 1 configured for procurement and access control of storage lockers, mobility solutions and other services offered within an enterprise-level amusement park facility, shown comprising: a system of GNSS satellites 10 orbiting around the Earth, GPS-tracked wireless networked lockers 150, 300, GPS-tracked wireless networked vehicles (e.g. ECVs 70, wheelchairs 110, and strollers 90 alike), GPS-tracked service providers, GPS-tracked vendors, and other diverse types of GPS-tracked wireless networked securable devices, each being interfaced with a TCP/IP infrastructure 11 directly, and/or via a facility-based Internet Gateway 14; a network of cellular towers 15 for supporting wireless data communication services between wireless mobile computing devices and network communication adapters; a plurality of wireless mobile computing systems (e.g. smartphones, tablet computers, etc.) 130; one or more industrial strength data centers 12, each supporting a cluster of communication servers (e.g. web servers) 12A, a cluster of application servers 12B, and a cluster of database servers 12C, and SMS/text and email servers 12D supported by at least one wide area network (WAN), and local weather servers 19, and network service platforms 13 including electronic payment systems and services, credit card processing, and the universe of webservers supported on the WWW.

Figure 11:
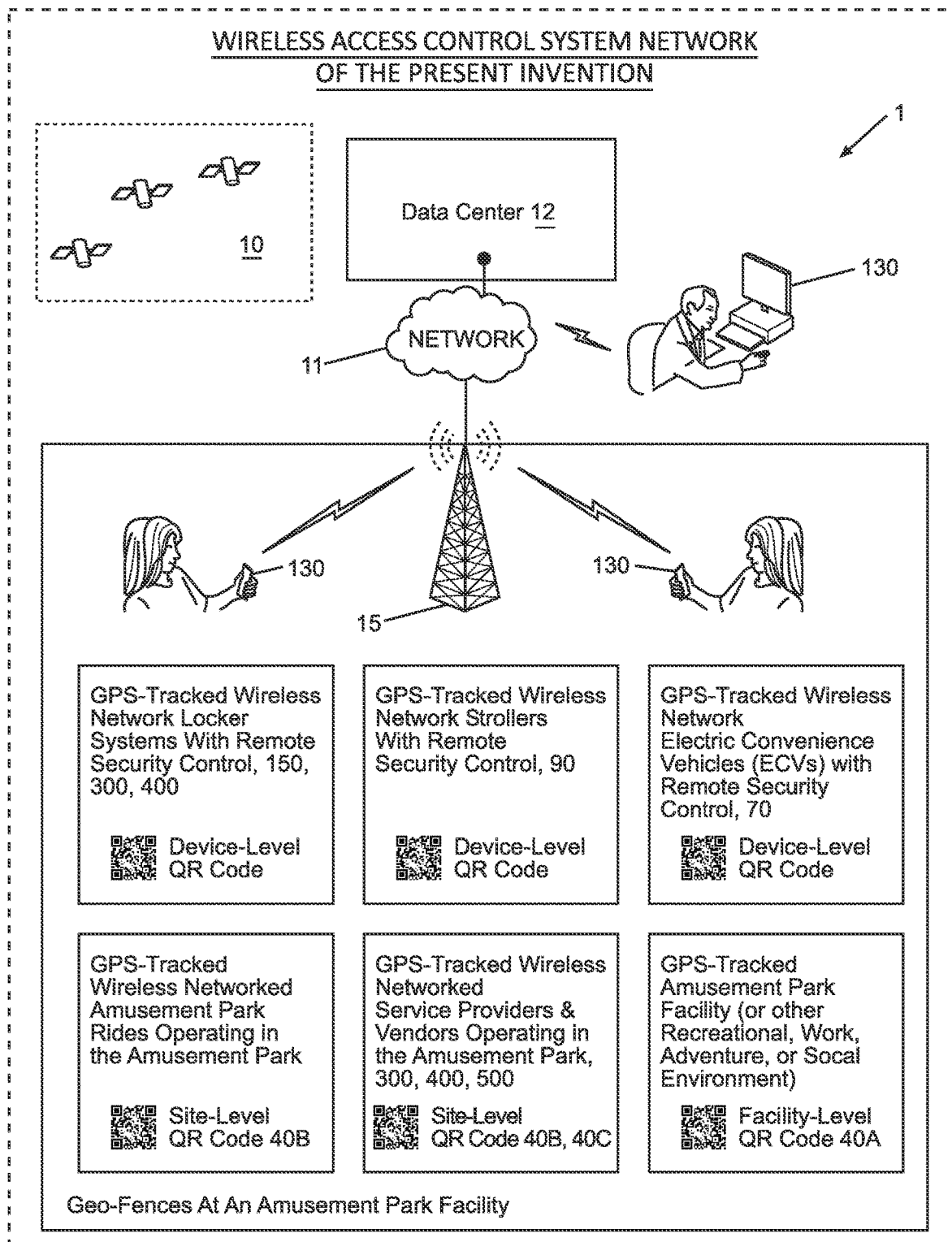
FIG. 11 is a schematic system diagram of the cloud-based GPS-tracking wireless access control system network of the present invention depicted in FIG. 10, showing, in greater detail, (i) GPS-tracked wireless networked locker systems with remote access control and bearing Device-Level QR Codes for procurement and access control by guests scanning these QR codes using mobile smartphones, (ii) GPS-tracked wireless networked strollers with remote security control and bearing Device-Level QR Codes for procurement and access control by guests scanning these QR codes using mobile smartphones, (iii) GPS-tracked wireless networked electric convenience vehicles (ECVs) with remote security control and bearing Device-Level QR Codes for procurement and access control guests by scanning these QR codes using mobile smartphones, (iv) GPS-tracked wireless networked amusement park rides (e.g. Sites) with remote security control and posting/displaying Site-Level QR Codes for access to the park's storage and mobility service transactional workflow by guests scanning these QR codes using mobile smartphones, (v) GPS-tracked wireless networked Service Providers and Vendors (e.g. Sites) with remote security control and posting/displaying Site-Level QR Codes for access to the park's service transactional workflow by guests scanning these QR codes using mobile smartphones, and (vi) GPS-tracked wireless networked Amusement Park Facility (e.g. Facility) with remote security control and posting/displaying Facility-Level QR Codes for access to the park's storage and mobility service transactional workflow by guests scanning these QR codes using mobile smartphones.

FIG. 11 shows the cloud-based GPS-tracking wireless access control system network 1 depicted in FIG. 10, showing, in greater detail: (i) GPS-tracked wireless networked locker systems 150, 300 with remote access control and bearing Device-Level QR Codes 40A for procurement and access control by guests scanning these QR codes using mobile smartphones 130; (ii) GPS-tracked wireless networked strollers with remote security control and bearing Device-Level QR Codes 40C for procurement and access control by guests scanning these QR codes using mobile smartphones 130; (iii) GPS-tracked wireless networked electric convenience vehicles (ECVs) 70 with remote security control and bearing Device-Level QR Codes 40C for procurement and access control guests by scanning these QR codes using mobile smartphones 130; (iv) GPS-tracked wireless networked amusement park rides (e.g. Sites) with remote security control and posting/displaying Site-Level QR Codes 40B for access to the park's storage and mobility service transactional workflow by guests scanning these QR codes using mobile smartphones 130; (v) GPS-tracked wireless networked Service Providers and Vendors (e.g. Sites) with remote security control and posting/displaying Site-Level QR Codes 40B for access to the park's service transactional workflow by guests scanning these QR codes using mobile smartphones 130; and (vi) GPS-tracked wireless networked Amusement Park Facility (e.g. Facility) 800 with remote security control and posting/displaying Facility-Level QR Codes 40A for access to the park's storage and mobility service transactional workflow by guests scanning these QR codes using mobile smartphones 130.

Figure 12:
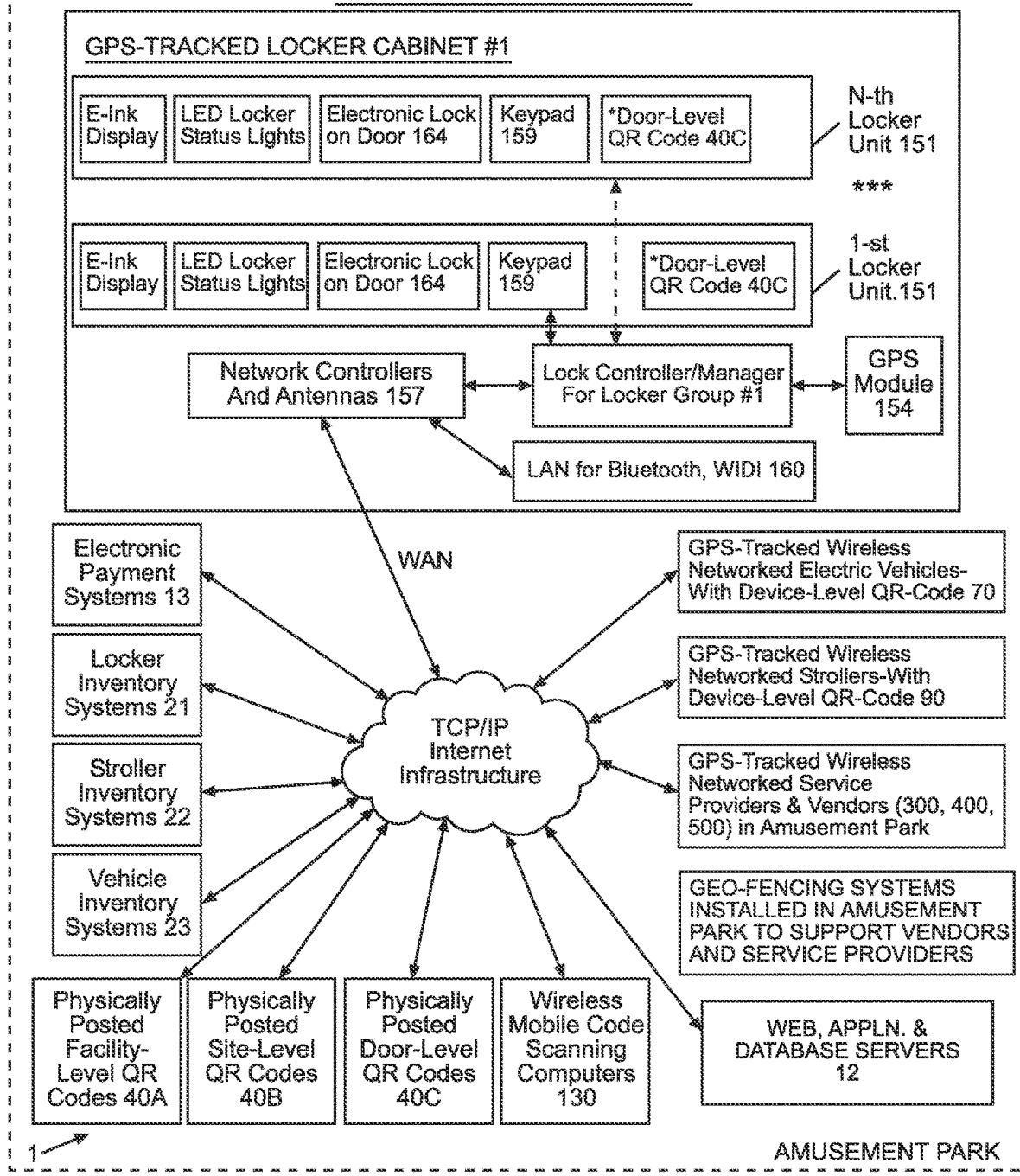
FIG. 12 is a schematic system block diagram of the cloud-based GPS-tracking wireless access control system network of the present invention, with other aspects thereof depicted in FIGS. 10 and 11, and showing the system subcomponents of its GPS-tracked wireless networked locker systems, and other system network components interfaced with its TCP/IP Internet infrastructure, namely: electronic payment systems, locker inventory systems, stroller inventory systems, electric convenience vehicle (ECV) inventory system, mobile computing systems, GPS-tracking wireless networked ECVs bearing device-level QR codes, GPS-tracked wireless networked strollers bearing device-level QR codes, GPS-tracked wireless networked venues of service providers and/or vendors operating in the park facility, bearing site-level QR codes, wireless networked geo-fencing systems installed in the amusement park to support the vendors and service providers operating in the amusement park facility using wireless networked services, and web, application and database servers associated with the data centers deployed to support the services required by the system network of the present invention.

FIG. 12 shows the cloud-based GPS-tracking wireless access control system network 1, with other aspects thereof depicted in FIGS. 10 and 11, and showing the system subcomponents of its GPS-tracked wireless networked locker systems, and other system network components interfaced with its TCP/IP Internet infrastructure 11, namely: electronic payment systems 13, locker inventory systems 21, stroller inventory systems 22, electric convenience vehicle (ECV) inventory system 23, mobile computing systems 130, GPS-tracking wireless networked ECVs 70 bearing device-level QR codes 40C, GPS-tracked wireless networked strollers 90 bearing device-level QR codes 40C, GPS-tracked wireless networked venues of service providers and/or vendors operating in the park facility, bearing site-level QR codes 40B, wireless networked geo-fencing systems installed in the amusement park to support the vendors and service providers operating in the amusement park facility using wireless networked services, and web, application and database servers 12A, 12B, 12C associated with the data centers 12 deployed to support the services required by the system network of the present invention 1.

In the system network of present invention 1, each locker, stroller, ECV and thing (i.e. "network device") deployed and managed on the system network 1 is, or should wherever possible, be assigned a static IP address so as to enable data communication between network devices and information servers deployed on the system network 1 using data communication protocols suitable for the application at hand, as described herein. It is also understood that preferably, the IP address will be set in the network controller of the networked device, as well as in the computer memory architecture of the programmed processor the networked device. However, in some embodiments, a network controller may be assigned to one or more or a group of networked devices, and IP address management and network protocol translation methods maybe be used as required or desired to achieve digital communication in a manner well known to those skilled in the computer architecture and networking communication arts.

Specification of the Network Architecture of the Wireless System Network of the Present Invention In general, FIGS. 10, 11 and 12 illustrate the network architecture of the wireless system network 1 for the case where the system network is implemented as a stand-alone platform designed to work independent from, but alongside of one or more networks deployed on the Internet. As shown, the wireless system network 1 comprises various system components, including a cellular phone and SMS messaging systems 12D, and one or more industrial-strength data centers 12, preferably mirrored with each other and running Border Gateway Protocol (BGP) between its router gateways, in a manner well known in the data center art. As shown in FIG. 10, each data center 12 comprising: a cluster of communication servers 12A for supporting http and other TCP/IP based communication protocols on the Internet; cluster of application servers 12B; a cluster of email processing servers 12D; cluster of SMS servers 12D; and a cluster of RDBMS servers 12C configured within an distributed file storage and retrieval ecosystem/system, and interfaced around the TCP/IP infrastructure 11 of the Internet well known in the art.

As shown in FIGS. 10, 11 and 12, the system network architecture also comprises: a plurality of Web-enabled mobile client machines 130 (e.g. mobile smartphones, mobile computers such as iPad, laptop computers, ad workstations, and other Internet-enabled computing devices with graphics display capabilities, etc.) running native mobile applications and mobile web browser applications supported modules supporting client-side and server-side processes on the system network of the present invention; and numerous media servers (e.g. Google, Facebook, NOAA, etc.) operably connected to the infrastructure of the Internet. The network of mobile computing systems 130 will run enterprise-level mobile application software, operably connected to the TCP/IP infrastructure of the Internet. Each mobile computing system 130 is provided with GPS-tracking and having wireless internet connectivity with the TCP/IP infrastructure of the Internet, using various communication technologies (e.g. GSM, Bluetooth, WIFI, and other wireless networking protocols well known in the wireless communications arts).

In general, regardless of the method of implementation employed, the wireless system networks of the illustrative embodiments of the present invention will be in almost all instances, realized as an industrial-strength, carrier-class Internet-based (i.e. cloud-based) network of object-oriented system design. Also, the system network will be deployed over a global data packet-switched communication network comprising numerous computing systems and networking components, as shown. As such, the information network of the present invention is often referred to herein as the "system" or "system network".

Preferably, although not necessary, the system network 1 would be designed according to object-oriented systems engineering (OOSE) methods using UML-based modeling tools such as ROSE by Rational Software, Inc. using an industry-standard Rational Unified Process (RUP) or Enterprise Unified Process (EUP), both well known in the art. Implementation programming languages can include C, Objective C, C, Java, PHP, Python, Google's GO, and other computer programming languages known in the art. The Internet-based system network can be implemented using any object-oriented integrated development environment (IDE) such as for example: the Java Platform, Enterprise Edition, or Java EE (formerly J2EE); Websphere IDE by IBM; Weblogic IDE by BEA; a non-Java IDE such as Microsoft's .NET IDE; or other suitably configured development and deployment environment well known in the art. Preferably, the system network is deployed as a three-tier server architecture with a double-firewall, and appropriate network switching and routing technologies well known in the art. In some deployments, private/public/hybrid cloud service providers, such Amazon Web Services (AWS), may be used to deploy Kubernetes, an open-source software container/cluster management/orchestration system, for automating deployment, scaling, and management of containerized software applications, such as the mobile enterprise-level application described above. Such practices are well known in the computer programming, networking and digital communication arts.

Figure 13A:
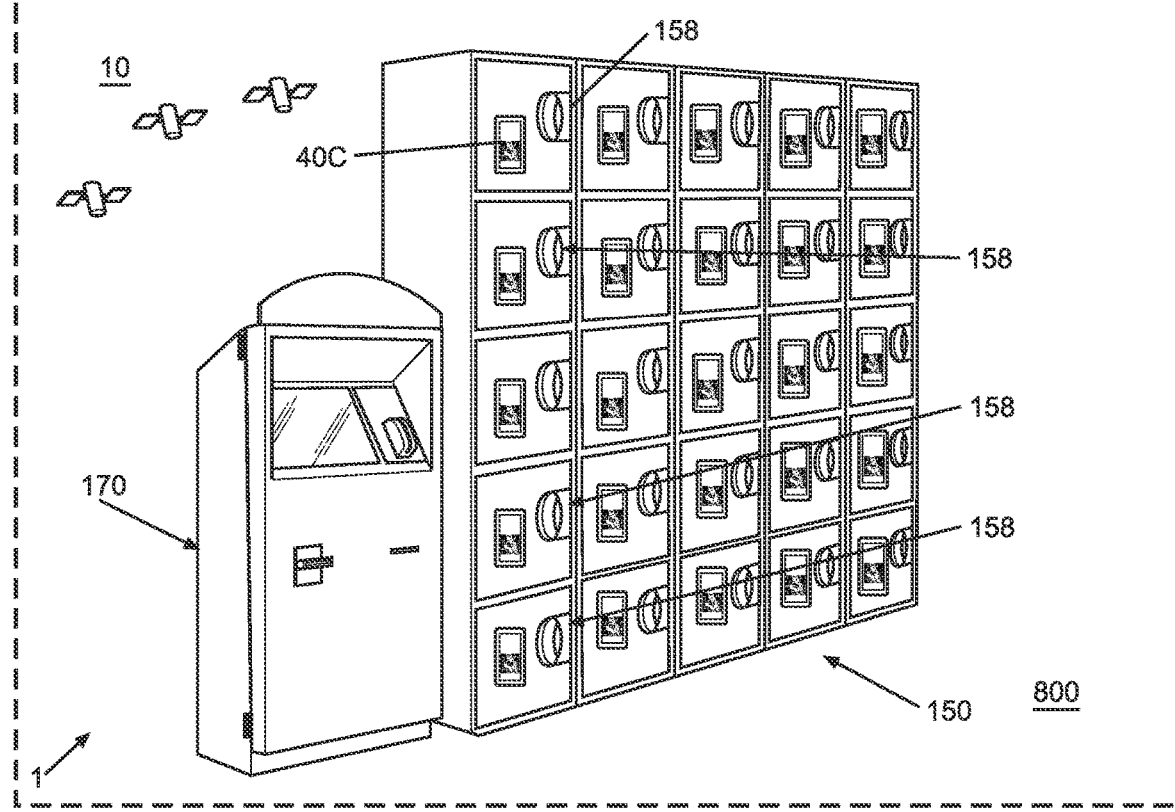
FIG. 13A is a perspective view of a GPS-tracked wireless networked mobile/stationary locker system having plurality of QR code driven access controlled locker units, each accessible by scanning the QR codes on the locker unit using a web-enabled mobile smartphone deployed in the system network, and carrying out the transaction supported on the display screen of the mobile smartphone.

Specification of GPS-Tracked Wireless Networked Mobile/ Portable Locker System with QR Code Driven Access Controlled Locker Units According to the Present Invention FIG. 13A shows a GPS-tracked wireless networked mobile/stationary locker system 150 having plurality of QR code-driven access controlled locker units 151, each accessible by scanning the QR codes on the locker unit using a web-enabled mobile smartphone 130 deployed in the system network 1, and carrying out the transaction supported on the display screen of the mobile smartphone.

Figure 13B:
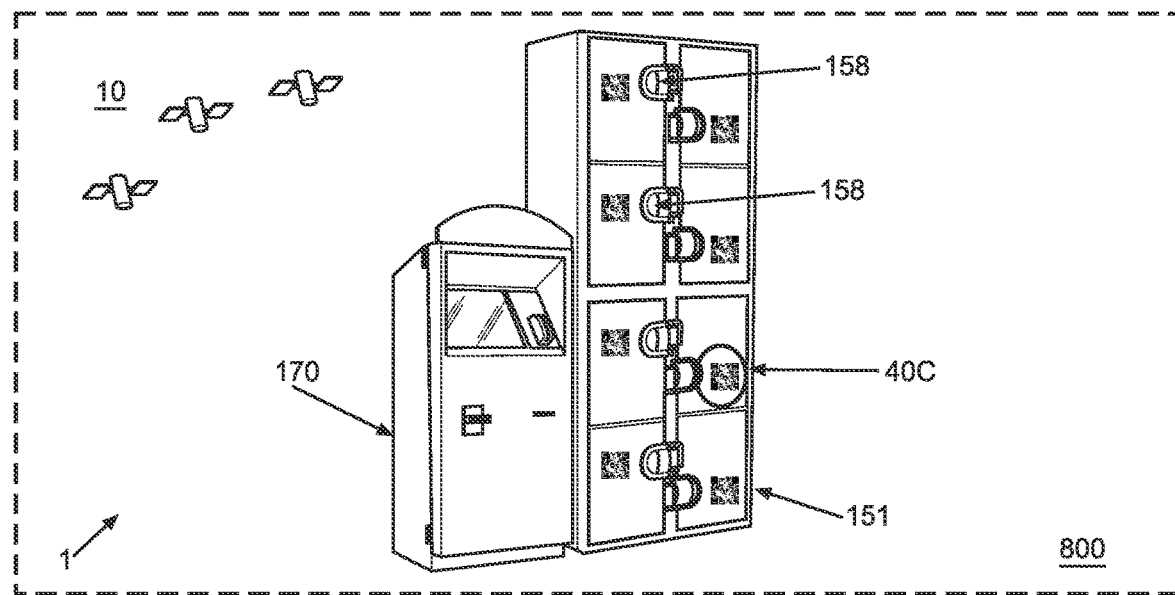
FIG. 13B a perspective view showing a column of locker cabinets from the larger GPS-tracked wireless networked locker system shown in FIG. 13A, wherein each electronically-controlled locker unit posts or displays a door-level QR code for scanning with a web-enabled mobile smartphone deployed on the wireless system network of the present invention.

FIG. 13B shows a column of locker cabinets from the larger GPS-tracked wireless networked locker system 151 shown in FIG. 13A, wherein each electronically-controlled locker unit 151 posts or displays a door-level QR code 40C for scanning with a web-enabled mobile smartphone 130 deployed on the wireless system network of the present invention.

Figure 14:
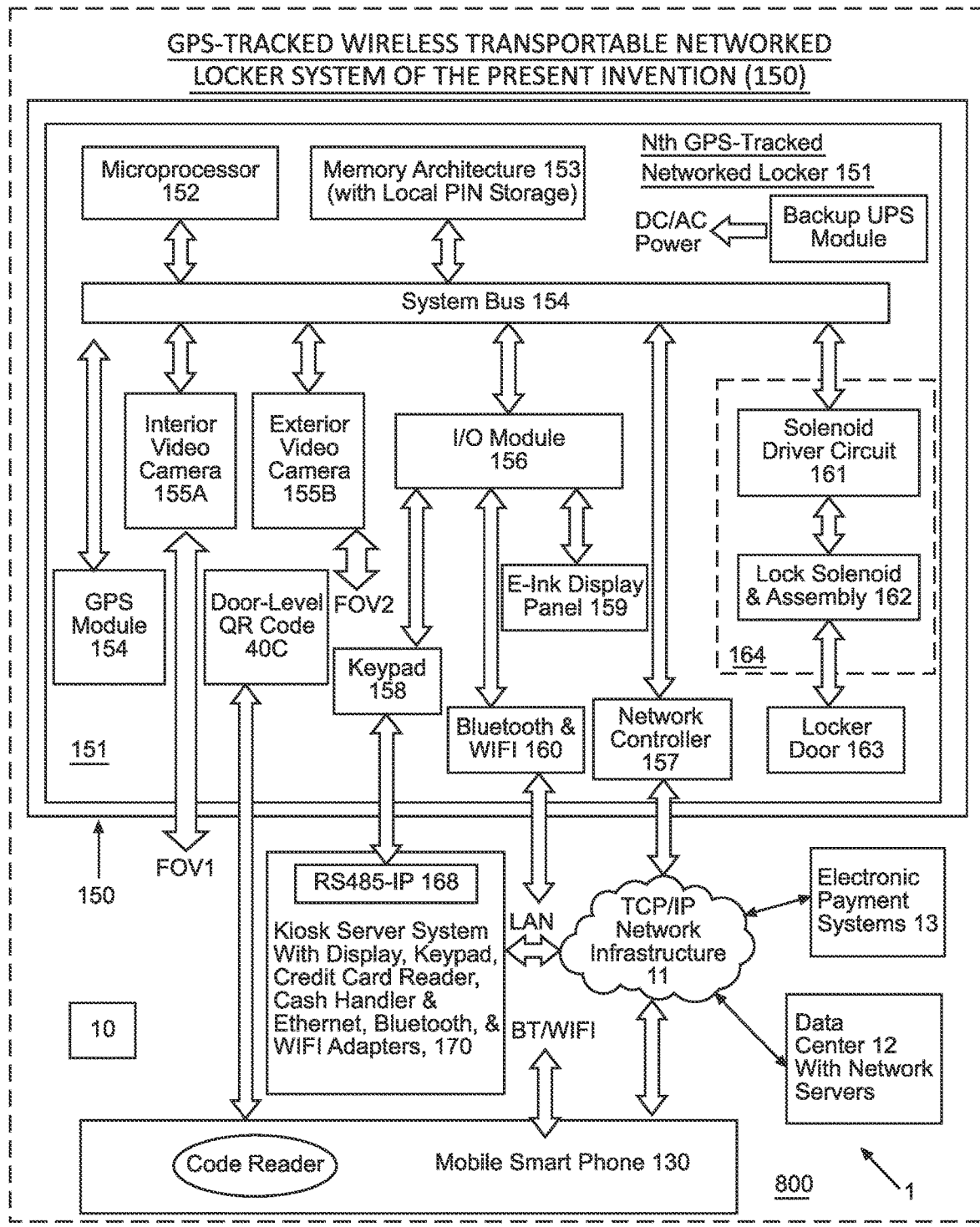
FIG. 14 is a schematic system block diagram of the GPS-tracked wireless networked transportable locker system of the present invention with QR code driven access control, and shown comprising a group of electronically-controlled locker units that are internetworked together in a transportable GPS-tracked cabinet, that can be locally managed by a networked kiosk server system, and/or remotely managed by network servers maintained in a cloud-based data center shown in FIGS. 10, 11 and 12, under any of seven exemplary case scenarios modeled and described in FIGS. 14B, 14C, 14D, 14E, 14F, 14G and 14H.

FIG. 14 shows the GPS-tracked wireless networked transportable locker system of the present invention 150 with QR code driven access control. As shown, networked locker system 150 comprises: a group of electronically-controlled locker units 151 that are internetworked together in a transportable GPS-tracked cabinet, that can be (i) locally managed by a networked kiosk server system 170 shown in FIGS. 13, 13A, 14 and 14A, and/or remotely managed by network servers maintained in a cloud-based data center 12 shown in FIGS. 10, 11 and 12, under any of seven exemplary case scenarios modeled and described in FIGS. 14B, 14C, 14D, 14E, 14F, 14G and 14H, as described below.

As shown in FIG. 14, each wireless networked locker system 151 comprises the following components integrated about a system bus, namely: a programmed microprocessor 152 interfaced to the system bus 154 and supported by a memory architecture (e.g. RAM, ROM, and SSD persistent storage) 153 for use in supporting the access and control programs carried out by the locker controller, and storing the guest user's digital password (e.g. PIN) entered into the system using a mobile smartphone 130 during the mobile transactions supported by the system network and described and illustrated in great detail herein; a local battery-powered un-interrupted power supply (UPS Module) with power converters and control circuitry for automatically supplying electrical power all local electrical components within the locker unit 151 (and/or locker cabinet 150); a network controller 157 for interfacing with the TCP/IP infrastructure 11; a solenoid driver circuit 161 connected to a lock solenoid and bolt assembly 162 and locker door 163; a keypad 158 for entering digital locker password to microprocessor; an E-ink display panel 159 and controller interfaced with system bus; a Bluetooth/WIFI 160 interfaced with the system bus 154 via an I/O module interface 156; an interior digital video camera 155A with an interior field of view (FOV1) interfaced with the system bus 154 that can function as an automated object sensor to determine if a guest left belongings inside the locker interior space; an exterior digital camera 155B interfaced with the system bus 154 and can support automated facial recognition of the user to support user authentication and locker entry as part of the locker access process; a GPS module 154 interfaced with the system bus; and a door-level QR code displayed in the outer door surface or electronically displayed on the E-ink panel 159.

Figure 14A:
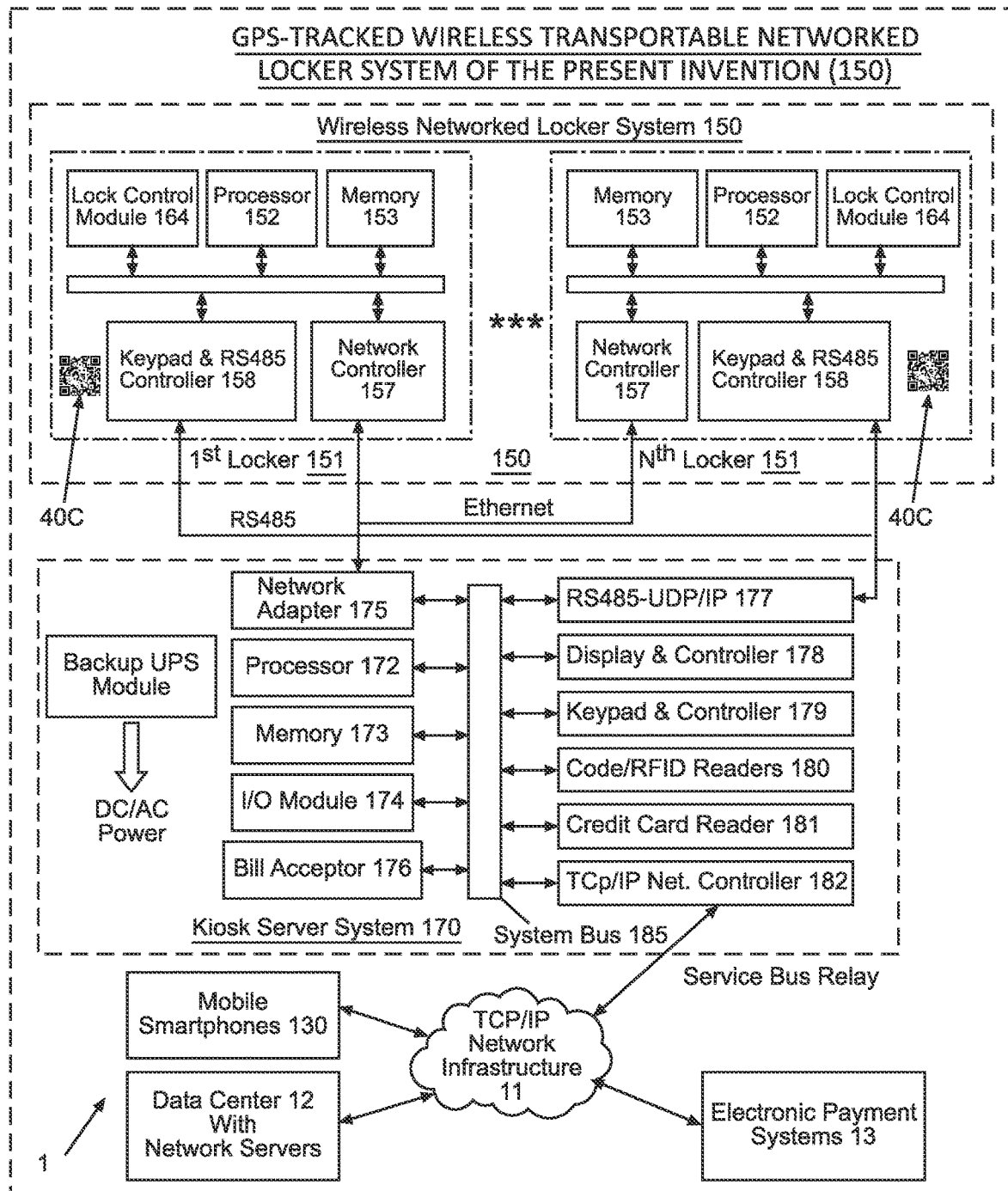
FIG. 14A is a schematic diagram of the GPS-tracked wireless networked transportable locker system shown in FIG. 14, with the internal system architecture of the kiosk server system shown in greater detail along with aspects of the system architecture of the locker units in the networked locker system, so as to show that the networked locker units are networked together and managed/manageable by the kiosk server system using Ethernet or other communication networking protocols, while the manual keypads and PIN storage memory on each locker unit are in communication with kiosk server system using a serial-to-UDP/IP communication network.

As shown in FIG. 14A, the locker units 151 in the networked locker system 150 are networked together and managed/manageable by the kiosk server system 170 using Ethernet or other communication networking protocols (157, 175), while the manual keypads 158 and PIN storage memory 153 on each locker unit 151 are in communication with kiosk server system 170 using a serial-to-UDP/IP communication network (158, 177) as shown. As shown, the kiosk server system 170 comprises a number of computing components interfaced around a system bus, namely: a network adapter (e.g. ethernet) 175; microprocessor 172; a memory architecture 172 (e.g. Cache, RAM, PROM, SSD, and other persistence memory); I/O module 174; bill acceptor 176; RS485/UDP/IP converter/adapter 177; visual touch-screen display panel and display controller 178; manual keypad and controller 179; bar code reader and RFID readers and controllers 180; credit/debit card (e.g. magstripe and RFID chip) reader 181; TCP/IP network controller 182; backup Uninterrupted Power Supply (UPS) module to generate local DC/AC power as needed during power interruptions on site or across a facility.

As shown in FIG. 14A, the networked locker system 150 and local kiosk server system 170, used to manage the same in particular embodiments and modes of system operation described herein, are connected to the Internet/Cloud infrastructure 11, along with the millions of guest user mobile smartphones 130, electronic payment systems 13, network servers within the data centers 12 supporting the system network, and other third-party network servers discussed herein and deployed across and around the Planet Earth. As shown, the kiosk server system 170 uses a conventional Service Bus Relay (SBR) available from Microsoft Azure Platform Services and other service providers to enable the locker units 151 in locker system 150 to access and use the Internet communication infrastructure in a simple and convenient manner well known in the network communication arts.

Figure 14B:
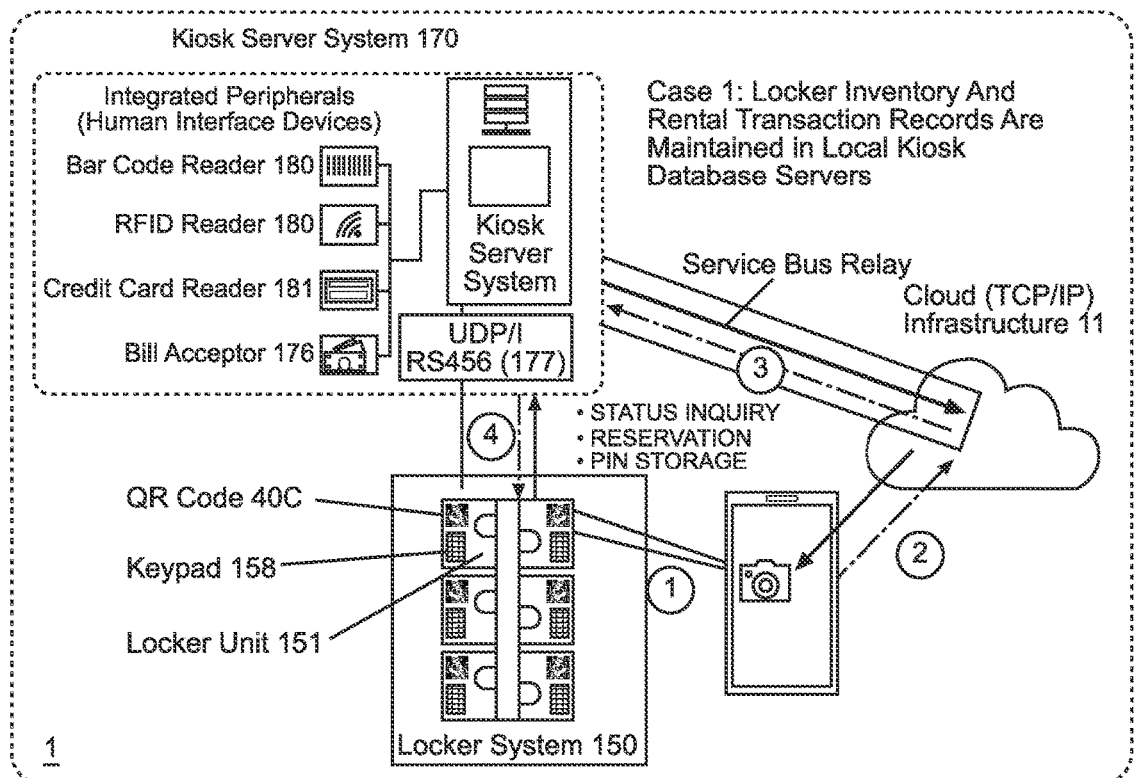
FIG. 14B shows the wireless system network of the present invention with mobile phones and other network components configured and operating according to Case 1, where a local kiosk server system is used to manage groups of locker units at a specific site location in a facility and locker inventory and rental transaction records are maintained in databases in the local kiosk server system.

FIG. 14B shows the wireless system network of the present invention with mobile phones and other network components configured and operating according to Case 1, where a local kiosk server system 170 is used to manage groups of locker units 150 (151) at a specific site location in a facility and locker inventory and rental transaction records are maintained in databases in the local kiosk server system 170.

As shown in FIG. 14B, Step 1 of the control access process support in this case scenario involves using (i) a mobile phone 130 to scan (i.e. read) a Door-Level QR Code 40C on a locker unit 151, and (ii) the data path indicated by 2-3-4 to check the status of the scanned locker unit 151. If rental status is "available", then the web services supported in the kiosk server system 170 sends http messages back to the web-enabled mobile phone 130 via data path 3-2 to support the locker rental, access and control methods described herein using the door-level QR code driven process described herein. Once the rental transaction has been completed, and payment or token-exchange made per the rental agreement, the kiosk server system 170 (i) stores the user's digital PIN code into the memory store of the rented/scanned locker unit 151, and automatically (ii) updates the locker inventory records and locker transaction records within database servers maintained on the local kiosk server system 170, and backed up elsewhere in the enterprise in accordance with best practices in data backup and information security.

Figure 14C:
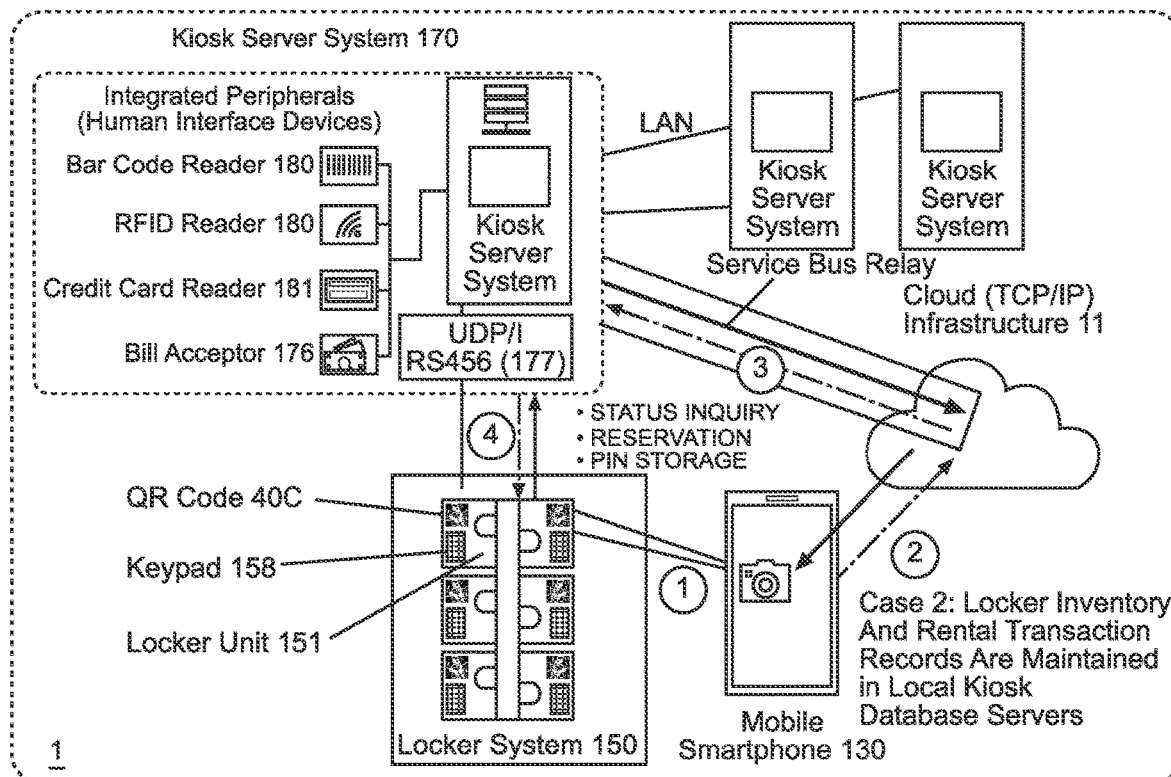
FIG. 14C shows the wireless system network of the present invention with mobile phones and other network components configured and operating according to Case 2, where local kiosk server systems are networked together and used to manage groups of locker units at specific site locations in specific facilities, and locker inventory and rental transaction records are maintained in databases synchronized in local kiosk server systems and cloud-based network servers.

FIG. 14C shows the wireless system network of the present invention with mobile phones 130 and other network components configured and operating according to Case 2, where local kiosk server systems 170 are networked together and used to manage groups of locker units 150 (151) at specific site locations in specific facilities, and locker inventory and rental transaction records are maintained in databases synchronized in local kiosk server systems 170 and cloud-based network servers 12.

As shown in FIG. 14C, Step 1 of the control access process support in this case scenario involves using (i) a mobile phone 130 to scan (i.e. read) a Door-Level QR Code 40C on a locker unit 151, and (ii) the data path indicated by 2-3-4 to check the status of the scanned locker unit 151. The primary different between Case 2 and Case 1, is that in Case 2, a large number of kiosk server systems 170 deployed across Sites indexed with Site-Level QR Codes 40B in a given Facility indexed with Facility-Level QR Codes 40A, are networked together to form an enterprise level information using the ethernet or other suitable networking protocol, and across this network configuration, information records can be shared, and network directories maintained to facilitate the locker and device rental, access and control services supported by the system network of the present invention 1 described herein. So, in Case 2, if rental status is "unavailable", then the web services supported in the kiosk server system 170 sends http messages back to the web-enabled mobile phone 130 via data path 3-2 to inform the guest user at what Site in the Facility he or she can rent a locker, mobility device or other thing, using the rental, access and control methods described herein using Facility-Level QR Codes 40A, Site-Level QR codes 40B and/or Door-level QR Code 40C described herein. Once the rental transaction has been completed at a particular locker at a specific Site in the Facility, and payment or token-exchange made per the rental agreement, the kiosk server system 170 (i) stores the user's digital PIN code into the memory store of the rented/scanned locker unit 151, and automatically (ii) updates the locker inventory records and locker transaction records within database servers maintained on the local kiosk server system 170, and backed up elsewhere in the enterprise in accordance with best practices in data backup and information security.

Figure 14D:
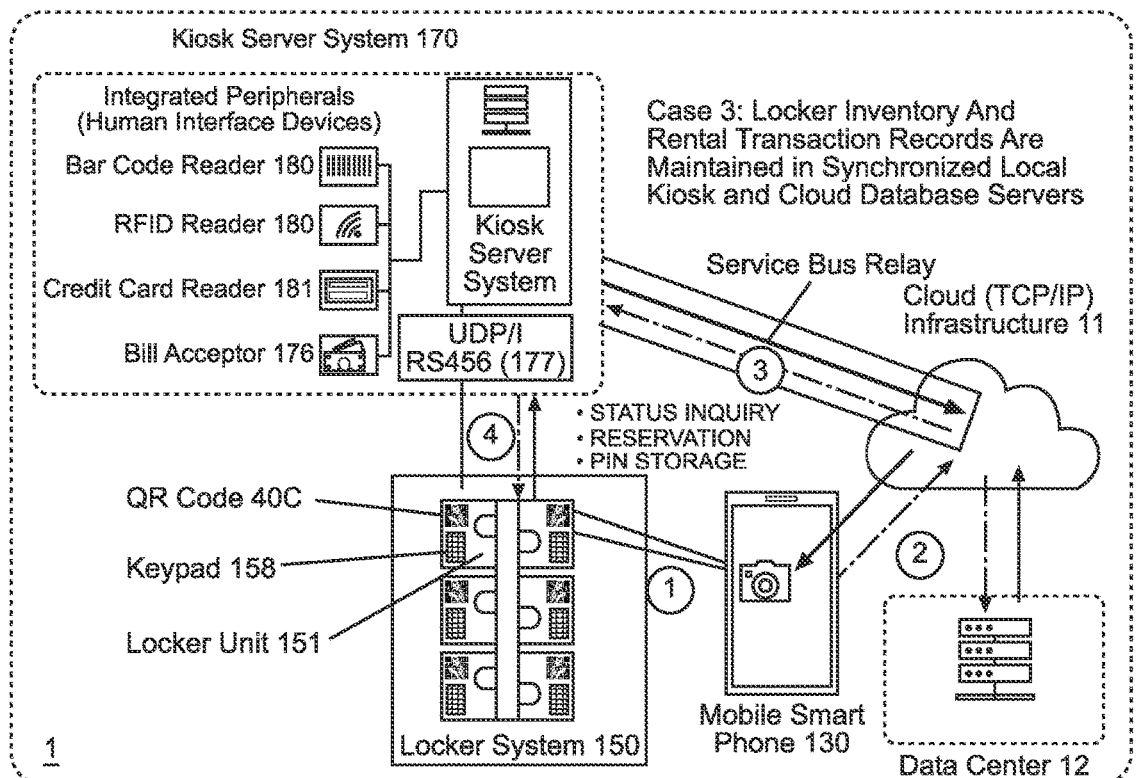
FIG. 14D shows the wireless system network of the present invention with mobile phones and other network components configured and operating according to Case 3, where a local kiosk server system is used to manage a groups of locker units at a specific site location in a specific facility, and locker inventory and rental transaction records are maintained in databases in local kiosk server systems and cloud-based network servers that are automatically data synchronized.

FIG. 14D shows the wireless system network of the present invention with mobile phones and other network components configured and operating according to Case 3, where a local kiosk server system 170 is used to manage a groups of locker units 150 at a specific site location in a specific facility, and locker inventory and rental transaction records are maintained in databases in local kiosk server systems 170 and cloud-based network servers 12 that are automatically data synchronized.

As shown in FIG. 14D, Step 1 of the control access process support in this case scenario involves using (i) a mobile phone 130 to scan (i.e. read) a Door-Level QR Code 40C on a locker unit 151, and (ii) the data path indicated by 2-3-4 to check the status of the scanned locker unit 151. The primary different between Case 3 and Cases 1 and 2, is that in Case 3, is the rental inventory and transaction records are also maintained within the network database servers 12 supported in the cloud-based data center 12, with data synchronization procedures and processes running between the locker inventory and transaction record databases maintained in the local kiosk server systems 170 and cloud-based network servers at the data center 12. So, in Case 3, if rental status is "available", then the local kiosk server 170 carries out the process illustrated in Case 1. However, if the rental status is "unavailable", then the web services supported in the kiosk server system 170 sends http messages back to the web-enabled mobile phone 130 via data path 3-2 (or alternatively, cloud-based servers in the data center 12 sends http messages back to the web-enabled mobile phone 130 via data path 2) so as to inform the guest user at what Site in the Facility he or she can rent a locker, mobility device or other thing, using the rental, access and control methods described herein using Facility-Level QR Codes 40A, Site-Level QR codes 40B and/or Door-level QR Code 40C described herein. Once the rental transaction has been completed at a particular locker at a specific Site, and payment or token-exchange made per the rental agreement, the kiosk server system 170 (i) stores the user's digital PIN code into the memory store of the rented/scanned locker unit 151, and automatically (ii) updates the locker inventory records and locker transaction records within database servers maintained on the local kiosk server system 170 and cloud-based network servers 12, and data synchronized in a manner well known in the data synchronization arts.

Figure 14E:
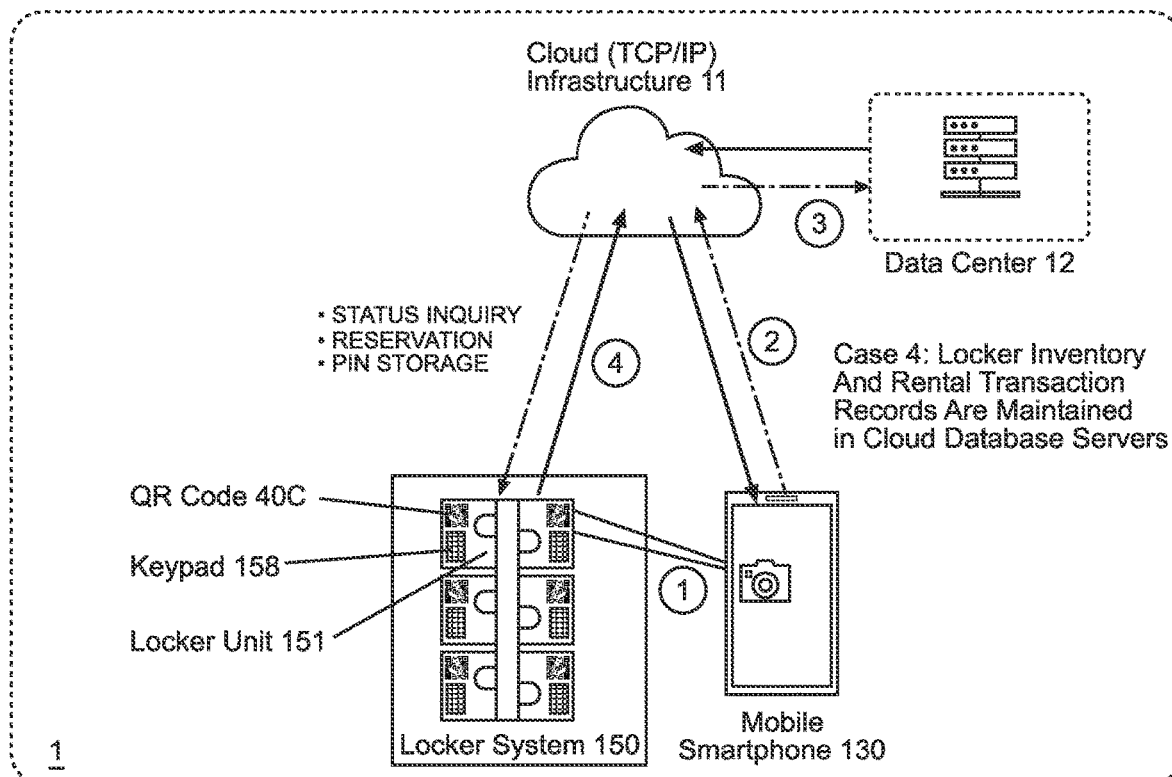
FIG. 14E shows the wireless system network of the present invention with mobile phones and other network components configured and operating according to Case 4, where a local kiosk server system is not employed to manage groups of local locker units at a site location in a specific facility, and all locker inventory and rental transaction records are maintained in databases in cloud-based network servers.

FIG. 14E shows the wireless system network of the present invention with mobile phones and other network components configured and operating according to Case 4, where a local kiosk server system 170 is not employed to manage groups of local locker units 150 at a site location in a specific facility, and all locker inventory and rental transaction records are maintained in databases in cloud-based network servers.

As shown in FIG. 14E, Step 1 of the control access process support in this case scenario involves using (i) a mobile phone 130 to scan (i.e. read) a Door-Level QR Code 40C on a cloud-based networked locker unit 151 (with locker system 150 directly connected to the cloud infrastructure 11 without the use of any local kiosk server system 170 to rent, access and control a scanned locker unit 151, and (ii) the data path indicated by 2-3-4 through the cloud infrastructure to check the status of the scanned locker unit 151. If rental status is "available", then the web services supported in the network servers in the data center 12 sends http messages back to the web-enabled mobile phone 130 via data path 3-2 to support the locker rental, access and control methods described herein using the door-level QR code driven process described herein. Once the rental transaction has been completed, and payment or token-exchange made per the rental agreement, the network server 12 (i) stores the user's digital PIN code into the memory store of the rented/scanned locker unit 151, and automatically (ii) updates the locker inventory records and locker transaction records within database servers maintained on the cloud-based data center 12, and backed up elsewhere in the enterprise in accordance with best practices in data backup and information security.

Figure 14F:
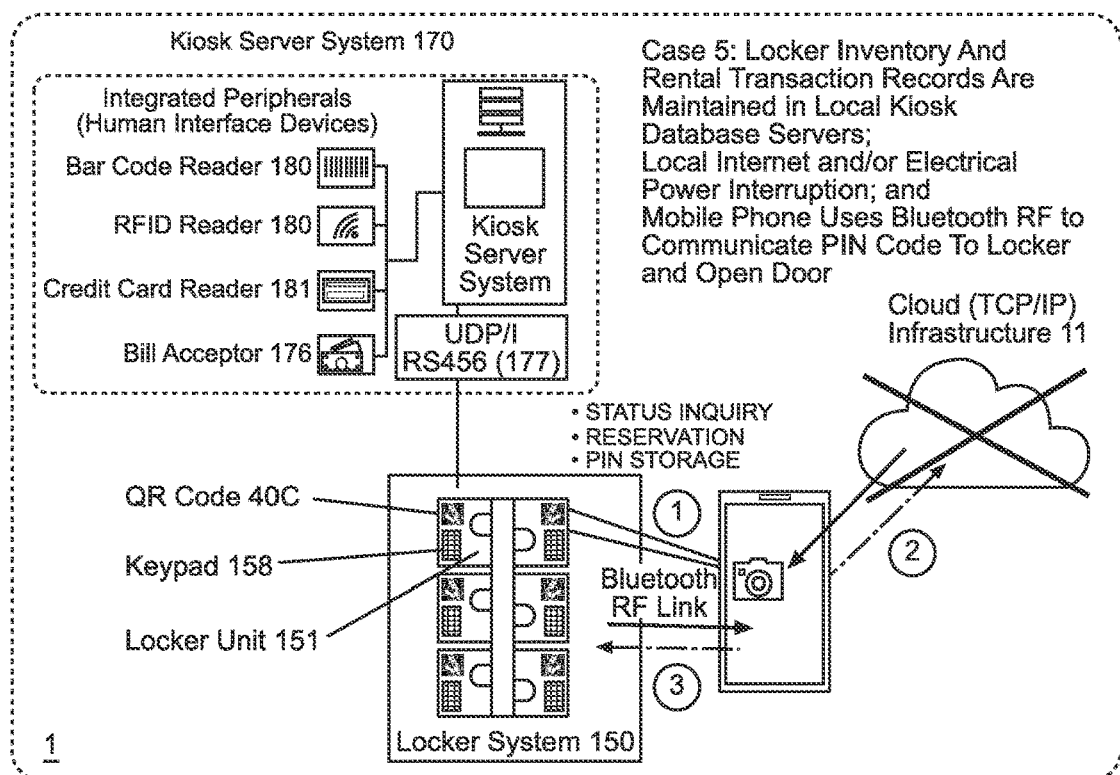
FIG. 14F shows the wireless system network of the present invention with mobile phones and other network components configured and operating according to Case 5, where locker inventory and rental transaction records are maintained in local kiosk database servers, local internet and/or electrical power is interrupted at a site and the guest's mobile phone uses Bluetooth RF communication with a specific locker unit to communicate the PIN code to locker and open the door of a rented locker and retrieve personal belongings.

FIG. 14F shows the wireless system network of the present invention with mobile phones and other network components configured and operating according to Case 5, where locker inventory and rental transaction records are maintained in local kiosk database servers 170, local internet and/or electrical power is interrupted at a site and the guest's mobile phone 130 uses Bluetooth RF communication with a specific locker unit 151 to communicate the PIN code to locker and open the door of a rented locker and retrieve personal belongings.

As shown in FIG. 14F, Step 1 of the control access process support in this case scenario involves using a mobile phone 130 to scan (i.e. read) a Door-Level QR Code 40C on a locker unit 151, and seek to establish an Internet/cloud connection with the local kiosk server system 170 as described hereinabove. However, due to an Internet and/or power interruption, the mobile phone 130 does not receive a proper http message back from the local kiosk server system 170, which is indicated by the X applied over the cloud icon in FIG. 14F. In response, the guest's mobile phone 130 uses Bluetooth RF communication with a specific locker unit 151 to communicate the PIN code to locker and open the door of the rented locker and retrieve personal belongings.

Figure 14G:
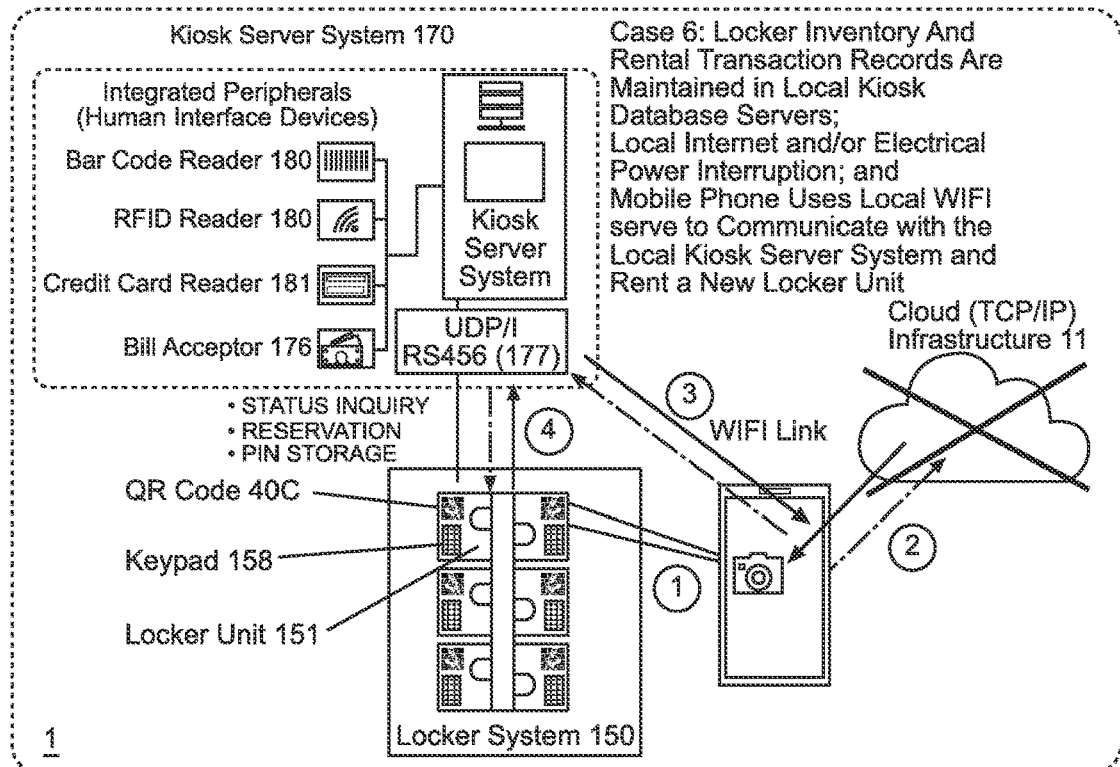
FIG. 14G shows the wireless system network of the present invention with mobile phones and other network components configured and operating according to Case 6, where locker inventory and rental transaction records are maintained in local kiosk database servers, local internet and/or electrical power is interrupted at a site and the guest's mobile phone uses local WIFI supported at the local kiosk server system to establish a WIFI communication link between the mobile smartphone and the local kiosk server system to rent a new locker unit and store the user's PIN code in the locker unit, then open the door of a rented locker and store personal belongings.

FIG. 14G shows the wireless system network of the present invention with mobile phones and other network components configured and operating according to Case 6, where locker inventory and rental transaction records are maintained in local kiosk database servers 170, local internet and/or electrical power is interrupted at a site and the guest's mobile phone 130 uses local WIFI supported at the local kiosk server system 170 to establish a WIFI communication link between the mobile smartphone 130 and the local kiosk server system 170 to rent a new locker unit 151 and store the user's PIN code in the locker unit 151, then opens the door of the rented locker to store personal belongings.

As shown in FIG. 14G, Step 1 of the control access process support in this case scenario involves using a mobile phone 130 to scan (i.e. read) a Door-Level QR Code 40C on a locker unit 151, and seek to establish an Internet/cloud connection with the local kiosk server system 170 as described hereinabove. However, due to an Internet and/or power interruption, the mobile phone 130 does not receive a proper http message back from the local kiosk server system 170 through the cloud infrastructure, which is indicated by the X applied over the cloud icon in FIG. 14G. In response, the guest's mobile phone 130 uses local WIFI supported at the local kiosk server system 170 to establish a WIFI communication link between the mobile smartphone 130 and the local kiosk server system 170 to rent a new locker unit 151 and store the user's PIN code in the locker unit 151, then opens the door of the rented locker to store personal belongings.

Figure 14H:
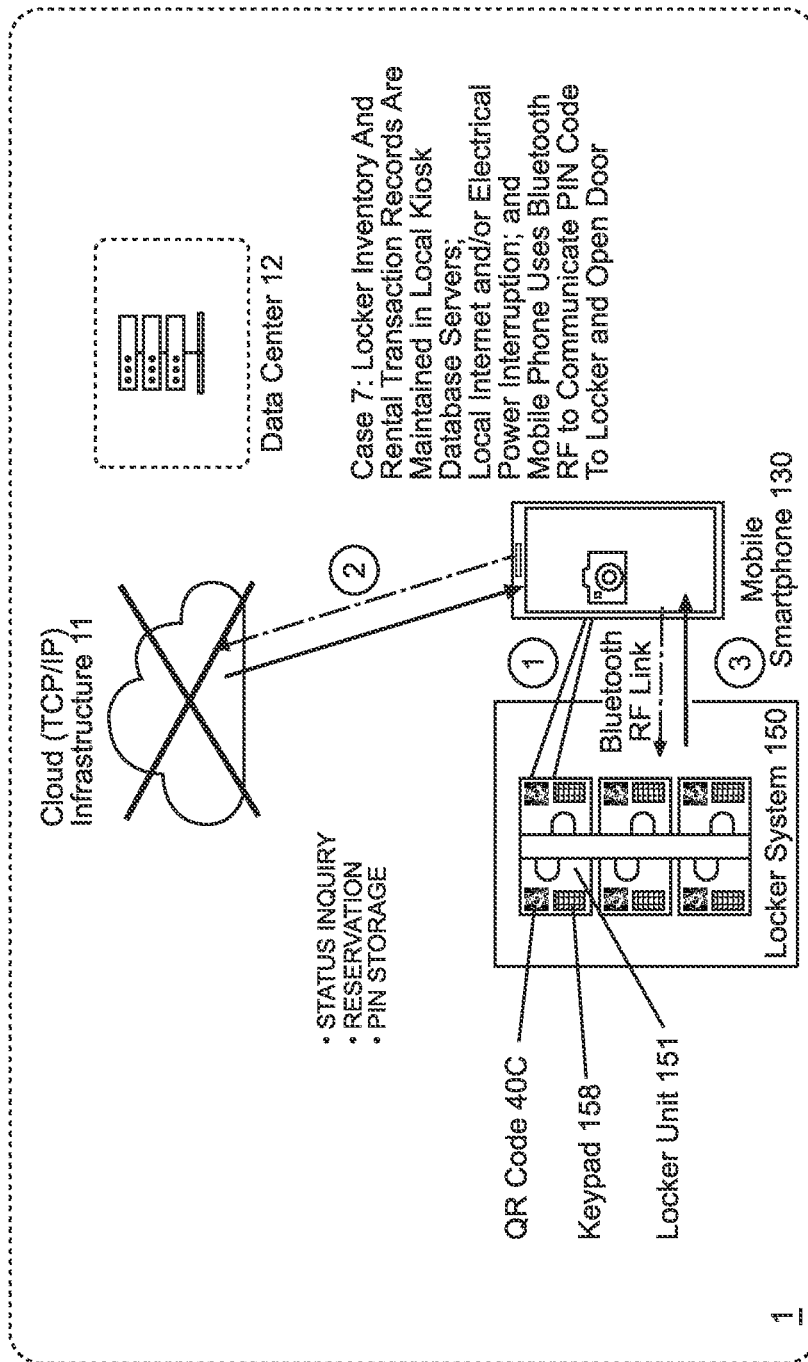
FIG. 14H shows the wireless system network of the present invention with mobile phones and other network components configured and operating according to Case 7, where locker inventory and rental transaction records are maintained in cloud database servers, local internet and/or electrical power is interrupted at a site, and a guest's mobile phone uses Bluetooth RF to communicate with the rented networked locker unit and enter the digital PIN code to open the locker door and retrieve personal belongings.

FIG. 14H shows the wireless system network of the present invention with mobile phones and other network components configured and operating according to Case 7, where locker inventory and rental transaction records are maintained in cloud database servers 12, local internet and/or electrical power is interrupted at a site, and a guest's mobile phone uses Bluetooth RF to communicate with the rented networked locker unit and enter the PIN code to open the locker door and retrieve personal belongings.

As shown in FIG. 14H, Step 1 of the control access process support in this case scenario involves using a mobile phone 130 to (i) scan (i.e. read) a Door-Level QR Code 40C on a locker unit 151 in a networked locker system 15 directly connected to the Internet without the use of any local kiosk server system 170, and (ii) seek to establish an Internet/cloud connection with the networked kiosk unit 151, as described hereinabove. However, due to an Internet and/or power interruption, the mobile phone 130 does not receive a proper http message back from the cloud-based network servers 12 through the cloud infrastructure during the transaction session, which is indicated by the X applied over the cloud icon in FIG. 14G. In response, the guest's mobile phone uses Bluetooth RF to communicate with the rented networked locker unit 151 and enter the PIN code to open the locker door and retrieve personal belongings.

These case scenarios are merely exemplary to illustrate the possibilities and potential configurations supported by the wireless control access system network of the present invention. Other scenarios are possible and can be supported by the system network of the present invention.

Figure 15:
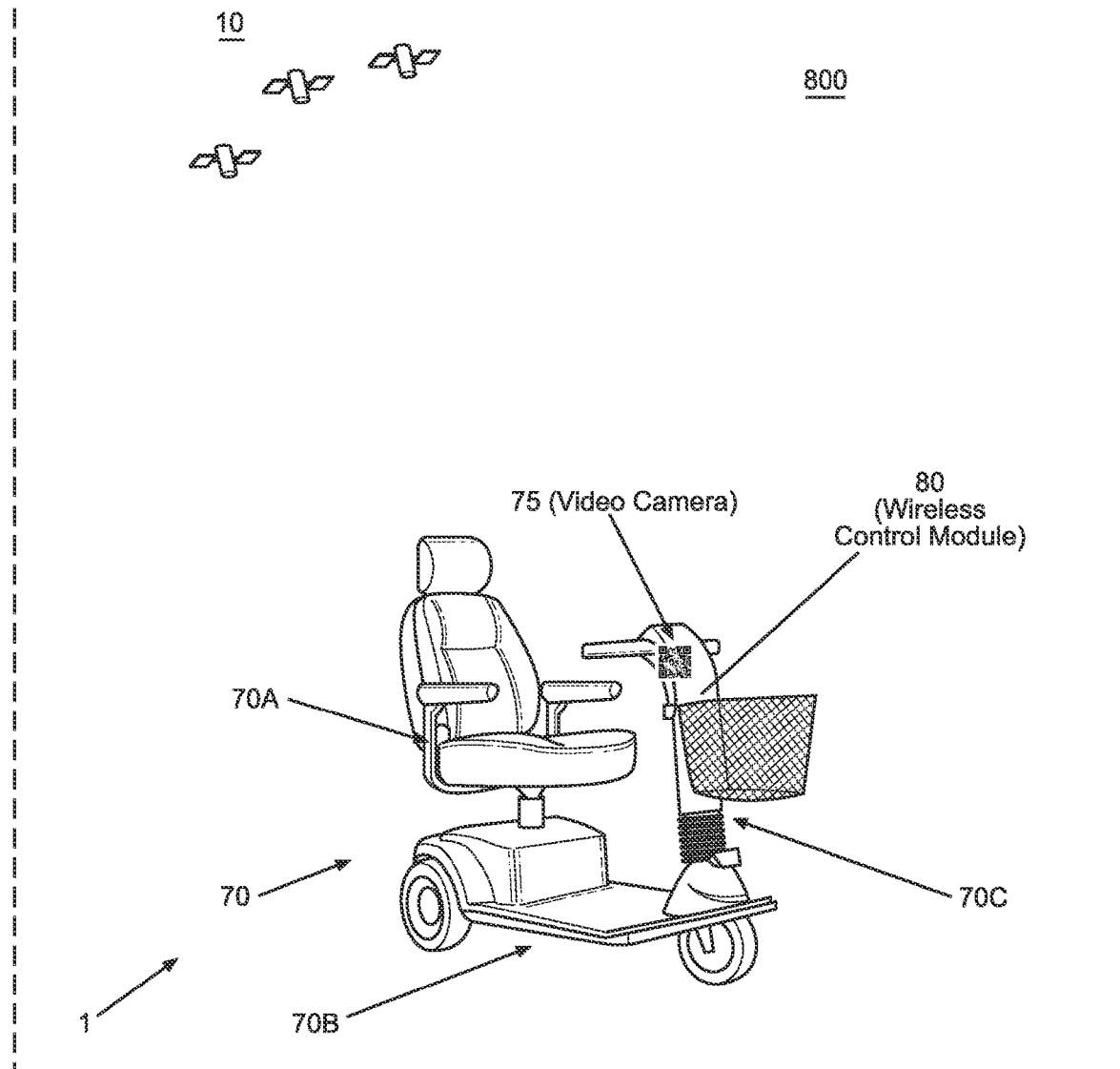
FIG. 15 is a perspective view of a GPS-tracked wireless networked electric convenience vehicle (ECVs) with Q code driven access control using the GPS-tracking wireless system network of the present invention.
Figure 16:
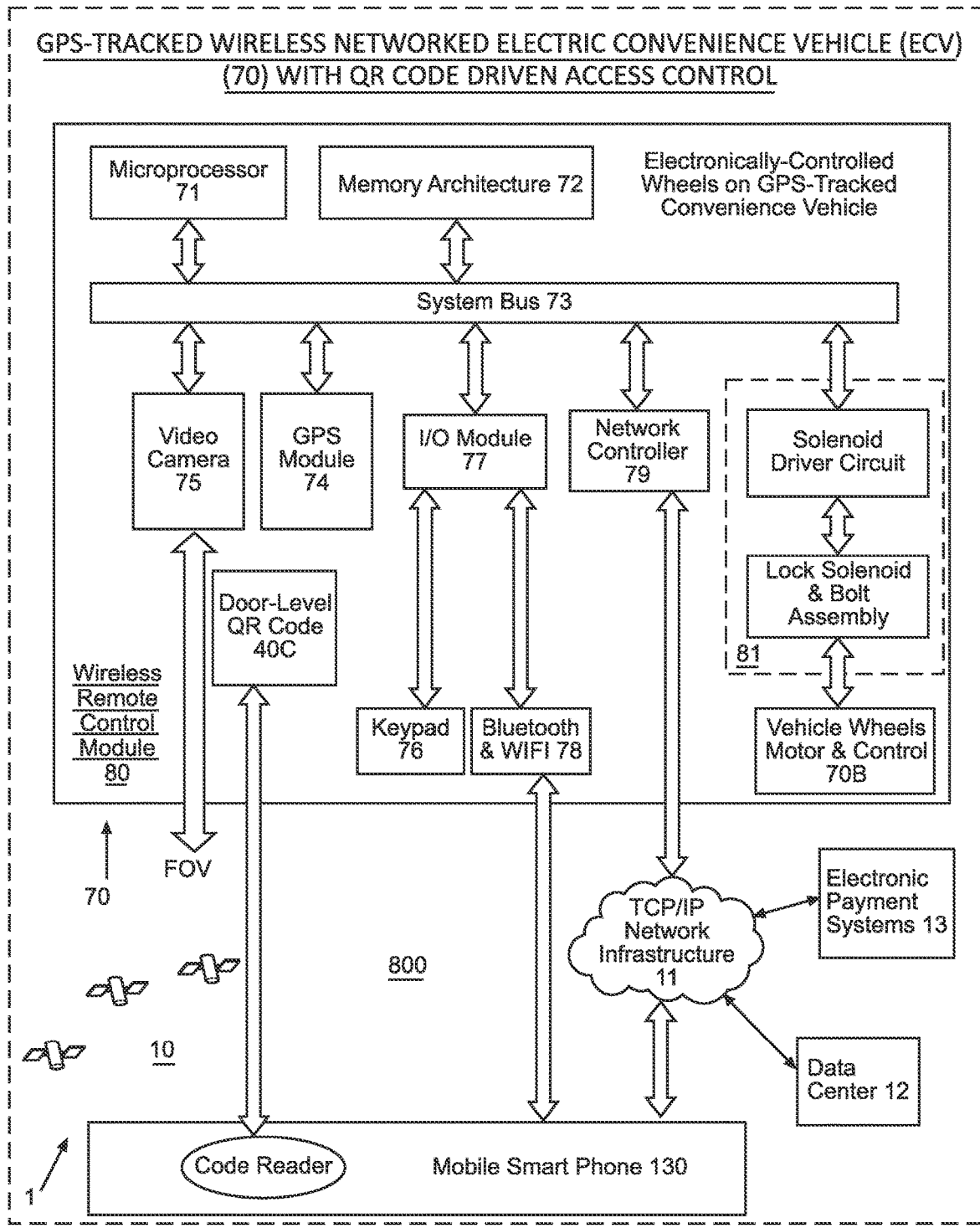
FIG. 16 is a GPS-tracked wireless networked electric convenience vehicle (ECV) of the present invention with QR code driven access control using the GPS-tracking wireless system network of the present invention.

Specification of a GPS-Tracked Wireless Networked Electric Convenience Vehicles (ECV) with QR-Code Driven Access Control According to the Present Invention FIGS. 15 and 16 show a GPS-tracked wireless networked electric convenience vehicle (ECVs) 70 with QR code driven access control using the GPS-tracking wireless system network of the present invention 1.

As shown in FIG. 16, the GPS-tracked wireless networked ECV comprises: an ECV 70 with a body portion 70A adapted for supporting the body of an adult often having a handicap or compromised physical abilities; a transport system with wheels 70B for supporting the body portion 70A; and electronic control module system 70C supporting wireless remote control module 80, and being integrated with the ECV and its control and drive electronics.

As shown in FIG. 16, the wireless remote control module system 80 comprises: a microprocessor 71 and memory architecture 72 interfaced with a system bus; 73 a GPS module (e.g. UBlock® GPS/GNSS Module) 74; a video camera with field of view (FOV) 75 integrated to the system bus 73; an I/O module 77 supporting a keypad and electronic-ink and LCD display panel 76, and a Bluetooth and WIFI network adapter 78 and various antennas to support RF and GPS communications with various systems on the wireless system network 1; a network adapter/controller 79 for providing TCP/IP network access to the wireless system network 1, and all services supported on the Internet; and an electronically controlled wheel axel control module (ECWCM) 81 interfaced with the system bus 73, for controlling access to the vehicle wheels and/or propulsion/drive system 70B of the ECV 70.

Specification of a GPS-Tracked Networked Stroller Vehicle Having QR Code Driven Access Controlled Wheels According to the Principles of the Present Invention FIG. 17 shows the GPS-tracked wireless networked stroller 90 provided with a QR code driven access control using the GPS-tracking wireless system network 1. FIG.

Figure 17A:
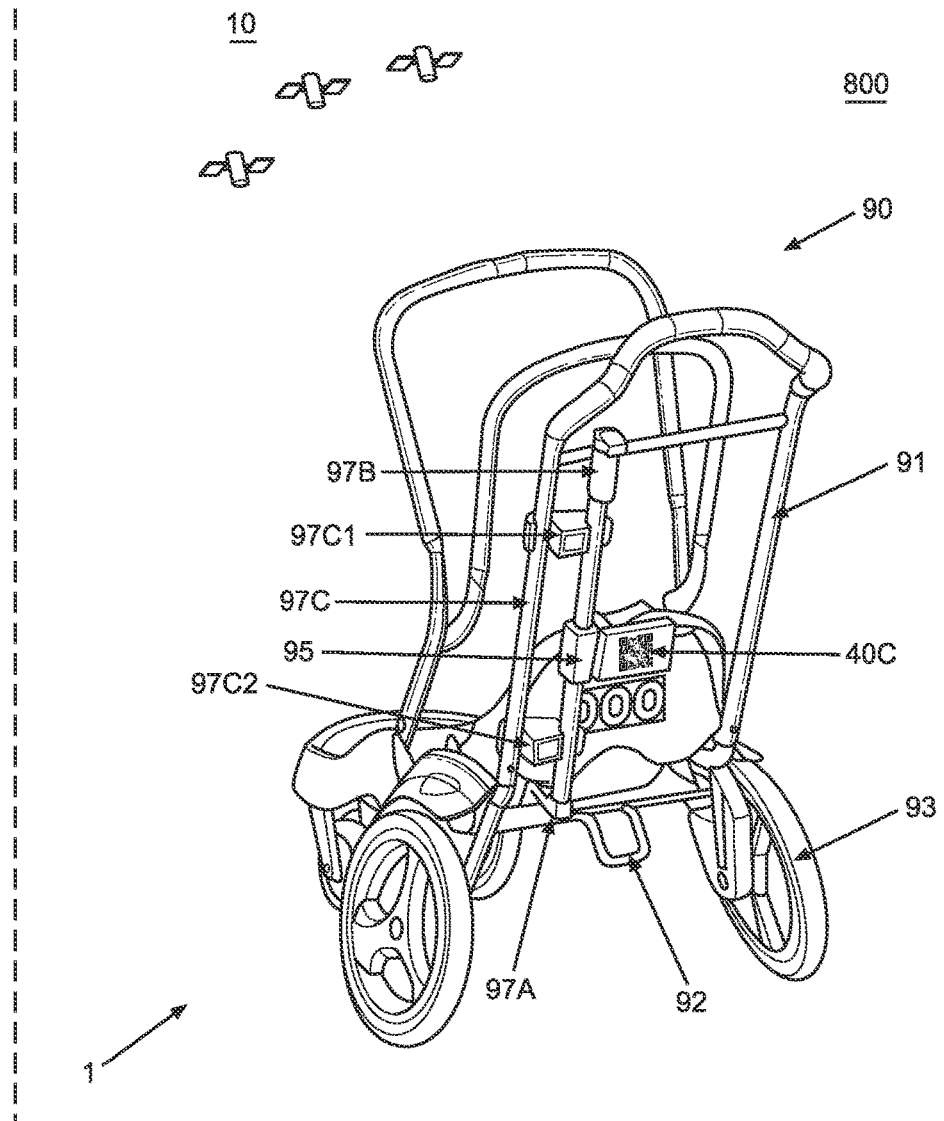
FIG. 17A is a rear perspective view of the GPS-tracked wireless networked stroller shown in FIG. 17, illustrating its electronically-controlled wheel-axel control module (ECWCM) shown in FIG. 16 installed and operational within the stroller system.

17A shows the GPS-tracked wireless networked stroller 90 while illustrating its wireless electronically-controlled wheel-axel control module 94 shown installed and operational in FIGS. 17 and 17A within the stroller system 90.

Figure 1:
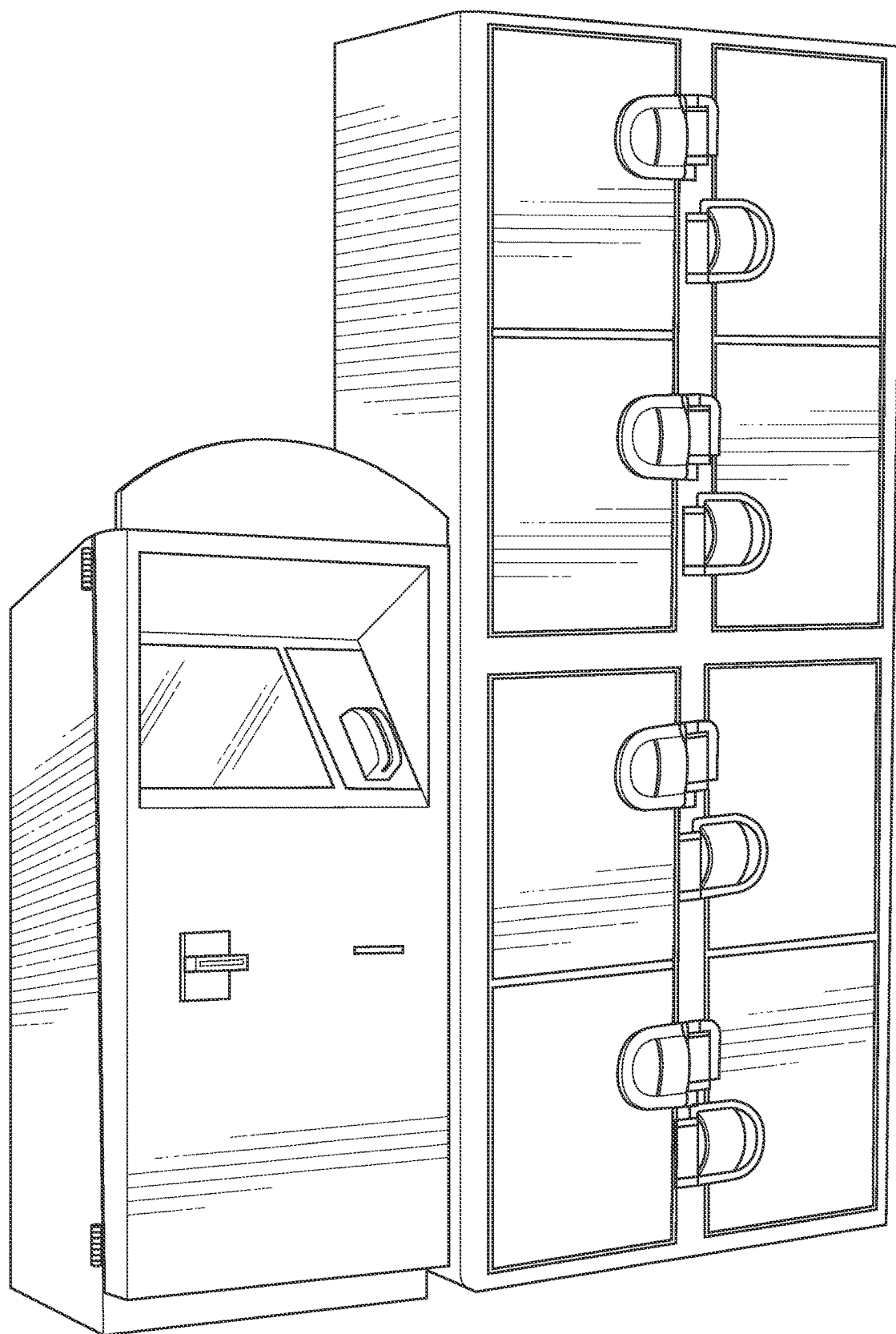
FIG. 1 shows a prior art GOPOD® electronic locker system, wherein for locker rental, guests simply visit any networked GOPOD® kiosk using cash or credit card, enter their desired PIN, and go directly to their locker, and wherein a dedicated keypad is installed on each locker allowing guests to bypass the kiosk for future access, thereby (i) eliminating operational nightmares associated with costly wristbands or RFID keys, unreliable biometric sensors and misplaced keys, (ii) reducing employee cash handling, and (iii) streamlining operations.

FIG. 17B1 shows the hand-actuated control bar assembly 94 mounted on the GPS-tracked wireless networked stroller shown in FIG. 17, by mounting brackets 97C1 and 97C2, attached to the framework of the stroller shown in FIG. 17A.

FIG. 17B1 shows the hand-actuated control bar assembly 94 configured in its unlocked state so the stroller wheel brake 92 is unlocked by the device, and its wheels 93 free to rotate without resistance. FIG. 17C1 shows the interior of wireless remote locking module 95 mounted to the hand-actuated control bar assembly 94, while shown in the unlocked state of configuration. In this configuration, the rotatable locking key 97E is rotated into a state to prevent the spring biased locking pin 97F from engaging in a hole in the cylindrical rod 97D, preventing the user from pushing the handle 97B downward and pushing the wheel brake into a locking position. Consequently, when the locking pin 97F is disengaged, the wheel braking mechanism cannot be locked by the hand-actuated control bar assembly 94.

FIG. 17B2 shows the hand-actuated control bar assembly mounted on the GPS-tracked wireless networked stroller configured in its locked state so the stroller wheel brake 92 is locked by the device 94, and its wheels 93 unable to rotate. FIG. 17C2 shows the wireless remote locking module 95 mounted to the hand-actuated control bar assembly 94, while shown in the locked state of configuration. In this configuration, the rotatable locking key 97E is rotated into a state to allow the spring biased locking pin 97F to engaging inside the hole in the cylindrical rod 97D, and locking the handle 97B into place within rod guide portion 99B, and locking the wheel brake into a locking position. Consequently, when the locking pin 97F is engaged, the wheel braking mechanism is automatically locked by the hand-actuated control bar assembly 94.

Figure 17D:
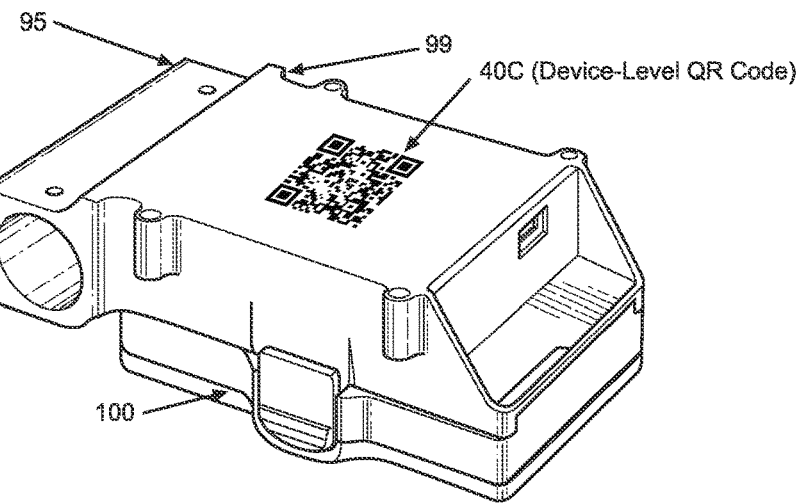
FIG. 17D is a perspective view of the GPS-tracking electronic control module mounted on the hand-actuated control bar assembly shown in FIGS. 17A and 17B, and employed in the GPS-tracked wireless networked stroller shown in FIG. 17, showing a control housing portion and a rechargeable battery module.

FIG. 17D shows the GPS-tracking electronic control module mounted on the hand-actuated control bar assembly shown in FIGS. 17A and 17B, and employed in the GPS-tracked wireless networked stroller shown in FIG. 17, showing a control housing portion 99 and a rechargeable battery module 100.

Figure 17E:
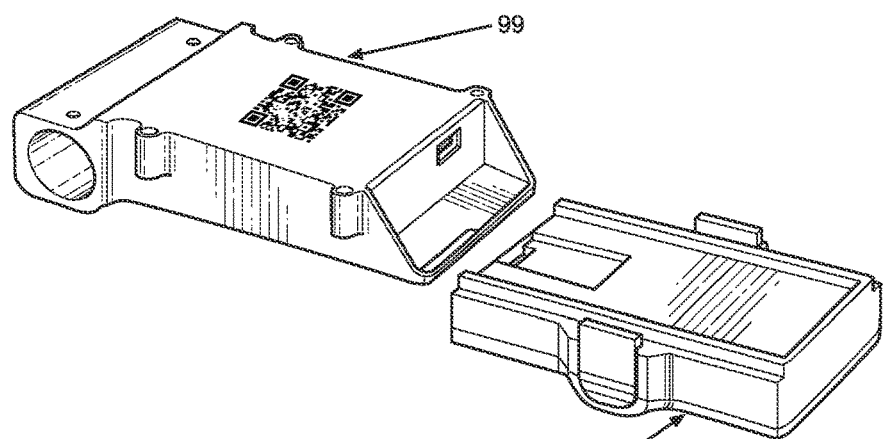
FIG. 17E is a perspective view of the GPS-tracking electronic control module of FIG. 17D, showing its battery power module slide off and away from the control housing portion.
Figure 17F:
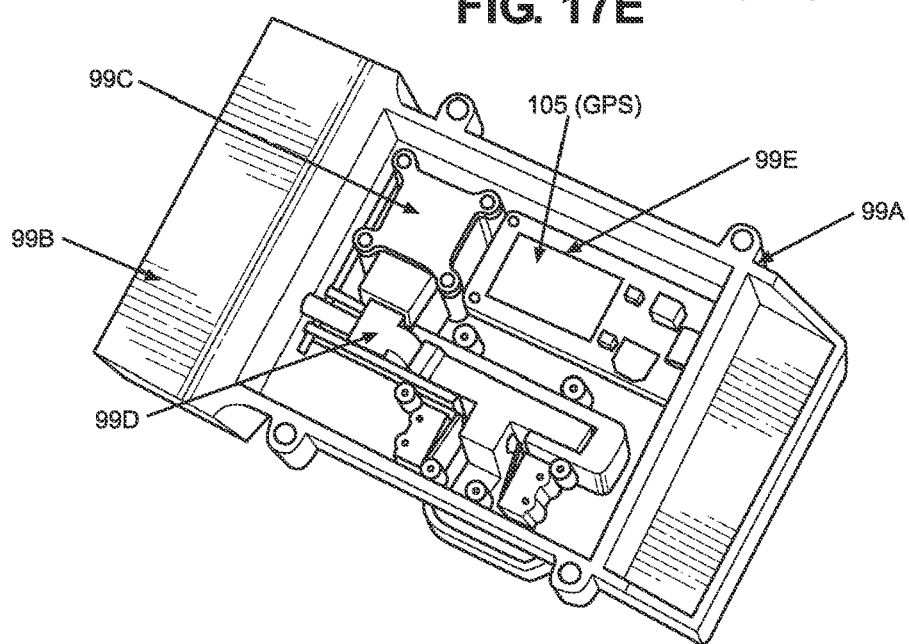
FIG. 17F is a perspective view of the control housing portion of the GPS-tracking electronic control module shown in FIGS. 17D through 17F, show with its cover manner removed from the main housing component to reveal its internally mounted electro-mechanical components including rotary motor, sensors, and electronic control circuitry.

FIG. 17E shows the GPS-tracking electronic control module of FIG. 17D, and its battery power module slide off and away from the control housing portion;

FIG. 17F shows the control housing portion 99 of the GPS-tracking electronic control module with its cover manner removed from the main housing component to reveal its internally mounted electro-mechanical components including rotary motor 99C, sensors 99A, and electronic control circuitry 99E.

FIGS. 17G1 and 17G2 show the construction of the battery power module 100 employed with the GPS-tracking electronic control module 95.

FIG. 18 shows GPS-tracked wireless networked stroller of the present invention with QR code driven access control using the GPS-tracking wireless system network of the present invention, to support Contactless Transactions for a quick and safe guest rental experience, Web-based Application initiated by QR code provides easy to use platform without need for app installation, SMS Receipt Message for guest convenience and personalized rental confirmation, Mobile Payment to reduce cash handling and labor costs, GPS-enabled fleet review and management, rider instructions for use of vehicle, and fleet reporting.

As shown in FIG. 18, the GPS-tracked wireless networked stroller comprises: a stroller with a body adapted for supporting a person typically child or young person, and sometimes a pet animal such as a dog; and control module containing the electronics. As shown in FIG. 18, the control electronics module 95 comprises: a microprocessor 104 and memory architecture 105 interfaced with a system bus 106; a GPS module (e.g. UBlock® GPS/GNSS Module); a video camera 102 with field of view (FOV) integrated to the system bus 106; an I/O module 108 supporting a keypad and electronic-ink and LCD display panel 110, and a Bluetooth and WIFI network adapter and antennas 111 to support GPS and RF communications supported on the wireless system network; a network adapter/controller 109 for providing TCP/IP network access to the wireless system network 1, and all services supported on the Internet; and an electronically controlled wheel axel control module (ECWCM) 95 interfaced with the system bus 106, for controlling access to the vehicle wheels 92 and/or brake system 93.

Figure 19:
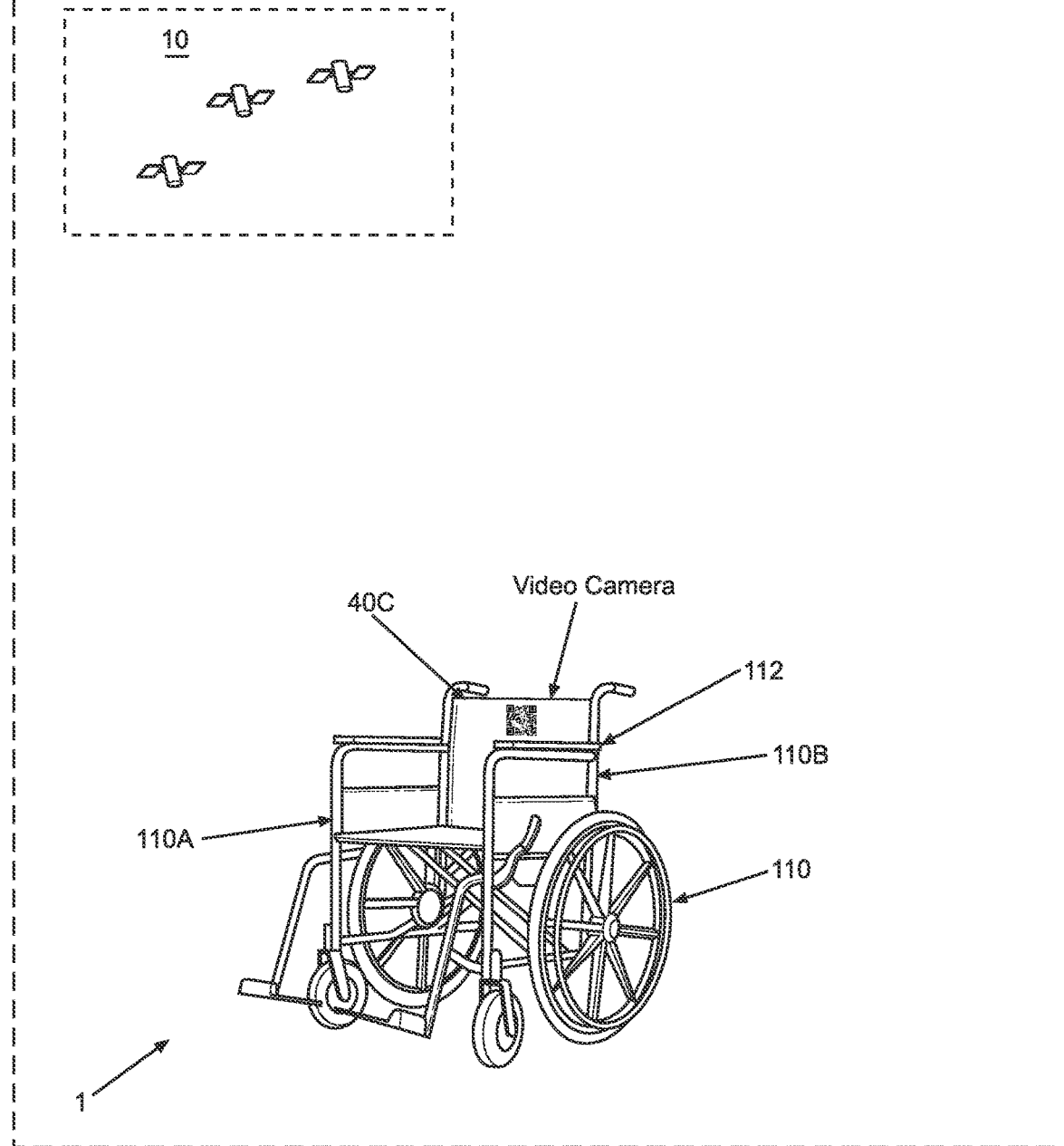
FIG. 19 is a perspective view of a GPS-tracked wireless networked wheel chair with QR code driven access control using the GPS-tracking wireless system network of the present invention.

Specification of GPS-Tracked Wireless Networked QR Code Driven Access Controlled Wheel Chair in Accordance with the Present Invention FIG. 19 shows a GPS-tracked wireless networked wheel chair 110 with QR code driven access control using the GPS-tracking wireless system network 1.

Figure 20:
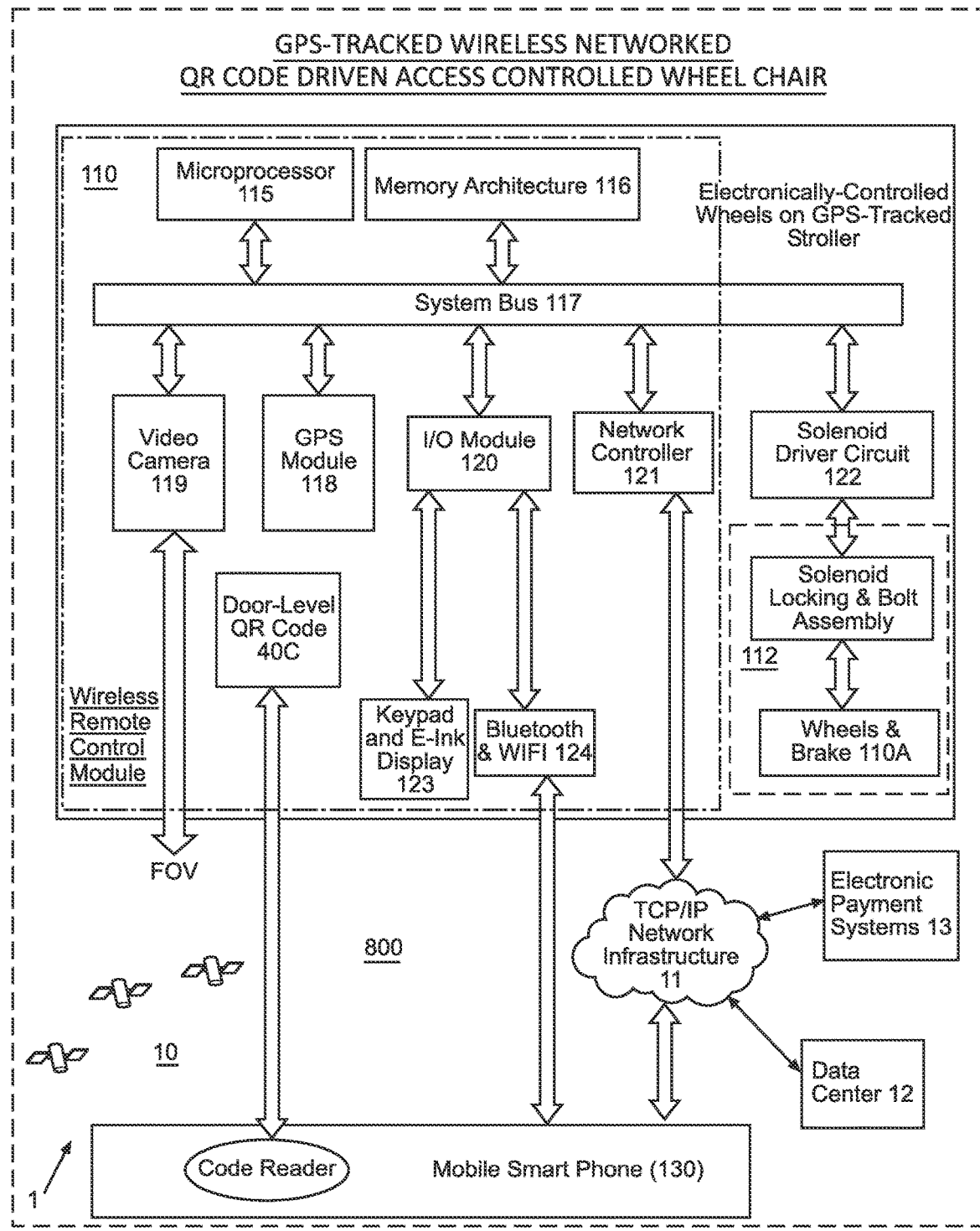
FIG. 20 is a GPS-tracked wireless networked wheel chair of the present invention with QR code driven access control using the GPS-tracking wireless system network of the present invention.

FIG. 20 shows the GPS-tracked wireless networked wheel chair 110 provided with QR code driven access control using the GPS-tracking wireless system network 1. As shown in FIG. 20, the GPS-tracked wireless networked wheelchair 110 comprises: a wheelchair body portion 110A adapted for supporting a child or adult, and pair of wheels 110B, with a braking system 111; and wireless remote control module system 112 supporting electronics, and being integrated with the wheelchair and its control and drive electronics, if and as may be provided.

As shown in FIG. 20, the wireless remote control electronics module system comprises: a microprocessor and memory architecture interfaced with a system bus; a GPS module (e.g. UBlock® GPS/GNSS Module) 118; a video camera 119 with field of view (FOV) integrated to the system bus 117; an I/O module supporting a keypad and electronic-ink and LCD display panel, and a Bluetooth and WIFI network adapter and various antennas to support RF and GPS communications with various systems on the wireless system network; a network adapter/controller 121 for providing TCP/IP network access to the wireless system network 1 of the present invention, and all services supported on the Internet; and an electronically controlled wheel axel control module (ECWCM) interfaced with the system bus 117, for controlling access to the vehicle wheels and/or propulsion/drive system.

Figure 22:
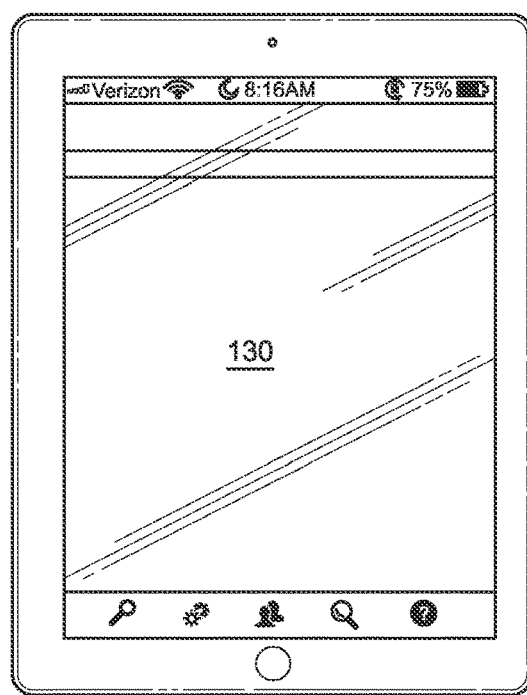
FIG. 22 is a perspective view of a mobile tablet computing system (e.g. Apple iPad device)
Figure 23:
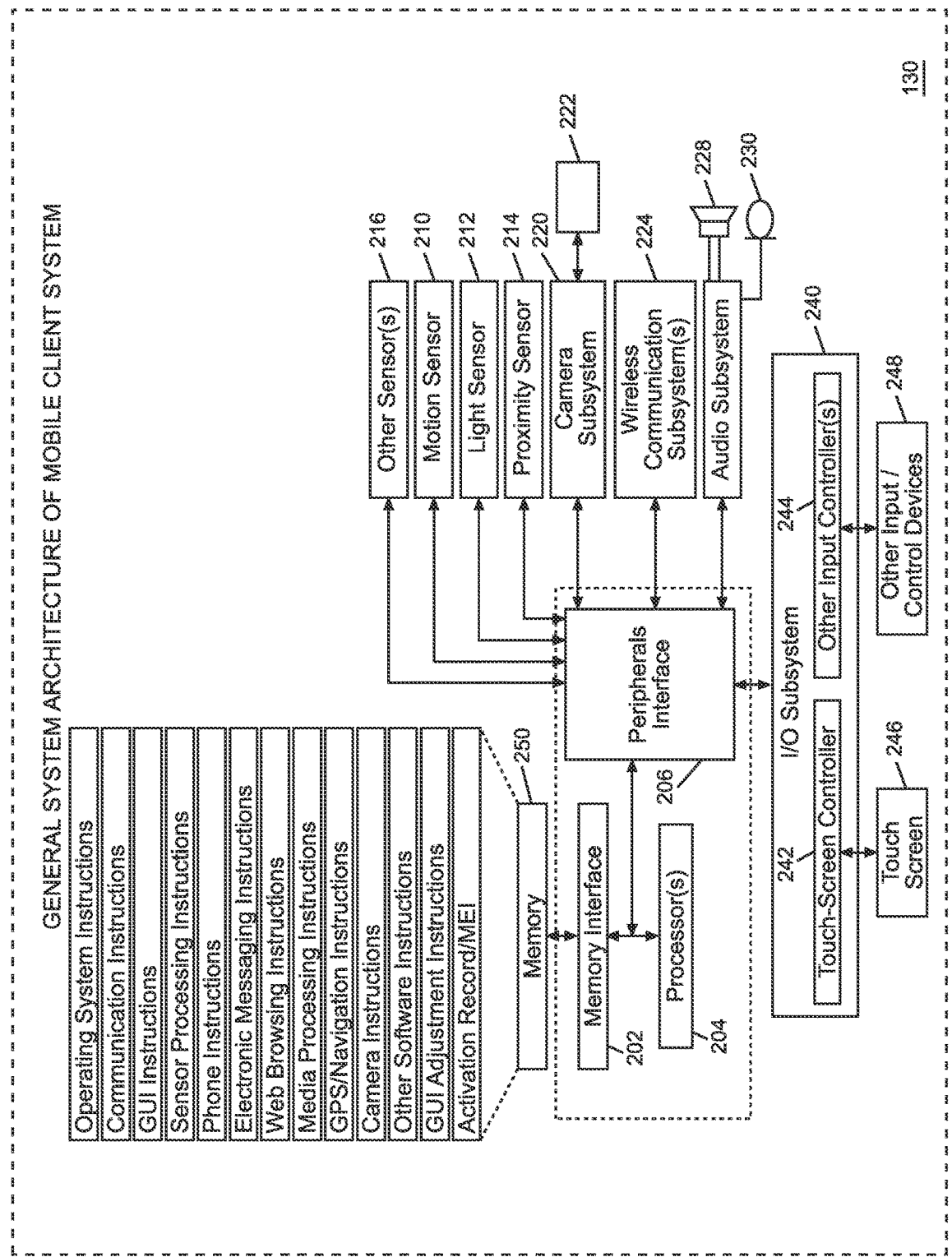
FIG. 23 is a schematic system block diagram of the mobile smartphone system and/or mobile tablet computing system shown in FIGS. 21 and 22.

Specification of System Architecture of an Exemplary Mobile Computing System Deployed on the Wireless System Network of the Present Invention FIG. 21 shows a mobile smartphone system (e.g. Apple iPhone device). FIG. 22 shows a mobile tablet computing system (e.g. Apple iPad device). FIG. 23 shows the system architecture for each mobile smartphone system and/or mobile tablet computing system shown in FIGS. 21 and 22, and depicted in FIGS. 10, 11, 12 and throughout the Patent Specification.

FIG. 23 illustrate the system architecture of an exemplary mobile computing system (e.g. system component) 130 shown in FIGS. 21 and 22 and deployed on the wireless system network of the present invention 1, and supporting the many services offered by system network servers. As shown in FIG. 23, the mobile computing device 130 can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. One or more communication buses or signal lines can couple the various components in the mobile device. Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate the orientation, lighting, and proximity functions. Other sensors 216 can also be connected to the peripherals interface 206, such as a positioning system (e.g., GPS receiver), a temperature sensor, a biometric sensor, a gyroscope, or other sensing device, to facilitate related functionalities. A camera subsystem 220 and an optical sensor 222, e.g., a charged coupled device (CCD) or a complementary metal-oxide semiconductor (CMOS) optical sensor, can be utilized to facilitate camera functions, such as recording photographs and video clips. Communication functions can be facilitated through one or more wireless communication subsystems 224, which can include radio frequency receivers and transmitters and/or optical (e.g., infrared) receivers and transmitters. The specific design and implementation of the communication subsystem 224 can depend on the communication network(s) over which the mobile computing device 130 is intended to operate. For example, a mobile device 130 may include communication subsystems 224 designed to operate over a GSM network, a GPRS network, an EDGE network, a Wi-Fi or WiMax network, and a Bluetooth™ network. In particular, the wireless communication subsystems 224 may include hosting protocols such that the mobile computing device 130 may be configured as a base station for other wireless devices. An audio subsystem 226 can be coupled to a speaker 228 and a microphone 230 to facilitate voice-enabled functions, such as voice recognition, voice replication, digital recording, and telephony functions. The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246. The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230. Such buttons and controls can be implemented as a hardware objects, or touch-screen graphical interface objects, touched and controlled by the system user. Additional features of mobile computing device 130 can be found in U.S. Pat. No. 8,631,358 incorporated herein by reference in its entirety.

In the preferred embodiments of the present invention, each mobile smartphone 130 requires a web-enabled browser program, such as Apple® Safari http browser program for the Apple® iPhone device 130 and the Apple® iPad® device 130, or any suitable web browser program for other brands of mobile phones, such as offered by Samsung, Google, Microsoft and others. The mobile smartphone 130 should also be capable of scanning and reading any machine readable code 40 described herein, including optical code symbols and/or RFID tags, as the wireless access and control application at hand may require to be properly and adequately supported on the access and control system network of the present invention.

Alternatively, a native mobile application may be designed, developed and installed on any mobile computing system 130 to provide the mobile computing device 130 with the capacity to read machine-readable code symbols in accordance with the present invention, and support the display of GUI screens on the mobile device to support the rental, access and control services provided to the user by the service provider. In most applications, it is expected that native mobile applications designed for practicing components of the present invention will be (i) web/http-enabled despite running on native code, and (ii) enable the receipt, display and transmission of HMTL documents (e.g. webpages) on the mobile phone devices 130, in a manner well known in the Internet arts and Web-based technology pioneered by Tim Berners-Lee who is the primary inventor of the World Wide Web (WWW). However, it is possible that someday HTML as we currently know it, may evolve into something different, and even called by a different or alternative name, but notwithstanding may serve as an enabling technology useful for practicing the various inventions disclosed herein.

Figure 24A:
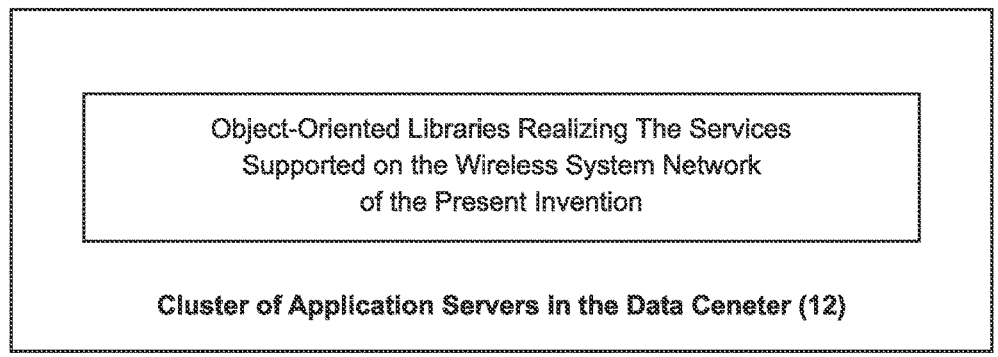
FIG. 24A is a schematic representation of the object-oriented libraries stored and executable within the cluster of application servers within the data center, realizing the many services supported on the wireless access control system network of the present invention.

Specification of Database Schema for the Database Component Used on the Wireless System Network of the Present Invention FIG. 24A illustrate object-oriented libraries that will be stored and executable within the cluster of application servers within the data centers supporting the wireless system network of the present invention, an realizing the many services supported on the wireless access control system network of the present invention.

Figure 24B:
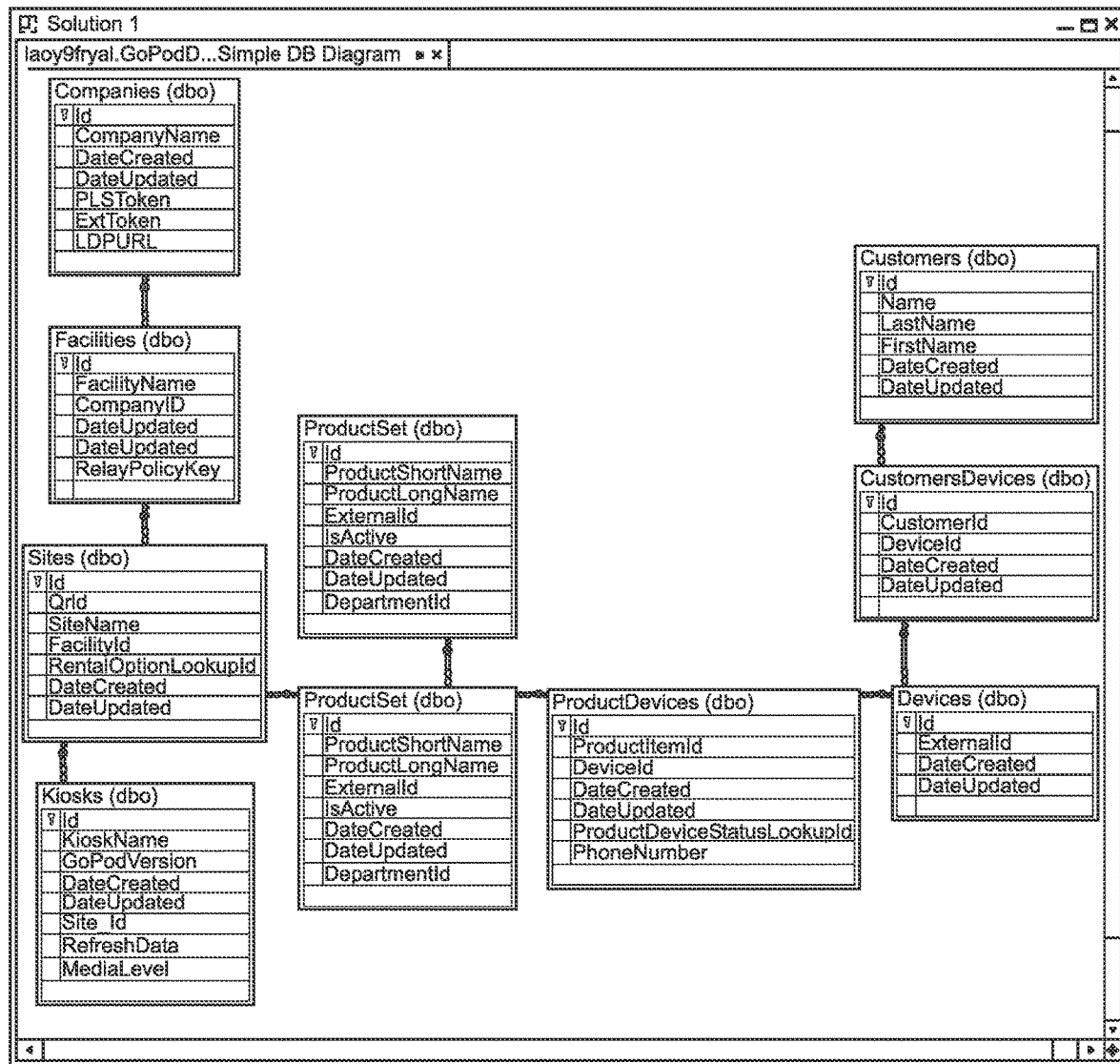
FIG. 24B is a schematic representation of the database structure associated with an exemplary relational database management system (RDBMS) used to illustrate a database architecture that will be designed and developed to support the wireless control access system network of the present invention, with the exemplary suite of services described in detail herein.

FIG. 24B represents a database structure associated with an exemplary relational database management system (RDBMS) used to illustrate a database architecture that will be designed and developed to support the wireless control access system network of the present invention, with the exemplary suite of services described in detail herein.

During the design and development of the system network, a data schema will be created for the object-oriented system-engineered (OOSE) software component thereof, for execution on a client-server architecture. In general, the software component of the system network will consist of classes, and these classes can be organized into frameworks or libraries that support the generation of graphical interface objects within GUI screens, control objects within the application or middle layer of the enterprise-level application, and enterprise or database objects represented within the system database (RDBMS) 12. Preferably, the RDBMS will be structured according to a database schema comprising enterprise objects, represented within the system database (e.g. RDBMS), including, for example: facilities including amusement and theme parks, recreational parks, centers and stadiums; rental equipment providers; vendors; service providers (e.g. instructors, trainers, medical personal); guest ID; facility managers; system user ID; Site ID; Site location; mobile phone ID; guest/visitor ID; mobile computer ID for computers deployed on the system network; and many other objects used to model the many different aspects of the system being developed. These objects and the database schema will be used and reflected in a set of object-oriented software modules developed for the system.

Each software module contains classes (written in an object-oriented programming language) supporting the system network of the present invention including, for example, the user registration module, vendor registration module, service provider registration module, mobile client computer registration module, user account management module, log-in module, settings module, contacts module, search module, data synchronization module, help module, and many other modules supporting the selection, delivery and monitoring of system monitoring related services supported on the system network of the present invention.

Implementing the Mobile Client Machines and Wireless Devices on the Wireless System Network of the Present Invention In one illustrative embodiment, the enterprise-level wireless system network of the present invention is supported by a robust suite of hosted services delivered to (i) Web-based client subsystems 130 using an application service provider (ASP) model, and also to (ii) remote monitoring services deployed for various kinds of stationary and/or mobile systems to be monitored, as described above and below. In this embodiment, the Web-enabled mobile clients 130 can be realized using a web-browser application running on the operating system (OS) of a computing device 130 (e.g. Linux, Application IOS, etc.) to support online modes of system operation. It is understood, however, that some or all of the services provided by the system network can be accessed using Java clients, or a native client application running on the operating system (OS) of a client computing device 130 to support both online and limited off-line modes of system operation.

Figure 25:
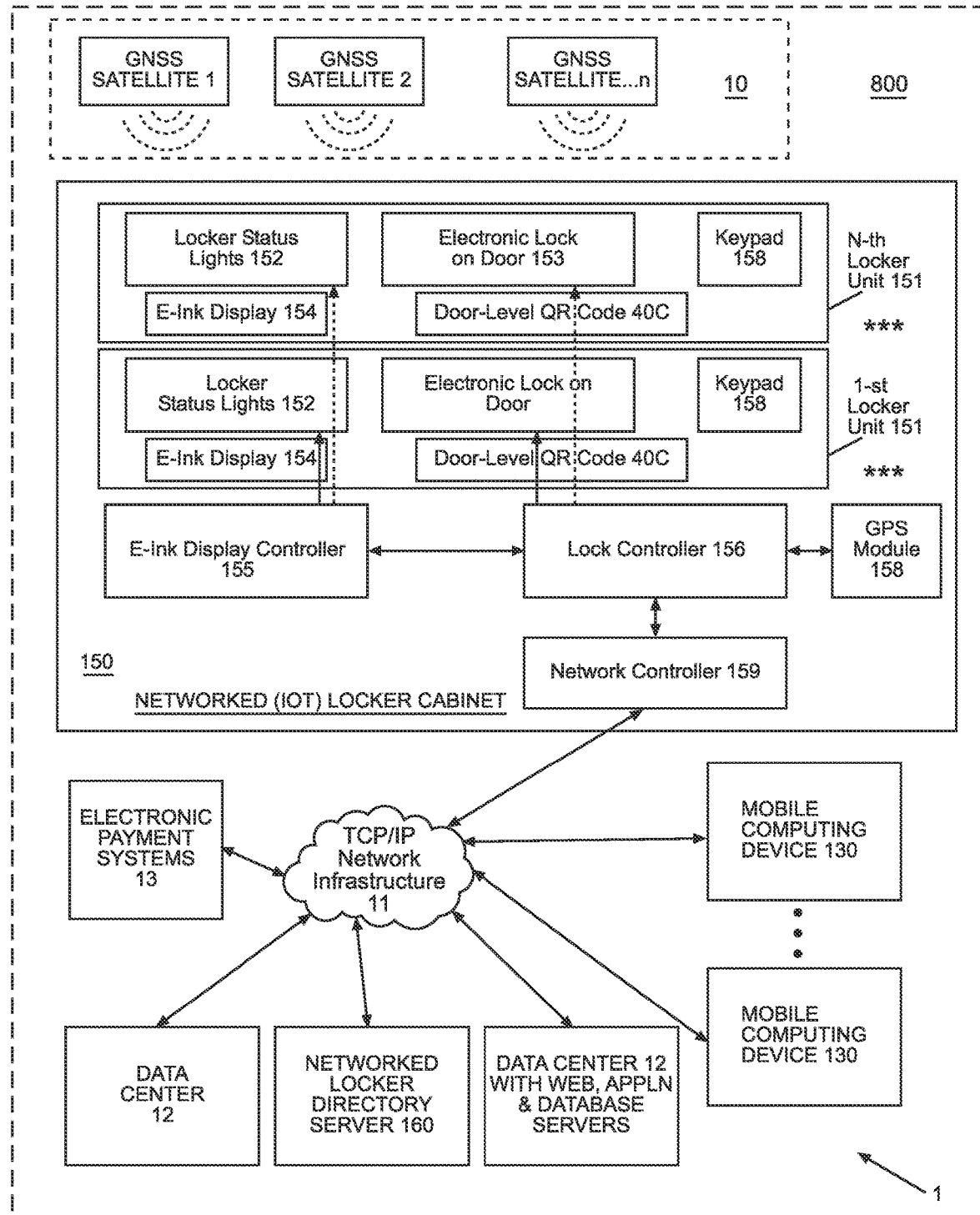
FIG. 25 is a GPS-tracked wireless networked locker system of the present invention with QR code driven access control using the GPS-tracking wireless system network of the present invention, supporting electronic-ink display panels on each locker front door to display QR codes, user instructions, messages and graphical indicia including advertising required or suggested by the principles of the present invention.

Specification of GPS-Tracked Wireless Networked Locker System with QR-Code Driven Access Controlled Locker Units According to the Present Invention FIG. 25 shows a GPS-tracked wireless networked (transportable/potable) locker system of the present invention fully equipped with QR code driven access control using the GPS-tracking wireless system network of the present invention, and supporting electronic-ink display panels on each locker front door to display QR codes, user instructions, messages and graphical indicia including advertising required or suggested by the principles of the present invention.

As shown in FIG. 25, the GPS-tracked wireless networked (transportable/potable) locker system 150 comprises: a locker cabinet with a plurality of electronically-controlled lockers 151, stored in a transportable cabinet 152 (with wheels as application requires), and electronics and communications equipment as shown in FIG. 25. As shown, each locker unit 151 comprises: a rugged housing for containing objects and at least one hinged door provided with an electronic lock unit 153; a door-level QR code 40C physically posted or electronically displayed on the door surface using its E-ink panel 154; an e-ink display controller 155 for the locker unit; RGY locker status LED lights 152; a local lock controller 156 for controlling the electronic lock control module; a keypad 159 for each lock controller mounted on the locker door, enabling the manual entry of digital lock code selected by the user; a network controller 159 for interfacing with the TCP/IP infrastructure 11 and communicating each locker unit with the wireless system network servers on the access control network system 1, as described herein; an internal digital video camera with a field of view (FOV) on the interior of the locker cabinet, and an external video camera with a field of view on the exterior of the locker facing the user to enable facial recognition as desired or required by the application; a GPS module 158 interfaced with the lock controller and its system bus and programmed processor, to provide real-time GPS coordinate with each locker transaction; and a Bluetooth and WIFI network adapter and various antennas to support RF and GPS communications with various systems on the wireless system network, including a guest user's web-enabled mobile phone system 130.

As shown, the GPS-tracked wireless networked (transportable/potable) locker system 151 is operably connected to the Internet's TCP/IP infrastructure 11, to which is connected various computing resources including: electronic payment systems 13 to support e-commerce payment transactions (e.g. ApplePay®, credit and debit card transactions, PayPal®, etc.); the data centers 12 to support the wireless system network 1 shown in FIGS. 10, 11 and 12; a web-based networked locker directory server 160; mobile computing devices 130 such as millions of mobile smartphones deployed on the wireless system network; and web, application and database servers associated with thousands of third-party service providers and vendors desiring to serve the guests and visitors of the facilities served by the system network of the present invention.

Figure 26:
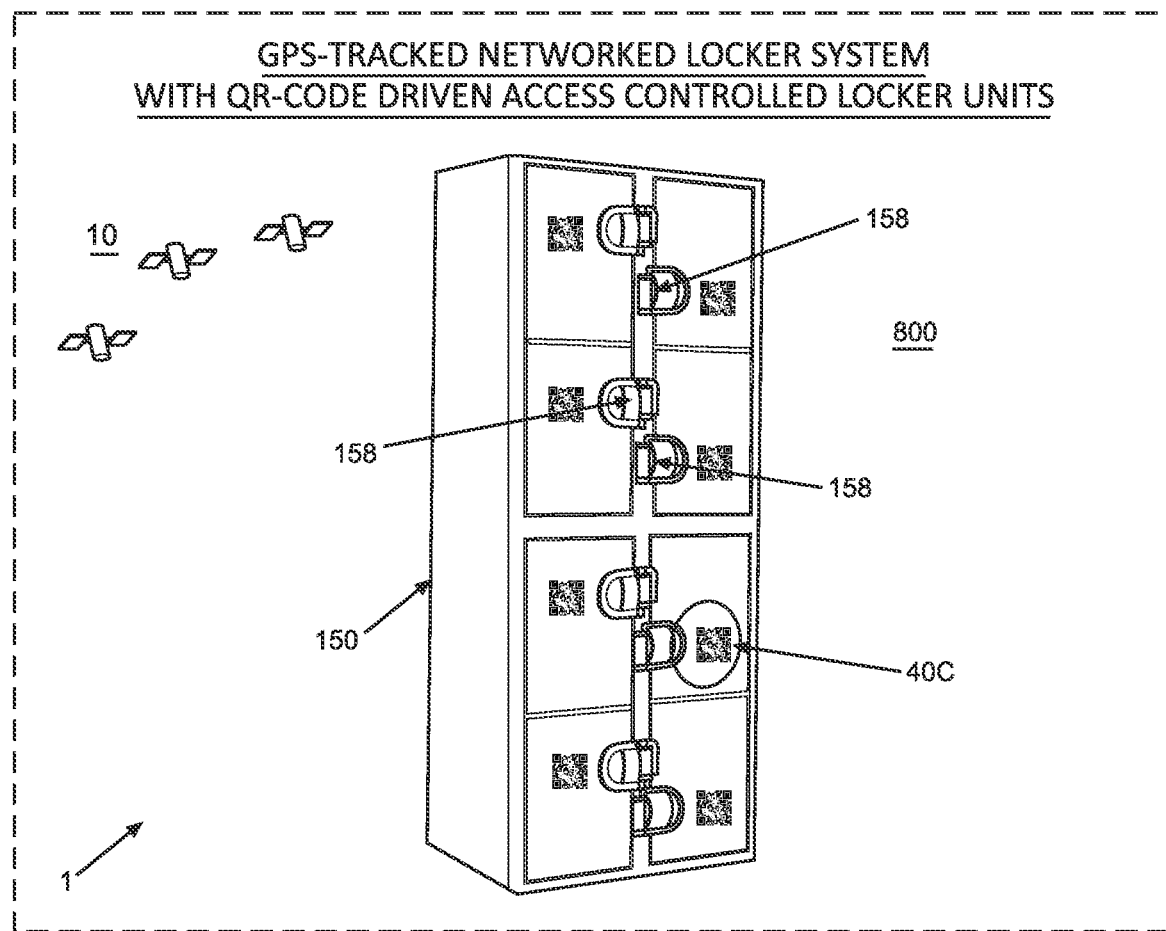
FIG. 26 is a perspective view of the GPS-tracked wireless networked locker system with QR code driven access controlled locker units, each having an electronic-ink (E-ink) display panel for displaying QR codes, user instructions, messages, as well as advertisements.

FIG. 26 shows the GPS-tracked wireless networked locker system 150 with QR code driven access controlled locker units 151, each having an electronic-ink (E-ink) display panel 154 for displaying QR codes 40C, user instructions, messages, as well as advertisements.

Figure 27:
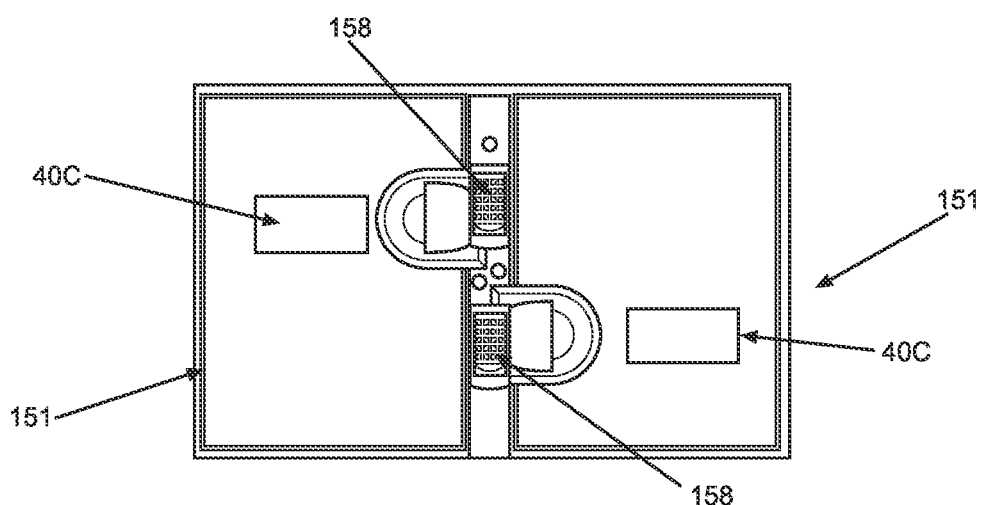
FIG. 27 is a perspective view of a pair of locker units in the GPS-tracked network wireless networked locker cabinet system shown in FIG. 27, each having an electronic-ink (E-ink) display panel for displaying QR codes and user instructions.

FIG. 27 shows a pair of locker units 151 in the GPS-tracked network wireless networked locker cabinet system 152 shown in FIG. 27, each having an electronic-ink (E-ink) display panel 154 for displaying QR codes and user instructions.

Figure 27A:
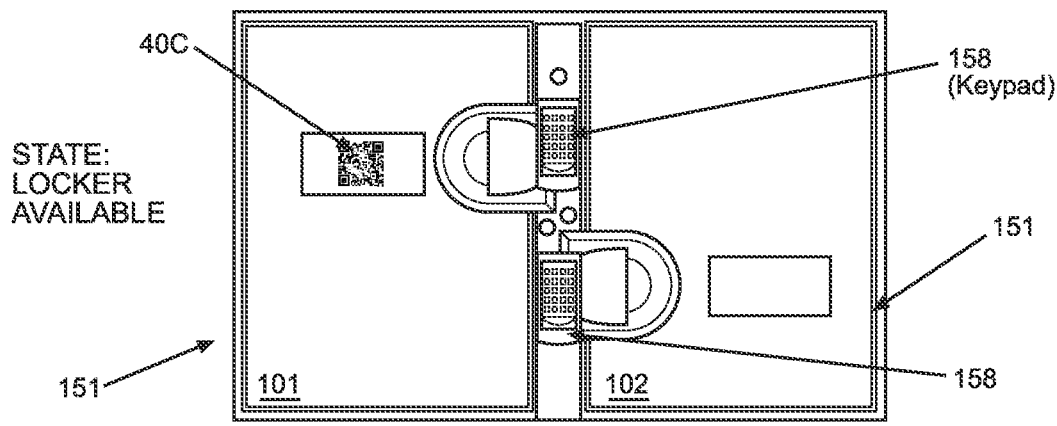
FIG. 27A is a perspective view of the locker units of FIG. 27, showing the left sided locker configured in the "locker available" state, and displaying a Door-Level QR code available for scanning by a guest's web-enabled mobile phone to receive the services from the system network of the present invention.

FIG. 27A shows the locker units 151 of FIG. 27, with the left sided locker configured in the "locker available" state, and displaying a Door-Level QR code available for scanning by a guest's web-enabled mobile phone 130 to receive the services from the system network of the present invention.

Figure 27B:
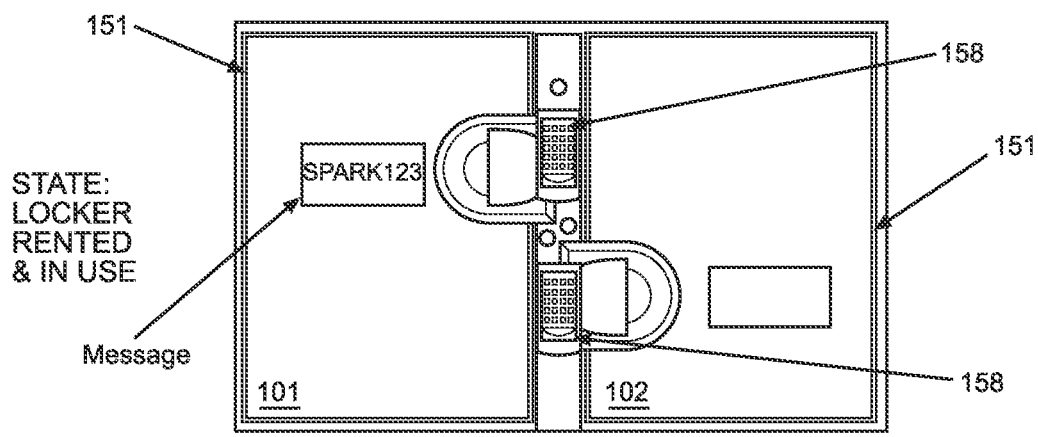
FIG. 27B is a perspective view of the locker units of FIG. 27, showing the left sided locker in the "locker rented & in use" state, displaying a user-selected message "SPARK123"
Figure 27C:
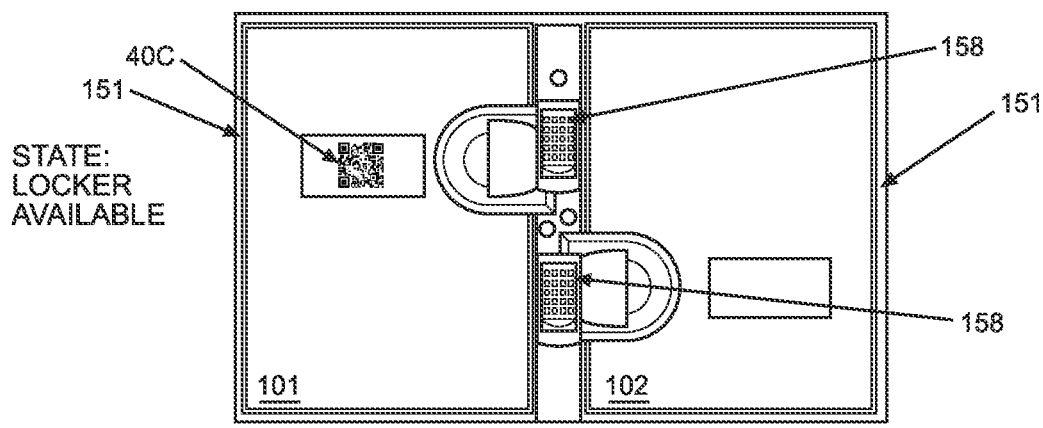
FIG. 27C is a perspective view of the locker units of FIG. 27, showing the left sided locker in the "locker available" state, displaying a Door-Level QR code once again.

FIG. 27B shows the locker units 151 of FIG. 27, with the left sided locker in the "locker rented & in use" state, displaying a user-selected message "SPARK123";

FIG. 27C shows the locker units 151 of FIG. 27, with the left sided locker in the "locker available" state, displaying a Door-Level QR code 40C once again.

Specification of the Method of Managing Access Control to a Networked Locker System by Scanning Facility-Level QR Codes Posted at the Entrance Gate or Outside of an Amusement Park Facility Using a Mobile Smartphone Wireless Connected to the Wireless Access Control System Network of the Present Invention FIGS. 28A, 28B, 28C and 28D describes the primary steps involved when carrying out the methods of managing access control to a networked locker system 150 by scanning facility-level QR codes 40A posted at the entrance gate or outside of an amusement park facility 800, using a mobile smartphone 130 wireless connected to the wireless access control system network of the present invention.

Figure 29A:
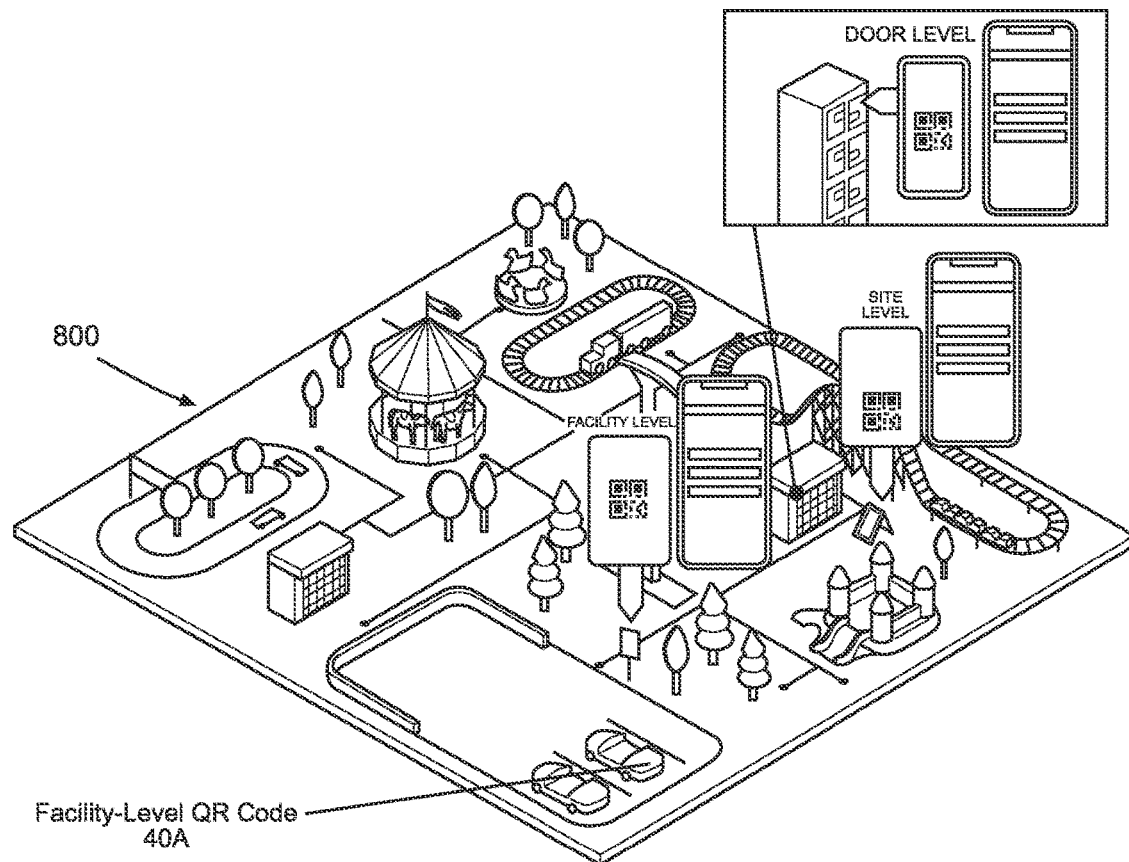
FIG. 29A is a schematic illustrating showing a perspective view of an amusement park facility, with a sign posted at the entrance date of the park, displaying a Facility-Level QR code as shown in FIG. 29B, which upon scanning with a web-enabled mobile smartphone is engineered to direct the guest user to a web-based e-commerce-enabled locker rental and access control transaction having the largest scope of services, encapsulating the entire facility, and allowing guest users to select a Site location of choice within the amusement park for their locker rental within the amusement park, and then allow the wireless system network to automatically assign an available locker to the guest at the selected Site.
Figure 29B:
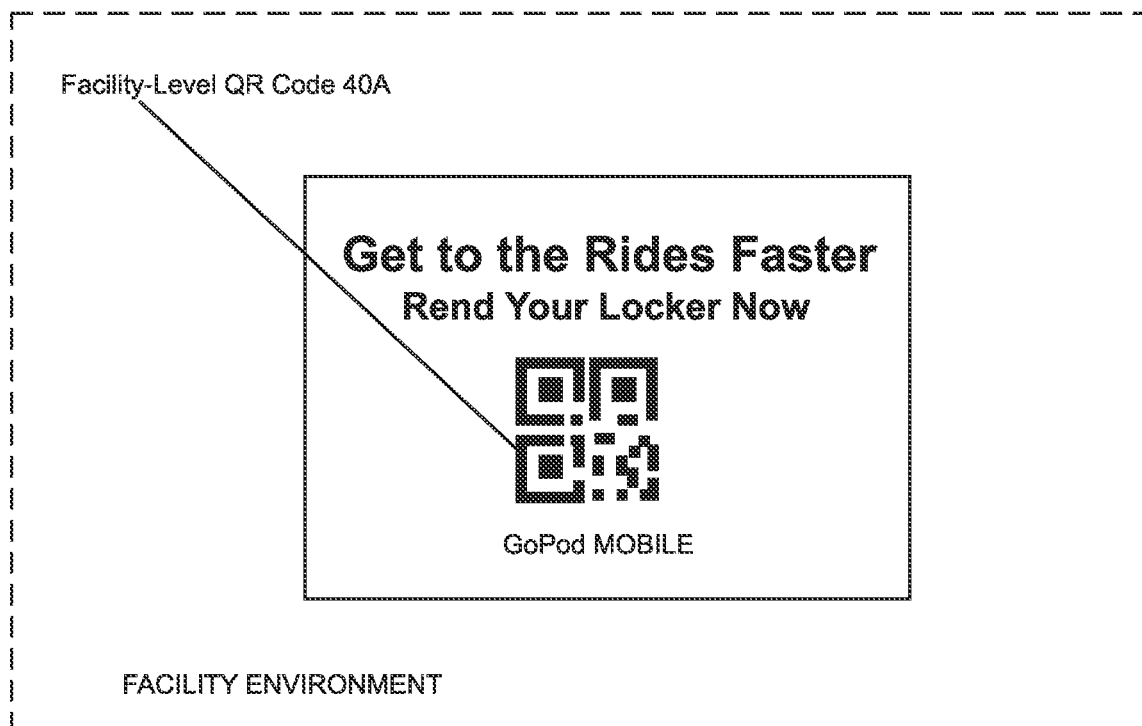
FIG. 29B is an enlarged view of the Facility-Level QR Code posted at the entrance gate of the amusement park illustrated in FIG. 29A.

FIG. 29A shows a perspective view of an amusement park facility 800, with a sign posted at the entrance date of the park, displaying a Facility-Level QR code 40A as shown in FIG. 29B which, upon scanning with a web-enabled mobile smartphone 130, is engineered to direct the guest user to a web-based e-commerce-enabled locker rental and access control transaction having the largest scope of services, encapsulating the entire facility. This allows guest users to select a Site location of choice within the amusement park 800 for their locker rental within the amusement park, and then allow the wireless system network to automatically assign an available locker to the guest at the selected Site.

FIG. 29B shows an enlarged view of the Facility-Level QR Code 40A posted at the entrance gate of the amusement park illustrated in FIG. 29A.

Figure 28A:
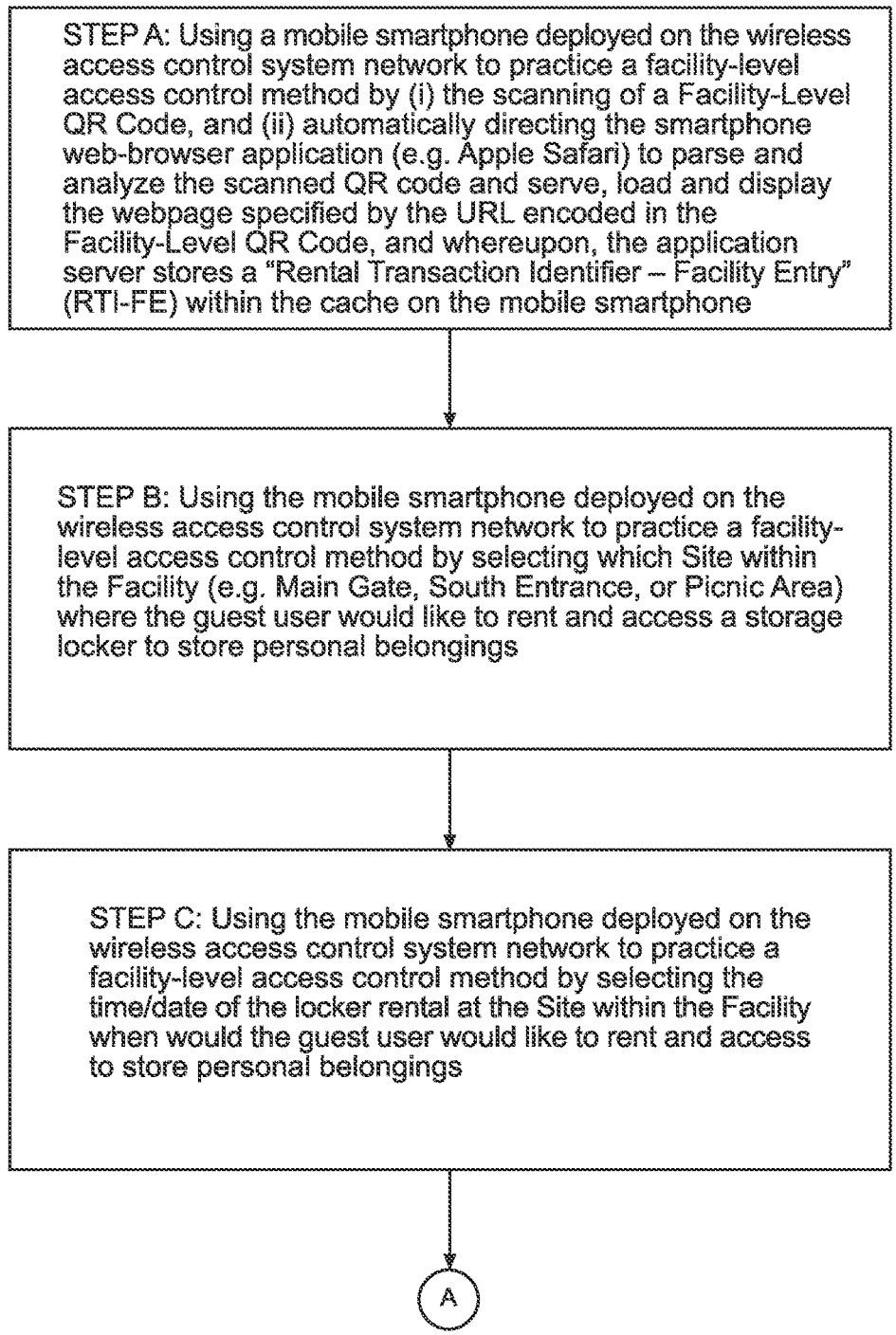
FIGS. 28A, 28B, 28C and 28D set forth a flow chart describing the primary steps involved when carrying out the method of managing access control to a networked locker system by scanning facility-level QR codes posted at the entrance gate or outside of an amusement park facility, using a mobile smartphone wireless connected to the wireless access control system network of the present invention.
Figure 28B:
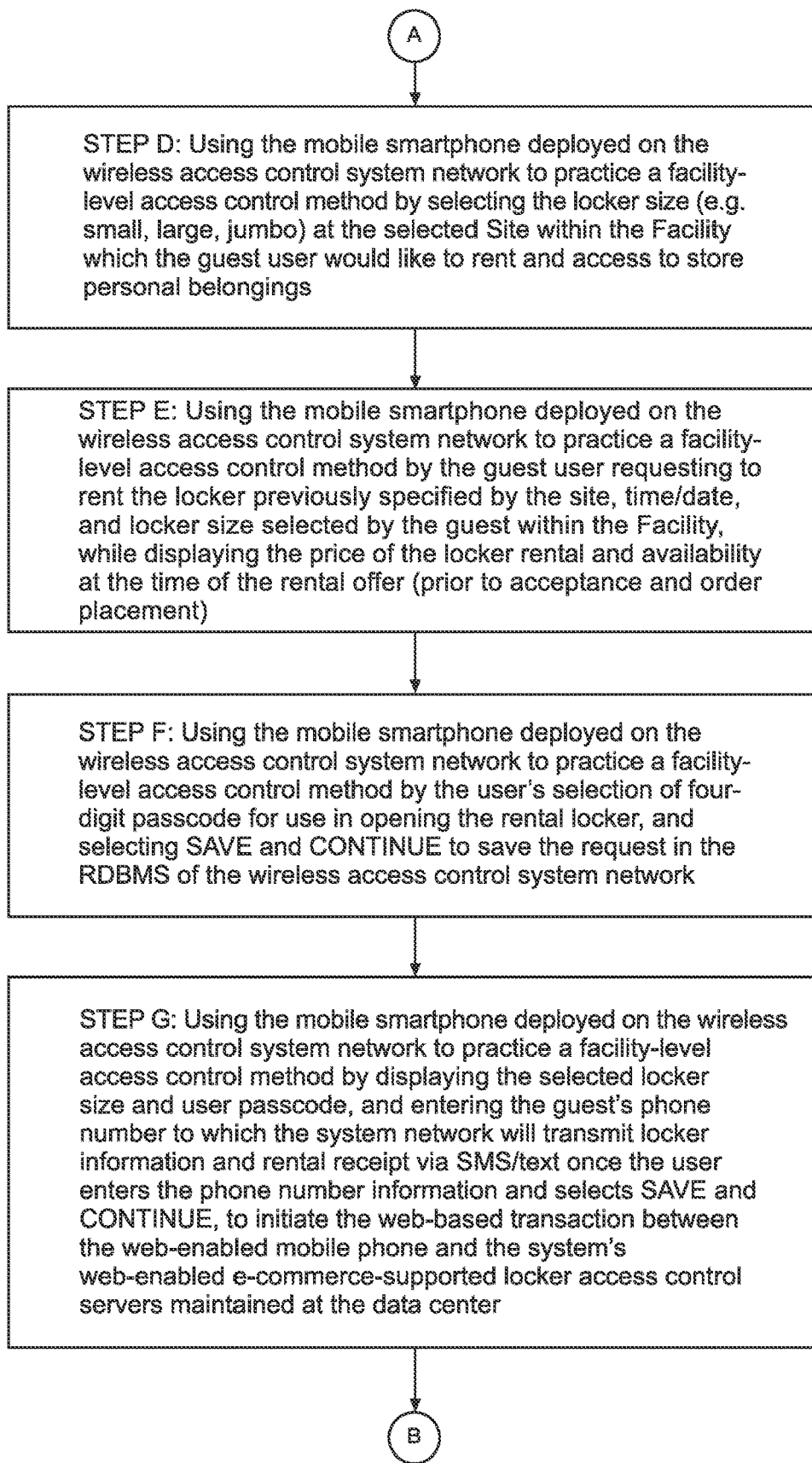
Figure 28C:
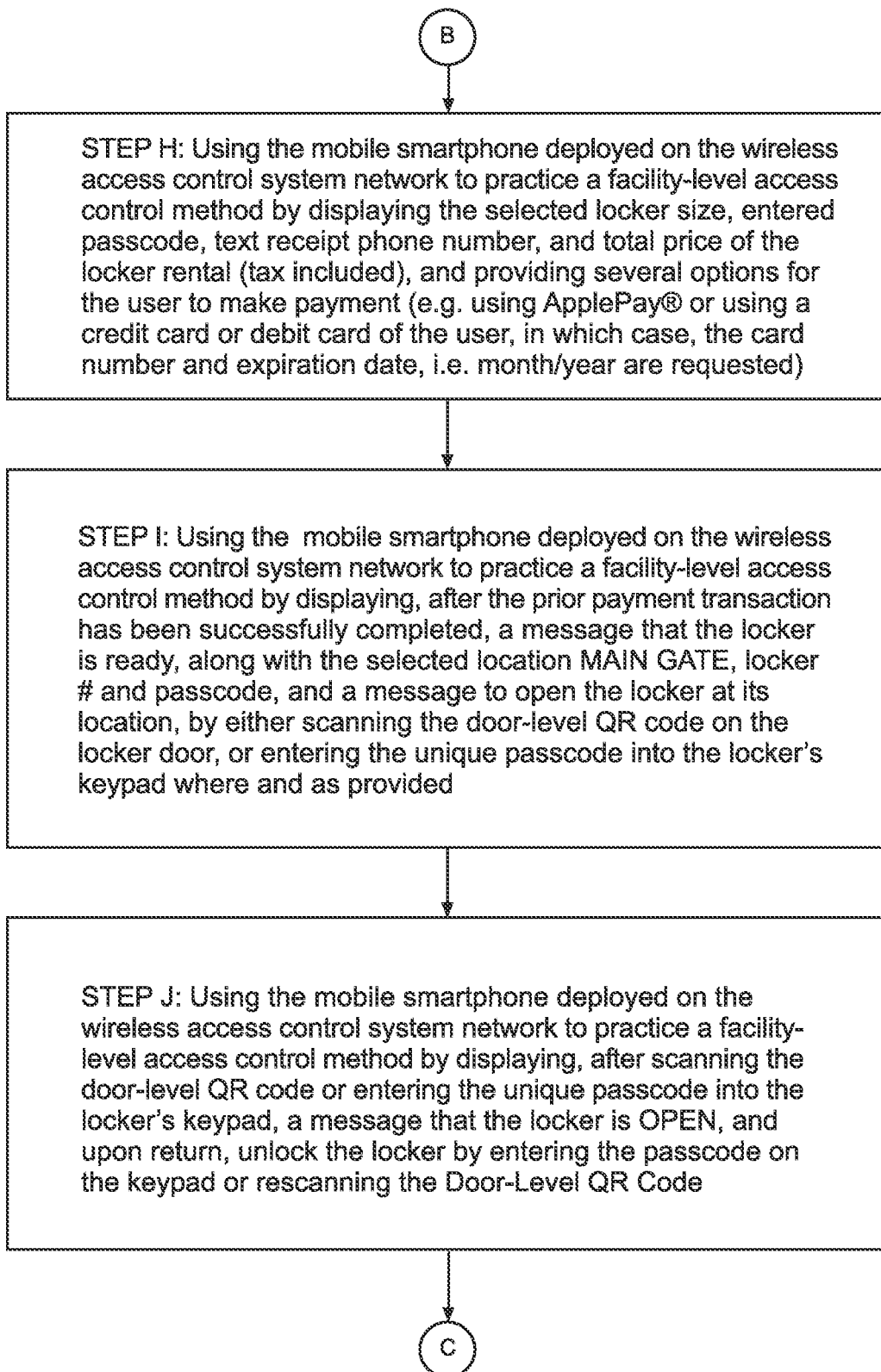

The method described and illustrated in FIGS. 28A through 28C is supported by the GUI screens shown in FIG. 30A through 30J.

Figure 30A:
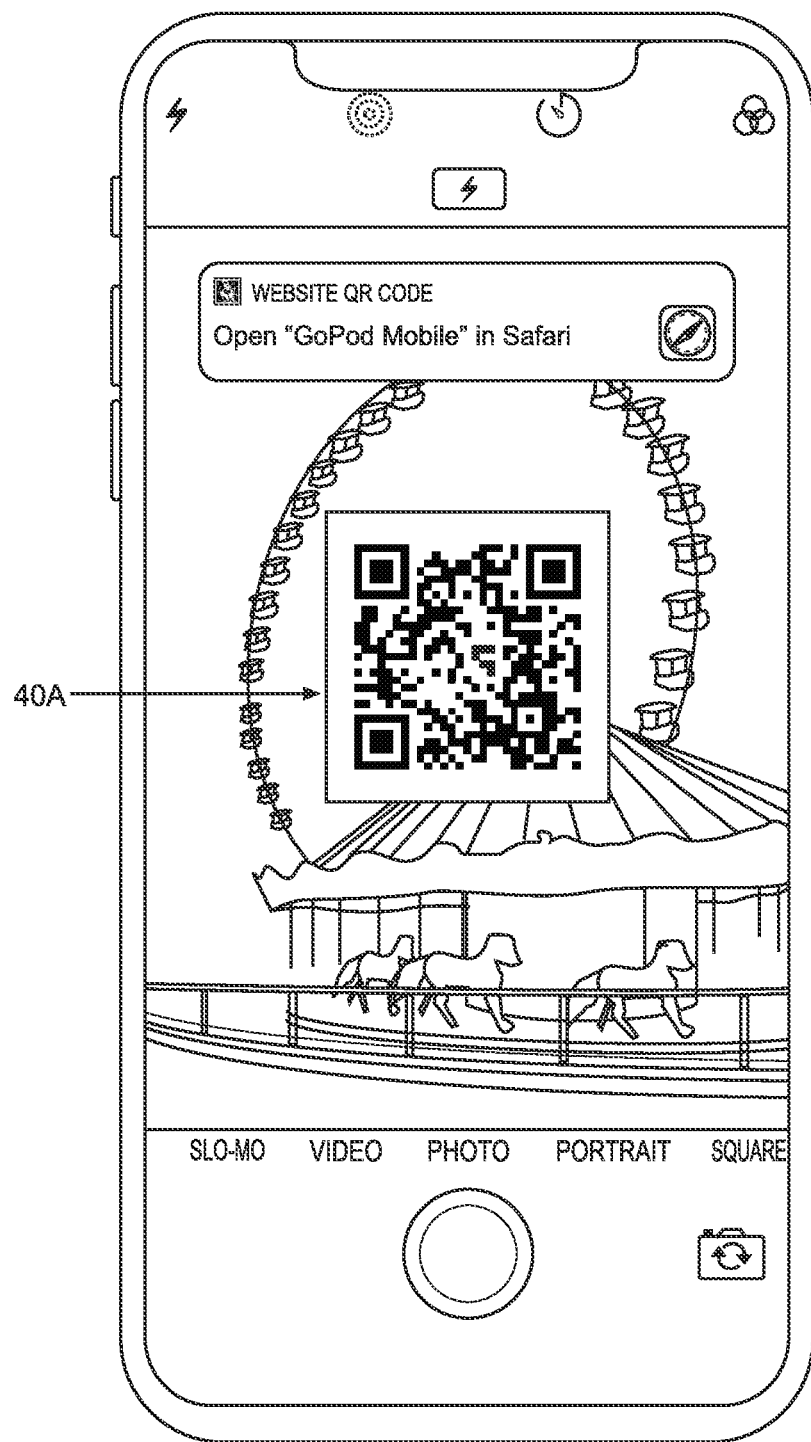
FIG. 30A is a graphical user interface (GUI) screen of the mobile smartphone shown in FIG. 21, deployed on the wireless access control system network of the present invention, and showing the first step in the facility-level access control method of the present invention involving (i) the scanning of a Facility-Level QR Code as shown in FIGS. 29A and 29B, and (ii) automatically directing the smartphone web-browser application (e.g. Apple Safari) to parse and analyze the scanned QR code and serve, load and display the webpage specified by the URL encoded in the Facility-Level QR Code as illustrated in table of FIG. 9, and whereupon, the application server stores a "Rental Transaction Identifier-Facility Entry" (RTI-FE) within the cache on the mobile smartphone.

As indicated in Step A of FIG. 28A, and shown in FIG. 30A, a mobile smartphone 130 deployed on the wireless access control system network 1 is used to practice a facility-level access control method by (i) scanning of a Facility-Level QR Code 40A, and (ii) automatically directing the smartphone web-browser application (e.g. Apple Safari) to parse and analyze the scanned QR code and serve, load and display the webpage specified by the URL encoded in the Facility-Level QR Code, and whereupon, the application server stores a "Rental Transaction Identifier-Facility Entry" (RTI-FE) within the cache on the mobile smartphone.

Figure 30B:
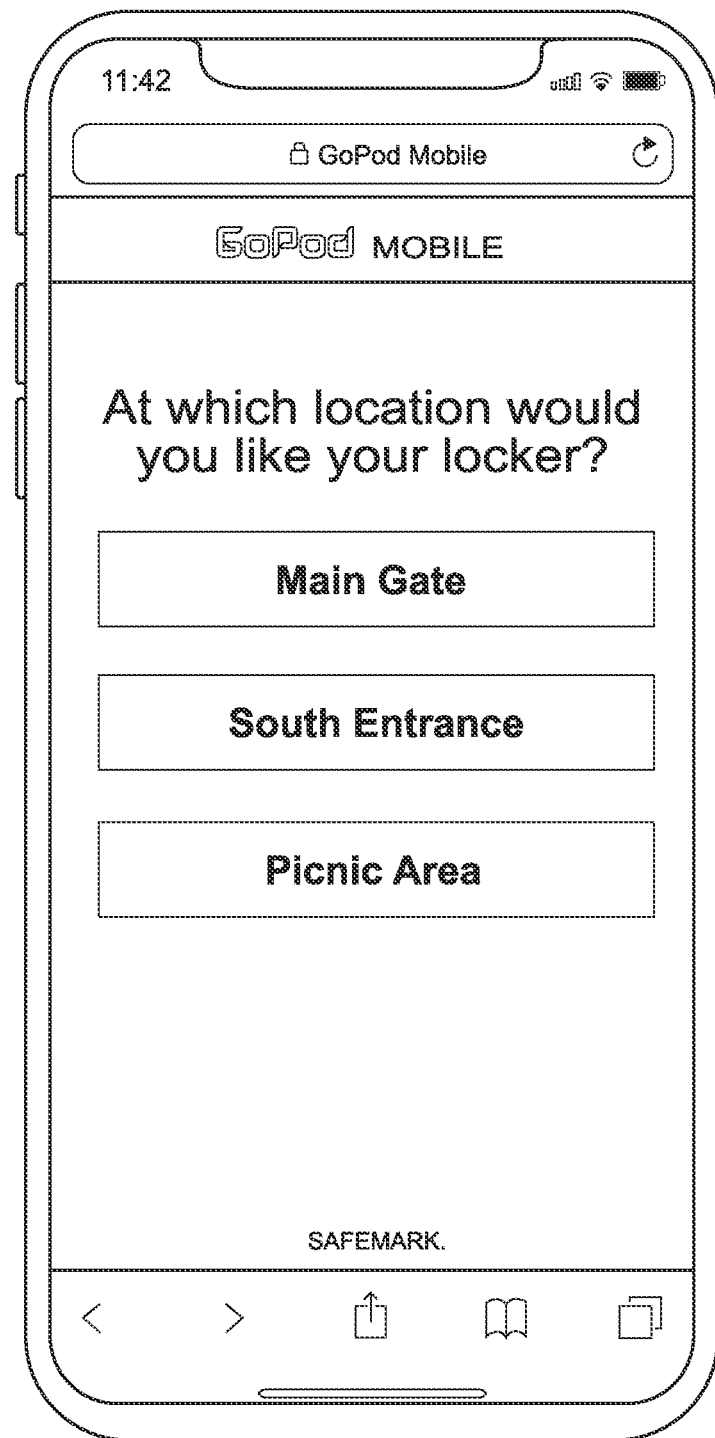
FIG. 30B is a graphical user interface (GUI) screen of the mobile smartphone shown in FIG. 21, deployed on the wireless access control system network of the present invention, and showing the second step in the facility-level access control method of the present invention involving the selection of which Site within the Facility (e.g. amusement park) (e.g. Main Gate, South Entrance, or Picnic Area) where the guest user would like to rent and access a storage locker to store personal belongings.

As indicated in Step B of FIG. 28A, and shown in FIG. 30B, the mobile smartphone 130 deployed on the wireless access control system network is used to practice a facility-level access control method by selecting which Site within the Facility (e.g. Main Gate, South Entrance, or Picnic Area) where the guest user would like to rent and access a storage locker 151 to store personal belongings.

Figure 30C:
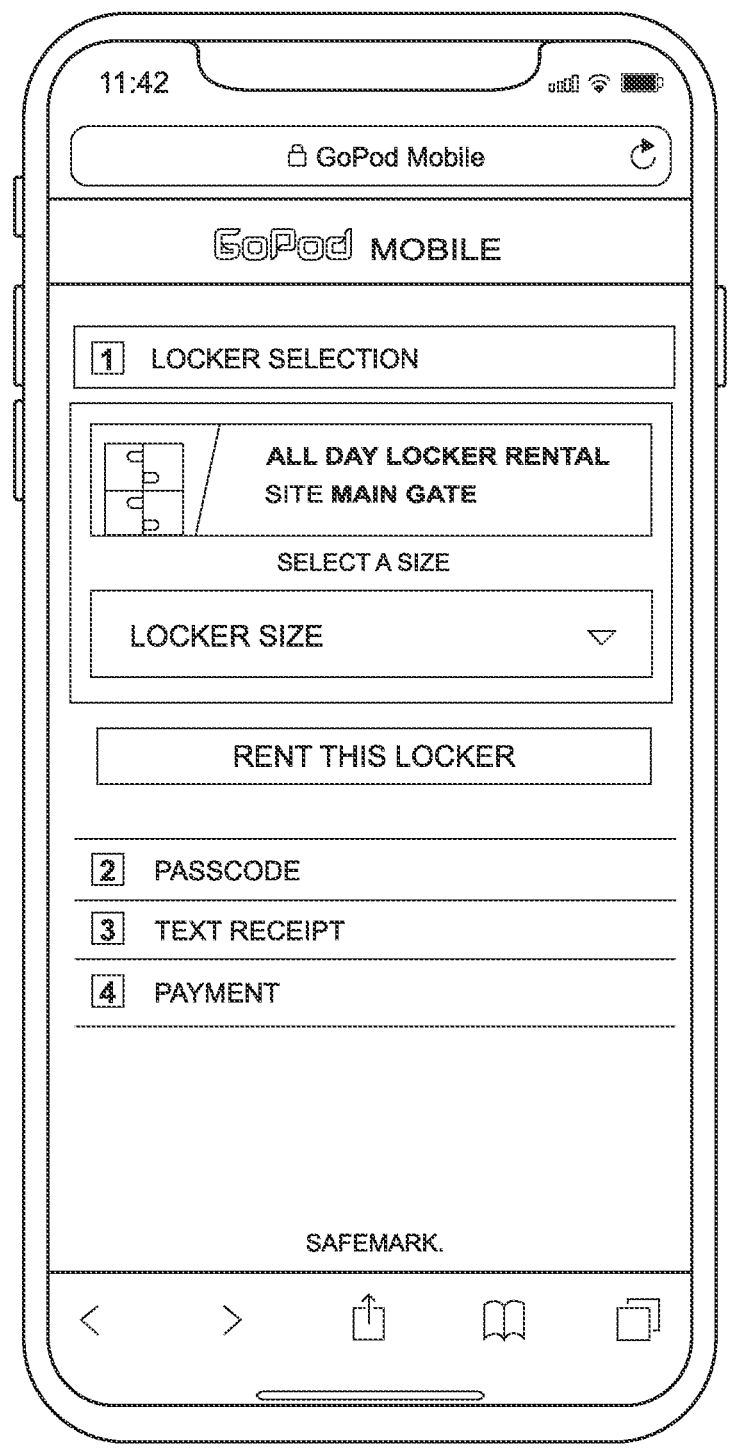
FIG. 30C is a graphical user interface (GUI) screen of the mobile smartphone shown in FIG. 21, deployed on the wireless access control system network of the present invention, and showing the third step in the facility-level access control method of the present invention involving the selection of time/date of the locker rental at the Site within the Facility when would the guest user would like to rent and access to store personal belongings.

As indicated in Step C of FIG. 28B, and shown in FIG. 30C, the mobile smartphone 130 deployed on the wireless access control system network 1 is used to practice a facility-level access control method by selecting the time/date of the locker rental at the Site within the Facility when would the guest user would like to rent and access to store personal belongings.

Figure 30D:
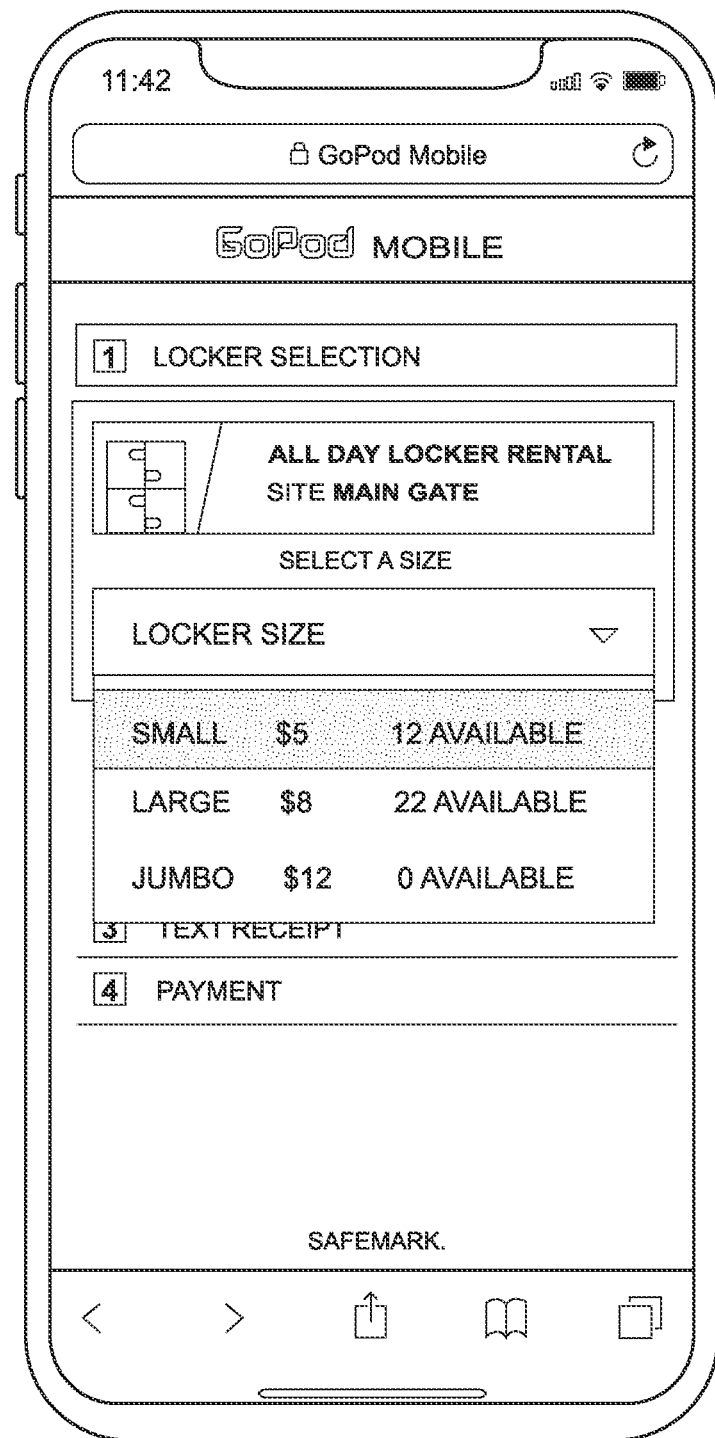
FIG. 30D is a graphical user interface (GUI) screen of the mobile smartphone shown in FIG. 21, deployed on the wireless access control system network of the present invention, and showing the fourth step in the facility-level access control method of the present invention involving the selection of locker size (e.g. small, large, jumbo) at the selected Site within the Facility which the guest user would like to rent and access to store personal belongings.

As indicated in Step D of FIG. 28B, and shown in FIG. 30D a mobile smartphone deployed on the wireless access control system network 1 is used to practice a facility-level access control method by selecting the locker size (e.g. small, large, jumbo) at the selected Site within the Facility which the guest user would like to rent and access to store personal belongings.

Figure 30E:
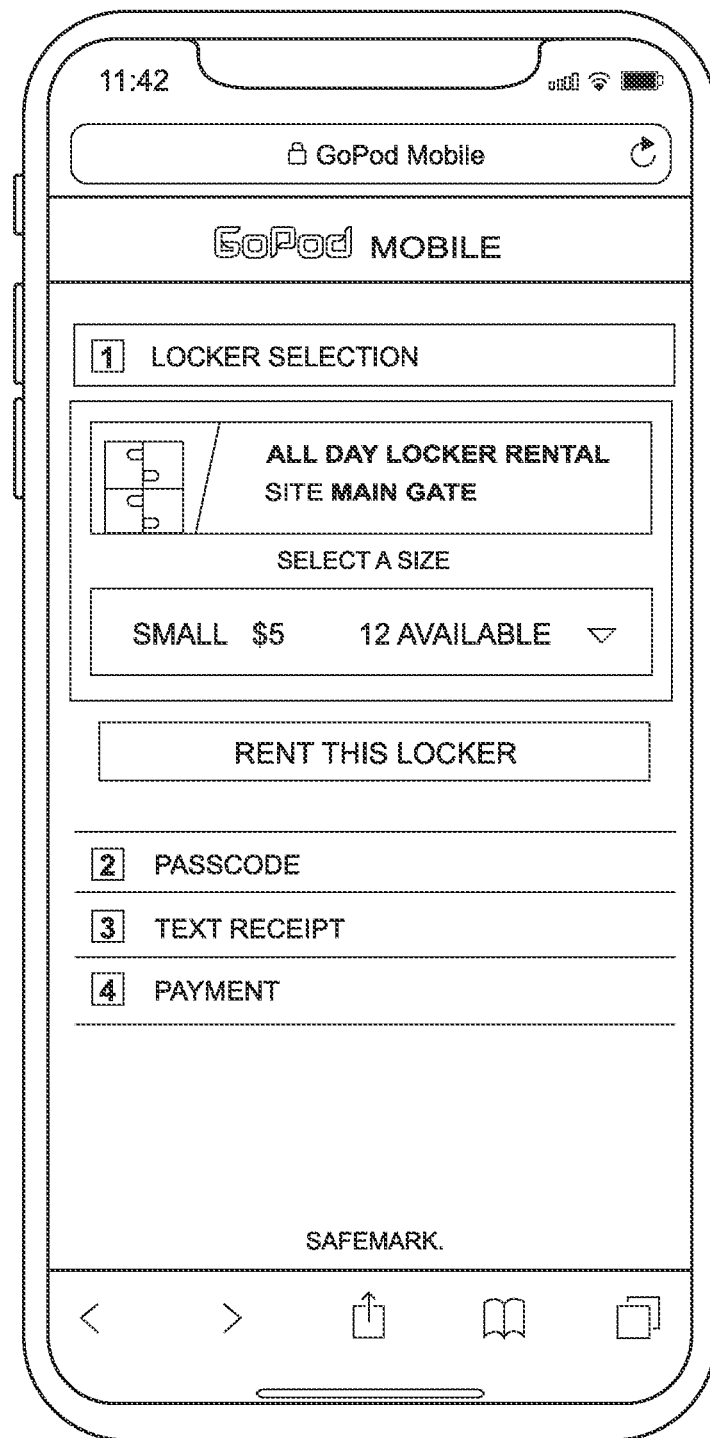
FIG. 30E is a graphical user interface (GUI) screen of the mobile smartphone shown in FIG. 21, deployed on the wireless access control system network of the present invention, and showing the fifth step in the facility-level access control method of the present invention involving the guest user requesting to rent the locker previously specified by the site, time/date, and locker size selected by the guest within the Facility, while displaying the price of the locker rental and availability at the time of the rental offer (prior to acceptance and order placement)

As indicated in Step E of FIG. 28B, and shown in FIG. 30E, the mobile smartphone 130 deployed on the wireless access control system network 1 is used to practice a facility-level access control method by the guest user requesting to rent the locker previously specified by the site, time/date, and locker size selected by the guest within the Facility, while displaying the price of the locker rental and availability at the time of the rental offer (prior to acceptance and order placement).

Figure 30F:
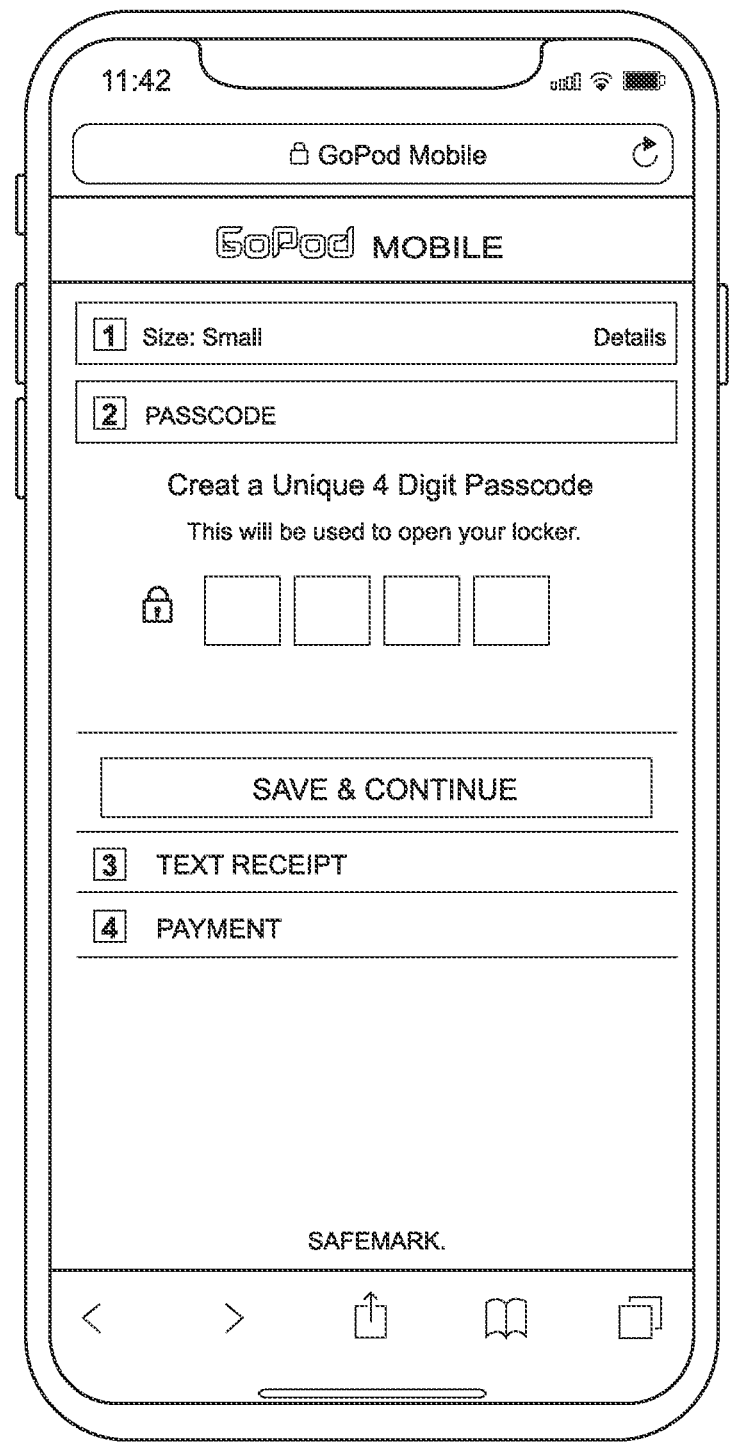
FIG. 30F is a graphical user interface (GUI) screen of the mobile smartphone shown in FIG. 21, deployed on the wireless access control system network of the present invention, and showing the sixth step in the facility-level access control method of the present invention involving the user's selection of four-digit passcode for use in opening the rental locker, and selecting SAVE and CONTINUE to save the request in the RDBMS of the wireless access control system network.

As indicated at Step F of FIG. 28B, and shown in FIG. 30F, the mobile smartphone 130 deployed on the wireless access control system network is used to practice a facility-level access control method by the user's selection of four-digit passcode for use in opening the rental locker, and selecting SAVE and CONTINUE to save the request in the RDBMS of the wireless access control system network.

Figure 30G:
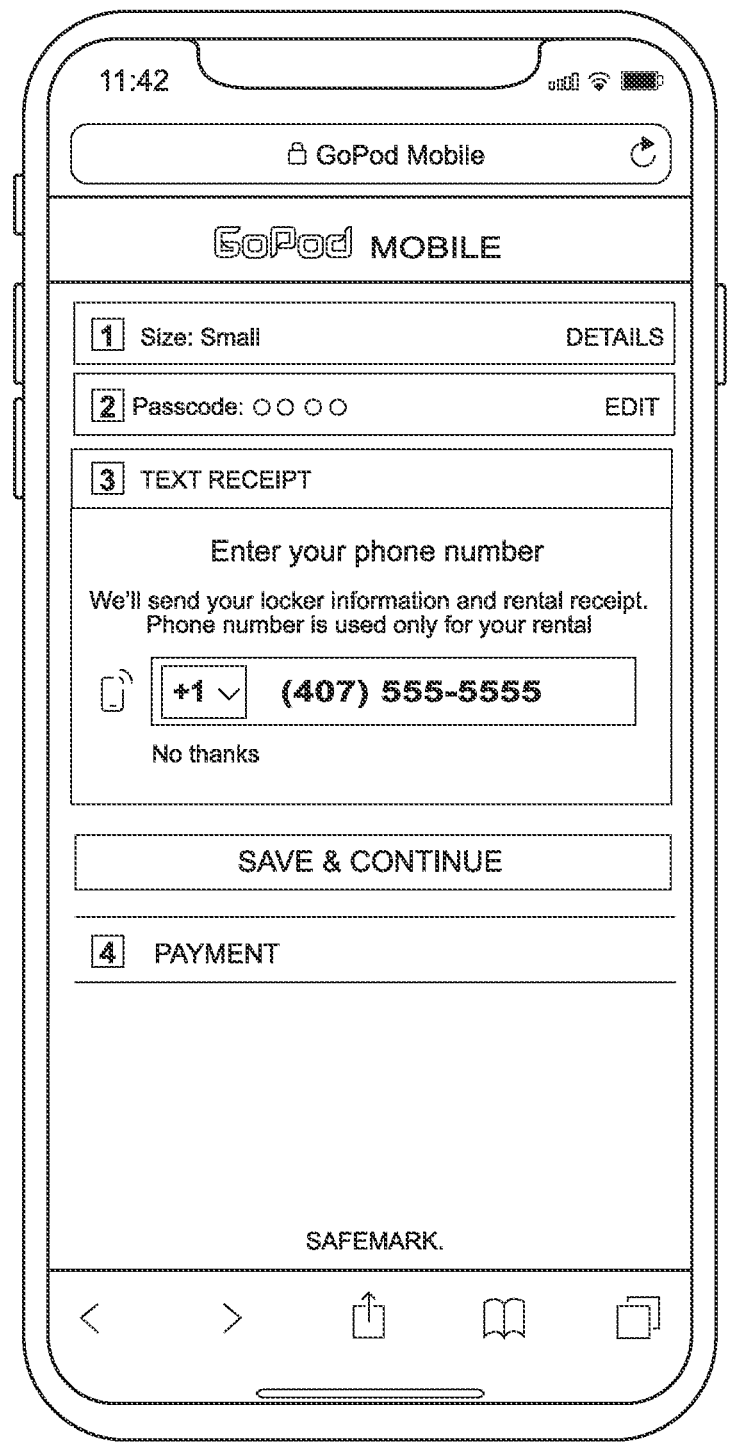
FIG. 30G is a graphical user interface (GUI) screen of the mobile smartphone shown in FIG. 21, deployed on the wireless access control system network of the present invention, and showing the seventh step in the facility-level access control method of the present invention displaying the selected locker size and user passcode, and involving entering the guest's phone number to which the system network will transmit locker information and rental receipt via SMS/text once the user enters the phone number information and selects SAVE and CONTINUE, to initiate the web-based transaction between the web-enabled mobile phone and the system's web-enabled e-commerce-supported locker access control servers maintained at the data center.

As indicated in Step G of FIG. 28B, and shown in FIG. 30G the mobile smartphone 130 deployed on the wireless access control system network 1 is used to practice a facility-level access control method by displaying the selected locker size and user passcode, and entering the guest's phone number to which the system network will transmit locker information and rental receipt via SMS/text once the user enters the phone number information and selects SAVE and CONTINUE, to initiate the web-based transaction between the web-enabled mobile phone and the system's web-enabled e-commerce-supported locker access control servers maintained at the data center.

Figure 30H:
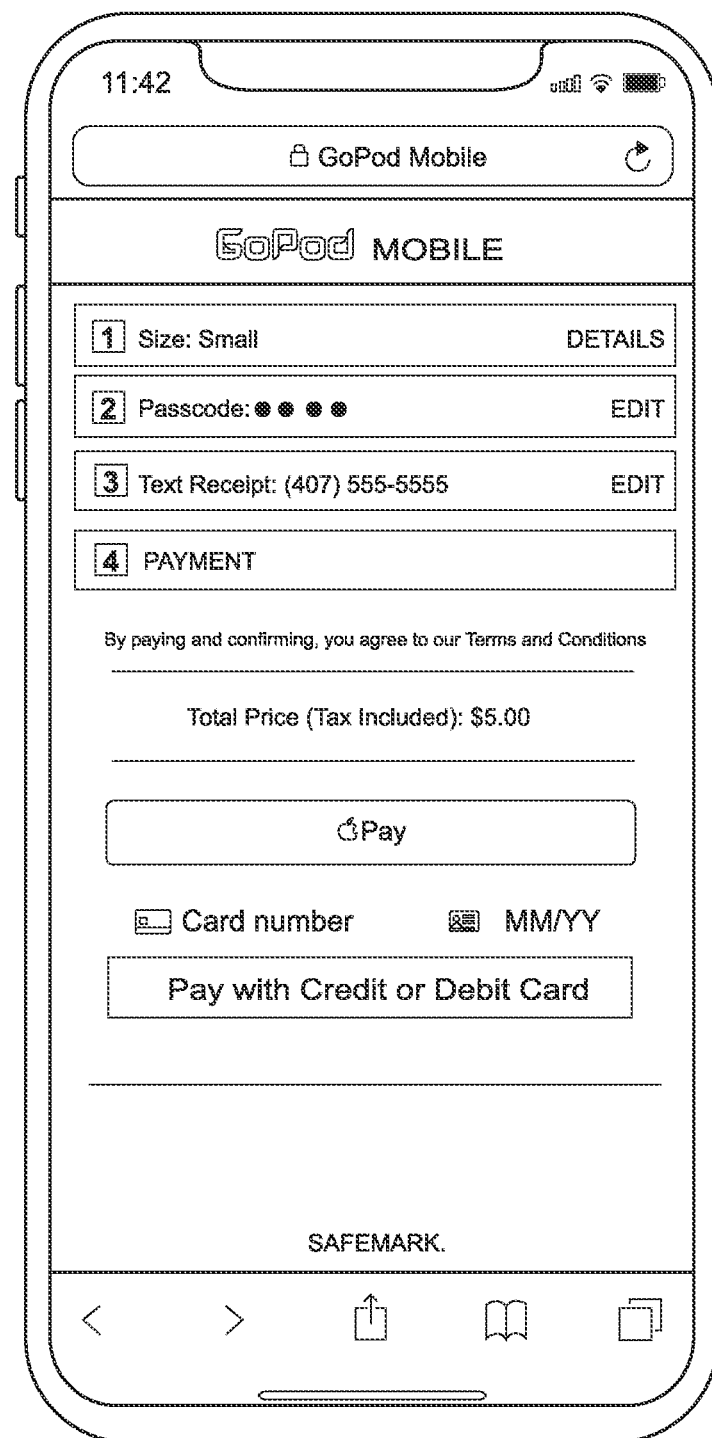
FIG. 30H is a graphical user interface (GUI) screen of the mobile smartphone shown in FIG. 21, deployed on the wireless access control system network of the present invention, and showing the eighth step in the facility-level access control method of the present invention displaying the selected locker size, entered passcode, text receipt phone number, and total price of the locker rental (tax included), and providing several options for the user to make payment (e.g. using ApplePay® or using a credit card or debit card of the user, in which case, the card number and expiration date i.e. month/year are requested)

As indicated in Step H of FIG. 28C, and shown in FIG. 30H the mobile smartphone deployed on the wireless access control system network is used to practice a facility-level access control method by displaying the selected locker size, entered passcode, text receipt phone number, and total price of the locker rental (tax included), and providing several options for the user to make payment (e.g. using ApplePay® or using a credit card or debit card of the user, in which case, the card number and expiration date, i.e. month/year are requested).

Figure 30I:
FIG. 30I is a graphical user interface (GUI) screen of the mobile smartphone shown in FIG. 21, deployed on the wireless access control system network of the present invention, and showing the nineth step in the facility-level access control method of the present invention displaying, after the prior payment transaction has been successfully completed, a message that the locker is ready, along with the selected location MAIN GATE, locker # and passcode, and a message to open the locker at its location, by either scanning the door-level QR code on the locker door, or entering the unique passcode into the locker's keypad (where and as provided)

As indicated in Step I of FIG. 28C, and shown in FIG. 30I the mobile smartphone deployed on the wireless access control system network is used to practice a facility-level access control method by displaying, after the prior payment transaction has been successfully completed, a message that the locker is ready, along with the selected location MAIN GATE, locker # and passcode, and a message to open the locker at its location, by either scanning the door-level QR code on the locker door, or entering the unique passcode into the locker's keypad where and as provided.

Figure 30J:
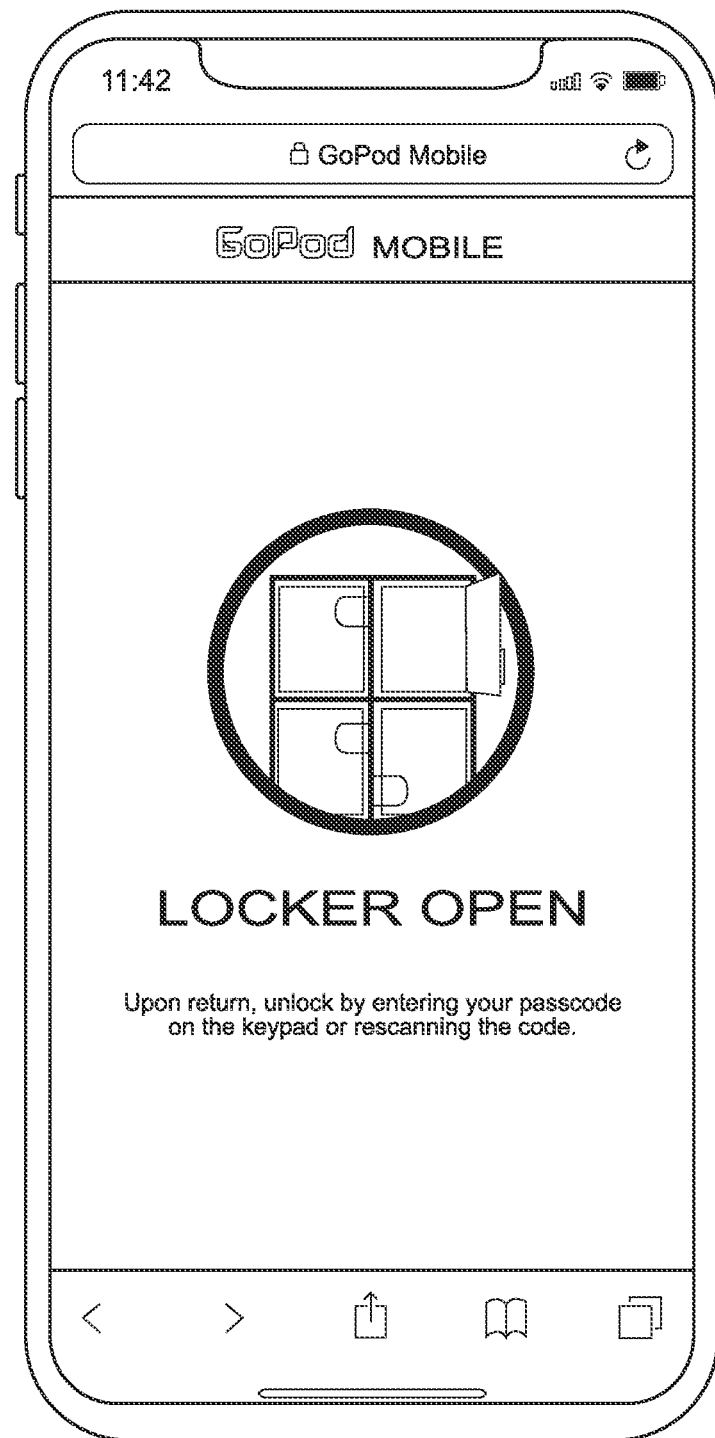
FIG. 30J is a graphical user interface (GUI) screen of the mobile smartphone shown in FIG. 21, deployed on the wireless access control system network of the present invention, and showing the tenth step in the facility-level access control method of the present invention displaying, after scanning the door-level QR code or entering the unique passcode into the locker's keypad, a message that the locker is OPEN (and "upon return, unlock the locker by entering the passcode on the keypad or rescanning the Door-Level QR Code")

As indicated in Step J of FIG. 28C, and shown in FIG. 30J, the mobile smartphone deployed on the wireless access control system network is used to practice a facility-level access control method by displaying, after scanning the door-level QR code or entering the unique passcode into the locker's keypad, a message that the locker is OPEN, and upon return, unlock the locker by entering the passcode on the keypad or rescanning the Door-Level QR Code.

Figure 28D:
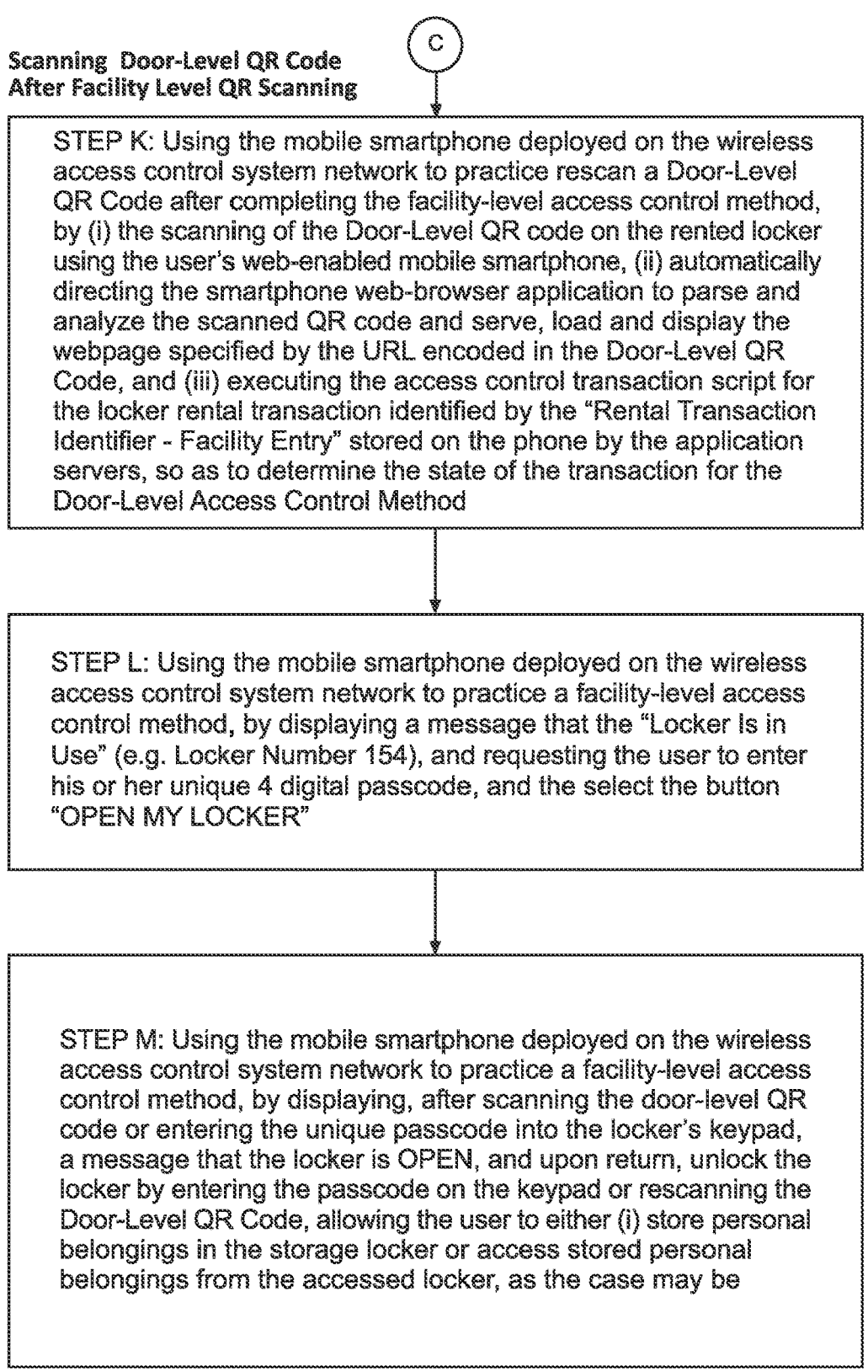

Specification of Method of Managing Access Control to a Networked Storage Locker Within an Amusement Park Enterprise by Scanning a Door-Level QR Code After Scanning a Facility Level QR Code Using a Mobile Smartphone Connected to the Wireless Access Control System Network of the Present Invention FIG. 28D describes the primary steps involved when carrying out the methods of managing access control to a networked locker system by scanning door-level QR codes 40C posted on locker rented at an amusement park facility, using a mobile smartphone 130 wirelessly connected to the wireless access control system network of the present invention 1.

Figure 31:
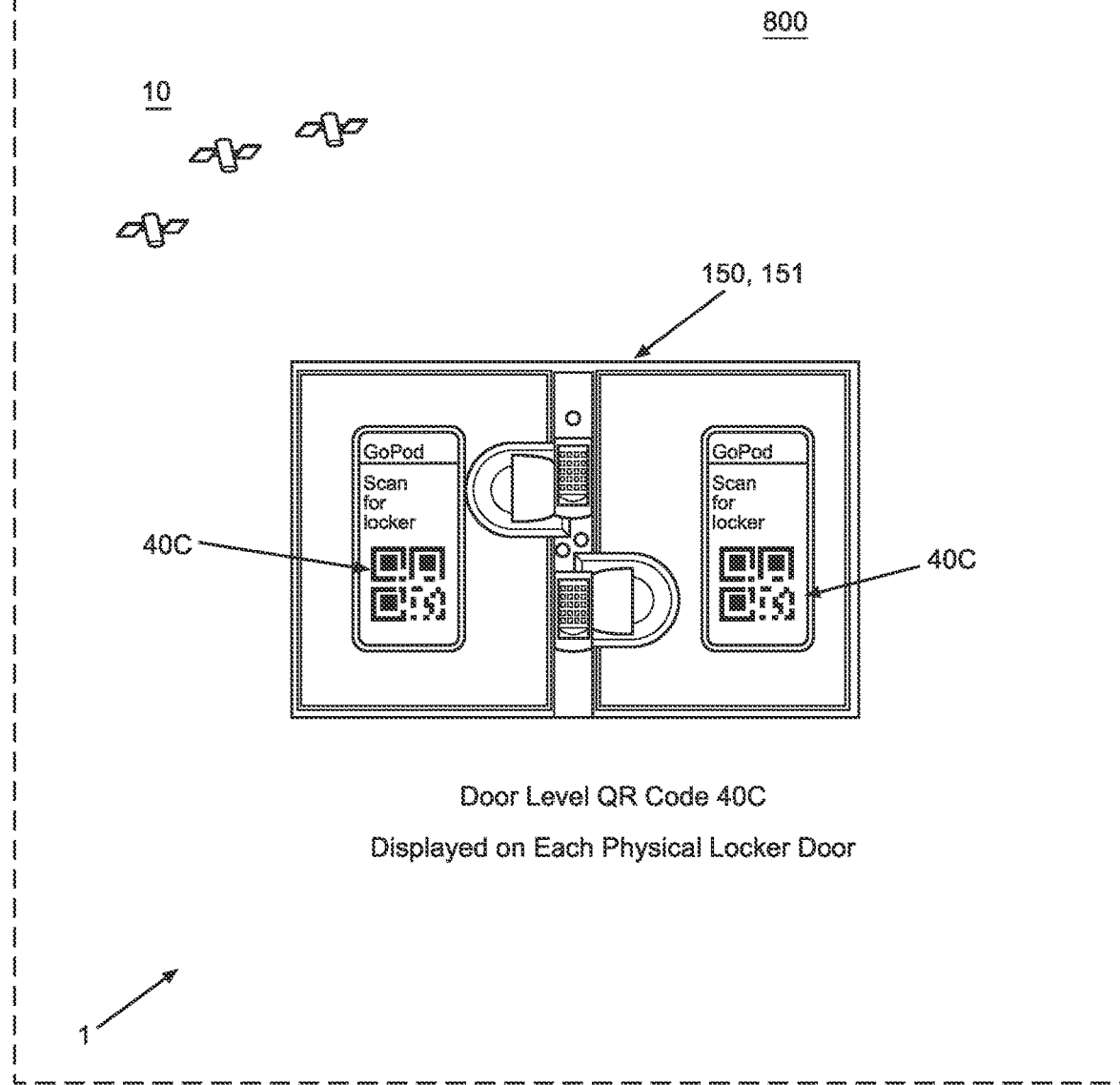
FIG. 31 is a plan view of an exemplary Door-Level QR Code (i.e. a machine-readable code, such as an optically-readable bar code symbol and/or RFID encoded tag component) physically posted or electrically displayed on the front door surface of each locker unit in the GPS-tracked wireless networked locker system illustrated in FIG. 26.

FIG. 31 shows a Door-Level QR Code 40C (i.e. a machine-readable code, such as an optically-readable bar code symbol and/or RFID encoded tag component) physically posted or electrically displayed on the front door surface of each locker unit 151 in the GPS-tracked wireless networked locker system 150 illustrated in FIG. 26.

Figure 32A:
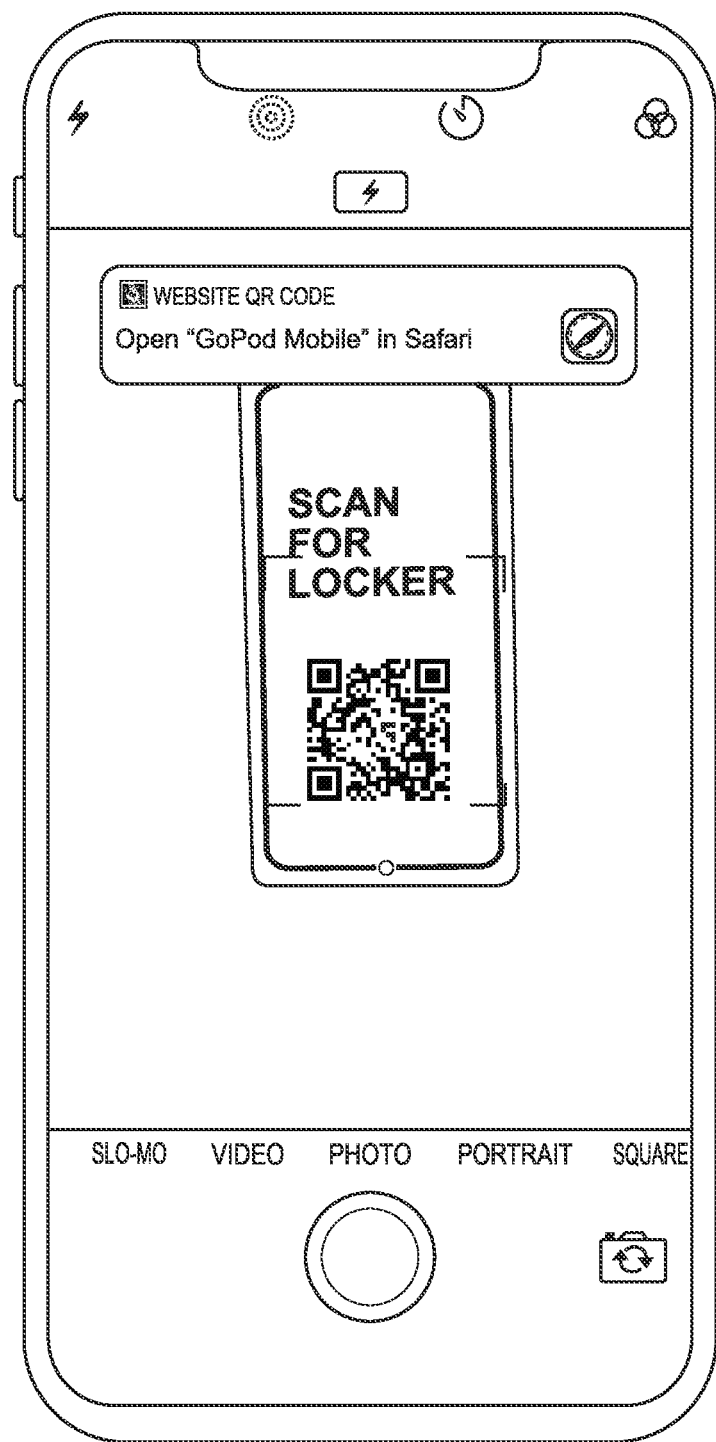
FIG. 32A is a graphical user interface (GUI) screen of the mobile smartphone shown in FIG. 21, deployed on the wireless access control system network of the present invention, and showing the first step in the door-level access control method when entered after completing the facility-level access control method described in FIGS. 31A through 30J, involving (i) the scanning of the Door-Level QR code on the rented locker using the user's web-enabled mobile smartphone, as shown in FIGS. 29A and 29B, (ii) automatically directing the smartphone web-browser application (e.g. Apple Safari) to parse and analyze the scanned QR code and serve, load and display the webpage specified by the URL encoded in the Door-Level QR Code as illustrated in table of FIG. 9, and (iii) executing the access control transaction script for the locker rental transaction identified by the "Rental Transaction Identifier-Facility Entry" stored on the phone by the application servers, so as to determine the state of the transaction for the Door-Level Access Control Method.
Figure 32B:
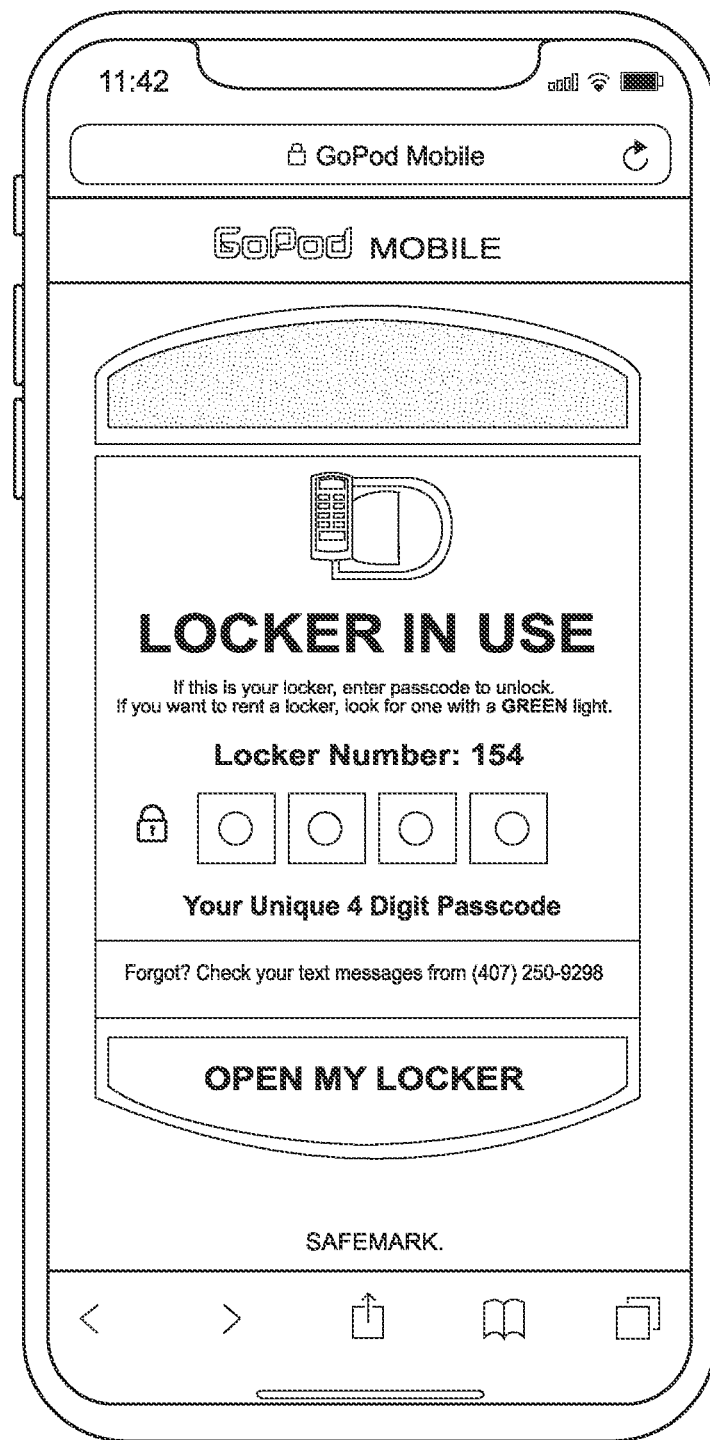
FIG. 32B is a graphical user interface (GUI) screen of the mobile smartphone shown in FIG. 21, deployed on the wireless access control system network of the present invention, and showing the second step in the door-level access control method of the present invention displaying a message that the "Locker Is in Use" (e.g. Locker Number 154), and requesting the user to enter his or her unique 4 digital passcode, and the select the button "OPEN MY LOCKER"
Figure 32C:
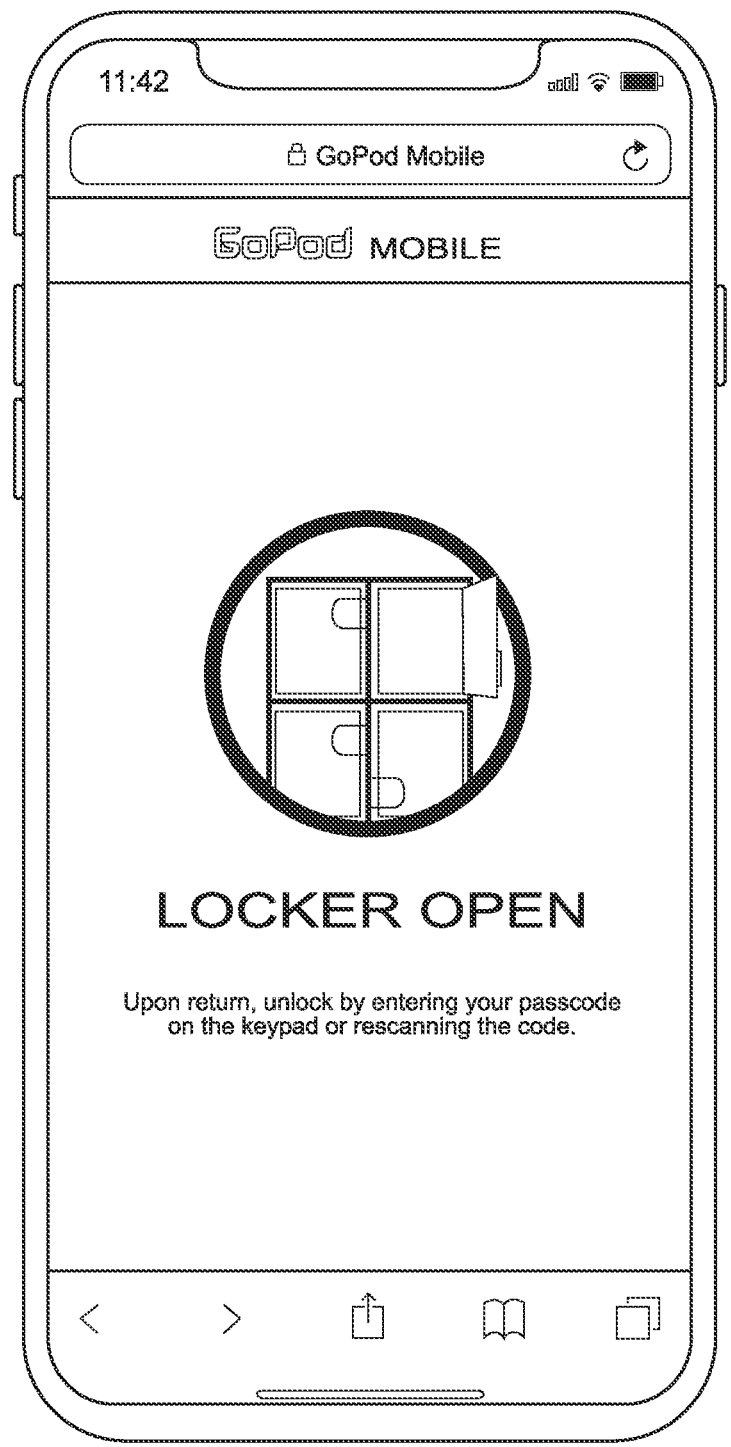
FIG. 32C is a graphical user interface (GUI) screen of the mobile smartphone shown in FIG. 21, deployed on the wireless access control system network of the present invention, and showing the third step in the door-level access control method displaying, after scanning the door-level QR code or entering the unique passcode into the locker's keypad, a message that the locker is OPEN (and "upon return, unlock the locker by entering the passcode on the keypad or rescanning the Door-Level QR Code"), allowing the user to either (i) store personal belongings in the storage locker or access stored personal belongings from the accessed locker, as the case may be.

The method described and illustrated in FIG. 28D is supported by the GUI screens shown in FIG. 32A through 32C.

As indicated in Step K of FIG. 28D, and shown in FIG. 32A, a mobile smartphone 130 deployed on the wireless access control system network is used to scan a Door-Level QR Code 40C after scanning a facility-level QR Code 40A, by (i) the scanning of the Door-Level QR code 40C on the rented locker using the user's web-enabled mobile smartphone, (ii) automatically directing the smartphone web-browser application to parse and analyze the scanned QR code and serve, load and display the webpage specified by the URL encoded in the Door-Level QR Code 40C, and (iii) executing the access control transaction script for the locker rental transaction identified by the "Rental Transaction Identifier-Facility Entry" stored on the phone by the application servers, so as to determine the state of the transaction for the Door-Level Access Control Method.

As indicated at Step L of FIG. 28D, and shown in FIG. 32B, the mobile smartphone 130 deployed on the wireless access control system network is used to practice a facility-level access control method, by displaying a message that the "Locker Is in Use" (e.g. Locker Number 154), and requesting the user to enter his or her unique 4 digital passcode, and the select the button "OPEN MY LOCKER".

As indicated at Step M of FIG. 28D, and shown in FIG. 32C, the mobile smartphone 130 deployed on the wireless access control system network is used to practice a facility-level access control method, by displaying, after scanning the door-level QR code 40C or entering the unique passcode into the locker's keypad, a message that the locker is OPEN, and upon return, unlock the locker by entering the passcode on the keypad or rescanning the Door-Level QR Code 40C, allowing the user to either (i) store personal belongings in the storage locker or access stored personal belongings from the accessed locker 151, as the case may be.

The above-described machine-readable code-driven access control method of the present invention shows how it is now possible to enable wireless rental, access and control to a specified locker (151) in a GPS-specified networked locker system 150 using a web-enabled smartphone 130, to read a Door-Level machine-readable (QR) code symbol to automatically initiate direct communication with the web-based communication/application/database servers maintained with the data center 12 of the wireless system network 1, and conduct the supporting web-based transaction. Each time the code symbol is scanned and the guest user seeks to open a rented locker, as well as an unavailable locker, transaction records of such events are recorded in the RDBMS of the data center 12.

However, during emergencies, when electrical power and/or Internet connectivity are disrupted, the system and method of the present invention allows the guest user to directly enter his or her digital password (e.g. PIN) into the keypad 158 provided on the rented locker unit 151, and locally operate its lock controller (provided with local battery power backup) and where the digital password (PIN) is stored in local memory 153 of the locker unit 151, as shown in FIG. 14, by the system network servers within the data center 12 during the web-based rental, access and control method of the present invention. This inventive feature allows the guest to unlock the electronically-controlled lock unit in locker unit 151, and open the locker door and access one's personal belongings while the locker system is disconnected from the Internet infrastructure and/or during local power disruptions. Details regarding this back-up local access method are disclosed in U.S. Pat. No. 8,990,110, US Patent Application No. US2019/0035186, incorporated herein by reference.

Also, during emergencies, when electrical power and/or Internet connectivity are disrupted, the system and method of the present invention also allows the guest user to locally communicate with the locker controller, through its network adapter and antennas (e.g. using Bluetooth and/or WIFI protocols), to establish a communication session between the mobile smartphone 130 and the rented locker unit 151, and then enter the guest's digital locker password (i.e. PIN) via the virtual keypad (GUI screen) on the mobile smartphone 130, to locally operate its lock controller (provided with local battery power backup), and where the digital password (PIN) is stored in local memory 153 of the locker unit 151, as shown in FIG. 14, by the system network servers within the data center 12 during the web-based rental, access and control method of the present invention. This inventive feature allows the guest to unlock the electronically-controlled lock unit of a rented locker unit 151, and open the locker door and access one's personal belongings while the locker system is disconnected from the Internet infrastructure and/or during local power disruptions.

Figure 33B:
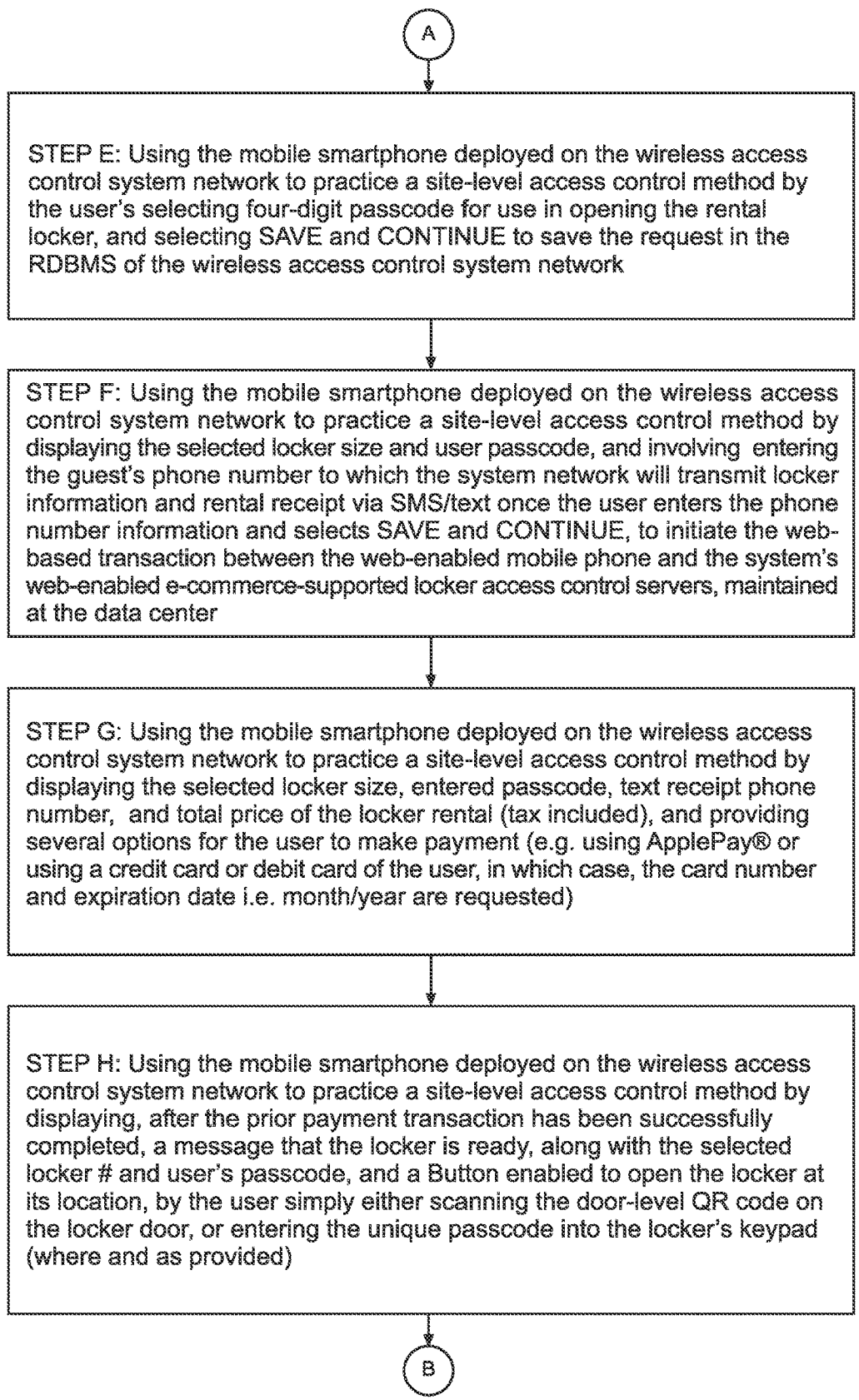
Figure 33C:
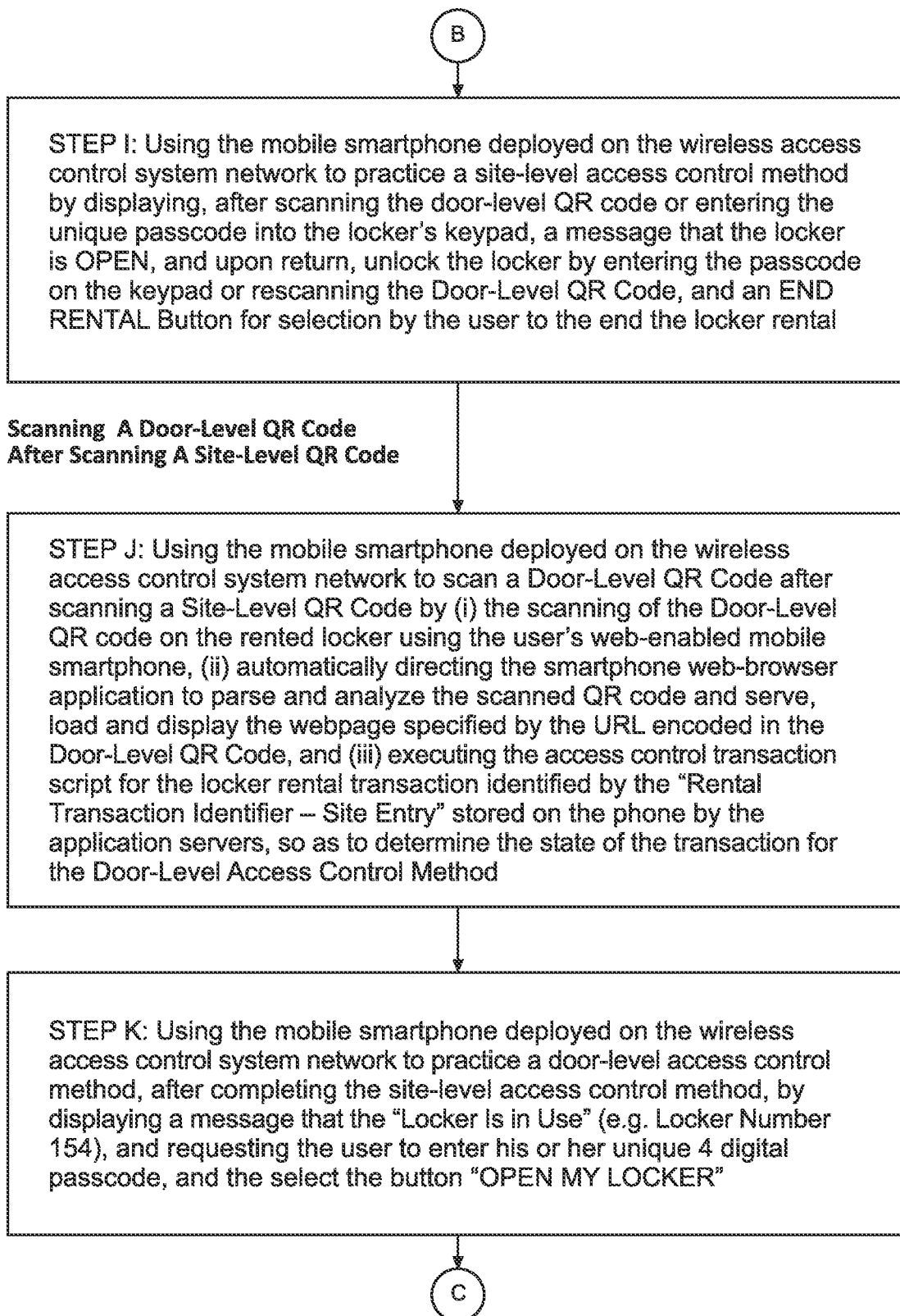

Specification of the Method of Managing Access Control to a Networked Locker System by Scanning Site-Level QR Codes Posted at a Particular Site in an Amusement Park Facility, Using a Mobile Smartphone Wireless Connected to the Wireless Access Control System Network of the Present Invention FIGS. 33A, 33B, and 33C describe the primary steps involved when carrying out the method of managing access control to a networked locker system by scanning site-level QR codes 40B posted at a particular Site in an amusement park facility, using a mobile smartphone wireless connected to the wireless access control system network of the present invention.

Figure 34A:
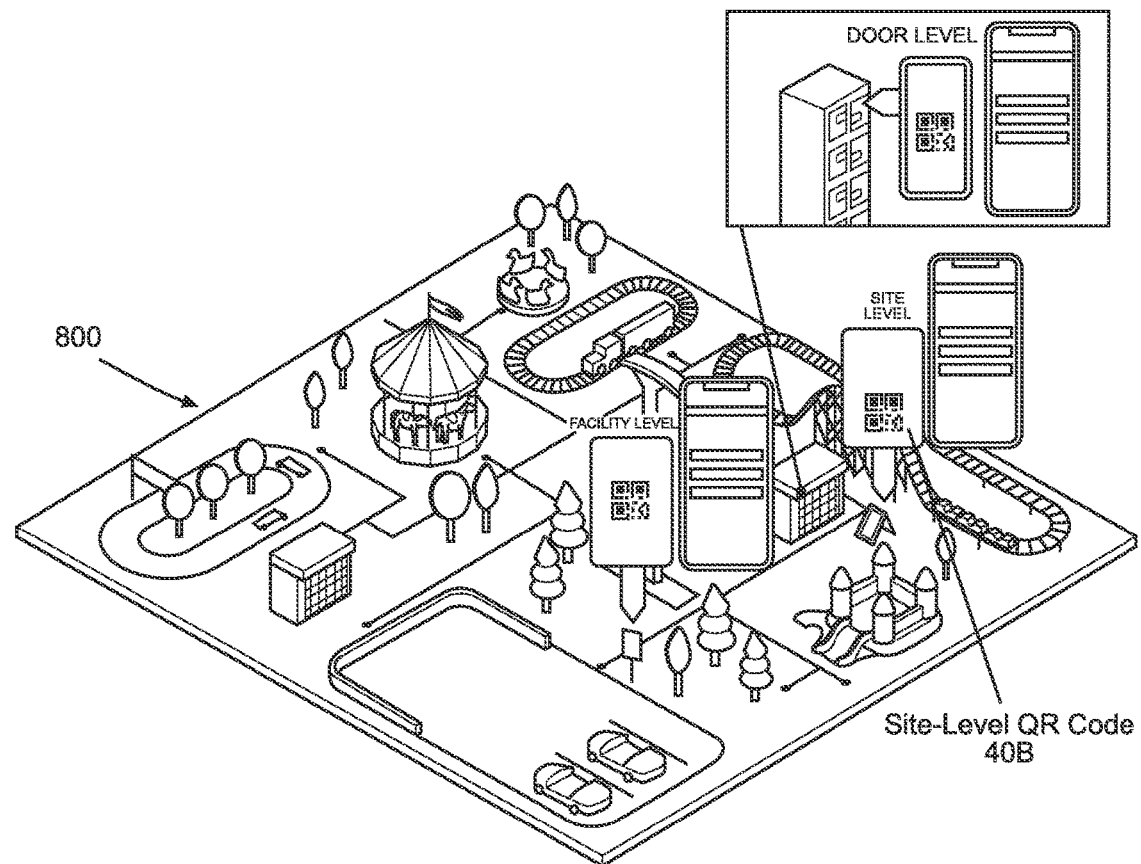
FIG. 34A is a schematic illustrating showing a perspective view of an amusement park facility, with a sign posted at a Site in the park, displaying a Site-Level QR code as shown in FIG. 34B, which upon scanning with a web-enabled mobile smartphone is engineered to direct the guest user to a web-based e-commerce-enabled locker rental and access control transaction having a narrowed scope of services within the facility, and allowing guest users to select a storage locker, mobility solution or other service at the Site within the amusement park, and then allow the wireless system network to automatically assign an available locker, mobility solution or service to the guest at the selected Site.
Figure 34B:
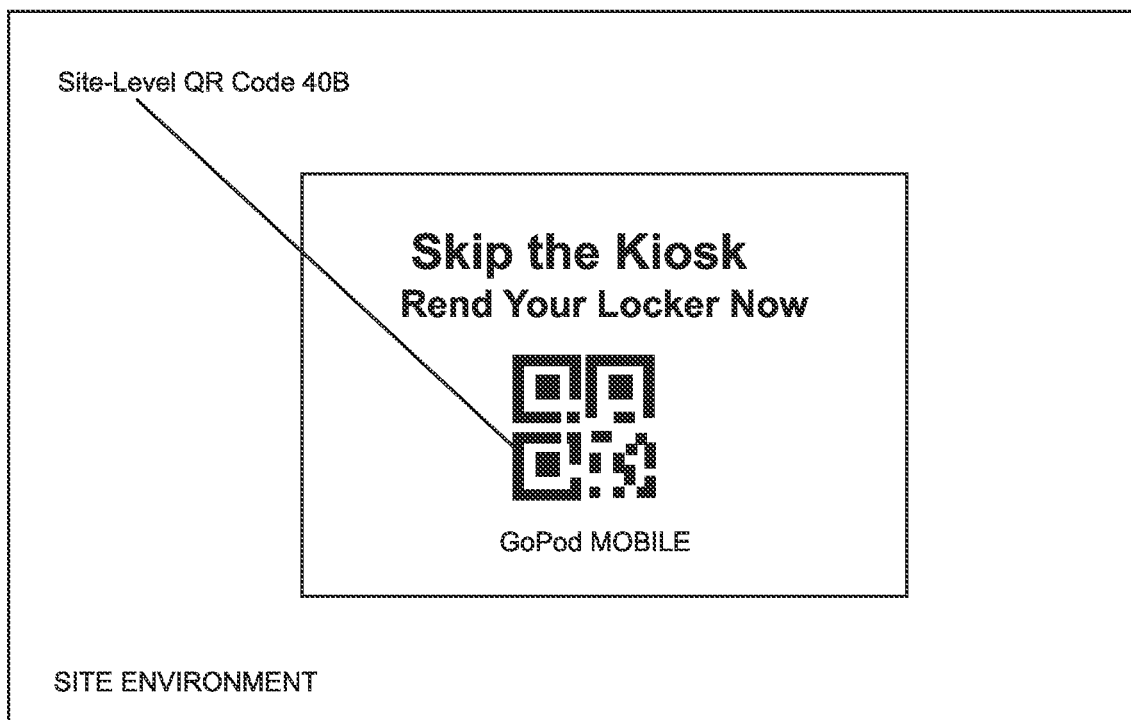
FIG. 34B is an enlarged view of the Site-Level QR Code posted at a Site within the amusement park illustrated in FIG. 34A, wherein at the Site Level, the user is able to scan a Site-Level QR code that is intelligently assigned to that Site location, and users will select a size of the storage locker (or type of mobility solution desired or required), and the wireless system network will automatically assign an available locker to the user (or an available vehicle, wheelchair or stroller to the user) at that Site, as the case may be.

FIG. 34A illustrates an amusement park facility, with a sign posted at a Site in the park, displaying a Site-Level QR code 40B as shown in FIG. 34B which, upon scanning with a web-enabled mobile smartphone 130, is engineered to direct the guest user to a web-based e-commerce-enabled locker rental and access control transaction having a narrowed scope of services within the facility. This allows guest users to select a storage locker, mobility solution or other service at the Site within the amusement park, and then allow the wireless system network to automatically assign an available locker, mobility solution or service to the guest at the selected Site. FIG. 34B shows and enlarged view of the Site-Level QR Code 40B posted at a Site within the amusement park illustrated in FIG. 34A, wherein at the Site Level, the user is able to scan a Site-Level QR code 40B that is intelligently assigned to that Site location, and users will select a size of the storage locker (or type of mobility solution desired or required), and the wireless system network will automatically assign an available locker to the user (or an available vehicle, wheelchair or stroller to the user) at that Site, as the case may be.

The method described and illustrated in FIGS. 33A through 33C is supported by the GUI screens shown in FIGS. 35A through 35I.

Figure 35A:
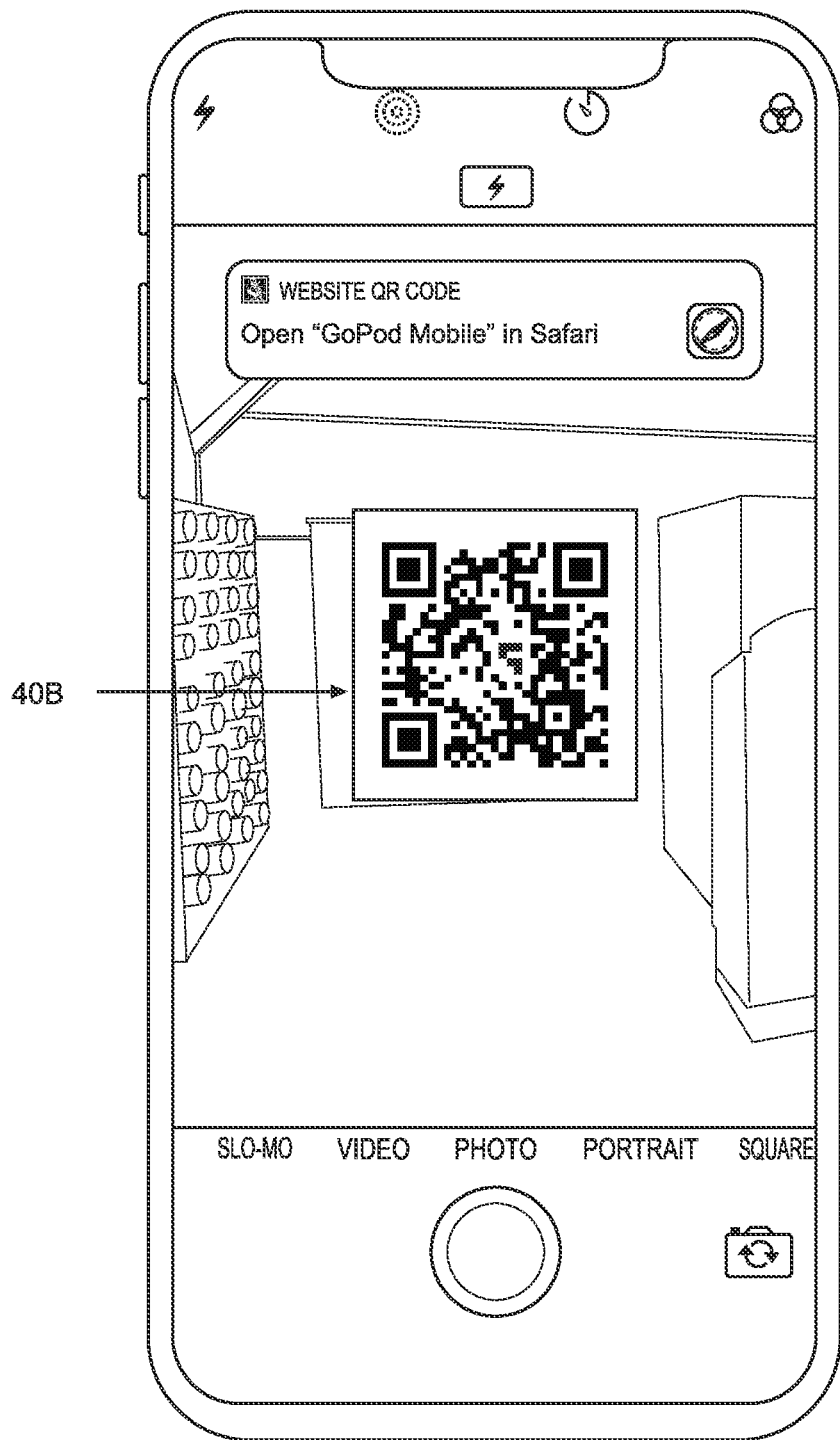
FIG. 35A is a graphical user interface (GUI) screen of the mobile smartphone shown in FIG. 21, deployed on the wireless access control system network of the present invention, and showing the first step in the site-level access control method of the present invention involving (i) the scanning of a Site-Level QR Code as shown in FIGS. 43A and 43B, and (ii) automatically directing the smartphone web-browser application (e.g. Apple Safari) to parse and analyze the scanned QR code and serve, load and display the webpage specified by the URL encoded in the Site-Level QR Code as illustrated in table of FIG. 9, and whereupon, the application server stores a "Rental Transaction Identifier-Site-Entry" (RTI-SE) within the cache on the mobile smartphone.

As indicated at Step A of FIG. 33A, and as shown in FIG. 35A, a mobile smartphone 130 deployed on the wireless access control system network 1 is used to practice a site-level access control method by (i) the scanning of a Site-Level QR Code 40B, and (ii) automatically directing the smartphone web-browser application to parse and analyze the scanned QR code and serve, load and display the webpage specified by the URL encoded in the Site-Level QR Code, and whereupon, the application server stores a "Rental Transaction Identifier-Site-Entry" (RTI-SE) within the cache on the mobile smartphone.

Figure 35B:
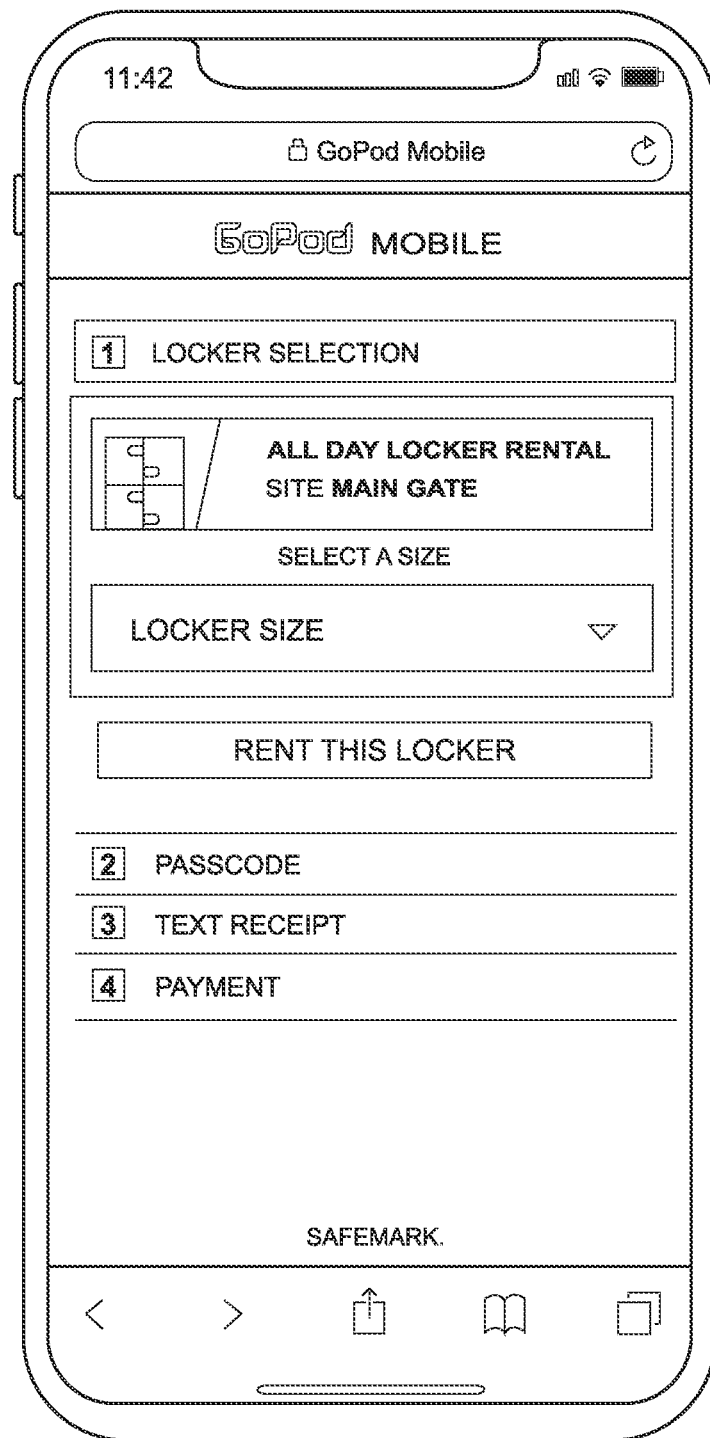
FIG. 35B is a graphical user interface (GUI) screen of the mobile smartphone shown in FIG. 21, deployed on the wireless access control system network of the present invention, and showing the second step in the site-level access control method of the present invention involving the selection of time/date of the locker rental at the Site within the Facility when would the guest user would like to rent and access to store personal belongings.

As indicated at Step B of FIG. 33A, and as shown in FIG. 35B, the mobile smartphone 130 deployed on the wireless access control system network 1 is used to practice a site-level access control method by selecting the time/date of the locker rental at the Site within the Facility when would the guest user would like to rent and access to store personal belongings.

Figure 35C:
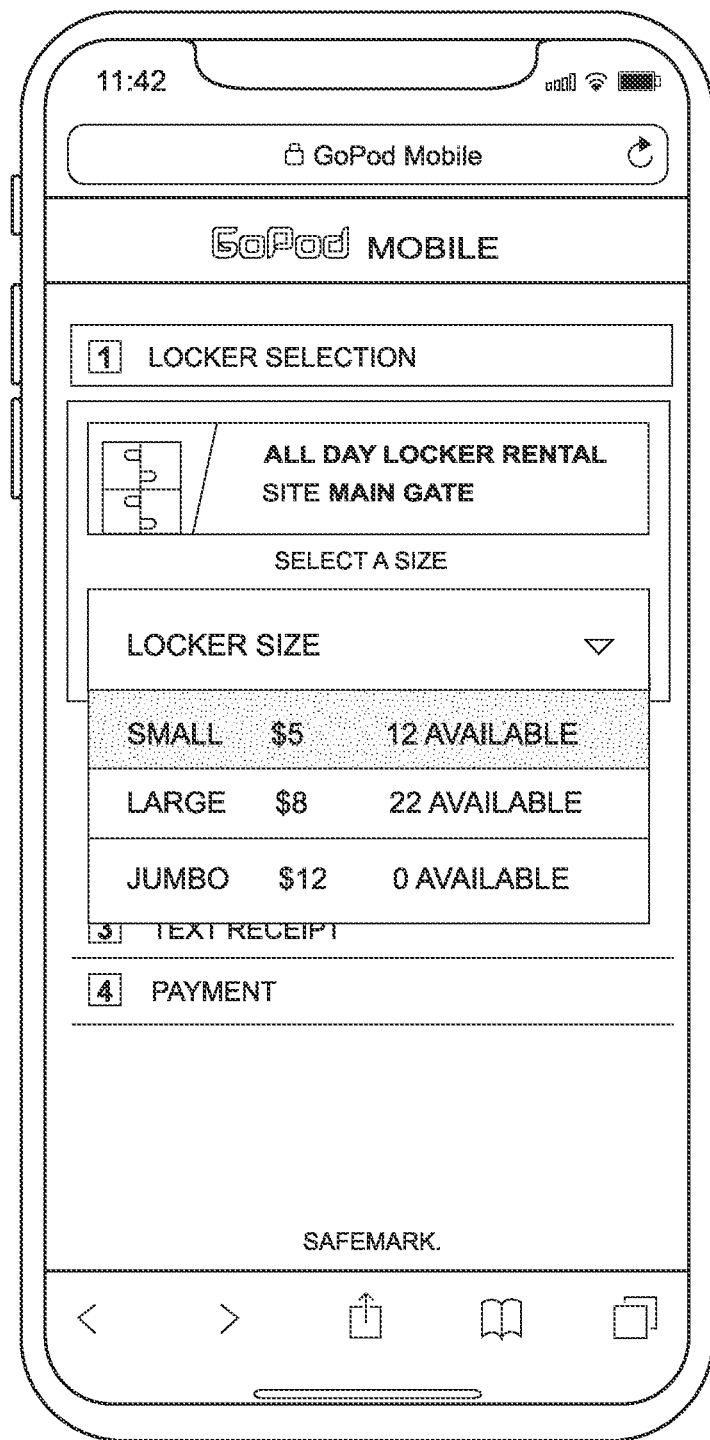
FIG. 35C is a graphical user interface (GUI) screen of the mobile smartphone shown in FIG. 21, deployed on the wireless access control system network of the present invention, and showing the third step in the site-level access control method of the present invention involving the selection of locker size (e.g. small, large, jumbo) at the selected Site within the Facility which the guest user would like to rent and access to store personal belongings.

As indicated at Step C of FIG. 33C, and as shown in FIG. 35C, the mobile smartphone 130 deployed on the wireless access control system network is used to practice a site-level access control method by selecting the locker size (e.g. small, large, jumbo) at the selected Site within the Facility which the guest user would like to rent and access to store personal belongings.

Figure 35D:
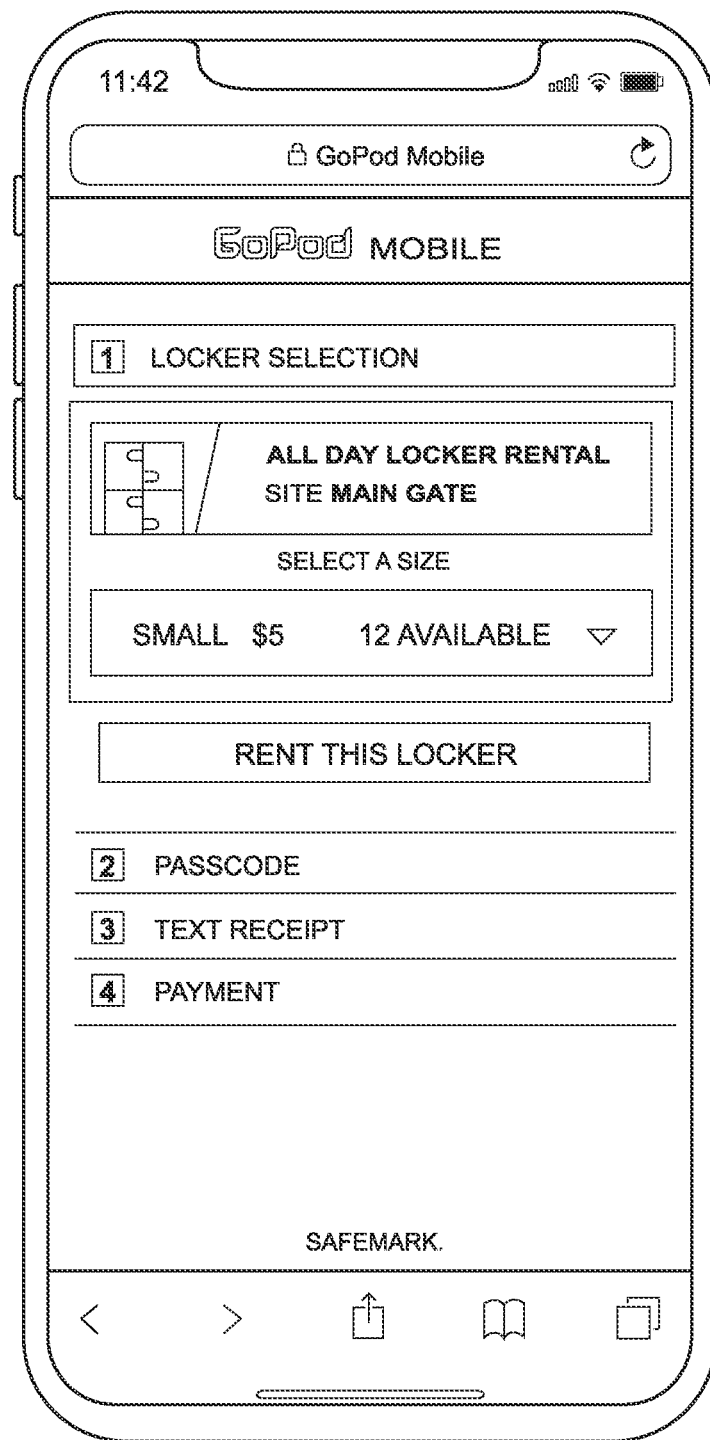
FIG. 35D is a graphical user interface (GUI) screen of the mobile smartphone shown in FIG. 21, deployed on the wireless access control system network of the present invention, and showing the fourth step in the site-level access control method of the present invention involving the guest user requesting to "Rent This Locker" previously specified by the Site, time/date, and locker size selected by the guest at the Site, while displaying the price of the locker rental and availability at the time of the rental offer (prior to acceptance and order placement)

As indicated at Step D of FIG. 33A, and as shown in FIG. 35D, the mobile smartphone 130 deployed on the wireless access control system network 1 is used to practice a site-level access control method by the guest user requesting to "Rent This Locker" previously specified by the Site, time/date, and locker size selected by the guest at the Site, while displaying the price of the locker rental and availability at the time of the rental offer (prior to acceptance and order placement).

Figure 35E:
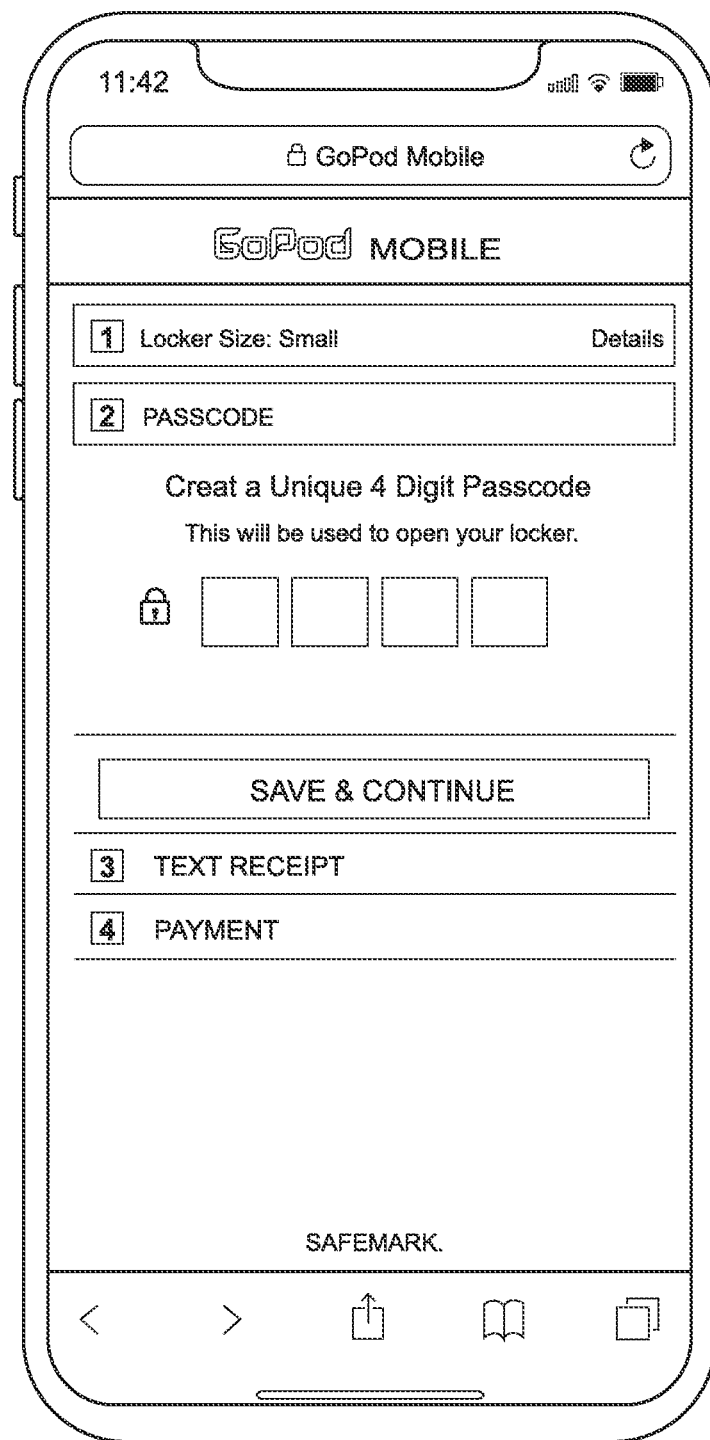
FIG. 35E is a graphical user interface (GUI) screen of the mobile smartphone shown in FIG. 21, deployed on the wireless access control system network of the present invention, and showing the fifth step in the site-level access control method of the present invention involving the user's selection of four-digit passcode for use in opening the rental locker, and selecting SAVE and CONTINUE to save the request in the RDBMS of the wireless access control system network.

As indicated at Step E of FIG. 33B, and as shown in FIG. 35E, the mobile smartphone 130 deployed on the wireless access control system network 1 is used to practice a site-level access control method by the user's selecting four-digit passcode for use in opening the rental locker, and selecting SAVE and CONTINUE to save the request in the RDBMS of the wireless access control system network.

Figure 35F:
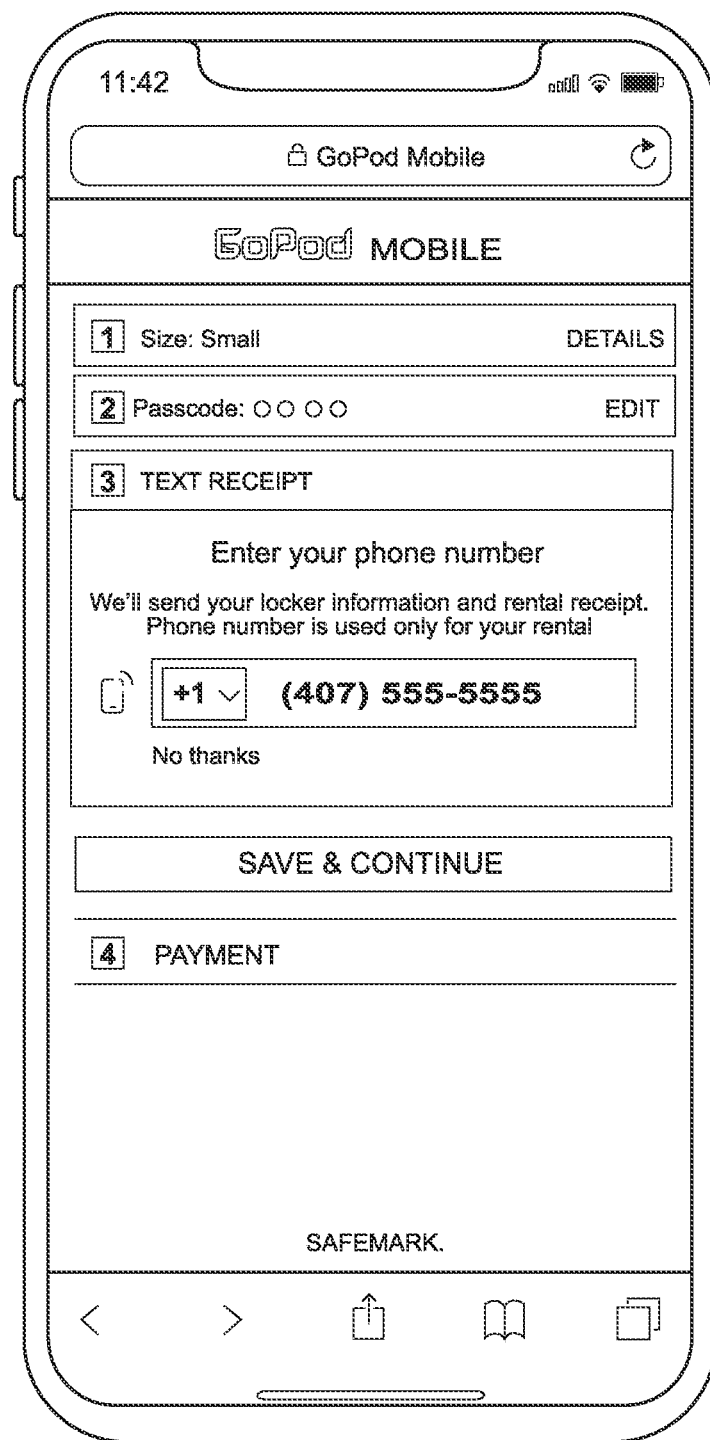
FIG. 35F is a graphical user interface (GUI) screen of the mobile smartphone shown in FIG. 21, deployed on the wireless access control system network of the present invention, and showing the sixth step in the site-level access control method of the present invention displaying the selected locker size and user passcode, and involving entering the guest's phone number to which the system network will transmit locker information and rental receipt via SMS/text once the user enters the phone number information and selects SAVE and CONTINUE, to initiate the web-based transaction between the web-enabled mobile phone and the system's web-enabled e-commerce-supported locker access control servers, maintained at the data center.

As indicated at Step F of FIG. 33B, and as shown in FIG. 35F, the mobile smartphone deployed on the wireless access control system network is used to practice a site-level access control method by displaying the selected locker size and user passcode, and involving entering the guest's phone number to which the system network will transmit locker information and rental receipt via SMS/text once the user enters the phone number information and selects SAVE and CONTINUE, to initiate the web-based transaction between the web-enabled mobile phone and the system's web-enabled e-commerce-supported locker access control servers, maintained at the data center.

Figure 35G:
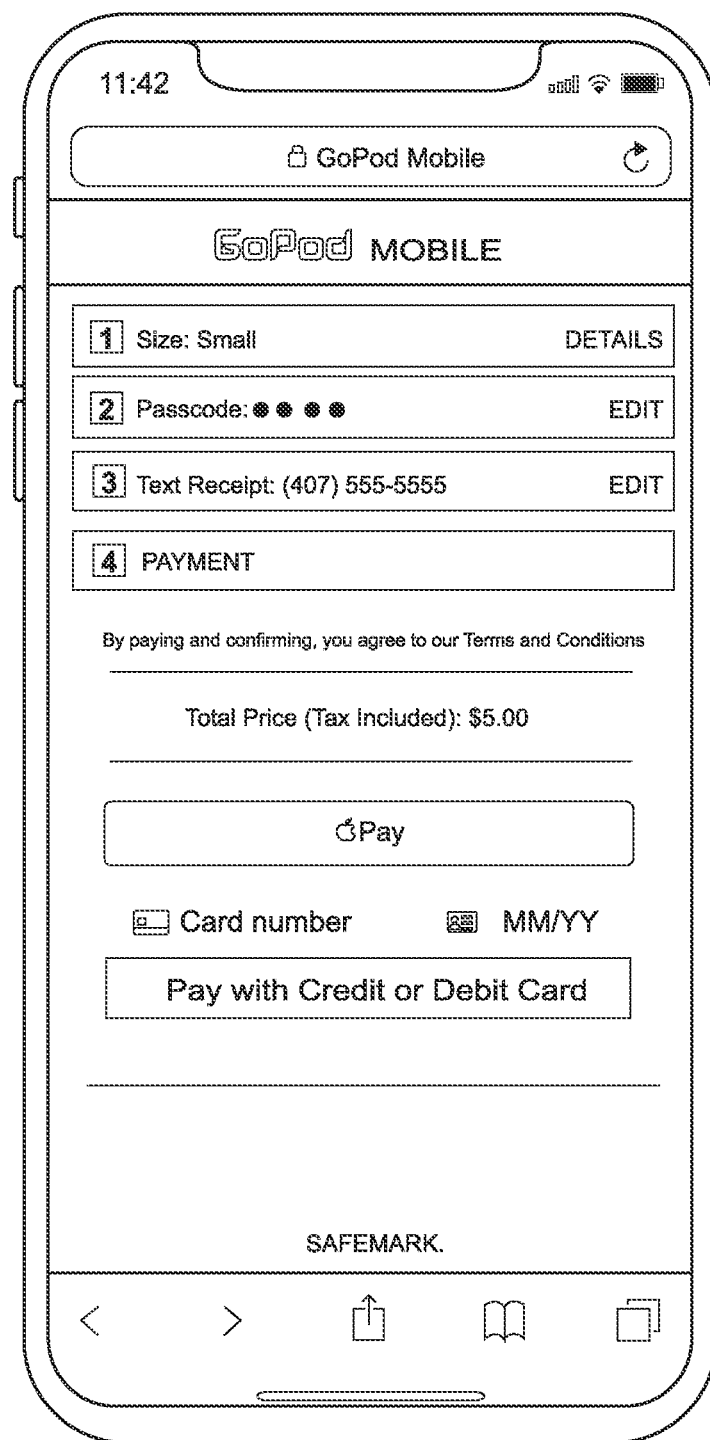
FIG. 35G is a graphical user interface (GUI) screen of the mobile smartphone shown in FIG. 21, deployed on the wireless access control system network of the present invention, and showing the seventh step in the site-level access control method of the present invention displaying the selected locker size, entered passcode, text receipt phone number, and total price of the locker rental (tax included), and providing several options for the user to make payment (e.g. using ApplePay® or using a credit card or debit card of the user, in which case, the card number and expiration date i.e. month/year are requested)

As indicated at Step G of FIG. 33B, and as shown in FIG. 35G, the mobile smartphone deployed on the wireless access control system network is used to practice a site-level access control method by displaying the selected locker size, entered passcode, text receipt phone number, and total price of the locker rental (tax included), and providing several options for the user to make payment (e.g. using ApplePay® or using a credit card or debit card of the user, in which case, the card number and expiration date i.e. month/year are requested).

Figure 35H:
FIG. 35H is a graphical user interface (GUI) screen of the mobile smartphone shown in FIG. 21, deployed on the wireless access control system network of the present invention, and showing the eighth step in the site-level access control method of the present invention displaying, after the prior payment transaction has been successfully completed, a message that the locker is ready, along with the selected locker # and user's passcode, and a Button enabled to open the locker at its location, by the user simply either scanning the door-level QR code on the locker door, or entering the unique passcode into the locker's keypad (where and as provided)

As indicated at Step H of FIG. 33B, and as shown in FIG. 35H, a mobile smartphone 130 deployed on the wireless access control system network 1 is used to practice a site-level access control method by displaying, after the prior payment transaction has been successfully completed, a message that the locker is ready, along with the selected locker # and user's passcode, and a Button enabled to open the locker at its location, by the user simply either scanning the door-level QR code 40C on the locker door, or entering the unique passcode into the locker's keypad (where and as provided).

Figure 35I:
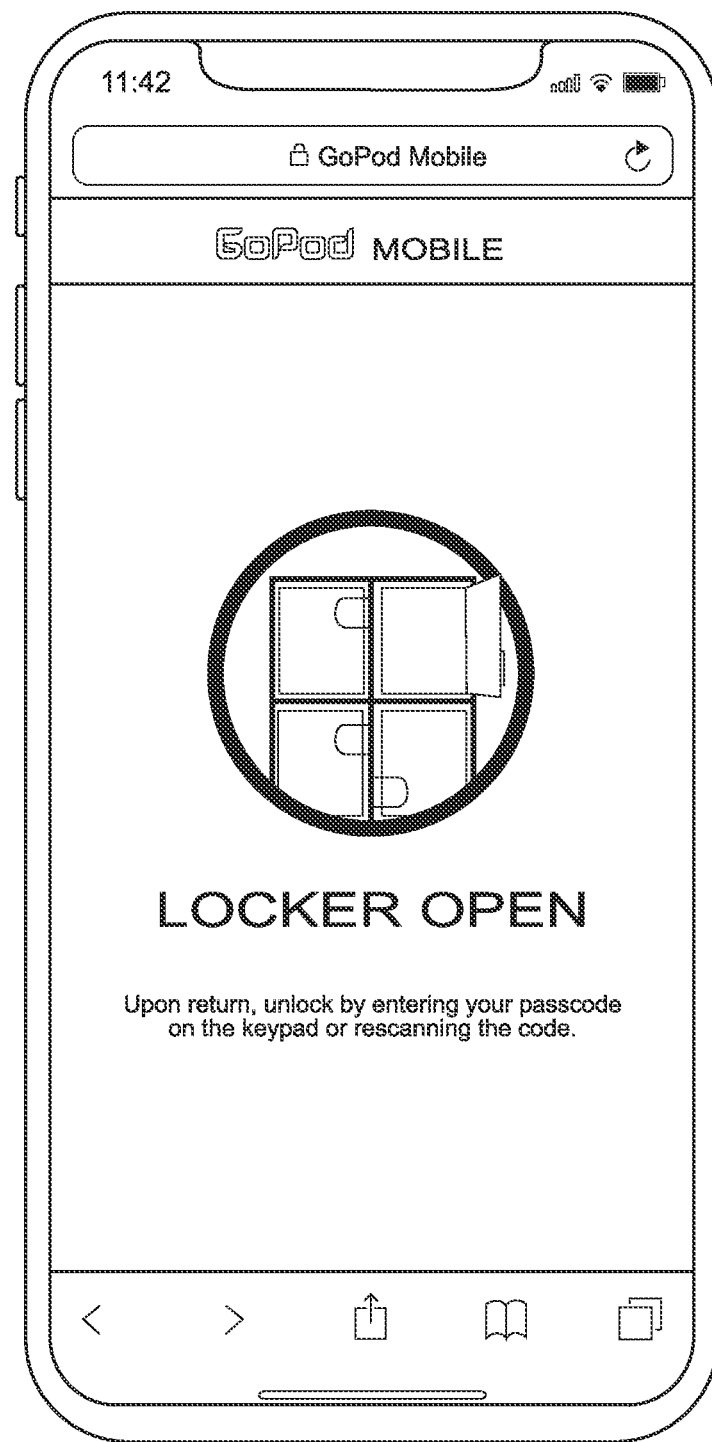
FIG. 35I is a graphical user interface (GUI) screen of the mobile smartphone shown in FIG. 21, deployed on the wireless access control system network of the present invention, and showing the nineth step in the site-level access control method of the present invention displaying, after scanning the door-level QR code or entering the unique passcode into the locker's keypad, a message that the locker is OPEN (and "upon return, unlock the locker by entering the passcode on the keypad or rescanning the Door-Level QR Code"), and an END RENTAL Button for selection by the user to the end the locker rental.

As indicated at Step I of FIG. 33C, and as shown in FIG. 35I, the mobile smartphone 130 deployed on the wireless access control system network 1 is used to practice a site-level access control method by displaying, after scanning the door-level QR code 40C or entering the unique passcode into the locker's keypad, a message that the locker is OPEN, and upon return, unlock the locker by entering the passcode on the keypad or rescanning the Door-Level QR Code, and an END RENTAL Button for selection by the user to the end the locker rental.

Figure 33D:
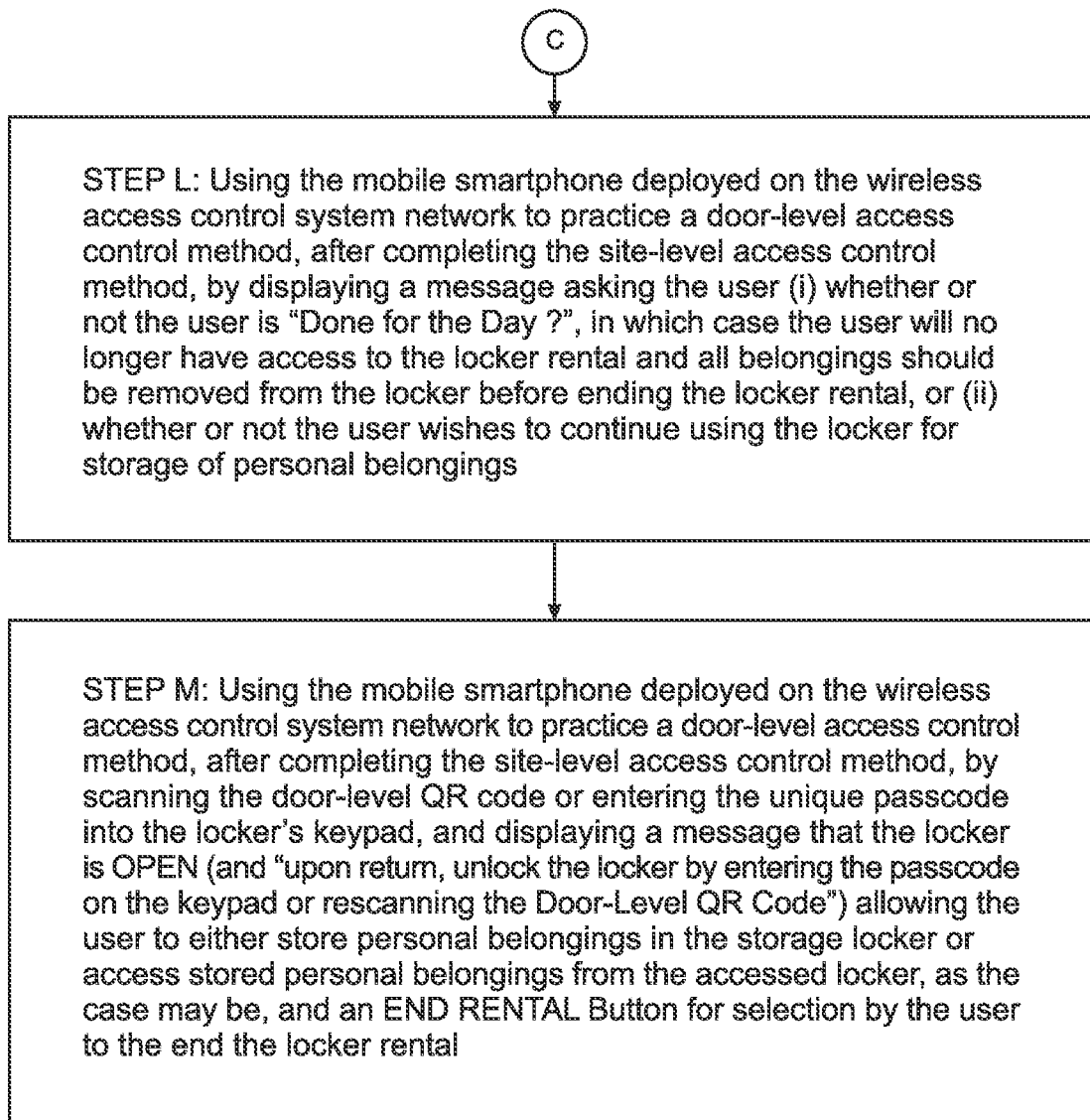

Specification of Method of Enabling Contact-Less Access Control of Storage Locker Within an Amusement Park Enterprise by Scanning a Door-Level QR Code After Scanning a Site-Level QR Code Using a Mobile Smartphone Connected to the Wireless Access Control System Network of the Present Invention FIGS. 33C and 33D describe the primary steps involved when carrying out the methods of managing access control to a networked locker system by scanning door-level QR codes 40C posted on locker rented at amusement park facility after scanning a site-level QR code 40B, using a mobile smartphone wireless connected to the wireless access control system network of the present invention.

Figure 36:
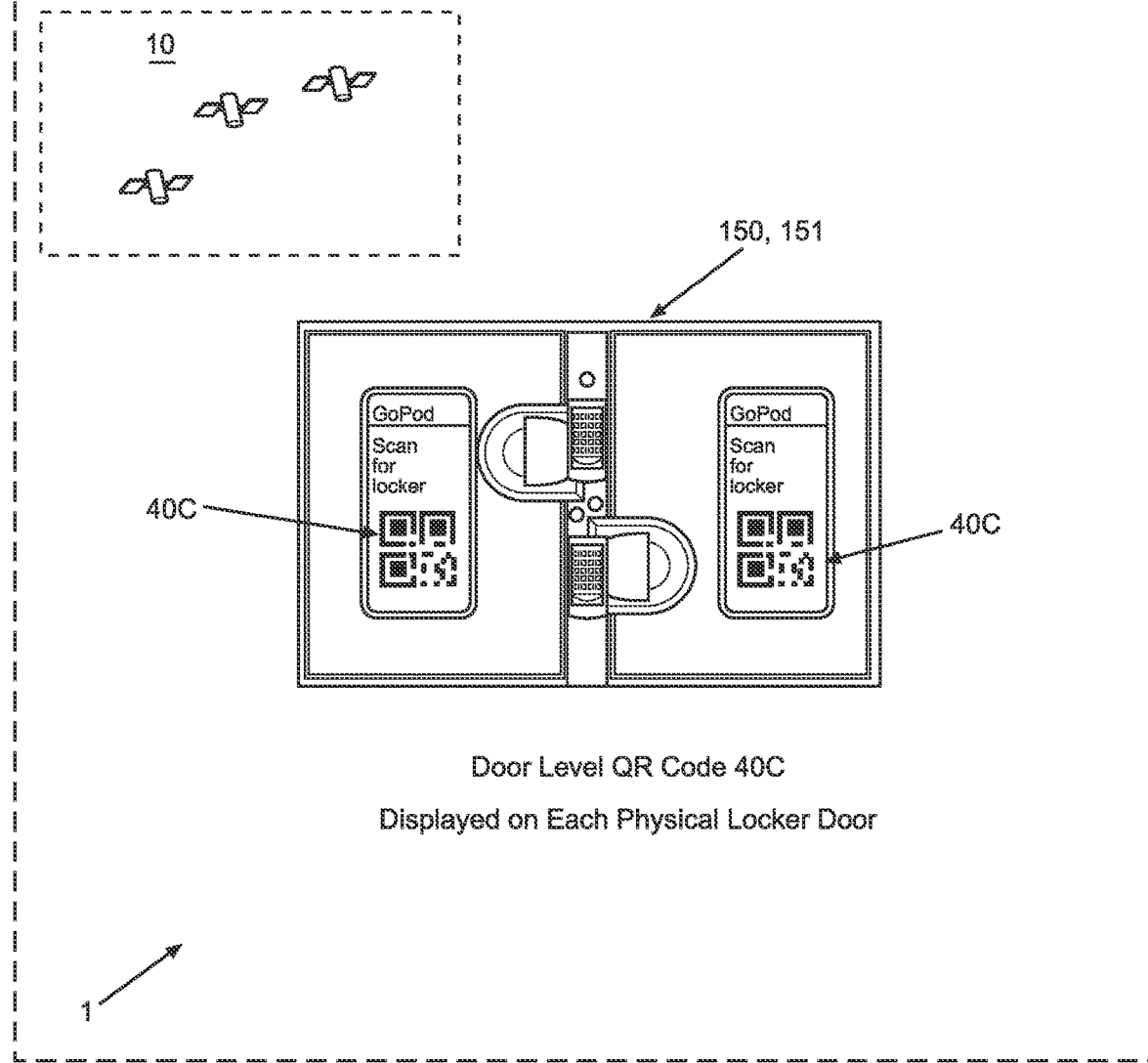
FIG. 36 is a plan view of an exemplary Door-Level QR Code physically posted or electrically displayed on the front door surface of each locker unit in the GPS-tracked wireless networked locker system illustrated in FIG. 26.

FIG. 36 shows a Door-Level QR Code 40C (i.e. a machine-readable code, such as an optically-readable bar code symbol and/or RFID encoded tag component) physically posted or electrically displayed on the front door surface of each locker unit in the GPS-tracked wireless networked locker system illustrated in FIG. 26.

The method described and illustrated in FIGS. 33C and 33D is supported by the GUI screens shown in FIG. 37A through 37D.

Figure 37A:
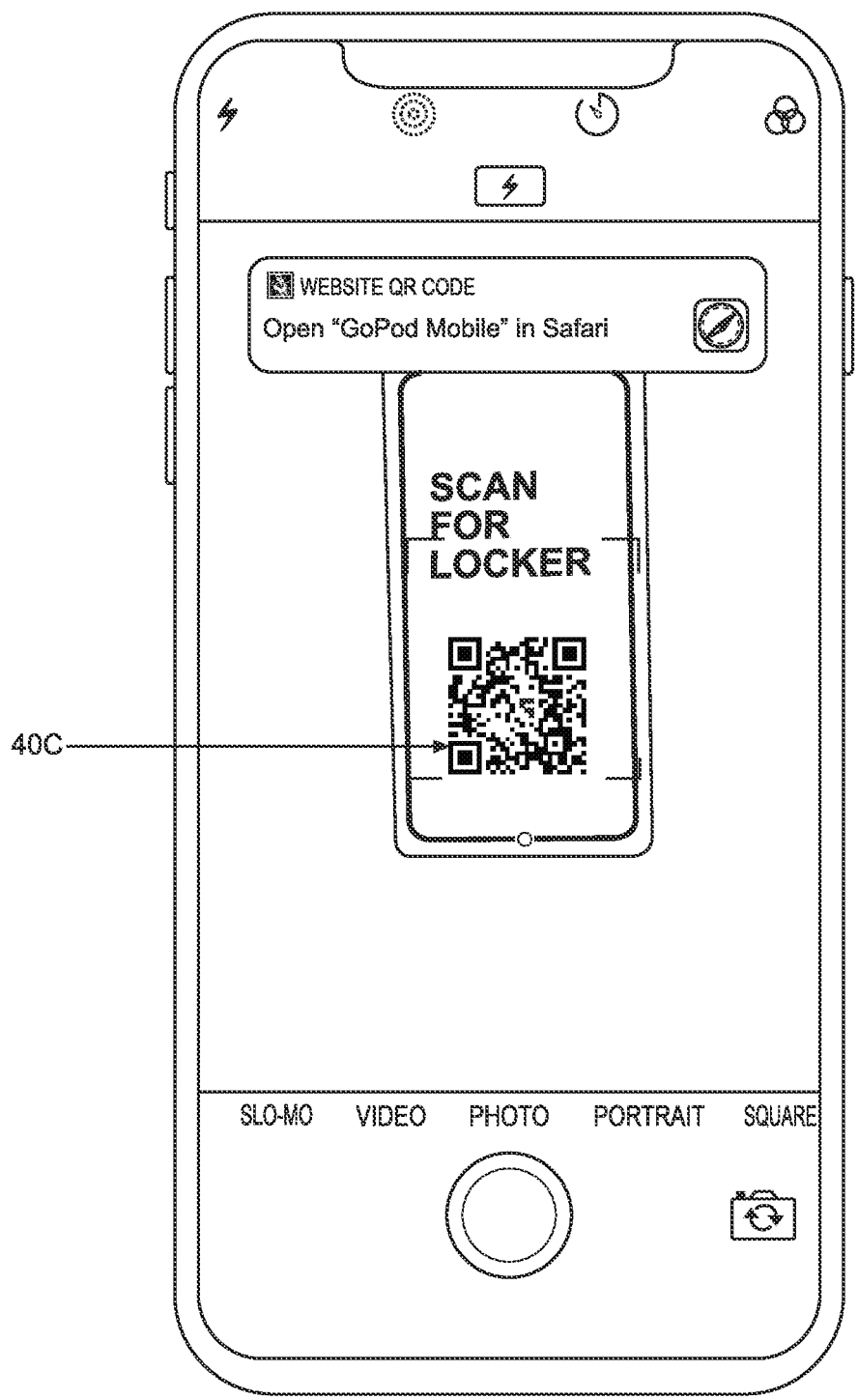
FIG. 37A is a graphical user interface (GUI) screen of the mobile smartphone shown in FIG. 21, deployed on the wireless access control system network of the present invention, and showing the first step in the door-level access control method when entered after scanning a site-level access QR code as described in FIGS. 35A through 35I, involving (i) the scanning of the Door-Level QR code on the rented locker using the user's web-enabled mobile smartphone, as shown in FIGS. 29A and 29B, (ii) automatically directing the smartphone web-browser application (e.g. Apple Safari) to parse and analyze the scanned QR code and serve, load and display the webpage specified by the URL encoded in the Door-Level QR Code as illustrated in table of FIG. 9, and (iii) executing the access control transaction script for the locker rental transaction identified by the "Rental Transaction Identifier-Site Entry" stored on the phone by the application servers, so as to determine the state of the transaction for the Door-Level Access Control Method.

As indicated at Step J of FIG. 33C, and as shown in FIG. 37A, a mobile smartphone deployed on the wireless access control system network 1 is used to scan a Door-Level QR Code 40C after scanning a Site-Level QR Code 40B by (i) the scanning of the Door-Level QR code on the rented locker using the user's web-enabled mobile smartphone 130, (ii) automatically directing the smartphone web-browser application to parse and analyze the scanned QR code and serve, load and display the webpage specified by the URL encoded in the Door-Level QR Code, and (iii) executing the access control transaction script for the locker rental transaction identified by the "Rental Transaction Identifier-Site Entry" stored on the phone by the application servers, so as to determine the state of the transaction for the Door-Level Access Control Method.

Figure 37B:
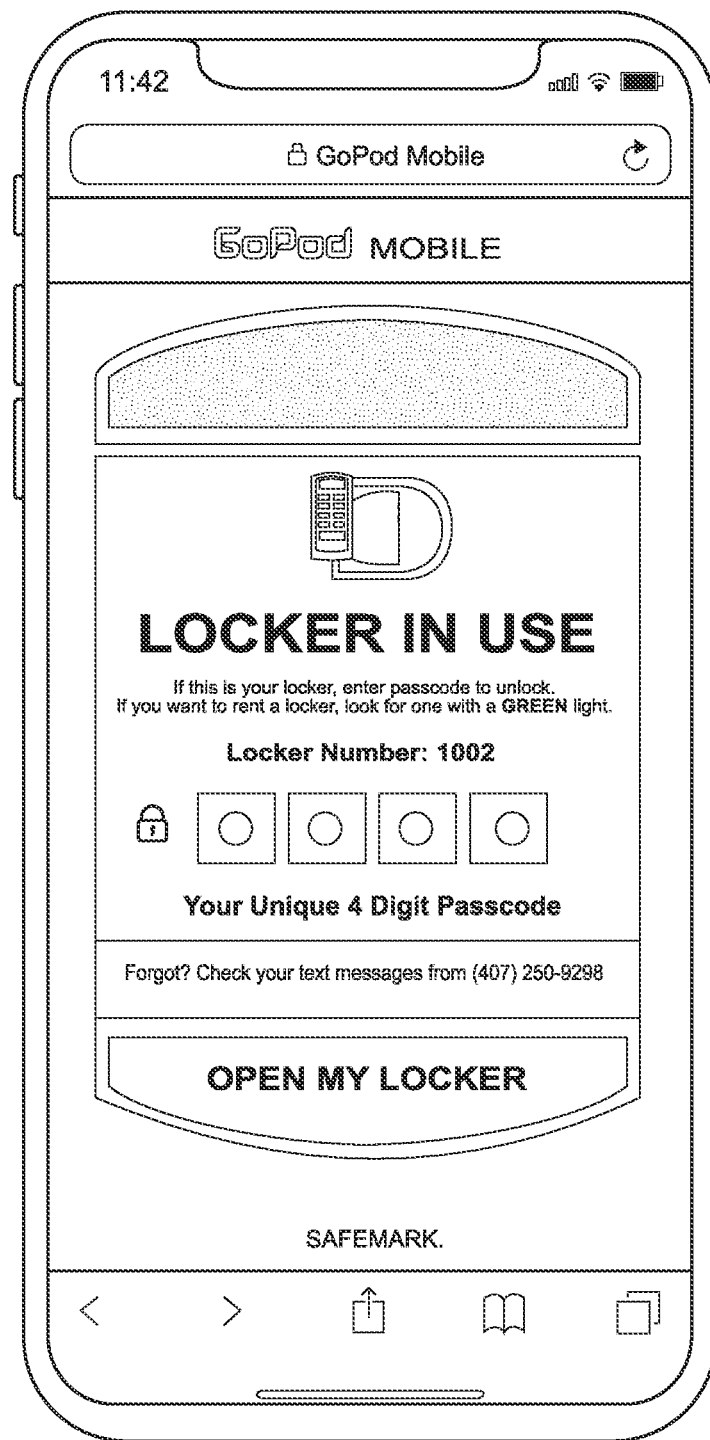
FIG. 37B is a graphical user interface (GUI) screen of the mobile smartphone shown in FIG. 21, deployed on the wireless access control system network of the present invention, and showing the second step in the door-level access control method of the present invention displaying a message that the "Locker Is in Use" (e.g. Locker Number 154), and requesting the user to enter his or her unique 4 digital passcode, and the select the button "OPEN MY LOCKER"

As indicated at Step K of FIG. 33C, and as shown in FIG. 37B, the mobile smartphone 130 deployed on the wireless access control system network 1 is used to practice a door-level access control method, after completing the site-level access control method, by displaying a message that the "Locker Is in Use" (e.g. Locker Number 154), and requesting the user to enter his or her unique 4 digital passcode, and the select the button "OPEN MY LOCKER".

Figure 37C:
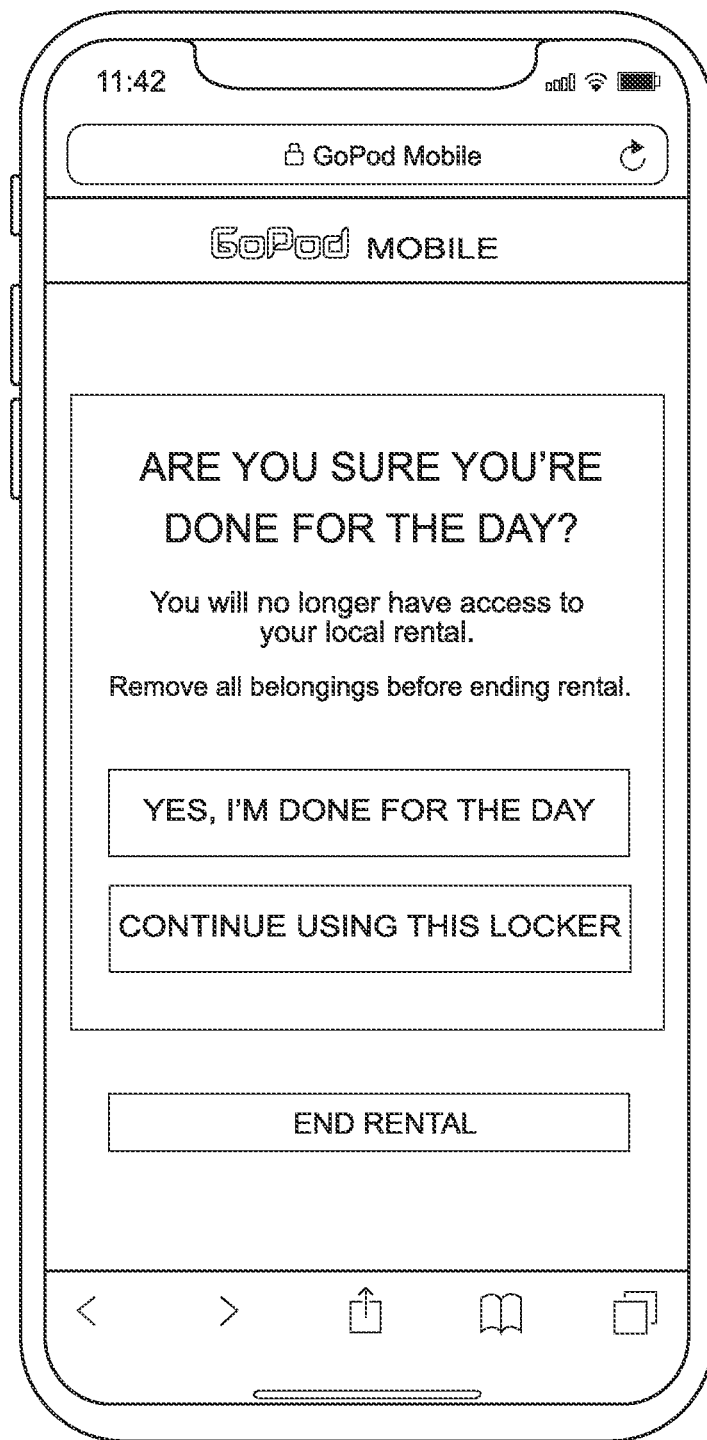
FIG. 37C is a graphical user interface (GUI) screen of the mobile smartphone shown in FIG. 21, deployed on the wireless access control system network of the present invention, and showing the third step in the door-level access control method of the present invention displaying a message asking the user (i) whether or not the user is "Done for the Day ?", in which case the user will no longer have access to the locker rental and all belongings should be removed from the locker before ending the locker rental, or (ii) whether or not the user wishes to continue using the locker for storage of personal belongings.

As indicated at Step L of FIG. 33D, and as shown in FIG. 37C, the mobile smartphone 130 deployed on the wireless access control system network 1 is used to practice a door-level access control method, after completing the site-level access control method, by displaying a message asking the user (i) whether or not the user is "Done for the Day ?", in which case the user will no longer have access to the locker rental and all belongings should be removed from the locker before ending the locker rental, or (ii) whether or not the user wishes to continue using the locker for storage of personal belongings.

Figure 37D:
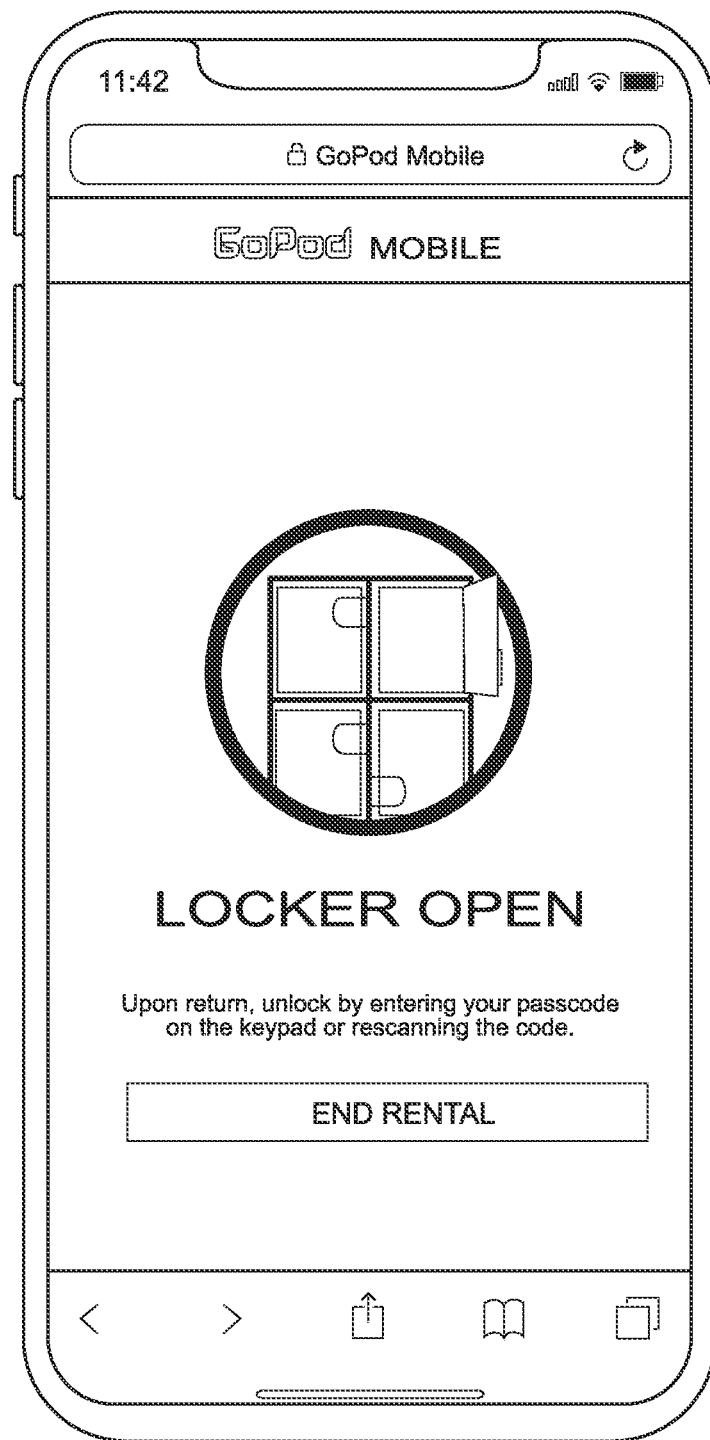
FIG. 37D is a graphical user interface (GUI) screen of the mobile smartphone shown in FIG. 21, deployed on the wireless access control system network of the present invention, and showing the fourth step in the door-level access control method displaying, after scanning the door-level QR code or entering the unique passcode into the locker's keypad, a message that the locker is OPEN (and "upon return, unlock the locker by entering the passcode on the keypad or rescanning the Door-Level QR Code") allowing the user to either store personal belongings in the storage locker or access stored personal belongings from the accessed locker, as the case may be, and an END RENTAL Button for selection by the user to the end the locker rental.

As indicated at Step M of FIG. 33D, and as shown in FIG. 37D, the mobile smartphone 130 deployed on the wireless access control system network 1 is used to practice a door-level access control method, after completing the site-level access control method, by scanning the door-level QR code or entering the unique passcode into the locker's keypad, and displaying a message that the locker is OPEN, and upon return, unlocking the locker by entering the passcode on the keypad or rescanning the Door-Level QR Code 40C, and allowing the user to either store personal belongings in the storage locker or access stored personal belongings from the accessed locker, as the case may be, and an END RENTAL Button for selection by the user to the end the locker rental.

The above-described machine-readable code-driven access control method of the present invention shows how it is now possible to enable wireless rental, access and control to a specified locker (151) in a GPS-specified networked locker system 150 using a web-enabled smartphone 130, to read a Door-Level machine-readable (QR) code symbol to automatically initiate direct communication with the web-based communication/application/database servers maintained with the data center 12 of the wireless system network 1, and conduct the supporting web-based transaction. Each time the code symbol is scanned and the guest user seeks to open a rented locker, as well as an unavailable locker, transaction records of such events are recorded in the RDBMS of the data center 12.

However, during emergencies, when electrical power and/or Internet connectivity are disrupted, the system and method of the present invention allows the guest user to directly enter his or her digital password (e.g. PIN) into the keypad 158 provided on the rented locker unit 151, and locally operate its lock controller (provided with local battery power backup) and where the digital password (PIN) is stored in local memory 153 of the locker unit 151, as shown in FIG. 14, by the system network servers within the data center 12 during the web-based rental, access and control method of the present invention. This inventive feature allows the guest to unlock the electronically-controlled lock unit in locker unit 151, and open the locker door and access one's personal belongings while the locker system is disconnected from the Internet infrastructure and/or during local power disruptions. Details regarding this back-up local access method are disclosed in U.S. Pat. No. 8,990,110, US Patent Application No. US2019/0035186, incorporated herein by reference.

Also, during emergencies, when electrical power and/or Internet connectivity are disrupted, the system and method of the present invention also allows the guest user to locally communicate with the locker controller, through its network adapter and antennas (e.g. using Bluetooth and/or WIFI protocols), to establish a communication session between the mobile smartphone 130 and the rented locker unit 151, and then enter the guest's digital locker password (i.e. PIN) via the virtual keypad (GUI screen) on the mobile smartphone 130, to locally operate its lock controller (provided with local battery power backup), and where the digital password (PIN) is stored in local memory 153 of the locker unit 151, as shown in FIG. 14, by the system network servers within the data center 12 during the web-based rental, access and control method of the present invention. This inventive feature allows the guest to unlock the electronically-controlled lock unit of a rented locker unit 151, and open the locker door and access one's personal belongings while the locker system is disconnected from the Internet infrastructure and/or during local power disruptions.

Figure 38B:
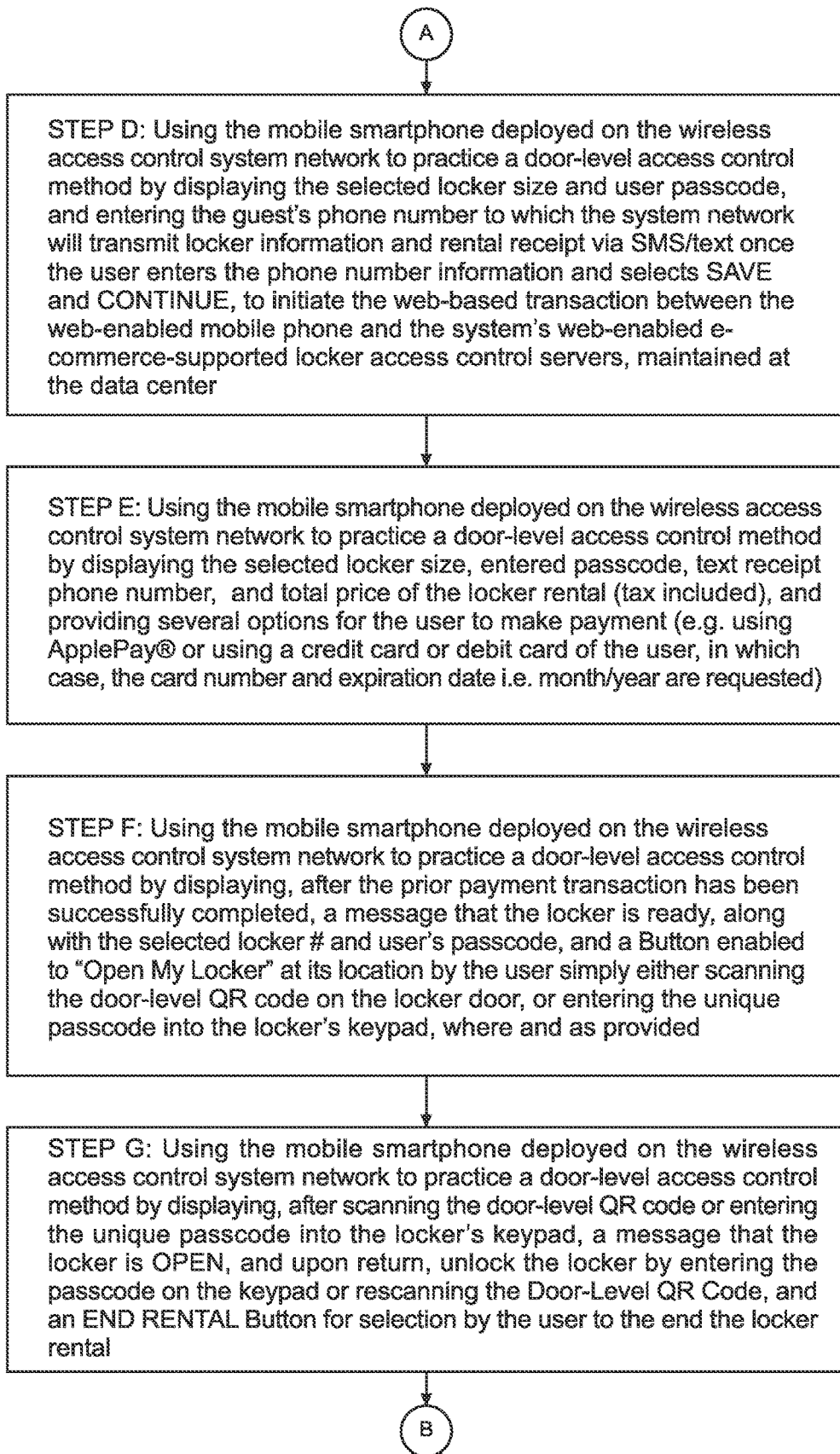

Specification of the Method of Managing Access Control to a Networked Locker System by Scanning Door-Level QR Codes Posted or Displayed on the Front Door of Each Storage Locker Deployed Within the Amusement Park Facility, Using a Mobile Smartphone Wireless Connected to the Wireless Access Control System Network of the Present Invention FIGS. 38A and 38B describe the primary steps involved when carrying out the method of managing access control to a networked locker system by scanning Door-Level QR Codes 40C posted or displayed on the front door of each storage locker deployed within the amusement park facility, using a mobile smartphone 130 wireless connected to the wireless access control system network of the present invention.

Figure 39A:
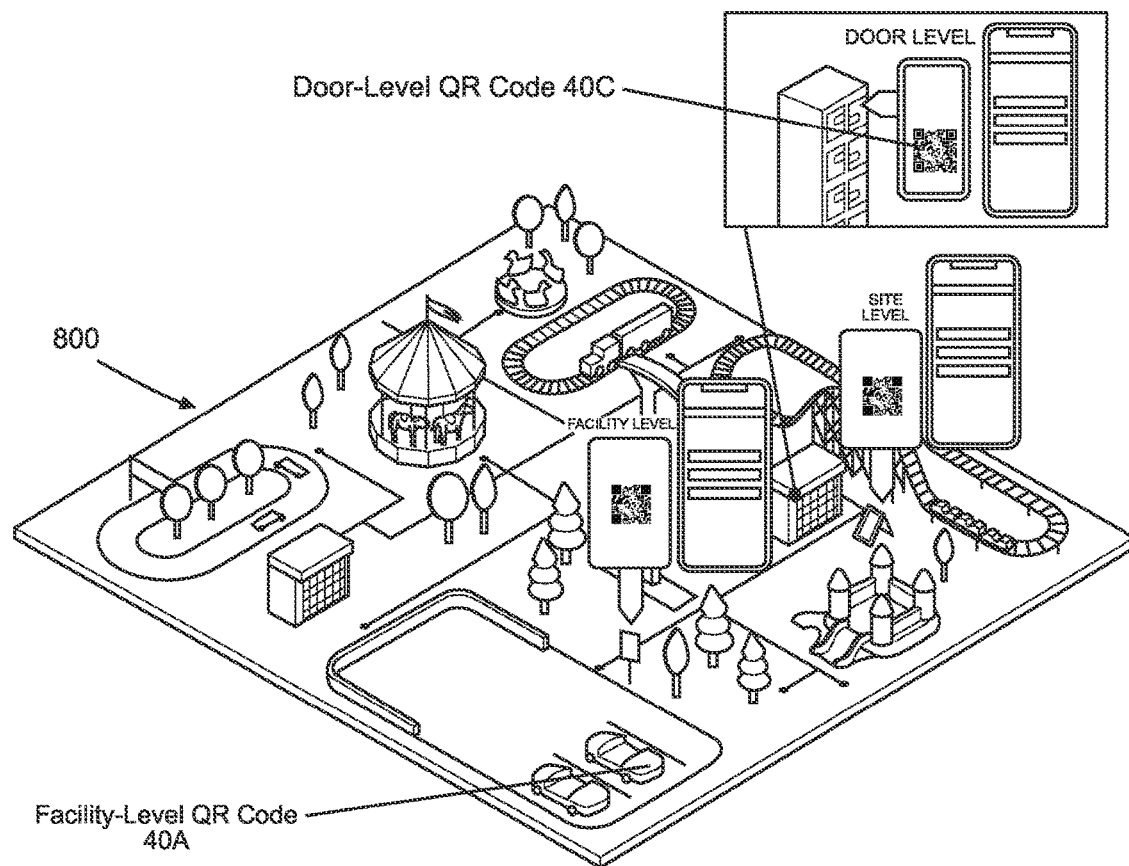
FIG. 39A is a schematic illustrating showing a perspective view of an amusement park facility, with a locker cabinet located at sign posted at a Site in the park, and each locker unit in the cabinet displaying a Door-Level QR code as shown in FIG. 39B, which upon scanning with a web-enabled mobile smartphone is engineered to direct the guest user to a web-based e-commerce-enabled locker rental and access control transaction having a narrowed scope of services within the facility, and allowing guest users to rent the storage locker, at the Site within the amusement park, and then allow the wireless system network to automatically control access to the locker at the Site.
Figure 39B:
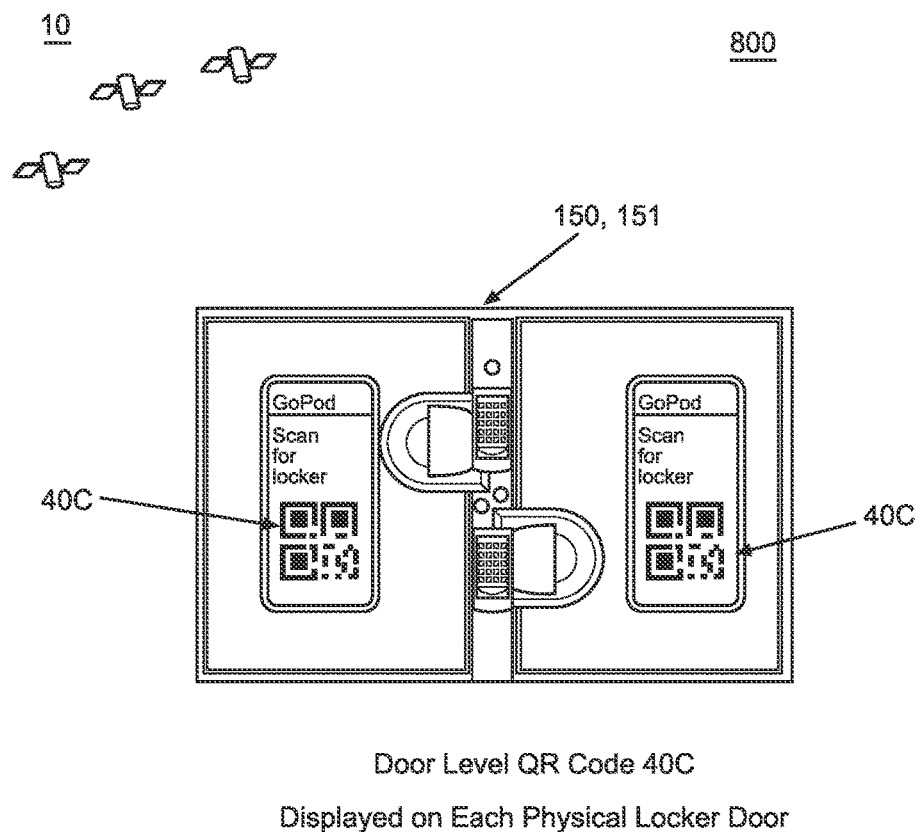
FIG. 39B is a plan view of the Door-Level QR Code physically posted or electrically displayed on the front door surface of each locker unit in the GPS-tracked wireless networked locker system illustrated in FIG. 26, wherein at this most explicit level, Door Level, users are allowed to directly scan the locker door they want to rent, and intelligence regarding the Size, Price, Site, and Facility is effectively built into the Door-Level QR Code so that users can enjoy an expedited rental experience.

FIG. 39A showing an amusement park facility, with a locker cabinet located at sign posted at a Site in the park, and each locker unit 151 in the cabinet displaying a Door-Level QR code 40C as shown in FIG. 39B, which upon scanning with a web-enabled mobile smartphone is engineered to direct the guest user to a web-based e-commerce-enabled locker rental and access control transaction having a narrowed scope of services within the facility. This allows guest users to rent the storage locker, at the Site within the amusement park, and then allow the wireless system network to automatically control access to the locker at the Site.

FIG. 39B shows the Door-Level QR Code 40C physically posted or electrically displayed on the front door surface of each locker unit 151 in the GPS-tracked wireless networked locker system 150 illustrated in FIG. 26, wherein at this most explicit level, Door Level, users are allowed to directly scan the locker door they want to rent, and intelligence regarding the Size, Price, Site, and Facility is effectively built into the Door-Level QR Code 40C so that users can enjoy an expedited rental experience.

The method described and illustrated in FIGS. 38A and 38B is supported by the GUI screens shown in FIG. 40A through 40G.

Figure 40A:
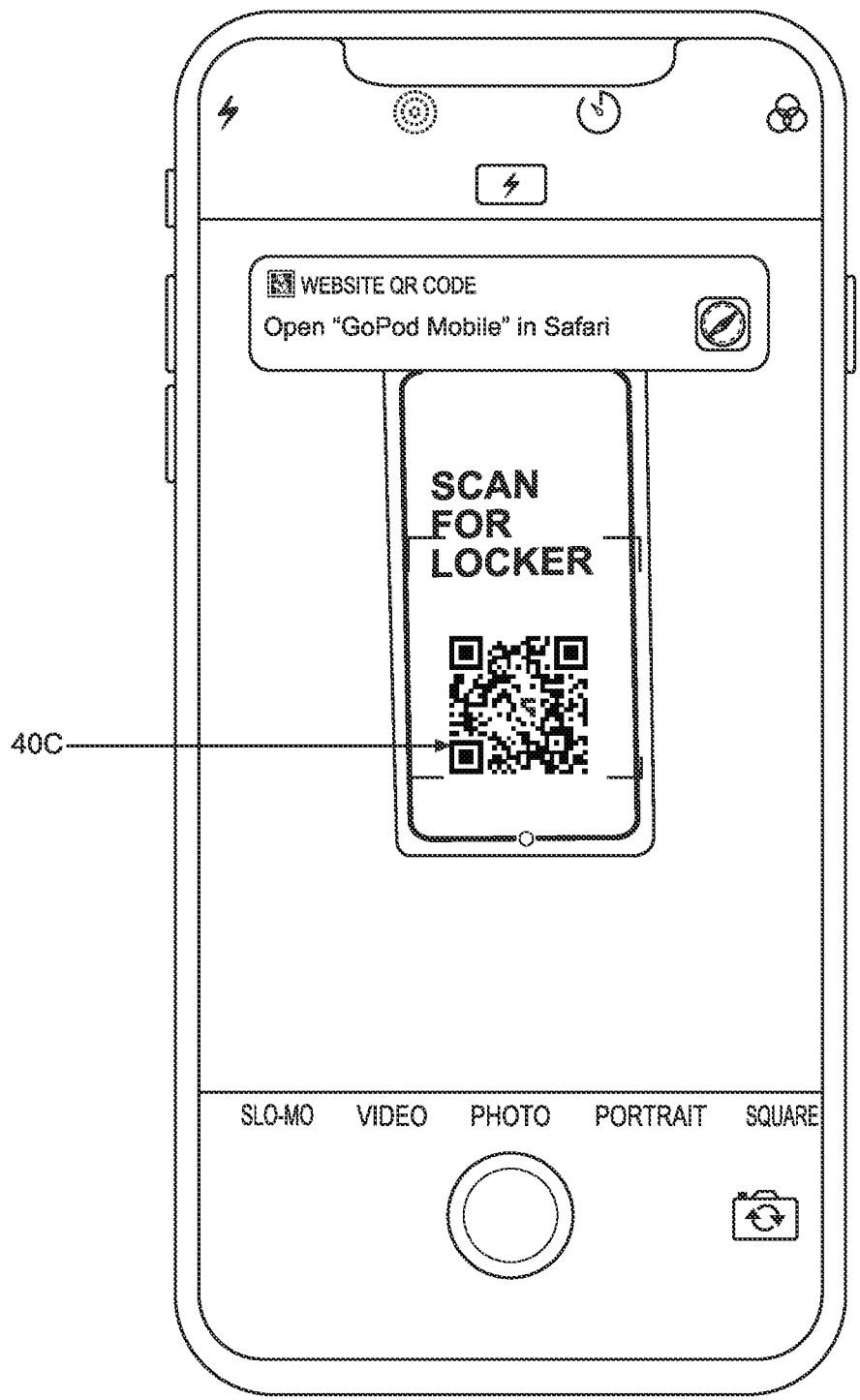
FIG. 40A is a graphical user interface (GUI) screen of the mobile smartphone shown in FIG. 21, deployed on the wireless access control system network of the present invention, and showing the first step in the door-level access control method of the present invention involving (i) the scanning of a Door-Level QR Code as shown in FIGS. 43A and 43B, and (ii) automatically directing the smartphone web-browser application (e.g. Apple Safari) to parse and analyze the scanned QR code and serve, load and display the webpage specified by the URL encoded in the Site-Level QR Code as illustrated in table of FIG. 9, and whereupon, the application server stores a "Rental Transaction Identifier-Door-Entry" (RTI-DE) within the cache on the mobile smartphone.

As indicated at Step A of FIG. 38A, and as shown in FIG. 40A, a mobile smartphone 130 deployed on the wireless access control system network is used to practice a door-level access control method by (i) the scanning of a Door-Level QR Code 40C, and (ii) automatically directing the smartphone web-browser application to parse and analyze the scanned QR code and serve, load and display the webpage specified by the URL encoded in the Site-Level QR Code, and whereupon, the application server stores a "Rental Transaction Identifier-Door-Entry" (RTI-DE) within the cache on the mobile smartphone.

Figure 40B:
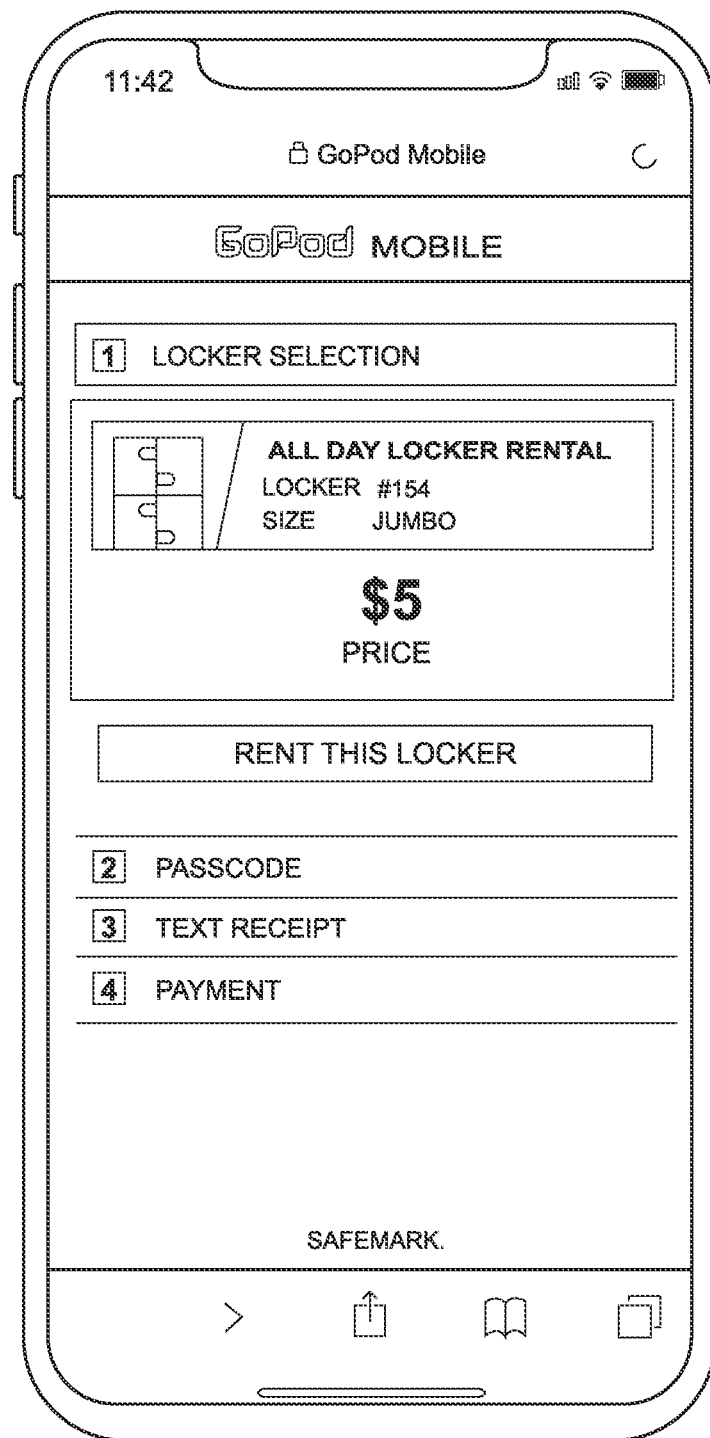
FIG. 40B is a graphical user interface (GUI) screen of the mobile smartphone shown in FIG. 21, deployed on the wireless access control system network of the present invention, and showing the second step in the door-level access control method of the present invention involving the user selecting the "Rent This Locker" Button to rent the scanned and selected locker for a specific time/date (e.g. All Day Locker Rental), given its specified size and rental price at the Site within the Facility.

As indicated at Step B of FIG. 38A, and as shown in FIG. 40B, the mobile smartphone 130 130 deployed on the wireless access control system network is used to practice a door-level access control method by the user selecting the "Rent This Locker" Button to rent the scanned and selected locker for a specific time/date (e.g. All Day Locker Rental), given its specified size and rental price at the Site within the Facility.

Figure 40C:
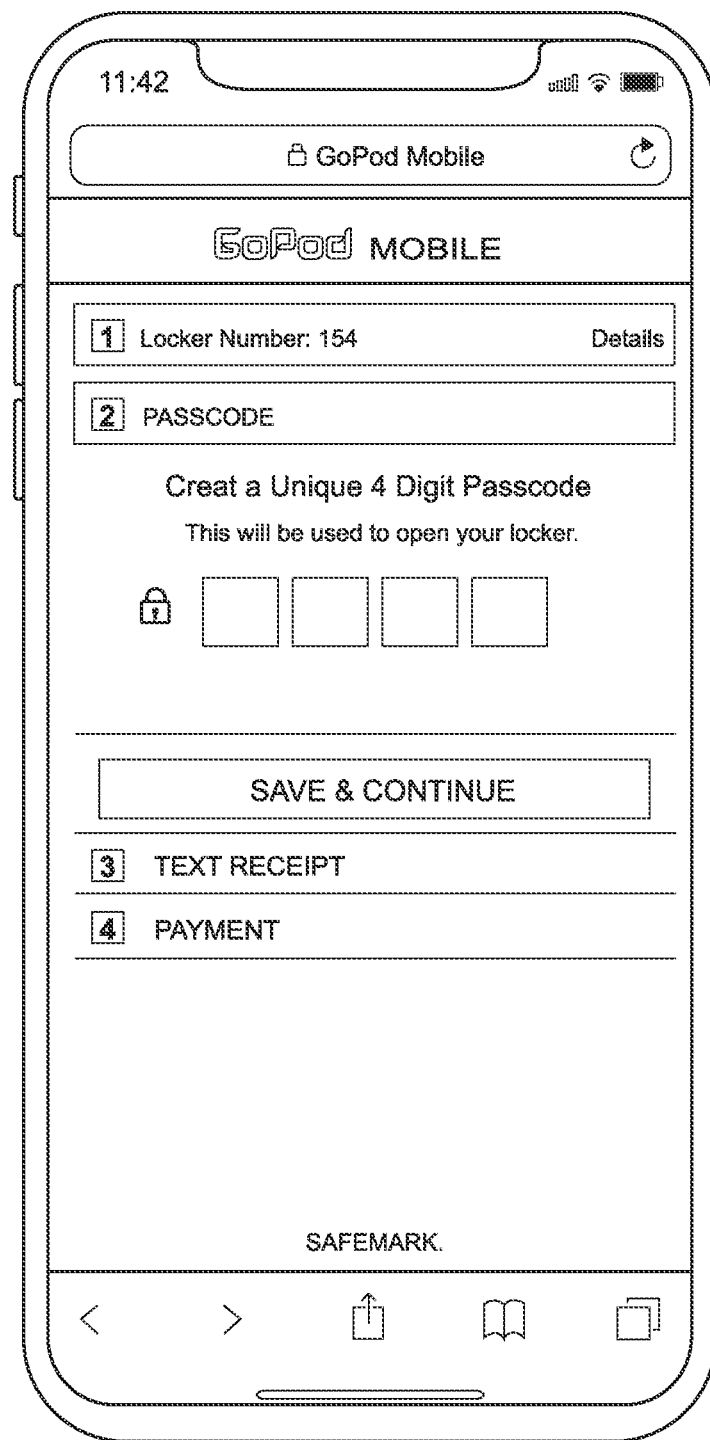
FIG. 40C is a graphical user interface (GUI) screen of the mobile smartphone shown in FIG. 21, deployed on the wireless access control system network of the present invention, and showing the third step in the door-level access control method of the present invention involving the user's selection of four-digit passcode for use in opening the rental locker, and selecting SAVE and CONTINUE to save the request in the RDBMS of the wireless access control system network.

As indicated at Step C of FIG. 38A, and as shown in FIG. 40C, the mobile smartphone 130 deployed on the wireless access control system network to practice a door-level access control method by the user's selection of four-digit passcode for use in opening the rental locker, and selecting SAVE and CONTINUE to save the request in the RDBMS 12C of the wireless access control system network.

Figure 40D:
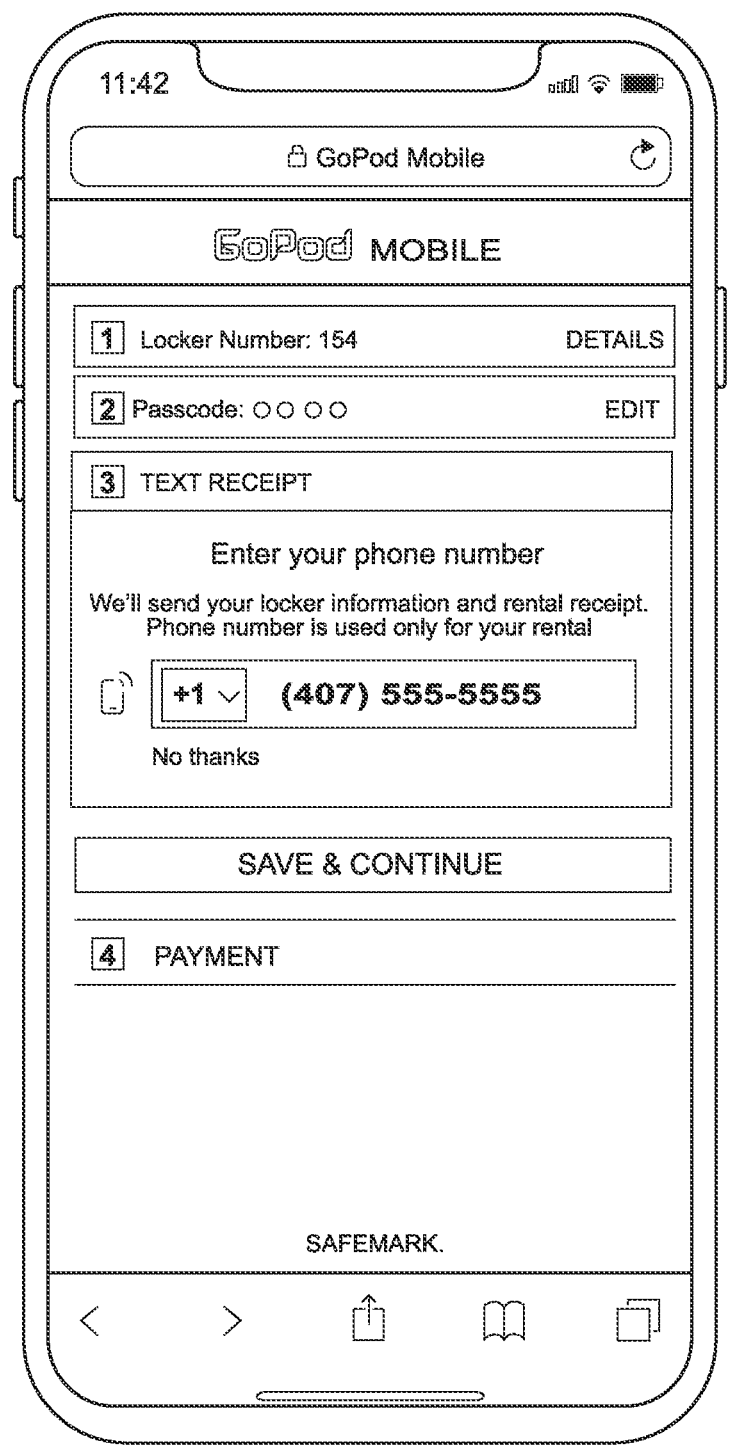
FIG. 40D is a graphical user interface (GUI) screen of the mobile smartphone shown in FIG. 21, deployed on the wireless access control system network of the present invention, and showing the fourth step in the door-level access control method of the present invention displaying the selected locker size and user passcode, and involving entering the guest's phone number to which the system network will transmit locker information and rental receipt via SMS/text once the user enters the phone number information and selects SAVE and CONTINUE, to initiate the web-based transaction between the web-enabled mobile phone and the system's web-enabled e-commerce-supported locker access control servers, maintained at the data center.

As indicated at Step D of FIG. 38B, and as shown in FIG. 40D, the mobile smartphone 130 deployed on the wireless access control system network is used to practice a door-level access control method by displaying the selected locker size and user passcode, and entering the guest's phone number to which the system network will transmit locker information and rental receipt via SMS/text once the user enters the phone number information and selects SAVE and CONTINUE, to initiate the web-based transaction between the web-enabled mobile phone and the system's web-enabled e-commerce-supported locker access control servers, maintained at the data center 12.

Figure 40E:
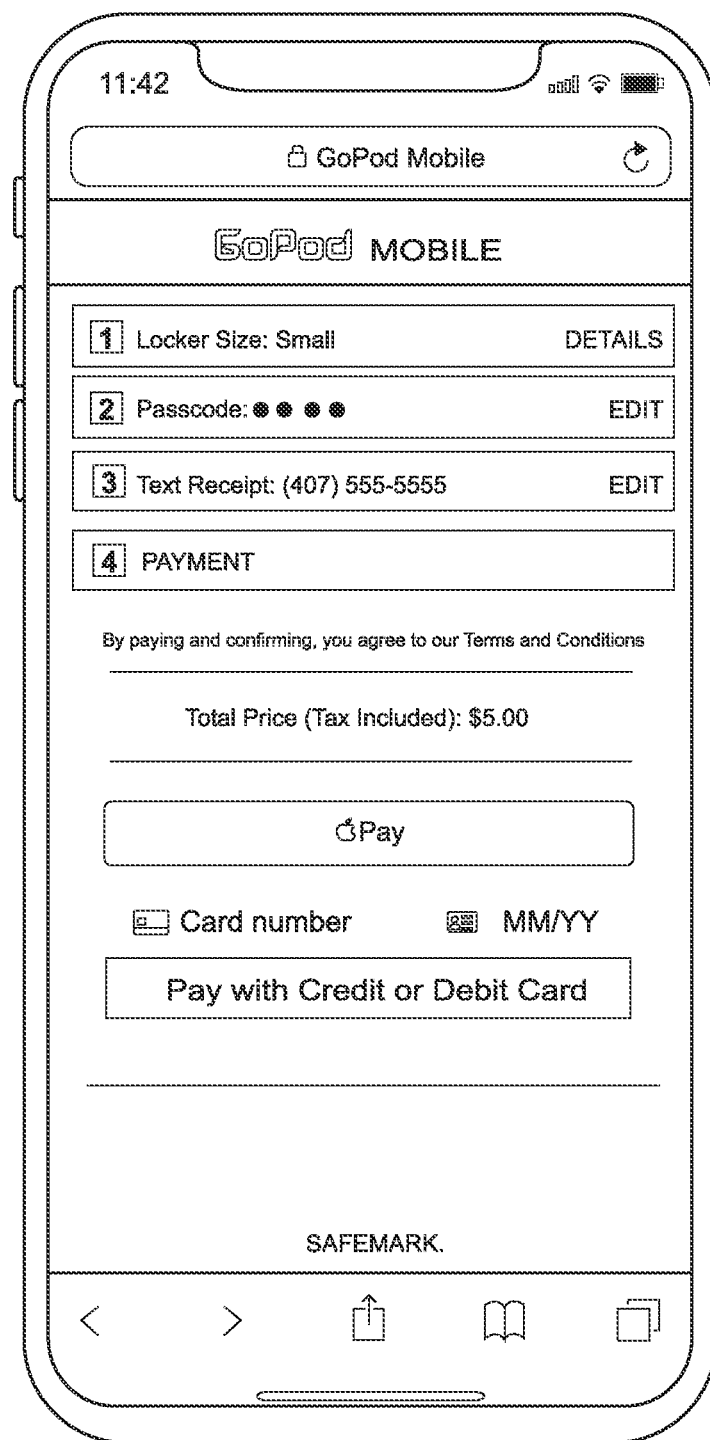
FIG. 40E is a graphical user interface (GUI) screen of the mobile smartphone shown in FIG. 21, deployed on the wireless access control system network of the present invention, and showing the fifth step in the door-level access control method of the present invention displaying the selected locker size, entered passcode, text receipt phone number, and total price of the locker rental (tax included), and providing several options for the user to make payment (e.g. using ApplePay® or using a credit card or debit card of the user, in which case, the card number and expiration date i.e. month/year are requested)

As indicated at Step E of FIG. 38B and as shown in FIG. 40E, using the mobile smartphone 130 deployed on the wireless access control system network 1 is used to practice a door-level access control method by displaying the selected locker size, entered passcode, text receipt phone number, and total price of the locker rental (tax included), and providing several options for the user to make payment (e.g. using ApplePay® or using a credit card or debit card of the user, in which case, the card number and expiration date i.e. month/year are requested).

Figure 40F:
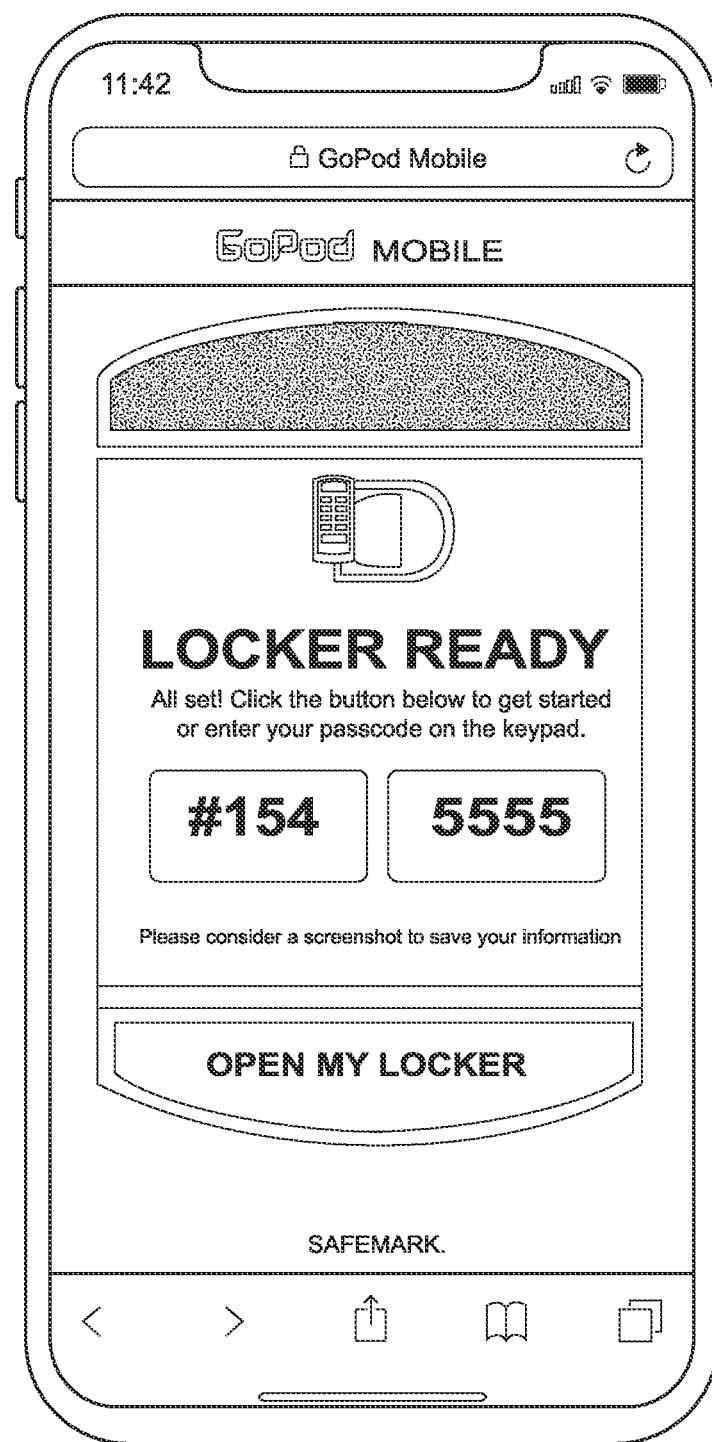
FIG. 40F is a graphical user interface (GUI) screen of the mobile smartphone shown in FIG. 21, deployed on the wireless access control system network of the present invention, and showing the sixth step in the door-level access control method of the present invention displaying, after the prior payment transaction has been successfully completed, a message that the locker is ready, along with the selected locker # and user's passcode, and a Button enabled to "Open My Locker" at its location by the user simply either scanning the door-level QR code on the locker door, or entering the unique passcode into the locker's keypad (where and as provided)

As indicated at Step F of FIG. 38B, and as shown in FIG. 40F, the mobile smartphone 130 deployed on the wireless access control system network 1 is used to practice a door-level access control method by displaying, after the prior payment transaction has been successfully completed, a message that the locker is ready, along with the selected locker # and user's passcode, and a Button enabled to "Open My Locker" at its location by the user simply either scanning the door-level QR code on the locker door, or entering the unique passcode into the locker's keypad, where and as provided.

Figure 40G:
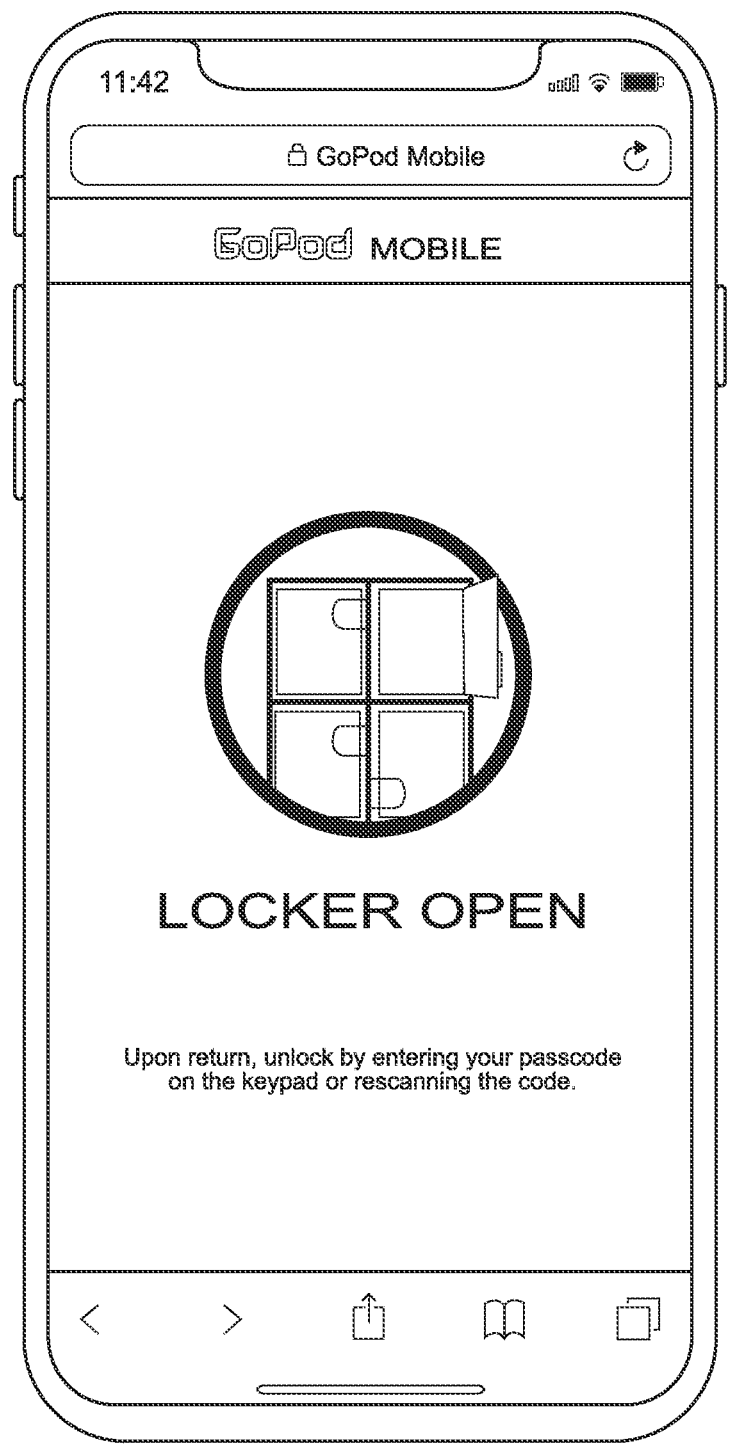
FIG. 40G is a graphical user interface (GUI) screen of the mobile smartphone shown in FIG. 21, deployed on the wireless access control system network of the present invention, and showing the seventh step in the door-level access control method of the present invention displaying, after scanning the door-level QR code or entering the unique passcode into the locker's keypad, a message that the locker is OPEN (and "upon return, unlock the locker by entering the passcode on the keypad or rescanning the Door-Level QR Code"), and an END RENTAL Button for selection by the user to the end the locker rental.

As indicated at Step G of FIG. 38B, and as shown in FIG. 40G, the mobile smartphone deployed on the wireless access control system network 1 is used to practice a door-level access control method by displaying, after scanning the door-level QR code 40C or entering the unique passcode into the locker's keypad, a message that the locker is OPEN, and upon return, unlock the locker by entering the passcode on the keypad or rescanning the Door-Level QR Code, and an END RENTAL Button for selection by the user to the end the locker rental.

Figure 3B:
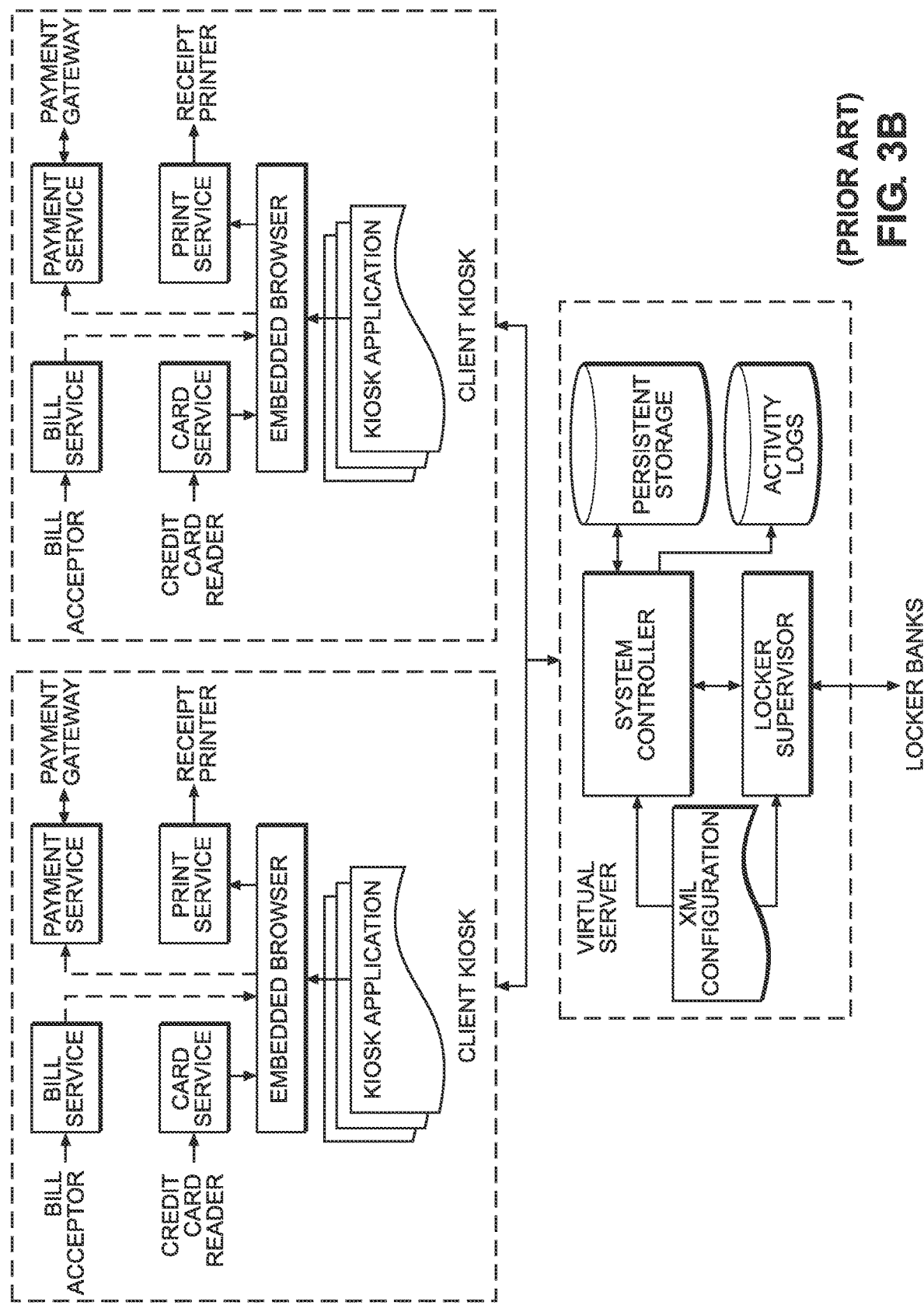
Figure 4:
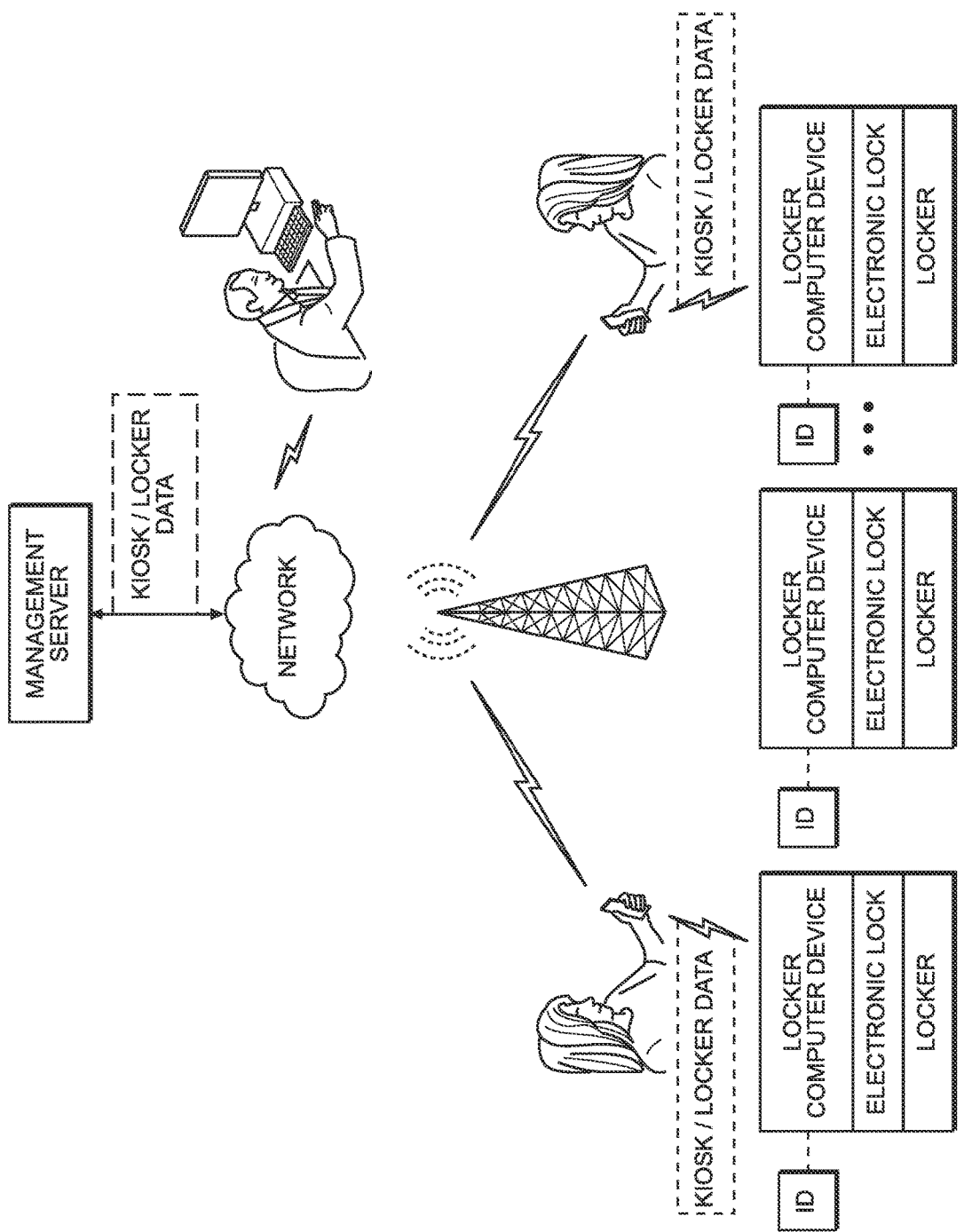
FIG. 4 is a system network diagram of the prior art system in FIGS. 3A through 3B, disclosed in US Patent Application No. US2019/0035186, showing the mobile phone of a guest sending kiosk/locker data to the management server via a cell tower network, while directly controlling access to the locker via a local locker computer device controlling the electronic lock installed in the accessed locker, as generally employed in Safemark's GoPod® electronic locker system.
Figure 5A:
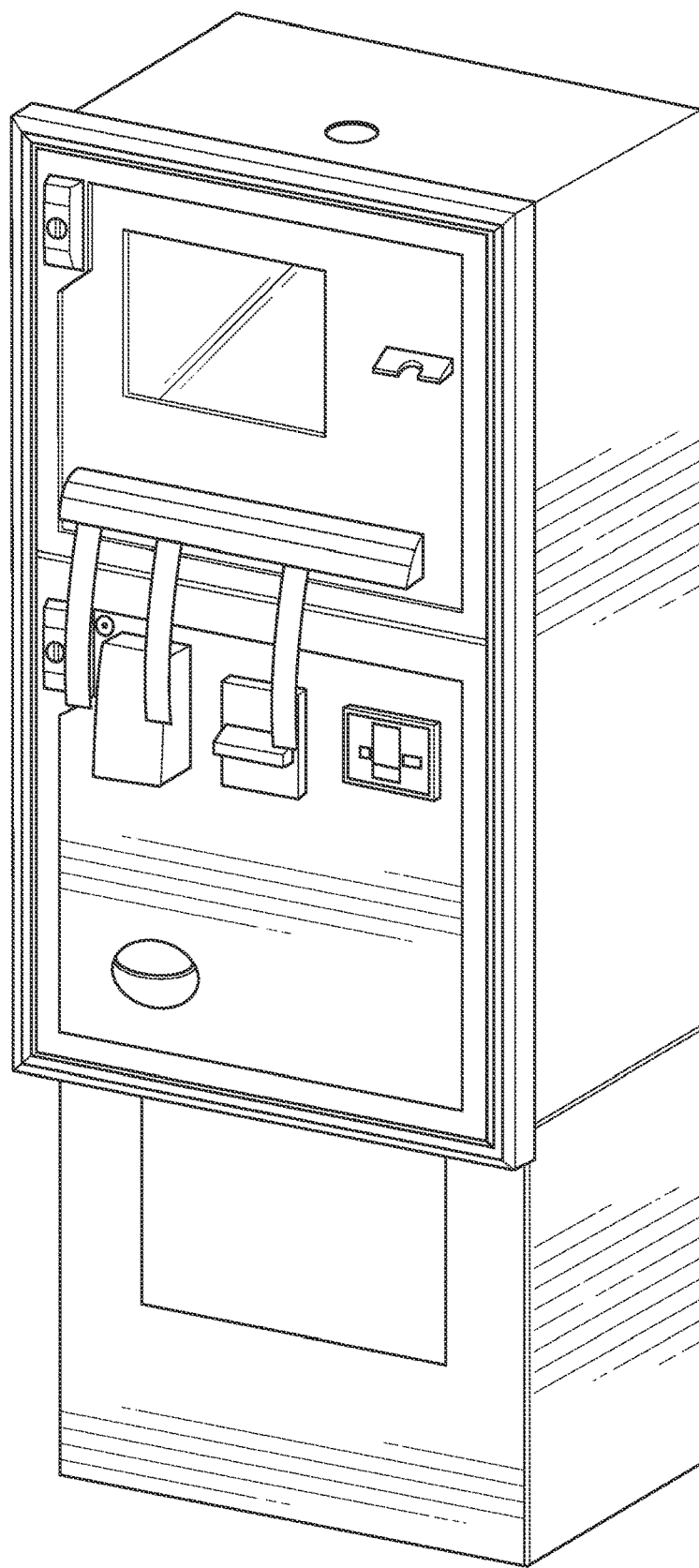
FIGS. 5A, 5B and 5C show a prior art locker system disclosed in U.S. Pat. No. 9,558,608 (assigned to Smarte Carte, Inc.) that includes electronic lockers that are centrally managed by a locker managed that handles admissions and sales for a venue, and wherein guests scan their ID codes at the locker terminal (kiosk terminal) and provide the scanned codes to ID code to the locker manager, and when approved, generates a rental plan and provided the guest access to the assigned locker.
Figure 5B:
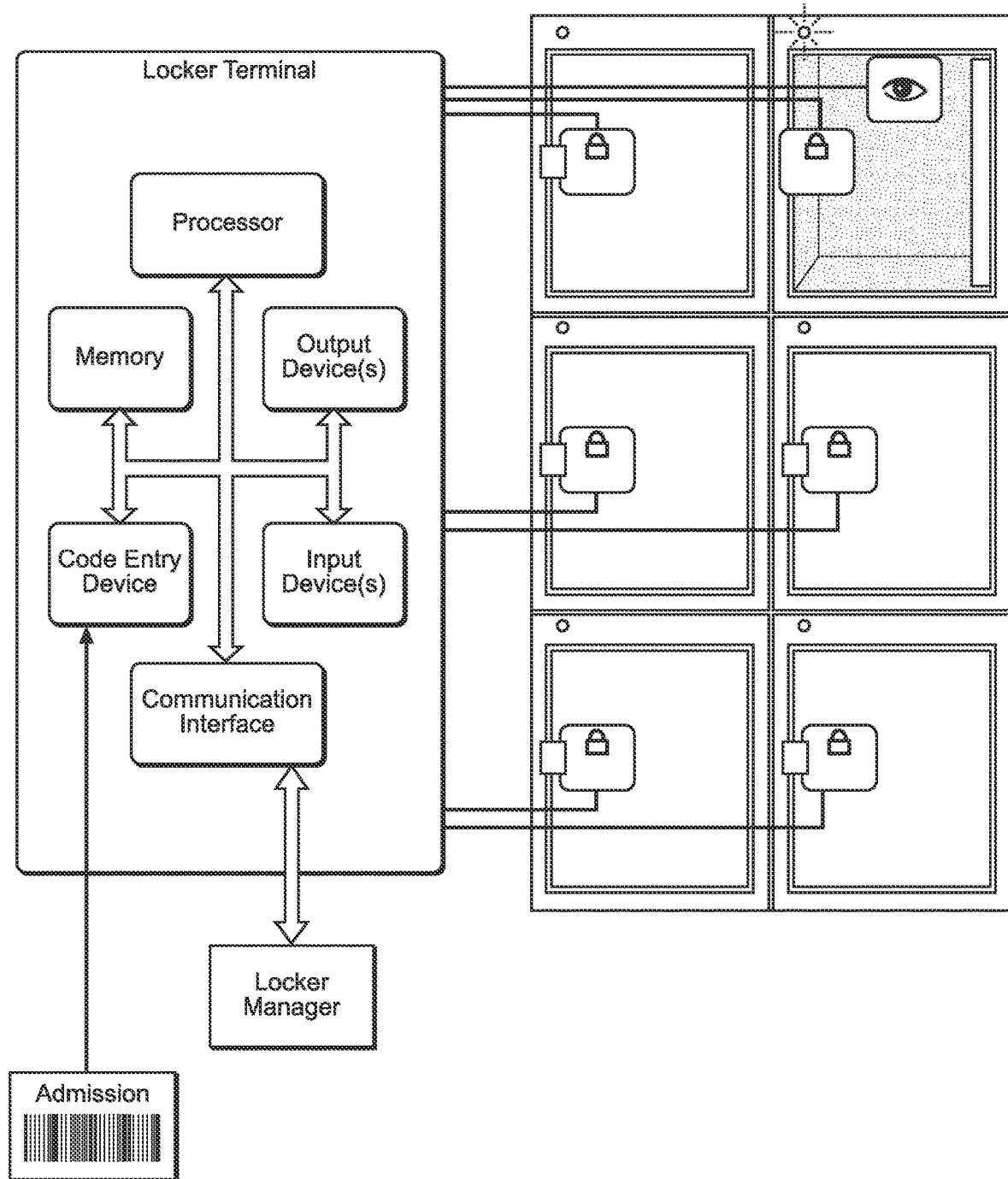
Figure 5C:
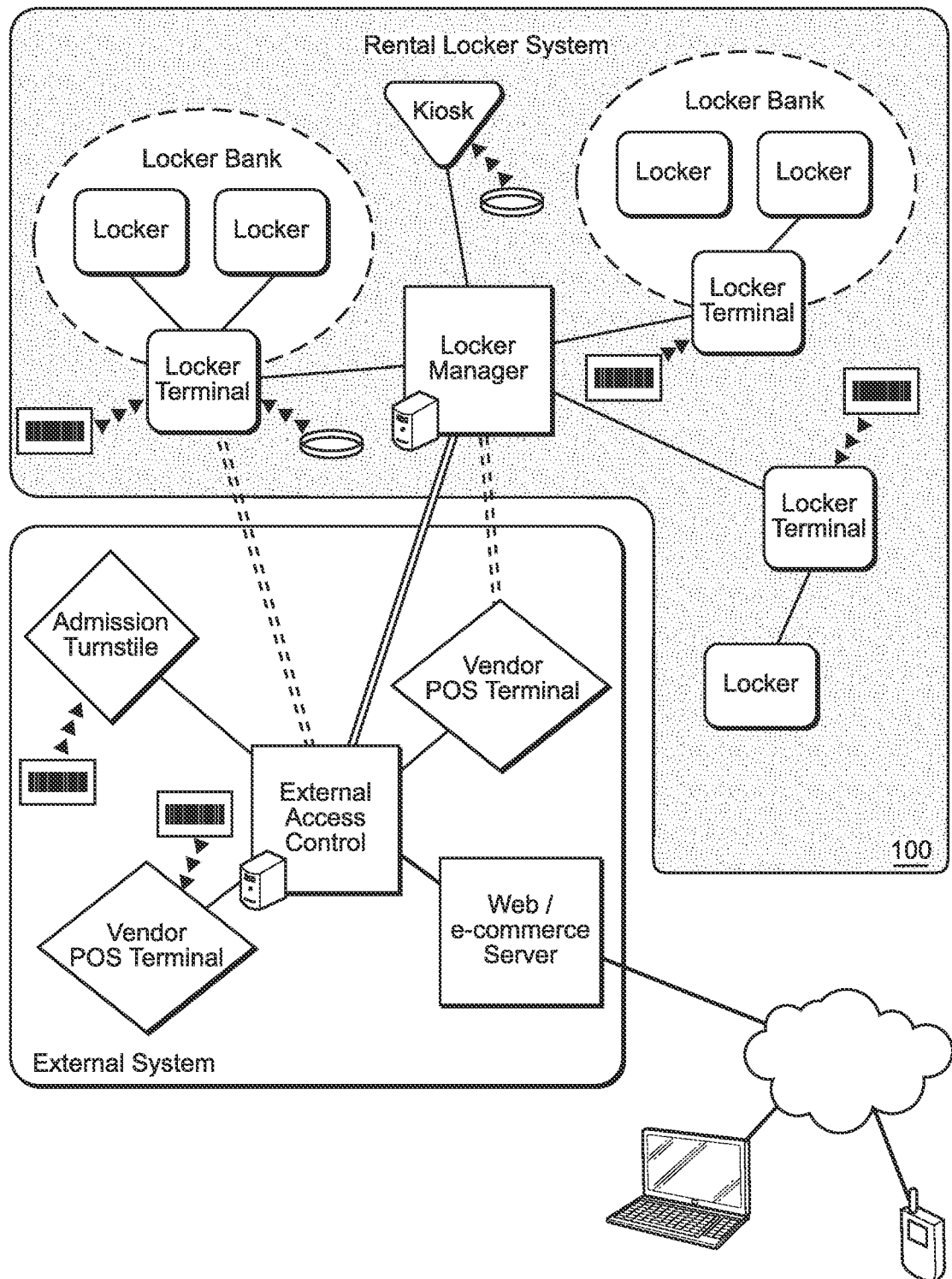
Figure 6A:
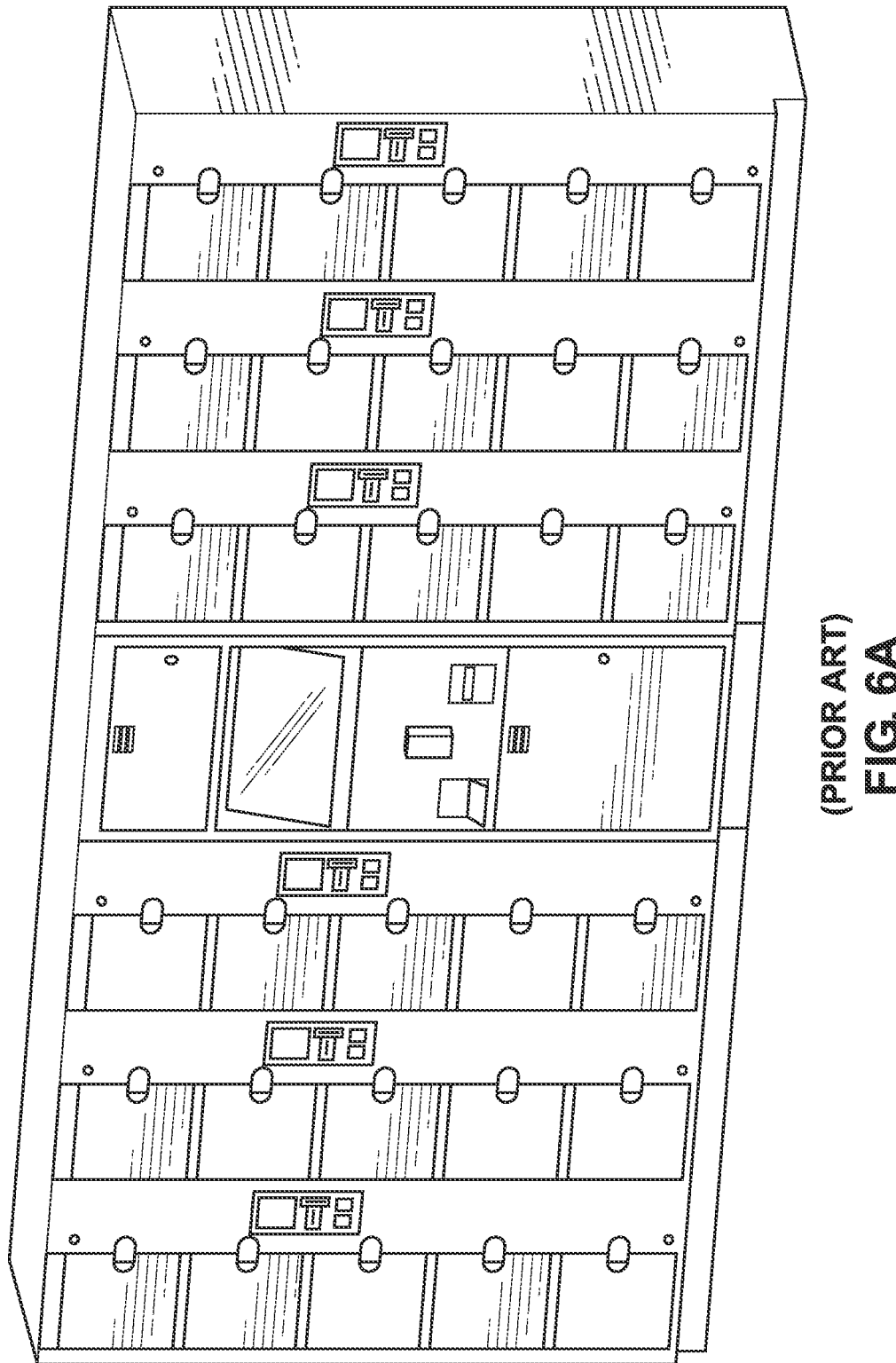
Figure 6B:
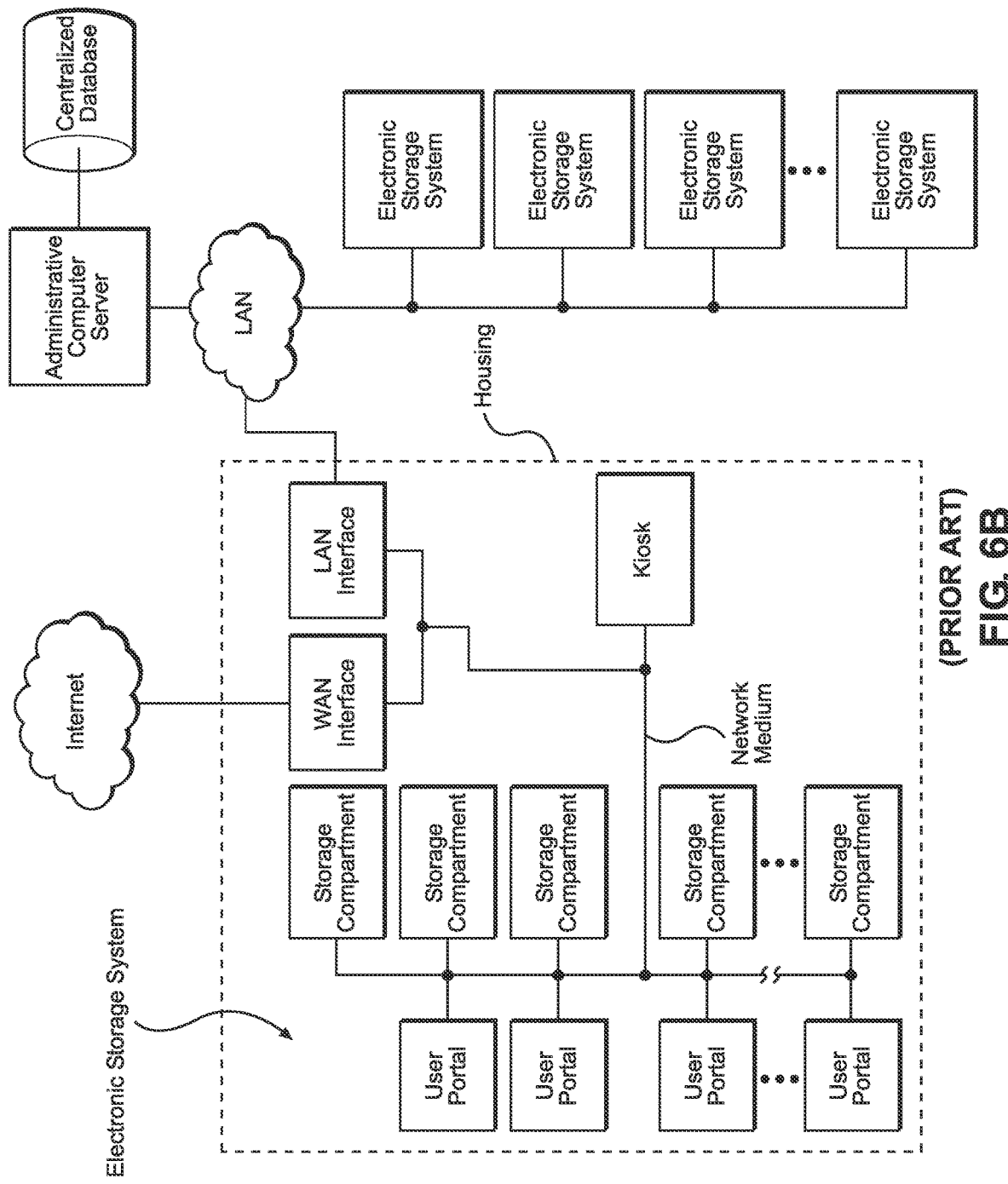
Figure 6D:
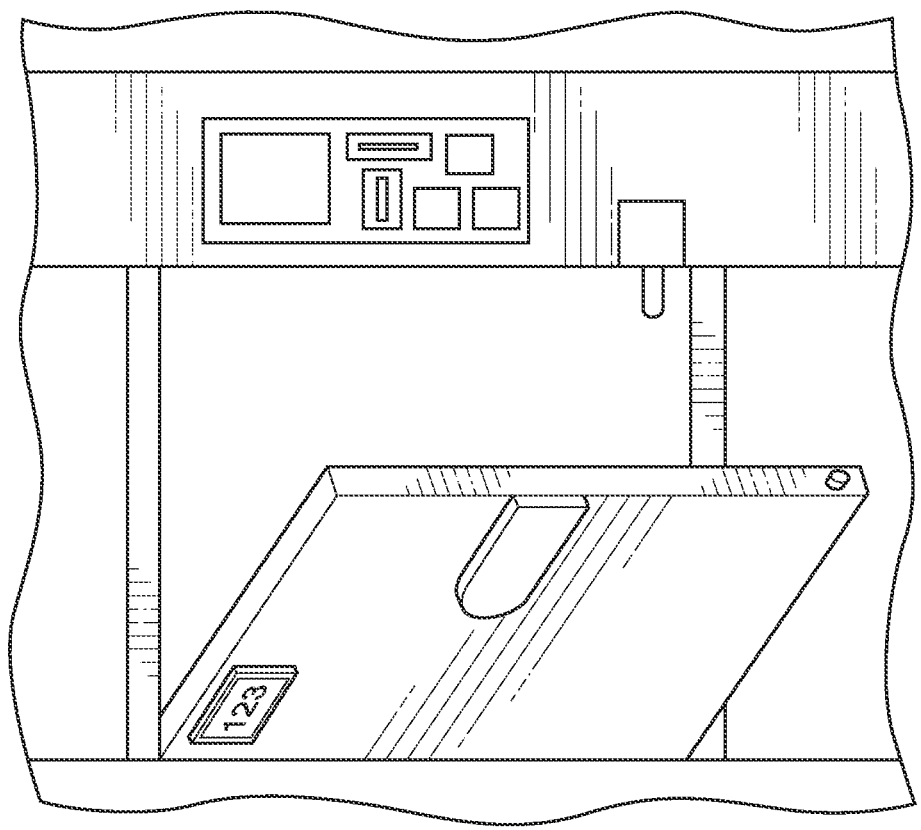
Figure 38C:
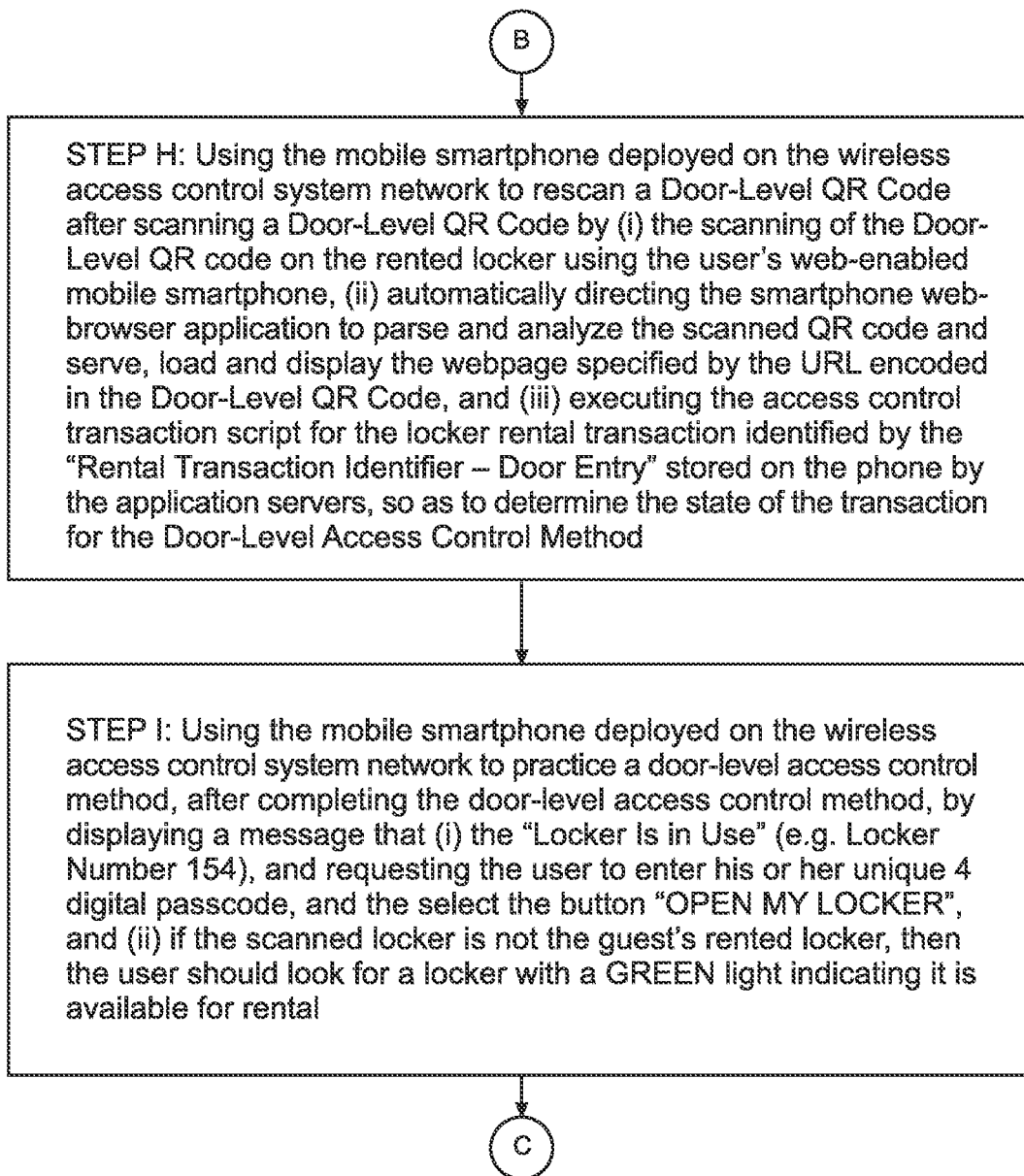

Specification of the Method of Managing Access Control to a Networked Locker System by Rescanning the Door-Level QR Code Posted or Displayed on the Front Door of the Storage Locker Deployed Within the Amusement Park Facility After the Locker has Been Scanned and Rented, Using a Mobile Smartphone Wireless Connected to the Wireless Access Control System Network of the Present Invention FIGS. 38C and 3D describes the primary steps involved when carrying out the method of managing access control to a networked locker system by rescanning Door-Level QR Codes 40C posted or displayed on the front door of each storage locker deployed within the amusement park facility, after the locker has been previously scanned and rented, using a mobile smartphone wireless 130 connected to the wireless access control system network of the present invention 1.

Figure 41:
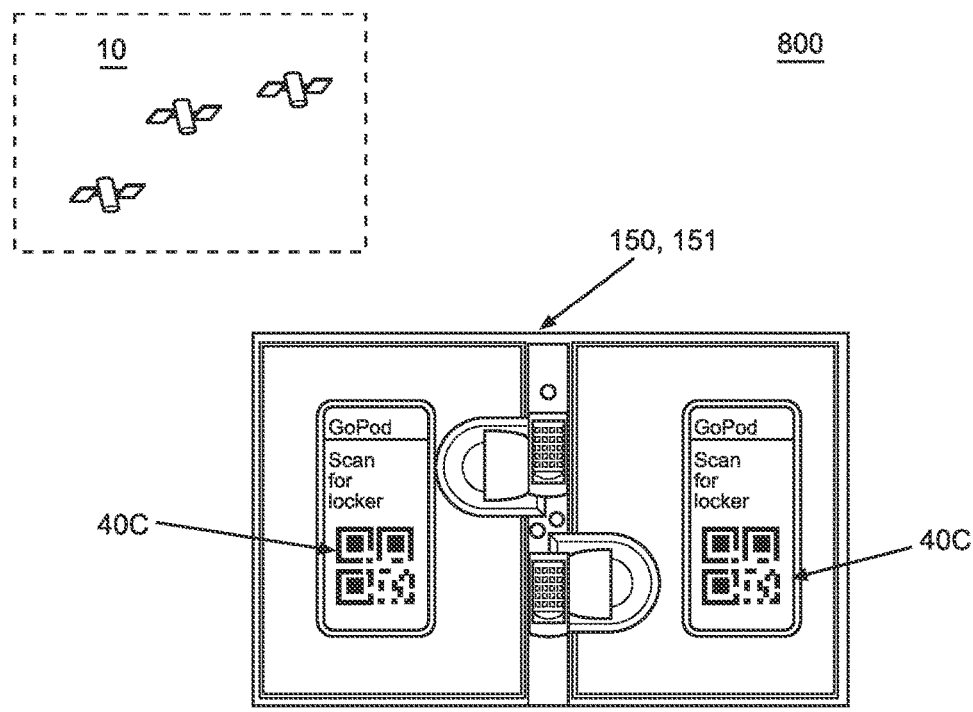
FIG. 41 is a plan view of the Door-Level QR Code physically posted or electrically displayed on the front door surface of each locker unit in the GPS-tracked wireless networked locker system illustrated in FIG. 26, wherein at this most explicit level, Door Level, users are allowed to directly rescan the rented locker door they want to access to remove personal belongings.

FIG. 41 shows the Door-Level QR Code 40C physically posted or electrically displayed on the front door surface of each locker unit in the GPS-tracked wireless networked locker system 150 illustrated in FIG. 26, wherein at this most explicit level, Door Level, users are allowed to directly rescan the rented locker door they want to access to remove personal belongings.

Figure 38D:
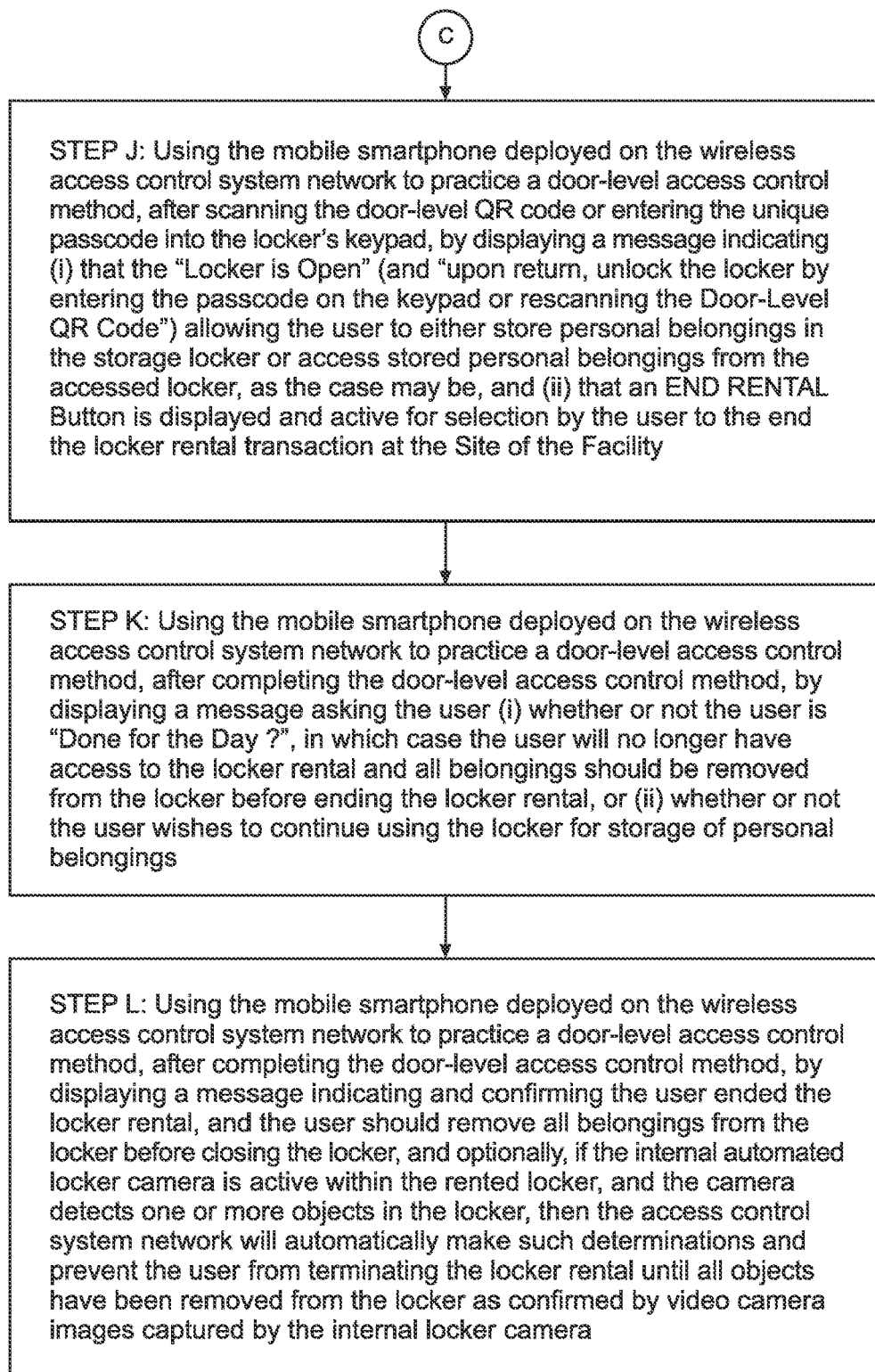

The method described and illustrated in FIGS. 38C and 38D is supported by the GUI screens shown in FIG. 42A through 42E.

As indicated at Step H of FIG. 38C, and as shown in FIG. 42A, a mobile smartphone 130 deployed on the wireless access control system network is used to rescan a Door-Level QR Code 40C after scanning a Door-Level QR Code 40C by (i) the scanning of the Door-Level QR code on the rented locker 151 using the user's web-enabled mobile smartphone 130, (ii) automatically directing the smartphone web-browser application to parse and analyze the scanned QR code and serve, load and display the webpage specified by the URL encoded in the Door-Level QR Code, and (iii) executing the access control transaction script for the locker rental transaction identified by the "Rental Transaction Identifier-Door Entry" stored on the phone by the application servers, so as to determine the state of the transaction for the Door-Level Access Control Method.

As indicated at Step I of FIG. 38C, and as shown in FIG. 42B, the mobile smartphone 130 deployed on the wireless access control system network 1 is used to practice a door-level access control method, after completing the door-level access control method, by displaying a message that (i) the "Locker Is in Use" (e.g. Locker Number 154), and requesting the user to enter his or her unique 4 digital passcode, and the select the button "OPEN MY LOCKER", and (ii) if the scanned locker is not the guest's rented locker, then the user should look for a locker with a GREEN light indicating it is available for rental.

As indicated at Step J of FIG. 38C, and as shown in FIG. 42C, the mobile smartphone 130 deployed on the wireless access control system network 1 is used to practice a door-level access control method, after scanning the door-level QR code or entering the unique passcode into the locker's keypad, by displaying a message indicating (i) that the "Locker is Open", and upon return, unlocking the locker by entering the passcode on the keypad or rescanning the Door-Level QR Code 40C, and allowing the user to either store personal belongings in the storage locker or access stored personal belongings from the accessed locker, as the case may be, and (ii) that an END RENTAL Button is displayed and active for selection by the user to the end the locker rental transaction at the Site of the Facility.

As indicated at Step K of FIG. 38D, and as shown in FIG. 42D, the mobile smartphone 130 deployed on the wireless access control system network 1 is used to practice a door-level access control method, after completing the door-level access control method, by displaying a message asking the user (i) whether or not the user is "Done for the Day ?", in which case the user will no longer have access to the locker rental and all belongings should be removed from the locker before ending the locker rental, or (ii) whether or not the user wishes to continue using the locker for storage of personal belongings.

As indicated at Step L of FIG. 38D, and as shown in FIG. 42E, the mobile smartphone 130 deployed on the wireless access control system network 1 is used to practice a door-level access control method, after completing the door-level access control method, by displaying a message indicating and confirming the user ended the locker rental, and the user should remove all belongings from the locker before closing the locker 151. Optionally, if the internal automated locker camera is active within the rented locker, and the interior video camera 155A detects one or more objects in the locker 151, then the access control system network 1 will automatically make such determinations and prevent the user from terminating the locker rental until all objects have been removed from the locker as confirmed by video camera images captured by the internal locker camera 155A.

The above-described machine-readable code-driven access control method of the present invention shows how it is now possible to enable wireless rental, access and control to a specified locker (151) in a GPS-specified networked locker system 150 using a web-enabled smartphone 130, to read a Door-Level machine-readable (QR) code symbol to automatically initiate direct communication with the web-based communication/application/database servers maintained with the data center 12 of the wireless system network 1, and conduct the supporting web-based transaction. Each time the code symbol is scanned and the guest user seeks to open a rented locker, as well as an unavailable locker, transaction records of such events are recorded in the RDBMS of the data center 12.

However, during emergencies, when electrical power and/or Internet connectivity are disrupted, the system and method of the present invention allows the guest user to directly enter his or her digital password (e.g. PIN) into the keypad 158 provided on the rented locker unit 151, and locally operate its lock controller (provided with local battery power backup) and where the digital password (PIN) is stored in local memory 153 of the locker unit 151, as shown in FIG. 14, by the system network servers within the data center 12 during the web-based rental, access and control method of the present invention. This inventive feature allows the guest to unlock the electronically-controlled lock unit in locker unit 151, and open the locker door and access one's personal belongings while the locker system is disconnected from the Internet infrastructure and/or during local power disruptions. Details regarding this back-up local access method are disclosed in U.S. Pat. No. 8,990,110, US Patent Application No. US2019/0035186, incorporated herein by reference.

Also, during emergencies, when electrical power and/or Internet connectivity are disrupted, the system and method of the present invention also allows the guest user to locally communicate with the locker controller, through its network adapter and antennas (e.g. using Bluetooth and/or WIFI protocols), to establish a communication session between the mobile smartphone 130 and the rented locker unit 151, and then enter the guest's digital locker password (i.e. PIN) via the virtual keypad (GUI screen) on the mobile smartphone 130, to locally operate its lock controller (provided with local battery power backup), and where the digital password (PIN) is stored in local memory 153 of the locker unit 151, as shown in FIG. 14, by the system network servers within the data center 12 during the web-based rental, access and control method of the present invention. This inventive feature allows the guest to unlock the electronically-controlled lock unit of a rented locker unit 151, and open the locker door and access one's personal belongings while the locker system is disconnected from the Internet infrastructure and/or during local power disruptions.

Specification of the Method of Managing Access Control to a GPS-Tracked Wireless Networked Stroller by Scanning Device-Level QR Codes Posted or Displayed on the Stroller Available for Rental, Controlled Access and use Within the Amusement Park Facility, Using a Mobile Smartphone Wireless Connected to the Wireless Access Control System Network of the Present Invention As shown in FIG. 44, guest users can use their mobile smartphone 130 to scan the Device-Level QR Code 40C posted on the GPS-tracked wireless networked stroller 90, and rent the stroller for terms that make sense. A primary advantage of the direct scan method is that intelligence regarding the stroller's Model, Price, Site, and Facility are effectively built into the Device-Level QR Code 40C so that users can enjoy an expedited rental experience, with involvement in minimal data entry operations. This method will be described in detail below.

FIGS. 43A, 43B and 43C describes the primary steps involved when carrying out the method of managing access control to a GPS-tracked wireless networked stroller 90 by scanning the Device-Level QR Code 40C posted or displayed on the stroller available for rental, controlled access and use within the amusement park facility 800, using a mobile smartphone 130 wireless connected to the wireless access control system network of the present invention 1.

As indicated in Step A of FIG. 43A, and as shown in FIG. 45A, a mobile smartphone 130 deployed on the wireless access control system network 1 is used to practice a device/thing-level access control method, by (i) the scanning of a Device-Level QR Code 40C on an available GPS-tracked wireless networked stroller, and (ii) automatically directing the smartphone web-browser application to parse and analyze the scanned QR code and serve, load and display the webpage specified by the URL encoded in the Device-Level QR Code, and whereupon, the application server stores a "Rental Transaction Identifier-Device-Entry" (RTI-DE) within the cache on the mobile smartphone.

As indicated at Step B of FIG. 43A, and as shown in FIG. 45B, the mobile smartphone 130 deployed on the wireless access control system network 1 is used to practice a device/thing-level access control method, by the user selecting the "Rent This Stroller" Button to rent the scanned and selected stroller for a specific time/date (e.g. All Day Rental), given its specified stroller size, and rental price, at the Site within the Facility.

As indicated at Step C of FIG. 43A, and as shown in FIG. 45C, the mobile smartphone 130 deployed on the wireless access control system network 1 is used to practice a device/thing-level access control method, by the entry of the user's full name and phone number for use in opening the rental locker 151, and selecting SAVE and CONTINUE to save the request in the RDBMS of the wireless access control system network.

As indicated at Step D of FIG. 43B, and as shown in FIG. 45D, the mobile smartphone 130 deployed on the wireless access control system network 1 is used to practice a device/thing-level access control method, by displaying the rental terms for the stroller 90 (e.g. one day rider only, to remain seated, always keep hands and feet inside stroller, slow speed for turns, do not exceed stroller weight limits, and do not leave valuable in an unintended stroller) to be checked by the user/renter, and then selecting CONFIRM and CONTINUE, to initiate the web-based transaction between the web-enabled mobile phone and the system's web-enabled e-commerce-supported stroller access control servers, maintained at the data center 12.

As indicated at Step E: of FIG. 43B, and as shown in FIG. 45E, the mobile smartphone 130 deployed on the wireless access control system network 1 is used to practice a device/thing-level access control method by displaying the selected stroller size, renter information, rental terms, and total price of the stroller rental (tax included), and providing several options for the user to make payment (e.g. using ApplePay® or using a credit card or debit card of the user, in which case, the card number and expiration date i.e. month/year are requested).

As indicated at Step F of FIG. 43B, and as shown in FIG. 45F, the mobile smartphone 130 deployed on the wireless access control system network is used to practice a device/thing-level access control method by displaying, after the prior payment transaction has been successfully completed, a message that the stroller is ready, along a Button enabled to "Unlock My Stroller" by the user simply clicking on the UNLOCK STROLLER Button, and a message indicating to lock the stroller, press the foot brake down 92 and press down on the red handle 97B.

As indicated at Step G of FIG. 43C, and as shown in FIG. 45G, the mobile smartphone 130 deployed on the wireless access control system network 1 is used to practice a device/thing-level access control method by displaying a message that the stroller 90 is UNLOCKED, and to roll the stroller 90, the user must lift the brake bar 92 with his or her foot before starting to push the stroller 90.

Specification of the GPS-Tracked Wireless Networked Amusement Park Game/Contest System Awarding Prizes to Game Winners, and Supporting a Local GPS-Tracked Wireless Networked Two-Sided Locker System for Storing Won Prizes by Guest Winners Using Door-Level QR Code Scanning FIG. 46 shows the GPS-tracked wireless networked amusement park game/contest system 310, located at its own Site within the Facility, and awarding prizes to game winners, and supporting a local GPS-tracked wireless networked two-sided locker system 300 that is access controlled by any guest winner using a mobile phone 130 to scan a door-level QR code 40C so as to rent and access a storage locker 301 for the purpose of storing a prize won at the game/contest while visiting the amusement park, and subsequently retrieving the prize from the locker on its retrieval side without interrupting game/contest play on the storage side of the prize locker.

FIG. 47A shows one electronically-controlled storage locker 301 contained in the two-sided locker system 300 deployed at the GPS-tracked wireless networked amusement park game/contest system 310 illustrated in FIG. 46. As shown, the system architecture of each electronically-controlled locker is shown and described in FIG. 48, and each GPS-tracked wireless networked locker unit 301 is access controlled and managed using Door-Level QR Codes 40C in a manner similar to that described herein with regard to the other illustrative embodiments of the present invention.

FIG. 47B shows the electronically-controlled storage locker 301 shown in FIG. 47A, showing its RGY status indicator lights, electronic-ink display panel, and Door-Level QR Code 40C posted on the locker door surface.

FIG. 48 shows a GPS-tracked wireless network QR code driven local access-controlled locker system present invention, shown comprising:

As shown in FIG. 48, each wireless networked two-sided prize locker system 301 comprises the following components: a double-sided locker unit 301 with a hinged locker door on the storage side, and a hinged door on the retrieval side; a first door-level QR code 40C physically posted or electronically displayed on the storage-side door surface 305 using its E-ink panel 303; a second door-level QR code 40C physically posted or electronically displayed on the storage-side door surface using its E-ink panel 303; RGY locker status LED lights 302; an e-ink display controller 306 for the locker unit; an electronic lock module for each door 305, controlled by a local lock controller 307; a keypad 309 for each lock controller mounted on the locker door, for entry of digital lock code selected by the user; a network controller 308 for interfacing with the TCP/IP infrastructure 11 and communicating each locker unit with the wireless system network servers, as described herein; a digital video camera with a field of view (FOV) and interfaced with the system bus; and a GPS module interfaced with the lock controller and its system bus and programmed processor. As shown, the double-sided locker cabinet 300 is connected to the data center 12 via the cloud infrastructure, along with mobile phone systems 130, prize locker directory servers 350, prize storage locker director server 351, electronic payment systems 13, and the like.

FIG. 49 provides an illustration for the system shown in FIGS. 46 through 47B, and a method of playing a game at a game site using this system, and then winning a prize and storing the prize within the double-sided wireless networked prize locker system 300 installed at the game site, as described in FIGS. 46, 47A, 47B and 48. This method will be further described with referenced to FIGS. 50A and 50B described below.

Specification of the Method of Playing a Game at a Game Site, Winning a Prize and Storing the Prize Within a Double-Sided Wireless Networked Prize Locker System Installed at the Game Site FIGS. 50A and 50B describes the primary steps carried out when practicing the method of storing a prize won by a guest during a game or contest, within the double-sided wireless networked prize locker system shown in FIGS. 46, 47A, 47B and 48, in accordance with the principles of the present invention.

As indicated at STEP A of FIG. 50A, and as shown in FIG. 49, a Guest visits a Game Site managed by a Game Attendant, offering a prize every game winner and the option to store a won prize in a locker of a wireless networked double-sided pass-through locker cabinet system 300 installed at the Game Site. As shown, the storage side of the double-sided locker 300 is disposed on the same side of the Game Site where the guest won the prize and can store the won prize in a rented locker 301 rented, accessed and controlled using a mobile smartphone 130 reading a Door-Level QR Code 40C posted on the storage side of a locker available for rental, whereas the retrieval side of the double-sided pass-through locker system 300 is disposed on the outside of the Game Site, where the winning guest can retrieve the stored prize from a rented locker 301 using their mobile smartphone 130 reading the Door-level QR code 40C posted on retrieval side the rented locker 301.

As indicated at Step B of FIG. 50A, and as shown in FIG. 49, the Guest scans a Game-Level QR Code (Player Code) at the Game Site using his or her mobile smartphone 130, provides its SMS/Text phone number to the system servers, pays the Game Site for the right to play a Game according to published Game Rules, and then starts playing the Game while the Game Management Servers at the data center 12 (i) store a Game Transaction Identifier in local memory of the guest's mobile smartphone, and (ii) transmit a Game Transaction Receipt (e.g. via email, SMS/Text and/or native Application) to the Mobile Phone of the Game Attendant's operating the Game Site.

As indicated at Step C of FIG. 50A, and as shown in FIG. 49, if the Guest Player wins a prize during Game Play, then the Game Attendant asks the Player if he wishes to store the won gift in a prize storage locker, and if the Guest indicates YES, then the Guest Attendant invites the Guest to scan a Door-Level QR Code 40C on a prize locker that indicates availability (e.g. a GREEN LED Light is illuminated); however, if the Guest Player does not win a prize during Game Play, then the Game Attendant or system will ask the Player if he wishes to play the game once again.

As indicated at Step D of FIG. 50B, and as shown in FIG. 49, if the Guest indicates he wishes to store the won prize in a prize locker in the double-sided prize locker cabinet system, 300 then the Guest Attendant invites the Guest to scan a Door-Level QR Code on any prize locker in the cabinet that indicates availability (e.g. a GREEN LED Light is illuminated), and once scanned, thereby commencing the Door-Level QR Driven Access Control Method to provide rental and access control to the Guest so that he or she may store the won prize on the storage side of the double-sided locker cabinet system 300, and then close the locker door and return to the amusement park 800.

As indicated at Step E of FIG. 50B, and as shown in FIG. 49, in response to completing the prize locker rental transaction, the system sends the Guest Player a locker rental receipt and notification to return to locker to pick up and retrieve the stored prize before leaving the amusement park 800.

As indicated at Step F of FIG. 50B, and as shown in FIG. 49, after the passage of time on the same day, the Guest returns to the retrieval side of the double-sided prize locker system 300 to open the locker door where the prize was stored, by rescanning the Door-Level QR Code or entering the four-digit personal code (to the locker keypad if available) via the keypad 309 to open the locker door and retrieve the won prize, and thereafter closing the locker door and terminating the rental agreement.

Specification the Method of Purchasing Products at a Retail Store and Retrieving the Purchased Products Stored in a Contactless Manner from Within a Double-Sided Wireless Networked Locker System Installed at the Retail Store FIG. 51A shows a GPS-tracked double-sided wireless networked retail storage locker system enabling customers to retrieve purchased items from the lockers in a contactless manner using mobile phones and the wireless access control system network of the present invention.

FIG. 51B shows the double-sided wireless networked retail storage locker system of FIG. 51A from a different perspective, showing its backstage loading area for loading purchased items int the retail locker system, and its guest area where consumers retrieving purchased items from specified assigned lockers containing their purchased goods, in a contactless manner using the mobile scanning locker access control methods of the present invention described herein.

FIG. 52 shows the double-sided wireless networked retail storage locker system of FIGS. 51A and 51B, configured for contactless purchased item retrieval in a retail environment, integrated within the cloud-based GPS-tracking wireless access control system network of the present invention.

As shown in FIG. 52, the wireless networked locker system illustrated in FIGS. 51A and 51B comprises: a locker cabinet, installed in a retail or other order fulfillment environment, and provided with a plurality of electronically-controlled lockers, each being provided with (i) a backstage loading area as illustrated in FIG. 51B for the loading of specific lockers with purchased items associated with purchased orders, and (ii) a guest area where consumers retrieve purchased items from lockers containing their purchased goods; and electronics and communications equipment shown in FIG. 52.

As shown in FIG. 52, each locker unit 501 within the wireless locker cabinet system 400 comprises a rugged housing for containing objects, and a hinged front door provided with an electronic lock unit. Preferably, each locker unit 401 further comprises: an electronic lock module 404 mounted on the retrieval side of the locker unit and connected to a strike plate and the like to enable an electronically-controlled door lock, and connected to a local lock controller 406 to control its operation during the control access methods according to the principles of the present invention; a keypad 410 mounted one each locker door, to allow the user to manually enter a digital password to access and open the locker unit either locally, or via the wireless remote methods of access control enabled by the wireless system network of the present invention described herein; an electronic-ink and LCD display panel 403 and controller 405 for display messages from the lock controller 406 and network servers during the access control methods of the present invention described herein; a Bluetooth and WIFI network adapter and various antennas to support RF communications with various systems on the wireless system network, including the user's mobile smartphone 130; a network adapter/controller 407, connected to the locker controller 406, for providing TCP/IP network access to the wireless system network of the present invention, and all services supported on the Internet; a Door-Level QR code 40C either printed and mounted on the front door, or electronically displayed by the electronic ink display; Red/Green/Yellow (RGY) LED locker status indicator lights 402 interfaced with the system bus and controlled by the locker microcontroller; and a GPS module (e.g. UBlock® GPS/GNSS Module); an internal digital video camera with field of view (FOV) facing towards the customer to enable facial recognition, and an internal video camera for automatically detecting the presence or absence of items in each locker unit, and assist in managing the access control process supported within the retail locker system.

As shown in FIG. 52, the GPS-tracked wireless networked (transportable/potable) locker system is operably connected to the Internet's TCP/IP infrastructure, 11 to which is connected various computing resources including: electronic payment systems 13 to support e-commerce payment transactions (e.g. ApplePay®, credit and debit card transactions, PayPal®, etc.); the data centers 12 to support the wireless system network 1 of the present invention shown in FIGS. 10, 11 and 12; a web-based networked locker directory servers 450 and 451 supported by the retailer; mobile computing devices 130 such as millions of mobile smartphones deployed on the wireless system network; and web, application and database servers 12 associated with thousands of third-party service providers and vendors desiring to serve the guests and visitors of the facilities served by the system network of the present invention.

Specification of the Method of Purchasing Products at a Retail Store and Retrieving the Purchased Products Stored in a Contactless Manner from Within a Double-Sided Wireless Networked Locker System Installed at the Retail Store FIG. 53 describes a method of purchasing products at an online e-commerce and/or brick and mortar retail store, and thereafter retrieving the purchased items in a contactless manner from storage within a two-sided GPS-tracked wireless networked retail locker system 400, installed a retail store, order fulfillment center or like center, as shown and described in FIGS. 51A, 51B and 52 described in detail above.

As indicated in Step A of FIG. 53, and as shown in FIGS. 51A and 51B, a Consumer visits a Retailer's Online and purchases Products from the Retailer using an online payment method, and the Retailer then stores the purchased Products within one or more double-sided storage lockers 400 within a wireless networked double-sided locker cabinet system 400 installed at the retailer's store or fulfillment center, wherein the storage side of each locker is accessible by the Retailer and its Retail Fulfilment Clerks, and the retrieval side of each locker is closed by an electronic lock employed on the locker door that can be controlled and accessed using their mobile smartphone 130 reading the Door-level QR code 40C posted on retrieval side the storage locker.

As indicated in Step B of FIG. 53, and as shown in FIGS. 51A and 51B, after completing the e-commerce product purchase transaction and its method of payment, the Consumer receives a Message Notification from the Retailer informing the Consumer in which storage lockers the Consumer's Purchased Products are being stored and ready for pickup at a specified Retailer Fulfillment Center site.

As indicated in Step C of FIG. 53, and as shown in FIGS. 51A and 51B, the Consumer visits the specified Retailer Fulfillment Center, and opens each storage locker 401 specified in Retailer's Message Notification by (i) using the Consumer's mobile smartphone to scan and read the Door-Level QR Code 40C posted on the locker door of the storage locker 401, (ii) unlocking and accessing control over the locker, (iii) opening the locker and retrieving the purchased goods stored in the opened locker, and (iv) then closing the emptied locker, whereupon the wireless network system 1 automatically sends a Pickup Receipt Message Notification to the consumer's mobile phone 130 indicating that specific storage locker(s) were opened on a specified date and time at the Retailer's Fulfillment Center, and the purchased goods retrieved therefrom. Once skilled in the art will be able to readily developed GUI screens and workflows for the method described in FIG. 53, in view of the direct scanning methods of wireless access controlled shown in FIGS. 36 through 42E, and associated GUI screens and work flows described in detail hereinabove.

Specification of Delivering Products and Services to a Guest Visitor who has Rented a GPS-Tracked Thing for use within an Amusement Park or Recreational Environment Using a Mobile Smartphone to Scan Device-Level QR Code on the GPS-Tracked Thing Being Tracked Within a GPS-Tracked Wireless System Network of the Present Invention FIG. 54 describes the GPS-tracking wireless access control system network of the present invention 1, configured and arranged for supporting the offering and delivery of goods and services to a consumer who has previously rented/access-controlled things of value (e.g. lockers, strollers, strollers, and other gear) that is being GPS-tracked within field of GPS tracking supported by the GPS-tracking wireless access control system network, and many supporting GNSS platforms orbiting the Earth.

Specification of the Method of Delivering Products and Services to a Guest Visitor Who has Rented a GPS-Tracked Thing for Use within an Amusement Park or Recreational Environment Using a Mobile Smartphone to Scan Device-Level QR Code on the GPS-Tracked Thing Being Tracked Within a GPS-Tracked Wireless System Network of the Present Invention FIGS. 55A and 55B describe the method of delivering products and services to a guest visitor who has rented a GPS-tracked thing for use within an amusement park or recreational environment using a mobile smartphone 130 to scan device-level QR code on the GPS-tracked device being tracked within by the GPS-tracked wireless access control system network, as shown and described in FIGS. 10, 11, 12 and elsewhere through the present Patent Specification.

As indicated at Step A of FIG. 55A, and as shown in FIG. 54, a Consumer rents, accesses and controls and use of a GPS-tracked device or thing (e.g. locker, mobility solution, rain-gear, sun-gear, scuba-gear, surf-gear, bicycle-gear, picnic-gear, beach-gear, camping-gear, radio/stereo-gear, etc.) for use within an amusement park or recreational environment using a mobile smartphone 130 to scan and read a Device-Level QR Code 40C posted on the GPS-tracked thing being tracked within a GPS-tracking wireless access control system network 1.

As indicated at Step B of FIG. 55A, and as shown in FIG. 54, the GPS-tracking wireless access control system network 1 requests the Consumer to provide permission and authorization to vendors and service providers, registered with the system network, to provide product and service offers to the mobile smartphone 130 of the Consumer as the Consumer travels within the park environment and its GPS-tracked thing is tracked by the GPS-tracking wireless access control system network; and Consumer provides permission to registered vendors and service providers to send message notifications to the smartphone of the Consumer 130.

As indicated at Step C of FIG. 55B, and as shown in FIG. 54, as the Consumer's GPS-tracked thing(s) is used within the amusement or recreational park environment, the GPS-tracking wireless access control network (i) sends SMS/text and/or email offers to the mobile smartphone of the consumer throughout the day, offering and suggesting particular goods and/or services available for purchase/rental and consumption at particular site locations in the amusement park facility, (ii) enables e-commerce payment transaction for such goods and/or surfaces over the Consumer's web-enabled mobile smartphone 130, and (iii) provides messages and notification regarding the delivery of purchased/procured goods and/or services to the Consumer's at current GPS-tracked location in the amusement or recreational park environment, including sending SMS/text notifications, digital facility maps and directions to visitors to facilitate product and/or service delivery to the Consumer, to drive commerce and deliver value.

Specification of the Method of Depositing Cash or Check Into or Withdrawing Cash from GPS-Tracked ATM Systems Displaying ATM-Level QR Codes Supporting Secure Specified Financial Transactions by Scanning the ATM-Level QR Code Using a Mobile Smartphone Deployed on the GPS-Tracked Wireless System Network of the Present Invention FIG. 56 describe the method of depositing cash or check into or withdrawing cash from GPS-tracked ATM banking systems 500 displaying ATM-Level QR codes 40C supporting secure specified financial transactions by scanning an ATM-level QR code displayed on the ATM system using a mobile smartphone 130 deployed on the GPS-tracked wireless system network of the present invention 1, as shown and described in FIGS. 10, 11, 12 and elsewhere throughout the Patent Specification.

FIG. 57 describes the system architecture of the GPS-tracked ATM banking system 500 displaying ATM-Level QR codes to enable the consumer user to access and control the GPS-specified ATM system to perform a number of banking functions in a contactless manner (i.e. not touching the keyboard, LCD display screen and other elements of the ATM system), namely: (i) an ATM-Level QR code 40C posted or displayed on the ATM System to Deposit Cash into ATM's Cash Depositor, (ii) an ATM-Level Code 40C To Withdraw Cash From ATM's Cash Dispenser, and/or (iii) an ATM-Level QR Code 40C to Deposit Check into ATM Check Depositor.

As shown in FIG. 57, the GPS-tracked ATM banking system comprises: an ATM bank system 500 having a secure cabinet/housing installation, containing a number of core components, namely: a bank ATM system 505 (as generally available numerous vendors around the world); a cash dispenser 502 integrated with the bank ATM system; cash depositor 501 integrated with the bank ATM system; a check depositor 502 integrated with the bank ATM system; a receipt bank ATM system; a GPS module 506 integrated with the bank ATM system; an electronic ink display panel 508, driven by an electronic-ink display panel controller 507 for displaying ATM-Level QR Codes 40C as required or desired in a given application environment; a set of ATM-level QR codes 40C programmed for initiating and conducting at least the following ATM-supported financial transactions, namely, (i) an ATM-Level QR code configured to enable Depositing Cash into ATM's Cash Depositor, (ii) an ATM-Level Code configured to enable Withdrawing Cash From ATM's Cash Dispenser, and (iii) an ATM-Level QR Code configured to enable Depositing a Check into ATM Check Depositor; a network controller for enabling the GPS-tracked ATM bank system to establish and maintain data communications with other servers and clients connected to the TCP/IP infrastructure 11 of the Internet; and a network fire device for providing network security to each GPS-tracked ATM bank system deployed on the GPS-tracking wireless network of the present invention, shown in FIGS. 10, 11 and 12.

As shown, the system network 1 further comprises: mobile phone systems 130; bank financial transaction servers 520 that connect and transaction with the GPS-tracked ATM bank system 500 and the customer's mobile smartphones; an ATM bank system directory server 530 maintaining a web-based directory of ATM systems; authentication servers 540; electronic payment systems 13; and the web, application and database servers 12A, 12B, 12C supported by the data centers 12 supporting the wireless system network of the present invention.

Method of Depositing Cash and/or Checks in or Withdrawing Cash from an GPS-Tracked QR Code Driven ATM System in a Contactless Manner Using a Mobile Smart Phone Deployed on the Wireless Access Control System Network of the Present Invention FIG. 58 describes the primary steps carried out when practicing the method of depositing cash and/or checks in or withdrawing cash from an GPS-tracked QR code driven ATM banking system shown in FIGS. 56 and 57, in a contactless manner using a mobile smart phone deployed on the wireless access control system network of the present invention.

As indicated at Step A of FIG. 58, and as shown in FIGS. 56 and 57, a Consumer visits a secure QR Code Driven ATM System 500 and uses a mobile smartphone to scan/read either (i) an ATM-Level QR Code 40C posted or displayed on the ATM System to Deposit Cash into ATM's Cash Depositor 501, (ii) an ATM-Level Code To Withdraw Cash From ATM's Cash Dispenser 502, or (iii) an ATM-Level QR Code to Deposit Check into ATM Check Depositor 502. Once the webpage is loaded on the mobile smartphone from the bank's financial transaction servers to support the requested financial transaction specified by the scanned ATM-Level QR Code 40C, and authentication is completed and a secure connection established between the mobile smartphone and the bank's financial transaction servers 520 and the GPS-tracked ATM system 500, a secure web-based financial transaction is carried out between the ATM 500, the Mobile Phone 130 and Bank's Financial Server 520 over the Internet, to enable Depositing of Cash Into ATM, Withdrawal of Cash from ATM, or Depositing Check into ATM, as specified by scanned ATM-Level QR Code 40C, all without contacting the ATM system 500 or any of its surfaces. During the process, the consumer will be instructed and requested to select features from the mobile phone display screen, and enter cash or check or withdraw cash as required by the transaction, and take a printed receipt if desired from receipt printer 504. The workflows will follow the principles described for Door-Level QR Code Scanning described and illustrated in FIGS. 40A through 40G, but will be adapted and modified for the particular financial transaction being engineered and executed on the ATM-supported service platform of the present invention, in a manner that will be generally known by those skilled in the art, without undue experimentation, having the benefit of disclosure and teachings of the present invention disclosed herein.

As indicated at Step B in FIG. 58, and as shown in FIGS. 56 and 57, the consumer's web-enabled mobile phone 130 will display GUI screens to support the required financial transaction with the ATM, specified by the scanned ATM-Level QR Code 40C, using the Bank's Financial Transaction Servers 520 and the GPS-tracked ATM Bank System communicating with the Bank's ATM Bank System 500 during a secure encrypted HTTP transaction.

As indicated at Step C in FIG. 58, and as shown in FIGS. 56 and 57, after completing the financial transaction and either depositing cash or check into, or withdrawing cash from the GPS-tracked ATM Bank System 500, as specified by the scanned ATM-Level QR Code 40C, the Bank's Financial Transaction Server 520 sends the Consumer's mobile phone 130 a receipt of the completed financial transaction indicating the GPS-tracked and access controlled ATM Bank System during the transaction on a specified date, time and GPS-coordinates, matched with the GPS coordinates collected from mobile phone 130 by the Bank's Financial Transaction Servers 520.

The value and benefit of the above-described GPS-tracked ATM banking system 500 will become readily apparent hereinafter, and further, in view of ongoing COVID-19 pandemic impacting the entire planet and global economy.

Also, GPS-tracked ATM banking system can be readily modified to provide a GPS-tracked train, rail or other admission ticket dispensing machine (TDM) system driven by TDM-Level QR Codes posted or displayed from the TDM System, in a way similar to the GPS-Tracked ATM Bank System 500 for scanning by a customer's web-enabled mobile smartphone 130 deployed on the wireless access control system of the present invention 1.

General Applications for Wireless System Network of the Present Invention

In addition to serving the many functions described herein, the GPS-tracking wireless system network of the present invention, and various novel mobile phone based access control methods, can also provide a complete decentralized point of sale (POS) and thing delivery system, where some things are "Internet of things" (IoT) connected, and are provided on self-serve basis to consumers; some things are physical items that can rented or purchased, with or without the assistance of a human attendant, or automated robot, and for which the guest can walk away; some things are physical items that are tied to secure storage locations and virtually connected to the purchaser/renter's mobile phone for later retrieval using cookie technologies known in the art; and some things have an intermediary "game" aspect between the person (e.g. player) and the item (e.g. prize) that can be offered to the winner in a touchless two-sided locker as described in FIGS. 46 through 50B.

Driving GP S-Driven Commerce Applications

As described and illustrated in FIGS. 54 through 55B, any guest who rents a GPS-tracked thing at a park or other venue, or even a non-GPS-tracked item (e.g. a Zip-line adventure trip) can request to receive SMS/text and/or email offers and notifications throughout the day, on a specified mobile smartphone number. Such concierge-like platform supported services can then use GPS information collected by the GPS-tracked thing to help locate, identify and suggest particular and useful/valuable goods and/or services to guests that are available for purchase/rental and consumption at particular site locations in the amusement park facility.

Also the GPS-tracking wireless platform of the present invention described herein can also enable vendors and service providers to provide and deliver specific goods and/or services to the guests at their current location in the amusement park, and even send notifications, directions and digital mobile facility maps on the mobile phones of guest visitors to facilitate service delivery while guests are freely moving around the park or other environment.

Upselling Goods and Services at Parks and Venues

As described and illustrated in FIGS. 54 through 55B, the GPS-tracking wireless system network and mobile phone based methods of the present invention will also enable vendors and service providers to send product/service offers and promotions to mobile phones based on anything of value that has been previously rented/accessed via a transaction (e.g. locker, mobility solution, rain-gear, sun-gear, scuba-gear, surf-gear, bicycle-gear, picnic-gear, beach-gear, radio/stereo-gear, etc.); and then Fulfil and Deliver the offered Goods and Services using the user's mobile phone, for the purpose of providing better and more economical ways of driving commerce and delivering consumer value.

Contactless Retrieval of Purchased Goods at Retail Stores

As described and illustrated in FIGS. 51 through 52, wireless system network and mobile phone based methods will enable consumers to send goods purchased at a retail store (in a park or anywhere outside for that matter, for storage and contactless retrieval at pickup centers, using a web-based mobile smartphone described herein in great detail.

Providing GPS-Tracked ATM Systems, Deployed on the GPS-Tracking Wireless Control Access System Network to Support Secure ATM-Based Financial Transactions Where Individuals Wish to Securely Withdraw and/or Deposit Cash and Deposit Checks without Touching a Public Touch-Screen Supported on an ATM Machine The GPS-tracked wireless and secure access control system network, and related mobile phone methods described hereinabove, can also be readily adapted to accessing and controlling ATM machines operated by banks and other financial institutions around the world. In a first illustrative embodiment, an ATM machine would be provided with (i) an electronic-ink display screen for electronically displaying ATM-level QR codes, or (ii) one or more printed ATM-level QR codes posted on the ATM system, so that bank customers, with a mobile phone with a web-browser and/or appropriately developed native client application can read the ATM-QR code and carry out a secure web-based financial transaction involving the specific ATM system at its specified GPS location, all in a contactless manner, involving the depositing and/or withdrawal of cash, and/or depositing of checks, with the GPS-tracked ATM system, as the case may be. Proper authentication methods will be used, in conjunction with necessary encryption methods required by financial industry, and state and federal laws.

Further Advantages of Provided by Various Aspects of the Present Invention

The GPS-enabled wireless networked lockers of the present invention shown and described in FIGS. 10, 11, 12, 13A through 14A, 25, 26, and 27 through 27C and related methods, will provide additional insight and great value, namely: real-time, updateable accurate database of our rather expensive locker assets—offering with certainty the location and count of our cabinets that have been distributed throughout America and the world; real-time visibility with the push of a button; Aids in mapping functions without the need to program/go through data entry.

The modular portable wireless networked locker systems of the present invention provide many advantages: they require no wires and are highly movable; they offers a great solution to temporary or event-based locker systems, as witnessed by the current COVID-19 pandemic, where temporary hospitals were set up in convention centers and lockers were added; and support large venues like stadiums whom want lockers only for concerts; where dormant lockers cannot be afforded for the 60 or 70% of days when no event is happening. Banks of lockers can be brought in and all typical services can be offered automatically: Inventory; Location; and Find-my-locker (e.g. guest-facing applications)

Modifications of the Illustrative Embodiments of the Present Invention

The present invention has been described in great detail with reference to the above illustrative embodiments. It is understood, however, that numerous modifications will readily occur to those with ordinary skill in the art having had the benefit of reading the present disclosure.

While electronic payment systems were disclosed in the illustrative embodiments, for use in paying for rental and purchase agreements, it is understood that non-banking based credit/debit card payment systems, can be used, including but not limited to reimbursement, trading and/or barter systems. Such alternative value-based systems can include, for example, BITCOIN, tokens, and diverse forms of social-based value and/or economic credit in current used, or to be devised and used among people in the future.

While electronic-ink display systems have been disclosed herein because of their low power consumption and excellent performance in high-brightness outdoor environments, it is understood that any electronic visual display technology employing any display medium, including liquid crystal displays (LCDs), plasma, as well as electronic-ink, display media can be used to practice the information display aspects of the present invention.

While web-based mobile smartphones have been the preferred technology for reading machine-readable codes applied to the facility, site and device/thing levels, in accordance with the principles of the present invention, it is understood that web-enabled body-mounted computing devices, such as Apple® and Samsung® smartwatches can be used to practice the methods of the present invention. Also, it is understood that these code symbol scanning methods can involve using code reading devices that are separate systems from the web-enabled computing systems that support the transactions between the consumer and vendors/service providers who provide the articles that might be then accessed and controlled using the wireless system network of the present invention.

While GPS-tracking has been integrated into the core services of the wireless access and control system network 1 of the present invention disclosed herein, for use in GPS-tracking of articles and things that are rented, leased or even purchased, it is understood that not all transactions supported and services provided by the wireless system network of the present invention (i.e. "the Platform") will require GPS-tracking, while employing mobile communication devices 130 to support transactions and methods of access and control, as taught herein.

Also, in alternative embodiments of the present invention described hereinabove, the system can be realized as a stand-alone application, or integrated as part of larger system networks. Such alternative system configurations will depend on particular end-user applications and target markets for products and services using the principles and technologies of the present invention.

These and all other such modifications and variations are deemed to be within the scope and spirit of the present invention as defined by the accompanying Claims to Invention.

What is claimed is:

1. A method of providing device-level access control to a wireless-networked stroller using a web-enabled mobile phone to scan a device-level machine-readable code posted on each of a plurality of wireless-networked strollers available for selection, rental, access and usage within an environment involving the wireless transmission and reception of radio signals between said wireless-networked stroller and a wireless access control system, said method comprising the steps of:

(a) using a web-enabled mobile phone deployed on and operably connected to a wireless communication infrastructure, and for scanning of a device-level machine-readable code posted on a wireless-networked stroller selected for rental, access and usage in said environment, wherein said wireless-networked stroller includes a stroller framework for carrying a passenger, and having at least a set of wheels mounted on an axle provided with a wheel braking assembly;

a hand-actuated control bar assembly mounted on said wireless-networked stroller by way of mounting brackets attached to said stroller framework, and wherein said hand-actuated control bar assembly including a user-operated handle fixed to a first rod member slidably connected with a second rod member that is terminated in a brake foot portion adapted for engaging with said wheel brake assembly during brake locking operations;

a wireless wheel-axle control module operably connected to said hand-actuated control bar assembly, and adapted for wireless transmission and reception of radio signals between said wireless-networked stroller and said wireless access control system;

said wireless wheel-axle control module having a battery-operated motor controllable in a locked state of operation and in an unlocked state of operation;

wherein when said battery-operated motor is controlled in said locked state of operation, said user-operated handle is locked stationary relative to said second rod member, while said brake foot portion engages with and locks said wheel braking assembly so that said stroller framework cannot move freely on a support surface; and wherein when said battery-operated motor is controlled in said unlocked state of operation, a user is prevented from pushing said user-operated handle downward and causing said wheel braking assembly to move into a locking position, so that said wheels are unlocked and free to rotate without resistance, and said stroller framework can move freely on said support surface;

(b) when said web-enabled mobile phone scans said device-level machine-readable code displayed on said wireless-networked stroller, a stroller rental transaction is completed over said wireless access control system, and the user obtains access control over said rented wireless-networked stroller supported by wireless radio signal and transmission between said wireless-networked stroller and said wireless access control system, then said wireless wheel-axle control module enables said unlocked state of operation, in which said set of wheels are allowed to rotate and said stroller framework is allowed to move freely on said support surface; and (c) when the user uses said web-enabled mobile phone to terminate said stroller rental transaction over said wireless access control system, and returns access control over said rented wireless-networked stroller, then said wireless wheel-axle control module enables said locked state of operation, in which said set of wheels are prevented from rotation and said stroller framework is not allowed to move freely on said support surface.

2. The method of claim 1, wherein said battery-operated motor is a battery-operated rotary motor, and said wireless wheel-axle control module further includes a rotatable locking key and a spring-biased locking pin;

wherein during said locked state of operation, said battery-operated rotary motor rotates said rotatable locking key into said locked state to allow said spring biased locking pin to engage inside a hole formed in said second rod member, locking said user-operated handle stationary relative to said second rod member, while said brake foot portion engages with and locks said wheel braking assembly so that said stroller framework cannot move freely on said support surface; and wherein during said unlocked state of operation, wherein said battery-operated rotary motor rotates said rotatable locking key into said unlocked state to prevent said spring biased locking pin from engaging in said hole in said second rod member, and preventing said user from pushing said user-operated handle downward and causing said wheel braking assembly to move into a locking position, so that said wheels are unlocked and free to rotate without resistance, and said stroller framework can move freely on said support surface.

3. The method of claim 1, wherein said wireless-networked stroller further comprises: a GPS transceiver for tracking said wireless-networked stroller within a GPS system associated with said wireless access control system.

4. The method of claim 1, wherein step (a) comprises using said web-enabled mobile phone for renting said selected wireless-networked stroller for a specific time/date, given its specified stroller size, and rental price, at the site within said environment.

5. The method of claim 1, wherein step (b) comprises using said web-enabled mobile smartphone for entering an access code in the form of the user's name and phone number for accessing said selected wireless-networked stroller, and storing in said database on said wireless communication infrastructure.

6. The method of claim 1, wherein step (b) comprises using said web-enabled mobile phone for displaying the rental terms for the wireless-networked stroller and completing a web-based transaction for the rental of the selected wireless-networked stroller.

7. The method of claim 1, wherein step (b) comprises using said web-enabled mobile phone for displaying the selected stroller size, renter information, rental terms, and total price of the stroller rental, and providing several options for the user to make payment.

8. The method of claim 1, wherein step (b) comprises using said web-enabled mobile phone for displaying a first message enabled to unlock said wireless-networked stroller, and a message indicating how to lock said wireless-networked stroller.

9. The method of claim 1, wherein step (b) comprises using said web-enabled mobile phone for displaying a second message indicating that said rented wireless-networked stroller is unlocked.

10. The method of claim 1, wherein said wireless wheel-axle control module further includes a rechargeable battery module for supplying battery power to electro-mechanical components including said battery-operated motor and electronic control circuitry within said wheel-axle control module.

11. A wireless-networked stroller available for selection, rental, access and usage within an environment involving wireless transmission and reception of radio signals between said wireless-networked stroller and a wireless access control system, said wireless-networked stroller comprising:

a stroller framework for carrying a passenger, and having at least a set of wheels mounted on an axle provided with a wheel braking assembly, a device-level machine-readable code displayed on a surface associated with said wireless-networked stroller, a hand-actuated control bar assembly mounted on said wireless-networked stroller by way of mounting brackets attached to said stroller framework, wherein said hand-actuated control bar assembly including a user-operated handle fixed to a first rod member slidably connected with a second rod member that is terminated in a brake foot portion adapted for engaging with said wheel braking assembly during brake locking operations; and a wireless wheel-axle control module operably connected to said hand-actuated control bar assembly, and adapted for wireless transmission and reception of radio signals between said wireless-networked stroller and said wireless access control system;

said wireless wheel-axle control module having a battery-operated motor controllable in a locked state of operation and in an unlocked state of operation;

wherein when said battery-operated motor is controlled in said locked state of operation, said user-operated handle is locked stationary relative to said second rod member, while said brake foot portion engages with and locks said wheel braking assembly so that said stroller framework cannot roll on a support surface; and wherein when said battery-operated motor is controlled in said unlocked state of operation, said user is prevented from pushing said user-operated handle downward and causing said wheel braking assembly to move into a locking position, so that said wheels are unlocked and free to rotate without resistance, and said stroller framework can roll freely on said support surface;

wherein when a web-enabled mobile phone employed by a user scans said device-level machine-readable code displayed on said wireless-networked stroller, a stroller rental transaction is completed over said wireless access control system, and the user obtains access control over said rented wireless-networked stroller supported by wireless radio signal and transmission between said wireless-networked stroller and said wireless access control system, then said wireless wheel-axle control module enables said unlocked state of operation, in which said set of wheels are allowed to rotate and said stroller framework is allowed to moved relative to the ground surface; and wherein, when the user uses said web-enabled mobile phone to terminate said stroller rental transaction over said wireless access control system, and returns access control over said rented wireless-networked stroller, then said wireless wheel-axle control module enables said locked state of operation, in which said set of wheels are prevented from rotation and said stroller framework is not allowed to move relative to the ground surface.

12. The wireless-networked stroller of claim 11, wherein said battery-operated motor is a battery-operated rotary motor, and said wireless wheel-axle control module further includes a rotatable locking key and a spring-biased locking pin;

wherein during said locked state of operation, said battery-operated rotary motor rotates said rotatable locking key into said locked state to allow said spring biased locking pin to engage inside a hole formed in said second rod member, locking said user-operated handle stationary relative to said second rod member, while said braking foot portion engages with and locks said wheel braking assembly so that said stroller framework cannot roll on a support surface; and wherein during said unlocked state of operation, wherein said battery-operated rotary motor rotates said rotatable locking key into said unlocked state to prevent said spring biased locking pin from engaging in said hole in said second rod member, and preventing said user from pushing said user-operated handle downward and causing said wheel braking assembly to move into a locking position, so that said wheels are unlocked and free to rotate without resistance, and said stroller framework can roll freely on said support surface.

13. The wireless-networked stroller of claim 11, wherein said wireless-networked mobility vehicle further comprises: a GPS transceiver for tracking said stroller framework within a GPS system associated with said wireless access control system.

14. The wireless-networked stroller of claim 11, wherein said web-enabled mobile phone runs a web-based application that is initiated by scanning said device-level machine-readable code, and supports messaging for rental confirmation, and mobile payment to reduce cash handling and labor costs.

15. The wireless-networked stroller of claim 11, wherein said web-based application supports fleet management, rider instructions for use of said wireless-networked stroller, and fleet reporting.

16. The wireless-networked stroller of claim 12, wherein said wireless wheel-axle control module further includes a rechargeable battery module for supplying battery power to said battery-operated motor and electronic control circuitry within said wheel-axle control module.

* * * * *